(12) United States Patent
Kaasila et al.

(10) Patent No.: US 7,737,993 B2
(45) Date of Patent: Jun. 15, 2010

(54) METHODS, SYSTEMS, AND PROGRAMMING FOR PRODUCING AND DISPLAYING SUBPIXEL-OPTIMIZED IMAGES AND DIGITAL CONTENT INCLUDING SUCH IMAGES

(76) Inventors: Sampo J. Kaasila, 6 Squirrel Run Rd., Plaistow, NH (US) 03865; John S. Collins, 9 Hawthorne Pl., Apt. 9E, Boston, MA (US) 02114; Edward W. Porter, 24 String Bridge, S12, Exeter, NH (US) 03833

( * ) Notice: Subject to any disclaimer, the term of this patent is extended or adjusted under 35 U.S.C. 154(b) by 607 days.

(21) Appl. No.: 10/700,376

(22) Filed: Nov. 3, 2003

(65) Prior Publication Data

US 2005/0062758 A1 Mar. 24, 2005

Related U.S. Application Data

(63) Continuation-in-part of application No. PCT/US02/14217, filed on May 2, 2002.

(60) Provisional application No. 60/288,287, filed on May 2, 2001, provisional application No. 60/296,275, filed on Jun. 5, 2001, provisional application No. 60/322,922, filed on Sep. 17, 2001, provisional application No. 60/296,237, filed on Jun. 5, 2001, provisional application No. 60/296,274, filed on Jun. 5, 2001, provisional application No. 60/296,284, filed on Jun. 5, 2001, provisional application No. 60/296,231, filed on Jun. 5, 2001, provisional application No. 60/296,224, filed on Jun. 5, 2001, provisional application No. 60/296,426, filed on Jun. 5, 2001, provisional application No. 60/296,273, filed on Jun. 5, 2001, provisional application No. 60/296,283, filed on Jun. 5, 2001, provisional application No. 60/296,281, filed on Jun. 5, 2001, provisional application No. 60/296,327, filed on Jun. 5, 2001.

(51) Int. Cl.
  *G09G 5/00* (2006.01)

(52) U.S. Cl. .......... 345/613; 345/467; 345/472; 345/472.1; 345/589; 345/612; 345/660; 345/667; 345/670; 345/698; 382/264; 382/274; 382/298; 382/299

(58) Field of Classification Search .......... 345/472.1, 345/612, 613, 670
See application file for complete search history.

(56) References Cited

U.S. PATENT DOCUMENTS 4,428,065 A 1/1984 Duvall et al.
(Continued)

FOREIGN PATENT DOCUMENTS

WO  WO 00/42564  7/2000
(Continued)

OTHER PUBLICATIONS

PCT/US02/14282.Search Report, Nov. 22, 2002, Bitstream Inc.
(Continued)

*Primary Examiner*—Antonio A Caschera
(74) *Attorney, Agent, or Firm*—Edward W. Porter

(57) ABSTRACT

Methods, systems, and programming for producing and displaying a scaled-down representation of subpixel-optimized images and digital content including such images that is represented by a mark-up language. Some embodiments display the text in such digital content using a different subpixel optimization than that used for the images. Others produce the subpixel-optimized images by calculating the luminosity of a subpixel as a function of the length of a plurality of coverage lines within a window in a source image corresponding to the subpixel that is covered by source image pixels having the subpixel's color. Some embodiments calculate the luminosity of a subpixel in such a subpixel-optimized image as a function both of the average luminosity of pixels in the subpixel's source image window and as a function of any color balancing distribution between resulting subpixel luminosities necessary to reduce color imbalance.

28 Claims, 87 Drawing Sheets

U.S. PATENT DOCUMENTS

| | | | |
|---|---|---|---|
| 4,723,209 A | 2/1988 | Hernandez et al. | |
| 4,751,507 A | 6/1988 | Hama et al. | |
| 5,334,996 A | 8/1994 | Tanigaki et al. | |
| 5,341,153 A | 8/1994 | Benzschawel et al. | |
| 5,341,466 A | 8/1994 | Perlin et al. | |
| 5,444,797 A | 8/1995 | Spitz et al. | |
| 5,533,174 A | 7/1996 | Flowers, Jr. et al. | |
| 5,563,955 A | 10/1996 | Bass et al. | |
| 5,615,384 A | 3/1997 | Allard et al. | |
| 5,619,633 A | 4/1997 | Turner | |
| 5,638,523 A | 6/1997 | Mullet et al. | |
| 5,714,971 A | 2/1998 | Shalit et al. | |
| 5,727,159 A | 3/1998 | Kikinis | |
| 5,781,714 A | 7/1998 | Collins et al. | |
| 5,821,913 A | 10/1998 | Mamiya | |
| 5,852,448 A | 12/1998 | Cheng | |
| 5,867,156 A | 2/1999 | Beard et al. | |
| 5,893,127 A | 4/1999 | Tyan et al. | |
| 5,909,221 A | 6/1999 | Nakai et al. | |
| 5,911,145 A | 6/1999 | Arora et al. | |
| 5,952,994 A * | 9/1999 | Ong et al. | 345/668 |
| 5,956,738 A | 9/1999 | Shirakawa | |
| 6,044,385 A | 3/2000 | Gross et al. | |
| 6,073,168 A | 6/2000 | Mighdoll et al. | |
| 6,076,109 A | 6/2000 | Kikinis | |
| 6,105,042 A * | 8/2000 | Aganovic et al. | 715/500 |
| 6,128,661 A | 10/2000 | Flanagin et al. | |
| 6,133,913 A | 10/2000 | White et al. | |
| 6,151,609 A | 11/2000 | Truong | |
| 6,157,390 A | 12/2000 | Cheng | |
| 6,161,114 A | 12/2000 | King et al. | |
| 6,167,441 A | 12/2000 | Himmel | |
| 6,185,589 B1 | 2/2001 | Votipka | |
| 6,185,625 B1 | 2/2001 | Tso et al. | |
| 6,188,385 B1 | 2/2001 | Hill et al. | |
| 6,189,020 B1 | 2/2001 | Shimizu | |
| 6,219,025 B1 | 4/2001 | Hill et al. | |
| 6,225,973 B1 | 5/2001 | Hill et al. | |
| 6,226,648 B1 | 5/2001 | Appleman et al. | |
| 6,236,390 B1 | 5/2001 | Hitchcock | |
| 6,236,433 B1 | 5/2001 | Acharya et al. | |
| 6,239,783 B1 | 5/2001 | Hill et al. | |
| 6,271,840 B1 | 8/2001 | Finseth et al. | |
| 6,278,448 B1 | 8/2001 | Brown et al. | |
| 6,321,158 B1 | 11/2001 | Delorme et al. | |
| 6,326,970 B1 | 12/2001 | Mott et al. | |
| 6,330,577 B1 | 12/2001 | Kim | |
| 6,339,426 B1 | 1/2002 | Lui et al. | |
| 6,341,310 B1 | 1/2002 | Leshem et al. | |
| 6,342,890 B1 * | 1/2002 | Shetter | 345/467 |
| 6,342,896 B1 | 1/2002 | Shetter et al. | |
| 6,343,377 B1 | 1/2002 | Gessner et al. | |
| 6,356,882 B1 | 3/2002 | Carroll et al. | |
| 6,363,395 B1 | 3/2002 | Tanaka et al. | |
| 6,384,839 B1 * | 5/2002 | Paul | 345/613 |
| 6,392,673 B1 | 5/2002 | Andrew et al. | |
| 6,393,145 B2 | 5/2002 | Betrisey et al. | |
| 6,437,793 B1 | 8/2002 | Kaasila | |
| 6,456,305 B1 | 9/2002 | Qureshi et al. | |
| 6,486,862 B1 | 11/2002 | Jacobsen et al. | |
| 6,556,217 B1 | 4/2003 | Makipaa et al. | |
| 6,601,057 B1 | 7/2003 | Underwood et al. | |
| 6,674,436 B1 | 1/2004 | Dresevic et al. | |
| 6,697,825 B1 | 2/2004 | Underwood et al. | |
| 6,708,309 B1 | 3/2004 | Blumberg | |
| 6,731,315 B1 | 5/2004 | Ma et al. | |
| 6,750,875 B1 | 6/2004 | Keely, Jr. et al. | |
| 6,826,727 B1 | 11/2004 | Mohr et al. | |
| 6,853,980 B1 | 2/2005 | Ying et al. | |
| 6,971,063 B1 | 11/2005 | Rappaport et al. | |
| 7,219,309 B2 | 5/2007 | Kaasila et al. | |
| 7,222,306 B2 | 5/2007 | Kaasila et al. | |
| 7,287,220 B2 | 10/2007 | Kaasila et al. | |
| 2001/0011308 A1 | 8/2001 | Clark et al. | |
| 2001/0011364 A1 | 8/2001 | Stoub | |
| 2001/0048764 A1 | 12/2001 | Betrisey et al. | |
| 2002/0021308 A1 | 2/2002 | White et al. | |
| 2002/0063697 A1 | 5/2002 | Amano | |
| 2002/0151283 A1 | 10/2002 | Pallakoff | |
| 2003/0016248 A1 | 1/2003 | Hayes Ubillos | |
| 2004/0183817 A1 | 9/2004 | Kaasila | |
| 2005/0041046 A1 | 2/2005 | Baar et al. | |
| 2005/0062758 A1 | 3/2005 | Kaasila et al. | |
| 2005/0132286 A1 | 6/2005 | Rohrabaugh et al. | |
| 2007/0180374 A1 * | 8/2007 | Gormish | 715/539 |

FOREIGN PATENT DOCUMENTS

| | | |
|---|---|---|
| WO | WO 00/57364 | 9/2000 |
| WO | WO 00/60479 | 10/2000 |
| WO | WO 00/67196 | 11/2000 |
| WO | WO 00/67247 | 11/2000 |
| WO | WO 02/088908 A2 | 11/2002 |
| WO | WO 02/088978 A1 | 11/2002 |
| WO | WO 02/089105 A2 | 11/2002 |
| WO | WO 02/101567 A3 | 12/2002 |
| WO | WO 2004/051429 | 6/2004 |
| WO | WO 2004/051430 | 6/2004 |
| WO | WO 2004/051430 A3 | 12/2004 |

OTHER PUBLICATIONS

PCT/US02/14217 Search Report, Nov. 22, 2002, Bitstream Inc.
PCT/US02/14380 Search Report, Sep. 5, 2002, Bitstream Inc.
PCT/US02/14216 Search Report, Nov. 22, 2002, Bitstream Inc.
PCT/US03/38342 Search Report, Jul. 4, 2004, Bitstream Inc.
Beat Stamm, The raster tragedy at low resolution, Excerpts from a presentation at a training session on Oct. 29, 1997, updated in Mar. 1998, (see PCT/US02/14282 search report), downloaded from http://www.microsoft.com/typograph/tools/trtalr.htm?fname=%20&fsize on Sep. 6, 2002, pp. 1-30.
Smith et al., Scalable Multimedia Delivery for Pervasive Computing, ACM 1999, pp. 131-140, ACM Multimedia '99, Oct. 1999, Orlando FL, USA.
Kevin C. Almeroth et al., Scalable Delivery of Web Pages using Cyclic Best-Effort Multicast, pp. 1214-1221, 0-7803-4383-2/98/$10.00 © 1998 IEEE (see PCT/US02/14380 search report).
Guillaume Pierre et al., Dynamically Selecting Optimal Distribution Strategies for Web documents, IEEE Transactions on Computers, vol. 51, No. 6, pp. 637-651; Jun. 2002, (see PCT/US02/14380 search report).
"Opera Small Screen Rendering" from web page www.opera.com/products/smartphone/smallscreen/news.com/, downloaded on Nov. 26, 2002, 4 pages.
"Welcome to Handspring.com" from web page www.handspring.com/index.jhtml, downloaded on Nov. 26, 2002, 1 page.
"Handspring: Software" from web page www.handspring.com/software/blazer_details.jhtml?..., downloaded on Nov. 26, 2002, 3 pages.
"A walk on the wide side" p. 56, EWEEK, Apr. 2, 2001, 1 page.
"Jimmy's Windows CE Software Home Page," from a web page originally downloaded on or before Jul. 4, 2001 (please note in particicularly the portion thereof entitled What's New in JS Landscape 2.0 which appears to refer to the product shown in the above EWEEK article); 7 pages.
Edward Porter, "Screen Shot of Three Microsoft-Internet Explorer Windows Showing Same Portion of Web Page with Different Layouts", created Sep. 16, 2005 on Mr. Porter's computer by opening three separate IE windows showing same web sites and manually varying window width and font size. It is the applicant's belief that IE's ability to alther the layout of a web page by altering window width and font size predates 2000. 1 page.
Edward Porter, "Screen Shot of Microsoft Word Displaying Portion of Text at Two Different Displayed Font Sizes", created on Sep. 16, 2005 on Mr. Porters computer by using the split box to open two panes in an MS Word view, scrolling the bottom pane so it showed same text as top pane, and increasing the magnification in the bottom pane while in normal view so the text in the bottom pain would re-flow across line boundaries. It is the applicants belief this capability predates 2000. 1 page.
Edward Porter, "Two screen shots of Internet Explorer Window Showing different views of same PDF file", created Sep. 11, 2006 on Mr. Porter's computer by downloading a PDF file from the Web and viewing it first in page width view and then in full page view; 2 pages.
OmniSky Wireless Service (version 2.0), by Amy R. Zunk, Posted Feb. 15, 2001, downloaded from Http://www.geek.com/hwswrev/palmpilot/omnisky/index.htm on Sep. 8, 2006, 7 pages.
"WAP", downloaded from Wikipedia, the free encyclopedia, on Sep. 8, 2006, 5 pages.
"Microbrowser", downloaded from Wikipedia, the free encyclopedia, on Sep. 8, 2006, 3 pages.
"Microsoft Reader", downloaded from Wikipedia, the free encyclopedia, on Sep. 8, 2006, 1 page.
Displaced Filtering for Patterned Displays, by Claude Betrisey et al, Society for Information Display, 2000: 4 pages.
Wireless Enterprise Applications for Mobile Information Management, Palm, Inc., Santa Clara, CA, 2000; cover sheet plus 27 pages.
Selling Windows CE to the real world, by Lisa M. Bowman, on Jun. 7, 1999, ZD Net News, originally downlowded from http://www.zdnet.com/zdnn/stories/news/0,4586,2270867,00.html on Mar. 15, 2001; 3 pages.
PDA-To-Desktop Remote-Control Technology Debuts, by Steve Gold, on May 11, 2001, Newsbytes, originally downloaded from http://www.nbnn.com/news/01/165603.html on May 12, 2001:2 pages.
The eBook Revolution, downloaded from Http://www.zimac.de/reader.htm on Sep. 8, 2006, the copyright notice at bottom of page goes to http://www.zimac.de/legal.htm, which lists Marc Zimmermann as copyright holder. Page states it was last updated on Mar. 6, 2005; 6 pages.
Microsoft Reader FAQ 1.1 (Unofficial), by Richard Crocker-Planet eBook editor, copyright 2005 by Binary Thing Pty. Ltd. Downloaded from http://www.planetebook.com/mainpage.asp?webpageid=103 on Sep. 8, 2006; 7 pages.
Bjork et al., West: A Web Browser for Small Terminals, ACM 1999, pp. 187-196.
Buyukkokten et al., Seeing the Whole in Parts: Text Summarization for Web Browsing on Handheld Devices, ACM 2001, pp. 652-662.

* cited by examiner

Detail From Standard 640 x 480 layout
Airline Tickets
Save up to 40% or more in 15 minutes or less!
1100
Detail From SubPixel Optimzed 320 x 240 layout (shown on non-subpixel display)
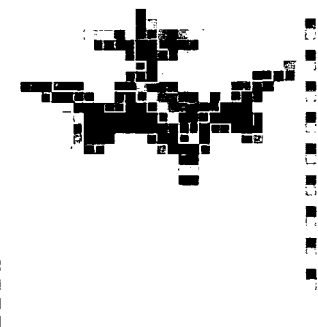
Airline Tickets
Save up to 40% or more in 15 minutes or less!
1120
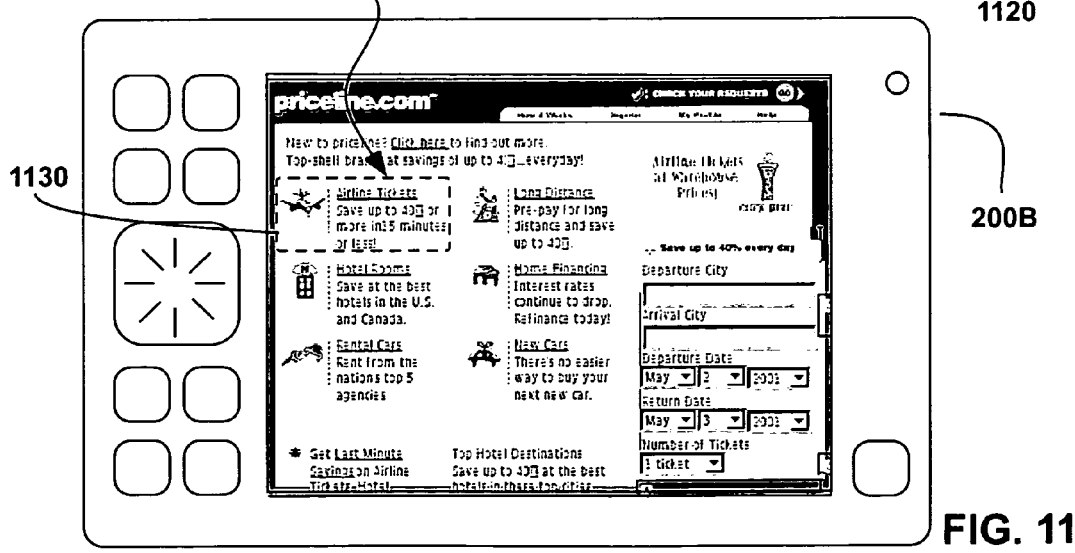
1130
200B
FIG. 11

-subpixel optimization routine (using line coverage)~2900
    -for each row in output image~2901
        -for each pixel in row~2902
            -for each subpixel in pixel~2904
                -for each of its scan lines~2906
                      -calculate each intersection between that scan line and a pixel boundary~2908
                      -for each portion of a scan line which occurs between two scan line ends, a scan line end and a pixel boundary, or two pixel boundaries~2910
                            -add to a coverage value associated with the subpixel the multiple of the percent of that scan line covered by the portion times the component color value of the pixel covering that portion corresponding to the color of the current subpixel, all divided by the number of the subpixel's scan lines~2912
            -Set the pixel's color value equal to a color having an compound RGB value with red, green, and blue values equal to the subpixel luminosity value of the pixel's red, green, and blue subpixels, respectively.~2914

FIG. 29

-subpixel optimization routine (using area coverage)~4100
    -for each pixel row in output image~4102
        -for each pixel in row~4104
            -for each subpixel in a pixel~4106
                -determine which pixels of source image are in a source image window associated with the subpixel~4108
                -for each such included source image pixel~4110
                    -calculate the percent of the subpixel's source image window's area covered by the pixel's area~4112
                    -add to a luminosity value being calculated for the subpixel the multiple of the percentage of the subpixel's source image window area covered by the pixel times the pixel's color component value corresponding to the color of the current subpixel ~4114
            -Set the pixel's color value equal to a color having an compound RGB value with red, green, and blue values equal to the subpixel luminosity value calculated for the pixel's red, green, and blue subpixels, respectively.~4116

FIG. 41

-subpixel optimization for bicolor bitmap ~5300
-for each pixel row in image~5301
    -for each pixel in row~5302
        -for each subpixel in the pixel~5304
            -determine which pixels of source image are in a window portion of source image corresponding to subpixel's area in scaled image~5306
            -for each source image pixel all or partially in the subpixel's source image window~5308
                -calculate the percent of the window's area covered by the pixel's area~5310
                -add to a luminosity/coverage value calculated for the subpixel the multiple of the percentage of the window area covered by the pixel times the pixel average foreground color intensity~5312
        -find the minimum subpixel luminosity/coverage value so calculated for the pixel~5314
        -for each subpixel in pixel~5316
            -set a luminosity/alpha value being calculated for the sub and the pixel to the pixel's minimum subpixel luminosity/coverage value~5318
            -distribute that portion of the subpixel's luminosity/coverage value that exceeds the pixel's mininum subpixel luminosity/coverage value to the luminosity/alpha values being calculated for the subpixel and adjacent subpixels in the pixel row using a color balance distribution filter~5320
    -For each pixel in row~5322
        -set the pixel's color value equal to a color having an compound RGB value with red, green, and blue component values equal to thlse luminosity/alpha values calculated for the pixel's red, green, and blue subpixels, respectively.~5324

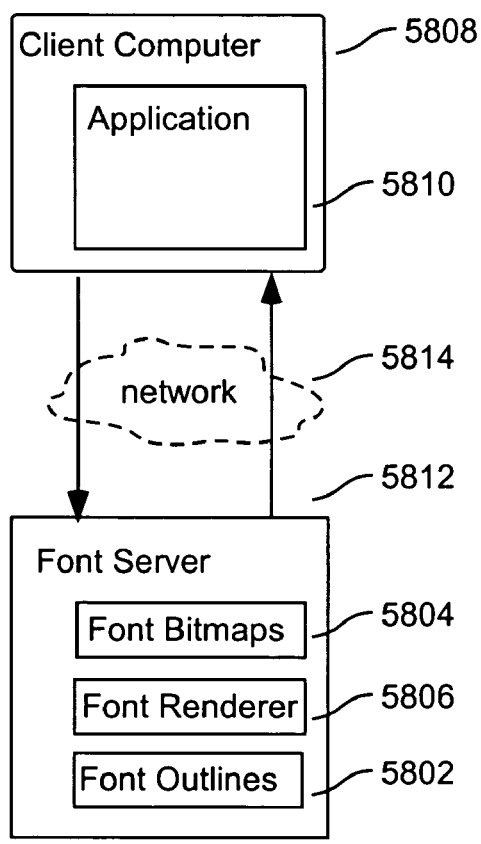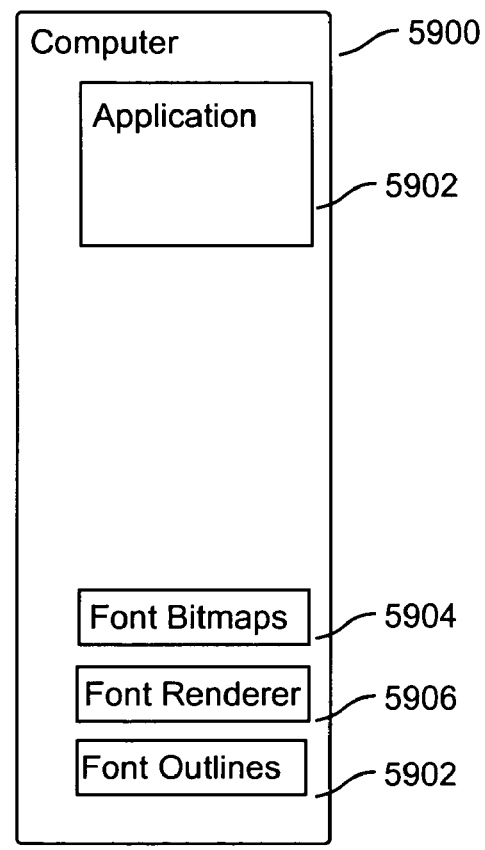
FIG. 58        FIG. 59

-subpixel optimized font bitmaps with non-linear color balance~6000
    -for each pixel row~6002
        -for each subpixel in a row~6004
            -determine a coverage value representing the perecent the subpixel which is covered by the font shape~6006
        -for each pixel in row~6008
            -determine the minimum coverage value calculated for each of its three subpixels ~6010
            -add minimum to temporary alpha value being calculated for each subpixel of the pixel~6012
            -for each of pixel's subpixels~6014
                -determine excess of subpixel's coverage value over the pixel's minimum~6016
                -distribute this excess value into sub-pixel alpha values based on color balance distribution filter appropriate for sub-pixel's color~6018
    -for each pixel in row~6020
        -use the three color alpha value defined for each pixel by the three alpha values calculated for its subpixels in a look-up table to map that value into one of relatively small palette of colors~6022

-Center-Weighted Color Balance Filter~9400

-For Coverage Value 0        0,0,0,0,0
    -For Coverage Value 31      0,1,1,1,0
    -For Coverage Value 62      0,2,2,2,0
    -For Coverage Value 93      1,2,3,2,1
    -For Coverage Value 126    1,3,4,3,1

FIG. 94

-Asymetric Color Balance Filter~9500

-For Coverage Value 0        0,0,0,0,0
    -For Coverage Value 31      1,1,1,0,0
    -For Coverage Value 62      2,2,2,0,0
    -For Coverage Value 93      3,3,3,0,0
    -For Coverage Value 126    3,3,4,1,1

FIG. 95

-Creation of input-color-to-output-color look-up table~9600
    -run the characters of multiple fonts through non-linear algorithm for deriving subpixel optimized font bitmaps, while keeping a histogram of the number of times each of one of the 2196 possible three color alpha values is calculated for a pixel~9602
    -create a 122 color output palette by~9604
        -selecting the thirteen grayscale colors possible for whole pixel alpha values in which each subpixel can have one of thirteen levels including, black and white~9606
        -selecting the 109 other most frequently occurring colors in the histogram~9608
    -for each of the 2196 possible calculated alpha values~9610
        -if that input color exactly matches one of the pallette's colors~9612
            -associate the input color with that palette, or output, color~9614
        -if not~9616
            -for each of 122 output colors~9618
                -if (ri-ro) and (gi-go) are of same sign and if $|ro-go| < |ri-gi|+x$~9620
                    -calculate the distance from the input color to the output color~9622
                    -if that distance is the closest distance so far to the input color~9624
                        -save it as closestAllowedPaletteColor~9626
        -associate the input color with the closestAllowedPaletteColor~9628

FIG. 96

-Displaying text with font bitmaps having subpixel alpha value components ~9700
    -for each string to be displayed~9702
        -sample points in rectangle of bitmap in which it is to be drawn to determine its background color~9704
        -for each of the 122 whole pixel alpha values used to represent font bitmaps~9706
            -for each of the three subpixel component colors~9708
                -calculate color luminosity for the subpixel component color as the current subpixel's alpha value in the current whole pixel alpha value ( the current supixel's alpha) times luminosity of the current subpixel color in the foreground color with which the fonts are to be drawn plus (1 minus the current subpixel's alpha) times the luminosity of the current subpixel's color in the background color~9710
            -map the current whole pixel alpha value to the whole pixel color comprised of the three subpixel luminosities calculated for the whole pixel alpha value~9712
        -for each character of string to be displayed~9714
            -access its associated font bitmap~9716
            -for each of pixel of the font bitmap~9718
                -find the color value which has been mapped to the pixel's corresponding whole pixel alpha value in the font bitmap~9720
                -set the corresponding pixel in the subpixel addressable display to that whole pixel color value~9722

FIG. 97

-Sample html~10300

-</head>

-<body background="http://a1636.g.akamai.net/7/1636/797/e5e77dd148cc98/graphics.boston.com/globe/images/tiles/tile.gif" link="5C3317" vlink="5C4033" onLoad="FrameThis()">

-...

-...

-<p>   /10300

-<B>E-mail to a friend</b><BR>                    /10300
-<a href="http://tools.boston.com/pass-it-on/popular/">See what stories users are sending to friends</a><p>
        /10300                              /10300
-<B>Free headlines e-mail</B><br>
-<a href="/newsletters/headlines/">The best of the Globe each weekday morning</a><p>
                /10300
                                          /10300
-<B>Alternative views</b><BR>
-<a href="/globe/lowgraphics">Low-graphics version</a><br>
-<a href="/globe/acrobat/today.pdf">How it looks in print</a>
-<p>   /10302
                                         \10300
-<!--SECTIONS-->
-<IMG WIDTH="120" HEIGHT="27" SRC="http://a1636.g.akamai.net/7/1636/797/0df5e88d0bb528/graphics.boston.com/globe/images/navs/nsections.gif" border="0" alt="Sections" VSPACE="1" WIDTH="120" HEIGHT="27"><BR>
-<a href="/globe" onMouseOver="loadimage('pageone', 'http://graphics.boston.com/globe/images/navs/rpageone.gif'); status='Boston Globe Online: Page One'; return true;" onMouseOut="loadimage('pageone', 'http://graphics.boston.com/globe/images/navs/npageone.gif'); status=''; return true;"><IMG WIDTH="119" HEIGHT="14" SRC="http://a1636.g.akamai.net/7/1636/797/f0a63d528dc7e3/graphics.boston.com/globe/images/navs/npageone.gif" border="0" alt="Boston Globe Online: Page One" name="pageone" VSPACE="1"></a><br>

-Browser's Proxy Code~10500
- ...
    -if receive request from thin client for a web page~10502
        -relay request to server indicated in URL of request~10504
    -if receive indication that browser has completed a screen draw or redraw~10506
        -call the screen capture and download routine when screen redraw is complete ~10510
    -if receive control object state query from browser~10514
        -query thin client for state of indicated one or more controls~10516
        -send those control states to browser~10518
    -if receive scroll/move command from thin client~10520
        -move view window accordingly relative to browser's virtual screen~10522
        -if portion of view window which was in view window before move is still in view window~10526
            -place appropriate scroll command at start of download display list~10528
        -if moved view window includes portion of web page not currently in virtual screen~10530
            -scroll browser's virtual screen accordingly~10532
            -request redraw for the newly scrolled virtual screen from browser~10534
    -if receive zoom command from thin client~10536
        -change view scale factor accordingly~10538
        -scale view window accordingly relative to browser's virtual screen~10540
        -if scaled view window includes portion of web page not currently in virtual screen~10542
            -scroll virtual screen change its resolution to cause scaled view window to fit in virtual screen~10544
        -call for screen redraw~10552

FIG. 105A

-if receive virtual resolution command from thin client~10554
    -change browser's virtual screen resolution to requested virtual resolution~10556
    -call for screen redraw~10560
-if receive other user input event from thin client~10562
    -transform its screenXY on client screen to corresponding location in browser screen using location of view window and display scaling factor~10564
    -relay event to browser's event queue~10566
-...

FIG. 105B

-Screen Capture And Download Routine~10600
    -ask for browser for screen redraw~10602
    -if browser calls~10604
        -measureString~10606
            -map requested font family and font size into substitute font family and size, including:~10608
                -select size for substitute fonts as a function of the requested font size and downscaling by the display scaling factor~10610
                -replace smaller size fonts with narrower and taller size to take advantage of the higher ratio of horizontal resolution of subpixels~10612
                -if limitMinimumFontSize is on~10614
                      -prevent substitute font size from being below a minimum pixel size~10616
            -return string measurement for substituted font and font size, scaled up measurements by display scale factor~10618
        -stringDraw~10620
            -transform string's virtual screen screenXY to thin client screenXY by scaling and/or translating as a function of the display scale factor and the view window's position relative to virtual screen~10621
            -if substituted font family and size associated with string in prior measure string call and any other font attributes for string is different than current font attribute for end of display list~10622
                -store a font command at end of display list changing current font attributes to attributes corresponding to current string~10623
            -store string, its thin-client screenXY, and its substituted font, including size and color, at end of download display list~10624
        -rectangleDraw~10626
            -transform rectangle's virtual screen screenXY, width, and height to thin client screenXY, width and height by scaling and/or translating as a function of the display scale factor and the view window's position relative to virtual screen~10628
            -if rectangle's color is different than background color for current end of download display list~10630
                -add a background color command changing to new background color at end of download display list~10632
            -store rectangle, transformed screenXY, width, and height at end of download display list~10634

FIG. 106A

-bitmapDraw~10636
    -if images URL is not already in a download image list~10638
        -if bitmap is color bitmap~10642
            -scan image for one or more portions of sufficient size which have only colors from a given bicolor spectrum~10644
            -for each bicolor portion of image found~10646
                -perform bicolor subpixel optimization, scaled down by display scale factor, on portion using opposite ends of its bicolor spectrum as foreground and background color at display scale factor~10648
                -if foreground color is too chromatically unbalanced, render image with a substituted more-balanced foreground color~10650
            -for each non-bicolor portion of image found~10652
                -perform multicolor subpixel optimization, scaled down by display scale factor, on bitmap using color image subpixel algorithm at display scale factor~10654
        -else if bitmap is grayscale bitmap~10656
            -perform bicolor subpixel optimization, scaled down by display scale factor, on bitmap using black and white as foreground and background colors at display scale factor~10658
        -store scaled-down, subpixel-optimized bitmap, with a unique imageID, transformed width and height, and its URL at end of image list~10662
    -transform image's screenXY for download and store an image location command having the imageID and the transformed screenXY, width, and height stored for the image in the image list at end of download display list~10664

FIG. 106B

-controlCreate~10666
    -transform control's screenXY by scaling and/or translating as a function of the display scale factor and the view window's position relative to virtual screen~10667
    -place corresponding control command, its transformed screenXY, and corresponding text in download list~10668
    -create corresponding browser-side portion of distributed control~10670

-...

-when screen redraw is complete~10672
    -call download display list routine~10674
    -clear display list~10676

FIG. 106C

-download display list routine~10700
    -select all elements in display list which will be all or partially be included in the new image which is to be created on the thin client's display screen in a download stream~10702
    -place all bitmaps in image list corresponding to one or more image locations commands in download stream at end of download stream, performing lossy compression on them first~10704
    -user a lossless compression algorithm to compress download stream~10705
    -open a the socket connection between browser's computer and thin client~10706
    -send display list to thin client over socket connection~10708

FIG. 107

-Download Stream~10800

-clearCmd~10802
    -scrollCmd + XYShift~10804
    -...
    -backgroundColorCmd + color~10806
    -rectanglleCmd +ScreenXY + width + Height~10808
    -rectanglleCmd +ScreenXY + width + Height~10808
    -...
    -backgroundColorCmd + color~10806

-imageLocationCmd + ImageID + ScreenXY+ width + height~10810
    -FontCmd + FontAttribute1 + NewValue1 + FontAttribute2 + NewValue2~10812...
    -StringCmd + ScreenXY + String~10814
    -StringCmd + ScreenXY + String~10814
    -...
    -imageLocationCmd + ImageID + ScreenXY+ width + height~10810
    -FontCmd + FontAttribute3+ NewValue3...~10812
    -StringCmd + ScreenXY + String~10814
    -...
    -StringCmd + ScreenXY + String~10814
    -StringCmd + ScreenXY + String~10814
    -rectanglleCmd +ScreenXY + width + Height~10808
    -ControlCmd + ControlID + ControlType + ScreenXY + ControlTextList~10816
    -StringCmd + ScreenXY + String~10814

-ControlCmd + ControlID + ScreenXY + Control Label~10816

-ImageCmd + ImageID + width + height + Bitmap~10818
    -ImageCmd + ImageID + width + height + Bitmap~10818
    -ImageCmd + ImageID + width + height + Bitmap~10818

FIG. 108

-thin client code~10900
- ...
    -if receive a download stream, start responding to individual commands in stream in the order in which they are received as soon as one or more are received, including responding to each of the following commands as follows~10902
        -clearCmd ~10904
            -clear thin client screen~10906
        -scrollCmd~10908
            -bitblit portion of screen which remains on screen after XYShift to appropriate position after that shift~10910
            -clear rest of screen~10912
        -backgroundColorCmd~10914
            -set current rectangle background color to the color specified in command~10916
        -rectangleCmd~10918
            -draw rectangle with upper left hand corner at ScreenXY, having the width and height specified in command, using current background color~10920
        -imageLocationCmd~10922
            -do nothing~10923
    -FontCmd + FontAttributer1 + NewValue1 + FontAttribute2 + NewValue2...~10924
        -set current value of all font attributes listed in command to the corresponding values listed in the command~10926
    -StringCmd + ScreenXY + String~10928
        -if thin client does not have font bitmap for each character of the specified string at the current font size and font family~10930
            -send separate HTTP request for font of each such bitmaps from font server, specifying size, character, font, and that is to be subpixel optimized, and subpixel array type~10932
            -when receive each requested font~10934
                -place it in font bitmap cache~10936
        -if have all characters of string specified in the command~10938
            -draw string, using current font attributes values, including foreground color, and using color from portion of screen on which it is being written as the background color~10940

FIG. 109A

-ControlCmd + ControlID + ControlType + ScreenXY + ControlTextList~10942
    -if no control has been created having controlID specified in command~10944
        -create thin client side of distributed control associated with that controlID~10946
    -draw specified control type on screen using subpixel optimized bitmaps for control image, at specified screenXY, using drawing one or more text items in controlTextList using subpixel optimized text, and set control's associated screen hotzone, if any to the appropriate portion of screen~10948

-ImageCmd~10950
    -for each imageLocationCmds in display list having same ImageID~10952
        -draw bitmap at that location~10954
    -redraw all other items in display list which occur at the same location as any of these drawn bitmaps~10956

-...

-if user clicks hotzone assocated with text entry field~10958
    -execute keyboard mode routine~10960
        -display pop up user keyboard and text edit line, saving the bitmap which was in its location~10962
        -until user presses enter~10964
            -if user user types text character~10966
                -place corresponding subpixel-optimized text shape on text edit line~10968
                -add character to position corresponding to cursor in a temporary text-edit string variable~10970

-...

-when user press enter, ~10972
            -store text-edit string state in corresponding text field control~10974
            -draw text-edit string in bitmap of text entry field using subpixel optimized fonts~10976
            -remove popup keyboard, replacing the bitmap with was in its place before it was displayed~10978

-else if user clicks on hot zone of a button or menu item control~10980
    -change appearance of button or menu item appropriately~10981
    -send event along with button or menu item ID up to proxy~10982

-else if user clicks on hot zone of another type of thin client control~10983
    -change appearance of control appropriately~10984
    -store user selected state change~10985

-else if user clicks on other portion of screen not associated with the thin client program's or its computer's control interface~10986
    -send even with screen location up to proxy~10987

FIG. 109B

-if receive query from proxy process re state of control~10988
    -query state of corresponding control on thin client~10989
    -transmit state to browser~10990
-if user enters a command to scroll screen~10991
    -upload command to proxy~10992
-if user enters a command to change zoom,~10993
    -upload command to proxy~10994
-if user enters a command to change virtual resolution,~10995
    -upload command to proxy~10996
-if user enters another command associated with thin client's control GUI~10997
    -...~10998

FIG. 109C

-proxy browser code with use of page layout caching~11500
   -...
      -if receive request for web page with an associated view setting~11502
         -request web page from server~11504
      -when a web page is received from a server~11506
         -have layout engine layout web page at the virtual screen resolution specified in the view setting, substituting fonts for layout engine's measure string calls according to view setting's appropriate scale factor~11507
         -select virtual screen position relative to resulting layout which will fit the view window implicit in the view setting, and redraw screen~11508
         -when receive image referenced in web page~11518
            -scale and subpixel optimize image according to scale factor~11520
         -once have all images referenced in web page~11522
            -compress layout and images~11523
            -download layout followed by images~11524
      -if receive request from thin client to rescale and subpixel optimize bitmaps of images at a given scale~11526
         -rescale and subpixel optimize them~11528
         -compress them~11530
         -download them to thin client~11532
      -if input event from thin client~11534
         -if its layout coordinate associated with it is not currently on virtual screen~11536
            -scroll virtual screen so that it is~11538
         -calculate virtual screen coordinate corresponding to layout coordinate~11540
         -place input event with calculated virtual screen coordinate in browser's event queue ~11542
   -...

FIG. 115

- thin client code with use of page layout caching~11600
    - ...
    - if start receiving downloaded page layout display list~11602
        - set mapping of view window to page layout and calculate scale factor as function of view selection~11604
        - display received elements of display list which fall within view window at current mapping of screen window to display list, including current scale factor~11606
    - if user generates input to changes size or location of view window relative to downloaded layout~11616
        - make the corresponding change to the mapping of view window to display list and calculate scale factor as function any such changes~11618
        - display any portions of page layout which fall within current view window at current scale factor including~11620
            - displaying strings with font sizes which are function of current scale factor, and adjusting for disproportionate changes in size of individual or all characters as font sizes change, by changing spacing between characters~11622
            - if there is a new scale factor~11624
                - requesting proxy to re-scale at new scale factor and subpixel optimize all images on screen at new mapping~11626
                - scaling at new scale factor and re-subpixel optimizing, and displaying the previously downloaded bitmaps of all on-screen images~11628
                - when newly scaled images are received, displaying them in place of locally rescaled versions~11630
    - if user generates input event relative to screen~11632
        - use view-window-to-page-layout mapping to determine location of input in layout cooridinates~11634
        - send input event and page layout coordinates to proxy~11636

FIG. 116

-Client code for selected text reflow~12900
        -If user selects area of downloaded page layout for text reflow at a new scale factor~12902
-select all strings and corresponding underlines in layout which are substantially within selected layout area~12904
                -label any group of one or more strings whose closeness in layout indicates that they are part of the same paragraph~12906
                -reflow and display the text of each group of strings labeled as a paragraph across screen area's across boundaries at new scale factor, underlining text in reflowed lay that was underlined before~12908

FIG. 129

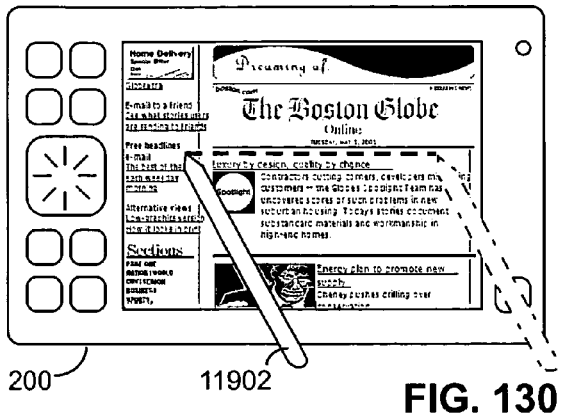

FIG. 130

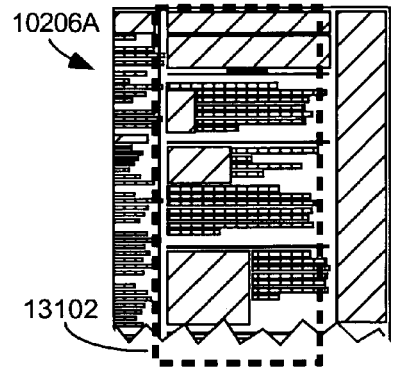

FIG. 131

Luxury by design, quality by chance

Contractors cutting corners, developers misleading customers – The Globe's Spotlight Team has uncovered scores of such problems in new suburban housing. Today's stories document substandard materials and workmanship in high-end homes Energy plan to promote new Supply Cheny pushes drilling over conservation
...

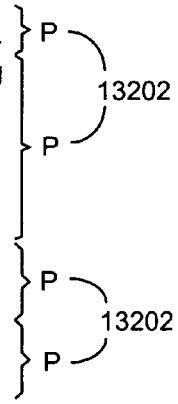

FIG. 132

Luxury by design, quality by chance

Contractors cutting corners, developers misleading customers –

The Globe's Spotlight Team has uncovered scores of such problems in new suburban housing.

Today's stories document substandard materials and work-

FIG. 133

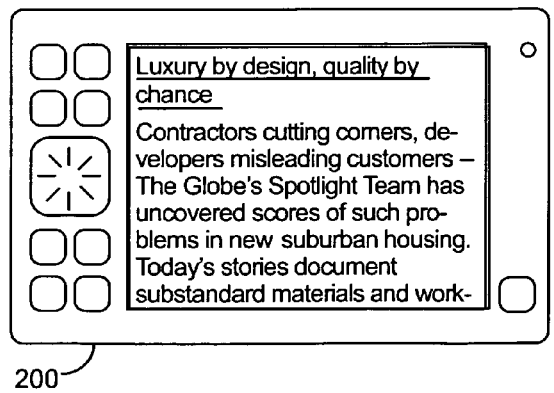

FIG. 134

-font server code~13900
    -if receive http request for one or more characters of a font~13902
        -if there is a font file matching having path name spacified in http request~13904
            -send that file over network in an http response to network address from which the font request came~13906
            -charge account associated with transaction~13908
        -else if font request is for a font bitmap~13910
            -generate font bitmap file having attributes indicated for font by path name, including~13912
                -if font request specifiestaht a subpixel optimazed version of the font is desired~13914
                    -generates subpixel optimized font of character using non-linear color balancing~13916
                -...
            -send that file over network in an http response to the requesting address~13918
            -cache the font bitmap file at address corresponding to path name specified in request~13920
            -charge account associated with transaction~13922

FIG. 139

-rectanglleCmd~14500
    -draw rectangle with screem position, height, and width defined with higher resolution than screen pixel resolution, using bicolor subpixel optimization and using current background color~14502

FIG. 145

-downloading web applets which creates subpixelized elements on screen~14600
    -server and/or proxy~14602
        -in response to request for media from thin client download media including applets~14608

-client~14604
        -request media~14606
        -receive media including applet~14610
        -load and run applet~14612
        -applets draw subpixel optimized elements to subpixel addressable screen on client~14614

FIG. 146

-subpixel optimization of 3-d animations~14900
    -for each of successive frame times~14902
        -run 3-d animation engine to create bitmap of current frame, or at least of those portions of image which have changed since the last frame, at a higher resolution than the resolution at which subpixel-optimized images will be displayed~14904
        -scale-down and subpixel optimize frame bitmap, or at least of changes in it since the last frame~14906
        -display scaled-down subpixel optimized frame bitmap, or at least scaled subpixel optimized bitmaps of changed portion of frame~14908

FIG. 149

-game server computer~15000

-if have receive user input from one or more game client computers~15002
        -feed it to game engine~15004
    -...
    -have game engine compute display list for current frame (or changes to display list for current frame)~15006
    -have 3-d rendering routine render bitmap frame of current display list(or current changes to display list) at higher resolution than that at which corresponding subpixel-optimized bitmaps will be shown~15008
    -scale-down and subpixel optimizie current frame bitmap(or bitmaps of current changes to frame and their scaled down locations)~15010
    -...
    -compress one or more successive scaled-down subpixel optimized bitmaps (and their locations) ~15012
    -download compressed, scaled, subpixel-optimized animation frames (or changes and their locations) to game client~15014

FIG. 150

-game client~15100

-...
    -receive downloaded images (and screen locations)~15101
    -decompress animated images (and screen locations)~15102
    -displays the scaled, subpixel optimized animation frame bitmaps (or change bitmaps at their respective positions)~15104
    -if have received any user input~15106
        -upload user input to game server~15108
    -...

FIG. 151

-subpixel optimization of images with transparency maps~15200
    -produce scaled, either a bicolor or multicolor subpixel-optimized bitmap of the foreground image~15202
    -produce a correspondingly scaled, bicolor subpixel optimized bitmap of the images transparency map~15204
    -display foreground image's bitmap on a subpixel optimized display including:~15206
        -for each pixel row of the displayed image~15208
            -for each subpixel of such row~15210
                -set currentAlpha to the alpha value of the corresponding subpixel of the transparency map~15212
                -set the luminosity of the current subpixel to currentAlpha times the luminosity of the corresponding subpixel of the foreground image plus (1 – currentAlpha) times the prior luminosity value of the current subpixel~15214

FIG. 152

-subpixel optimizing video having interpolation between keyframes~15300
    -decompress video~15302
    -scale and subpixel optimizing key frames~153040
    -scale but do not subpixel optimize interpolated changes between keyframes because of its rapid speed~15306
    -display scaled video on subpixel addressable display with subpixel optimized keyframes and non-subpixel optimized interframe interpolation~15308

FIG. 153

-subpixel optimizing video representing changes to portions of frame~15400
    -decompress video~15402
    -scale and subpixel optimizing frames~15404
    -scale and subpixel optimize change bitmaps, scale their location relative to frame~15406
    -repeatedly display on subpixel addressable display~15407
        -any scaled, subpixel optimized video frame followed by a sequence of one or more scaled subpixel optimized change bitmaps over the bitmap of that frame at corresponding scaled positions on the frame~15408

FIG. 154

-moving images with fixed subpixelation~15500
    -store subpixel-optimized bitmap of image~15502
    -for each successive frame time~15503
        -calculate movement of image at fixed size and orientation, rounding location to nearest horizontal and vertical whole pixel location~15504
        -display image at that location~15506

FIG. 155

-moving image with changing subpixelation~15600
    -store high resolution source image~15602
    -for each successive frame time~15603
        -calculate translation, rotation, and/or transformation of high resolution source~15604
        -generate scale-down and subpixel optimized bitmap of image with images mapping into subpixel grid associated with bitmap being a function of its tranlation, rotation, and/or transformation~15606
        -display resulting subpixel optimized bitmap on subpixel display~15608

FIG. 156

-subpixel optimazation of DVD video~15700
    -decompress DVD video to a resolution higher than that at which it is to be displayed in subpixel optimized image~15702
    -scale and supixel optimize decompressed bitmaps of video images~15704
    -display scaled subpixel optimized bitmaps of video images on subpixel addressable display~15706

FIG. 157

-subpixel optimization of HDTV~15800
    -decompress HDTV video to a resolution higher than that at which it is to be displayed in subpixel optimized image~15802
    -scale and supixel optimize decompressed bitmaps of video images~15804
    -display scaled subpixel optimized bitmaps of video images on subpixel addressable display~15806

FIG. 158

-subpixel optmization of mpeg4~15900
    -receive and decompress mpeg4 video~15902
    -use bicolor subpixel optimization with non-linear color balance in scaling down of bicolor objects~15904
    -use multi-color subpixel optimization in scaling down of non-bicolor objects~15906
    -display combination of bicolor and multicolor objects on subpixel optimized display moving subpixel optimized objects relative to screen~15908

FIG. 159

-server subpixel optimization of scaled down, downloaded video~16000
    -receives request for video and specification of subpixel display resolution~16002
    -receives requested video content~16004
    -scales down and subpixel optimizes the received video to subpixel resolution association with request~16006
    -compresses video~16008
    -downloads it to requesting device~16010

FIG. 160

-proxy subpixel optimization of scaled down, downloaded video~16100

-proxy computer code~16100
        -when receive request for video (and specification of subpixel resolution)~16102
            -send corresponding request for the requested video to a server~16103
        -when receive requested video content~16104
            -scale down and subpixel optimizes video (to specified subpixel resolution)~16106
            -compress subpixel optimized video~16108
            -download it to thin client~16110

-thin client code~16112
        -in response to user input, send request for video to proxy (including subpixel resolution at which video is to be displayed)~16113
        -when receive requested video from proxy~16114
            -decompress video~16115
            -display scaled-down decompressed video on subpixel addressable display~16116

FIG. 161

-Electronic ink code~16200
    -if user enters electronic ink input~16202
        -record strokes as series of points and curves or lines in between~16204
        -draw ink on screen using subpixel optimization of lines and curves with non-linear color balance~16206
    -if user selects to scale up representation of electronic ink~16208
        -produce subpixel optimized bitmap of ink's lines and curves using bicolor subpixel optimization with non-linear color balancing at the selected scaled up size~16210
        -display scaled up image~16212
    -if user selects to scale down representation of electronic ink~16214
        -to produce subpixel optimized bitmap of ink's lines and curves using bicolor subpixel optimization with non-linear color balancing at the selected scaled down size~16216
        -display scaled down image~16218

FIG. 162

The global leader in search infrastructure. LookSmart provides quality search

-subpixel optimized font bitmaps with non-linear color balance~6000A
    -determine tightest rectangular array of rasterazition units into which character font shape fits, taking into account alignment of character-font shape relative to raterization units due to hinting 18202
    -for each pixel row~6002A
        -for each subpixel in a row~6004
            -determine a coverage value representing the percent of the subpixel which is covered by the font shape~6006
    -map resulting array of subpixel coverage values into an array of subpixel addressable pixels, aligning first column of rasterization units with leftmost subpixel of a pixel row~18204
    -pad array with pixel column comprised of three subpixel's each to left~18206
    -pad array with two, three, or four more sub-pixel columns to right, so as to cause the total number of sub-pixel columns to be an even multiple of three~18208
    -adjust left and right side bearing values to compensate for padding subpixel column on left and right side of bitmap~18210
    -perform non-linear color balancing~18212
    -convert to packed color value pixel bitmap~18214

FIG. 182

-drawing character string~18300
    -set pen position to start position for string~18302
    -for each character of string to be displayed~9714A
        -access its associated font bitmap~9716
        -set character start position to pen position~18304
        -adjust pen position by left side bearing~18306
        -for each pixel value of the font bitmap~9718
            -if pixel is non-zero, draw pixel 18308
        -set pen position to character start position plush current character's advance width~18310

FIG. 183

-selected text reflow~18500
    -access web page's contents~18502
    -perform first layout of web page's contents, placing text at different horizontal locations as indicated by web page~18504
    -display elements of web page at positions determined by the first layout~18506
    -enable user to select a portion of text at a given horizontal location in display of first layout~18508
    -respond to user selection of such a portion of text by~18510
        -performing a second layout of the selected text by re-flowing it in a new column, at a different font size relative to new column's width~18512
        -displaying layout of new column at scale that fills at least two thirds of width of screen~18514

FIG. 185

-zoom to fit~18600
    -access web page's contents~18602
    -perform layout of web page's contents~18604
    -display all or portion of layout at first scale~18606
    -enable user to drag pointing device across first scale layout display; ~18608
    -if drag continues across screen boundary ~18610
        scroll onto screen portions of layout at first scale previously off screen~18612
    -if drag is released~18614
        -define selected layout part based on position in first scale layout display of start and end of drag ~18616
    -display selected part of layout at second scale that fits selected layout part to screen. ~18618

FIG. 186

-drag scroll ~18700
    -access web page's contents~18702
    -perform layout of web page's contents~18704
    -display all or portion of layout~18706
    -enable user to drag a pointing device across display of layout~18708
    -responding to any such drag across a boundary associated with a screen edge by scrolling onto screen, past the screen edge, portions of layout previously off screen~18710

FIG. 187

-clickzoom~18800
    -access web page's contents~18802
    -perform layout of web page's contents~18804
    -display all or portion of layout at first scale~18806
    -enable user to click a pointing device at a selected location in display of layout at first scale~18808
    -responding to such a click by performing a zoomed display of portion of layout around selected location~18810

FIG. 188

-zoomclick~18900
    -access web page's contents~18902
    -perform layout of web page's contents~18904
    -display all or portion of layout at first scale on touch screen~18906
    -if user presses touch screen at first position in first scale layout display~18908
        -replace first scale layout display with a display at larger scale of portion of layout that includes first position at substantially same position on screen as in first scale layout display~18910
        -display cursor slightly above location of touch~18912
        -respond to any movement of touch by correspondingly moving cursor on display at second scale~18914
        -respond to any movement of touch across a boundary associated with a screen edge by scrolling onto screen, past the screen edge, portions of layout at second scale previously off screen~18916
        -if user subsequently releases of press at a selected position in second scale layout display~18918
            -act as if a mouse click had occurred at corresponding position relative to web page~18920
            -replace second scale layout display with first scale layout display~18922

FIG. 189

-zoom out with greeking~19000
    -access web page's contents~19002
    -perform layout of web page's contents~19004
    -if user has selected given larger display scale~19006
        -display portion of web page's layout at larger scale, including~19008
            -representing layout's images with bitmap images scaled for display at larger scale~19010
            -representing layout's strings by bitmap images composed of font bitmaps sized for display at larger scale~19012
    -if user has selected given smaller display scale~19014
        -display portion of web page's layout at smaller scale, including~19016
            -representing layout's images with bitmap images scaled for display at smaller scale~19018
            -representing layout's strings by bitmaps composed of a greeked text representation designed to indicate size and location of each such string at smaller scale~19020

FIG. 190

METHODS, SYSTEMS, AND PROGRAMMING FOR PRODUCING AND DISPLAYING SUBPIXEL-OPTIMIZED IMAGES AND DIGITAL CONTENT INCLUDING SUCH IMAGES

RELATED APPLICATIONS

This application is a continuation-in-part of, and claims priority under 35 U.S.C. §119 from, PCT application PCT/US02/14217, entitled "Methods, Systems, And Programming For Producing And Displaying Subpixel-Optimized Images and Digital Content Including Such Images", filed on May 2, 2002, having a first priority date of May 2, 2001, and a WO publication number of WO 02/089105 A2. Through this PCT application, the current application claims priority of the following US provisional applications:

APPLICANT: Sampo J. Kaasila et al.
TITLE: Methods, Systems, and Programming For Browsing The Web Or Viewing Other Sorts of Media or Computer Output
Ser. No. 60/288,287
FILING DATE: May 2, 2001
APPLICANT: Sampo J. Kaasila et al.
TITLE: Methods, Systems, and Programming For Producing and Displaying Subpixel-Optimized Font Bitmaps Using Non-Linear Color Balancings
Ser. No. 60/296,275
FILING DATE: Jun. 5, 2001
APPLICANT: Sampo J. Kaasila et al.
TITLE: Methods, Systems, and Programming For Producing and Displaying Subpixel-Optimized Font Bitmaps Using Non-Linear Color Balancings
Ser. No. 60/322,922
FILING DATE: Sep. 17, 2001
APPLICANT: Sampo J. Kaasila et al.
TITLE: Methods, Systems, and Programming For Producing And Displaying Subpixel-Optimized Images and Digital Content Including Such Images
Ser. No. 60/296,237
FILING DATE: Jun. 5, 2001
APPLICANT: Sampo J. Kaasila et al.
TITLE: Methods, Systems, and Programming For Displaying Media Including Both Images And Text In A Subpixel-Optimized Manner
Ser. No. 60/296,274
FILING DATE: Jun. 5, 2001
APPLICANT: Sampo J. Kaasila et al.
TITLE: Methods, Systems, and Programming For Displaying Media Including Text In A Scaled And/Or Subpixel-Optimized Manner
Ser. No. 60/296,284
FILING DATE: Jun. 5, 2001
APPLICANT: Sampo J. Kaasila et al.
TITLE: Methods, Systems, and Programming For Displaying Media In A Scaled-Down Manner
Ser. No. 60/296,231
FILING DATE: Jun. 5, 2001
APPLICANT: Sampo J. Kaasila et al.
TITLE: Methods, Systems, and Programming For Displaying Media Scaled-Down By A Variable Scale Factor
Ser. No. 60/296,224
FILING DATE: Jun. 5, 2001
APPLICANT: Sampo J. Kaasila et al.
TITLE: Methods, Systems, and Programming Involved In Preparing Media For Display On One Computer And Displaying It On Another Computer
Ser. No. 60/296,426
FILING DATE: Jun. 5, 2001
APPLICANT: Sampo J. Kaasila et al.
TITLE: Methods, Systems, and Programming Involved In Displaying Text And/Or Images In A Scaled Down Or Subpixel Optimized Manner
Ser. No. 60/296,273
FILING DATE: Jun. 5, 2001
APPLICANT: Sampo J. Kaasila et al.
TITLE: Methods, Systems, and Programming Involved In The Supply Of Fonts Over A Computer Network
Ser. No. 60/296,283
FILING DATE: Jun. 5, 2001
APPLICANT: Sampo J. Kaasila et al.
TITLE: Methods, Systems, and Programming Involved In Display Of Subpixel Optimized GUI And/Or Multimedia Elements
Ser. No. 60/296,281
FILING DATE: Jun. 5, 2001
APPLICANT: Sampo J. Kaasila et al.
TITLE: Methods, Systems, and Programming Involved In Display Of Digital Content In An Orientation Different Than An Orientation At Which Operating System Can Display
Ser. No. 60/296,327
FILING DATE: Jun. 5, 2001

The current application also claims priority from U.S. patent application Ser. No. 10/138,923, entitled "Methods, Systems, And Programming For Computer Display Of Images, Text, And/Or Digtal Content", which was filed on May 2, 2002 by S. Kaasila et al, which also claims priority from the above listed provisional applications, and which is hereby incorporated herein by reference in its entirety.

FIELD OF THE INVENTION

The present invention relates to methods, systems, and programming for producing and displaying subpixel-optimized images and digital content including such images.

BACKGROUND OF THE INVENTION

This patent application has many aspects that relate to the optimization of using computing devices with small or low resolution screens, such as handheld computers, cellphone computers, or computers with wrist or head mounted displays. A good portion of this optimizing has been done to improve the use of such small screen devices for browsing the World Wide Web or similar media, although many of its features can be used when viewing other types of screen content.

Another portion of this optimization has been focused on improving the ability to browse such media through relatively low bandwidth links, such as those that would be found on current wireless links. It should be appreciated, however, that many aspects of the inventions disclosed in this application are not limited to use for these purpose.

For example, some of the features that are designed to make it easier for users to view portions of Web pages at a larger size could be used to make reading the Web on traditional computers easier on the eye or easier to read at greater distances.

At the time this application is being filed there are multiple handheld computers that have approximately 240 by 320 pixel screens that measure approximately four inches diagonally. These include the Compaq iPaq H3650 Pocket PC, the Casio Cassiopeia, and the Hewlett-Packard Jornado 525.

Unfortunately such a resolution would be too low to display most current Web pages on. Currently most Web pages can be viewed with 640×480 resolution screen (although a few web sites cannot even be properly viewed at this resolution). It would be desirable to be able to view most web pages with such hand held devices.

The manufacturers of liquid crystal displays are now capable of making screens having substantially higher resolutions than those that are currently on the market. Makers of organic LED displays claim they can achieve even higher resolutions. This means that a four inch diagonal screen of the size currently in the handheld computers listed above could have a resolution of 480 by 640 or higher, and that such resolutions might soon even be on screens as small as 2.5 inches in diameter. Although such screens would provide an acceptable resolution for many web sites, even a higher effective resolution would be desirable to view many web pages.

In addition, in order for such screens to be seen at a relatively high resolution, they would have to be held close to a user's eyes. Although this might be satisfactory for many applications, users might often find it tiring or inconvenient to constantly hold a handheld computer close one eyes.

Such advances in display resolution would also mean that a 320 by 240 pixel screens could be made with a diagonal length of two inches or less. Such a display would be about the size of the display commonly contained in many present-day cellphones, and could also fit onto a wristwatch. Such displays would make many forms of applications currently used on hand held computers available on cellphones, wristwatches or other similarly small format computers. Unfortunately they would have the problem of both having a relatively low resolution that would tend to make it difficult for them to view most web pages, and of being so physically small that for a user to be able to see their resolution they would have to be held very close to the user's eyes. Again, holding such a device close to a user's eyes might be satisfactory at certain times, but over long periods of time, or in certain situations it might be inconvenient.

Currently there are several companies that provide head mounted displays that enable a person to see an image of a computer screen, either as a result of light reflected into the user's eyes through a device that appears somewhat like a pair of glasses, or from a mirror placed above, below, or off to the side of the user's eyes. To make it easy for user to interact with their surroundings while using such a head mounted display, it is often desirable to have such projected computer screens take up a relatively small portion of the user's optic field. Thus, users of such displays might face many of the same problems as would users of small handheld screens.

Some aspects of the invention relates to methods for optimizing the browsing of the Web or application screen output on a computer with relatively limited computational power, memory, or bandwidth to the Internet. For example, currently a standard Web browser of the type used in most desktop and laptop computers requires many megabytes of memory and a relatively large amount of computational power. They also require a connection to the Internet having at least the speed of a high-speed modem to work effectively with a type of Web content contained in many of the World Wide Web's more frequently used Web pages. Unfortunately, many handheld computers either do not have the storage or computational capacity to be able to effectively view many such web pages. Also most commonly available wireless systems have a bandwidth that is substantially below that which would be desirable for viewing many Web pages. As a result of these factors, one of the focus of some of the innovations contained in this application relate to methods for enabling computers with limited storage, commutation, or bandwidth to better browse the World Wide Web or similar media.

SUMMARY OF THE INVENTION

The invention is most accurately described by the claims below and where the claims differ from this summary, the wording of the claims should be considered the true description of the invention.

An aspect of the present invention is a method of displaying digital content including text and/or images is provided. The digital content is represented by a mark-up language including tags which identify images contained in the content. The display is performed on a subpixel addressable screen having pixels comprised of separately addressable differently colored sub-pixels. The method comprises the following steps. The digital content is accessed, including its images, from a device in which it is stored or from programming which generates it dynamically; and displaying on the screen one or more of such accessed images at a first pixel scale in which the luminosity of each differently colored sub-pixel of a given pixel is derived from a different area of the same image at a second, higher resolution, pixel scale.

According to another aspect of the present invention a method of producing a sub-pixel resolution representation of an image suitable for display on a sub-pixel addressed screen having pixels comprised of separately addressable differently colored sub-pixels is provided. The method determines the luminosity of each subpixel in a given pixel of the subpixel resolution representation by defining for the sub-pixel a plurality of coverage lines which fit within a window in a higher resolution representation of the image, which window is different for each sub-pixel of a given pixel. It calculates the length of each coverage line which corresponds to given pixel in the higher resolution image, and it determines the luminosity of the sub-pixel as a function of the length of each coverage line which corresponds to each higher resolution pixel and the respective luminosity in the sub-pixel's color of that higher resolution image pixel.

According to yet another aspect of the present invention a method of producing a sub-pixel resolution representation of a source image suitable for display on a sub-pixel addressed screen having pixels comprised of separately addressable differently colored sub-pixels is provided. This method produces a scaled sub-pixel optimized image of a bitmap image by associating a luminosity value with each subpixel of the scaled image. The luminosity values are calculated as a function of the whole pixel luminosity of the one or more pixels in the source image which cover a source image window corresponding to the area of the subpixel, the percent of that window covered by each such source image pixels, and a color balancing function that distributes subpixel luminosity values to reduce color imbalance.

BRIEF DESCRIPTION OF THE DRAWINGS

These and other aspects of the present invention will become more evident upon reading the following description of the preferred embodiment in conjunction with the accompanying drawings, in which:

FIG. 11 illustrates the level of readability provided by one current embodiment of the invention when displaying standard Web content on a 320 by 240 color display.

FIG. 29 is a highly simplified pseudocode description of a subpixel optimization method that calculates subpixel luminance values based on line coverage values, such as the line coverage values illustrated with regard to FIGS. 17 through 28.

FIG. 41 is a highly simplified pseudocode description of a subpixel optimization method that calculates subpixel luminance values based on an area coverage values, such as those discussed with regard to FIGS. 39 and 40.

FIG. 53 is a highly simplified pseudocode representation of a software method for creating a subpixel-optimized representation of a bicolor bitmap.

FIG. 56 is a screen shot of a 320×240 screen of a web page produced by one embodiment of the present invention;

FIG. 57 is a 2× blowup of the screen shot shown in FIG. 56;

FIG. 58 illustrates how a computer can access font bitmaps or font outlines from a font server;

FIG. 59 illustrates how a computer can access font bitmaps or font outlines that it has stored within it;

FIG. 60 is a highly simplified pseudocode representation of an algorithm for calculating a subpixel-optimized bitmap of a character-font shape using non-linear color balancing of the type described above with regard to FIGS. 48 through 52;

FIGS. 94 and 95 illustrates color balance filters that can be used with the non-linear color balancing method described with regard FIG. 60;

FIG. 96 is a highly simplified pseudocode description of an algorithm that can be used to map the whole-pixel composite alpha values calculated for font bitmaps by a method such as that shown in FIG. 60 into a more limited color space of such whole-pixel composite alpha values;

FIG. 97 is a highly simplified pseudocode description of an algorithm for displaying text strings on a subpixel addressable display using font bitmaps created by a combination of the methods illustrated in FIGS. 60 and 96;

FIG. 103 is a portion of the HTML code of the web page illustrated in FIGS. 98 and 99;

FIGS. 105A and 105B are highly simplified pseudocode descriptions of programming on the proxy server shown in FIG. 102;

FIGS. 106A through 106C are highly simplified pseudocode descriptions of proxy server programming for capturing, scaling-down, and subpixel-optimizing a representation of a portion of a web page and downloading it to a thin client computer;

FIG. 107 is a highly simplified pseudocode description of programming for the actual downloading of the web page representation captured by the programming of FIGS. 106A through 106C;

FIG. 108 is a highly simplified representation of the data downloaded to a thin client computer by the programming illustrated in FIG. 107;

FIGS. 109A through 109C are highly simplified pseudocode representations of programming on the thin client shown in FIG. 102;

FIGS. 115 and 116 are highly simplified pseudocode representations of programming on a proxy browser and thin client computer, respectively, that is used in an alternate embodiment of the invention in which the thin client computer stores the layout of an entire web page to allow it to more quickly scroll and zoom relative to that web page;

FIG. 129 is a highly simplified pseudocode description of programming for allowing a user to have selected text re-flowed across a given screen width at a larger scale;

FIGS. 130 through 137 are used to illustrate how the text re-flow capability shown in FIG. 129 can operate;

FIG. 139 is a highly simplified pseudocode description of programming that can be used on one or more font servers;

FIG. 145 is a highly simplified pseudocode description of programming use to draw a simple shape with a subpixel-optimized resolution;

FIG. 146 is a highly simplified pseudocode description of how web applets can be used to draw subpixel-optimized elements on the screen of a computer;

FIG. 149 is a highly simplified pseudocode description of how 3-D animation can be subpixel-optimized;

FIGS. 150 and 151 are highly simplified pseudocode descriptions of how a client/server gaming system can be used to provide subpixel-optimized game images on a client computer;

FIG. 152 is a highly simplified pseudocode description of how subpixel-optimized displays can be made of images having transparency maps;

FIG. 153 is a highly simplified pseudocode description of how video using interpolation between keyframes can be subpixel-optimized;

FIG. 154 is a highly simplified pseudocode description of how video whose representation includes the drawing of screen changes to less than a whole frames can be subpixel-optimized;

FIGS. 155 and 156 are highly simplified pseudocode description of different methods of displaying images that move relative to a display window;

FIGS. 157 through 159 are highly simplified pseudocode description of how subpixel optimization can be applied to video that is been represented by various compression techniques;

FIG. 160 is a highly simplified pseudocode representation of programming for enabling a server computer to download subpixel-optimized, scaled-down video to a client computer;

FIG. 161 is a highly simplified pseudocode description of programming on both a client and proxy computer to enable the client computer to access scaled-down, subpixel-optimized video from other servers through a proxy computer;

FIG. 162 is a highly simplified pseudocode representation of programming that allows electronic ink to be viewed more clearly;

FIGS. 168 through 184 are used to describe additional improvements to the invention for improving the clarity of color-balanced subpixel-optimized font bitmaps produced by the present invention.

FIG. 185 is a higher level description of the selected-text reflow method described with regard to FIGS. 129 through 134;

FIG. 186 is a high-level pseudocode description of a zoom-to-fit method; of the general type described with regard to FIGS. 118 through 120;

FIG. 187 is a high-level pseudocode description of a drag scroll method, that allows a user to easily navigate within the display of a web page's layout;

FIG. 188 is a high-level pseudocode description of a click-zoom method that enables the user to rapidly selected to zoom in on a desired portion of the display of a layout of a web page;

FIG. 189 is a highly simplified pseudocode description of the zoomclick method described with regard to FIGS. 121 through 128;

FIG. 190 is a highly simplified pseudocode description of a method that allows a user to see a zoom-out view of a web page using greeking;

DETAILED DESCRIPTION OF SOME PREFERRED EMBODIMENTS

Figure 1:
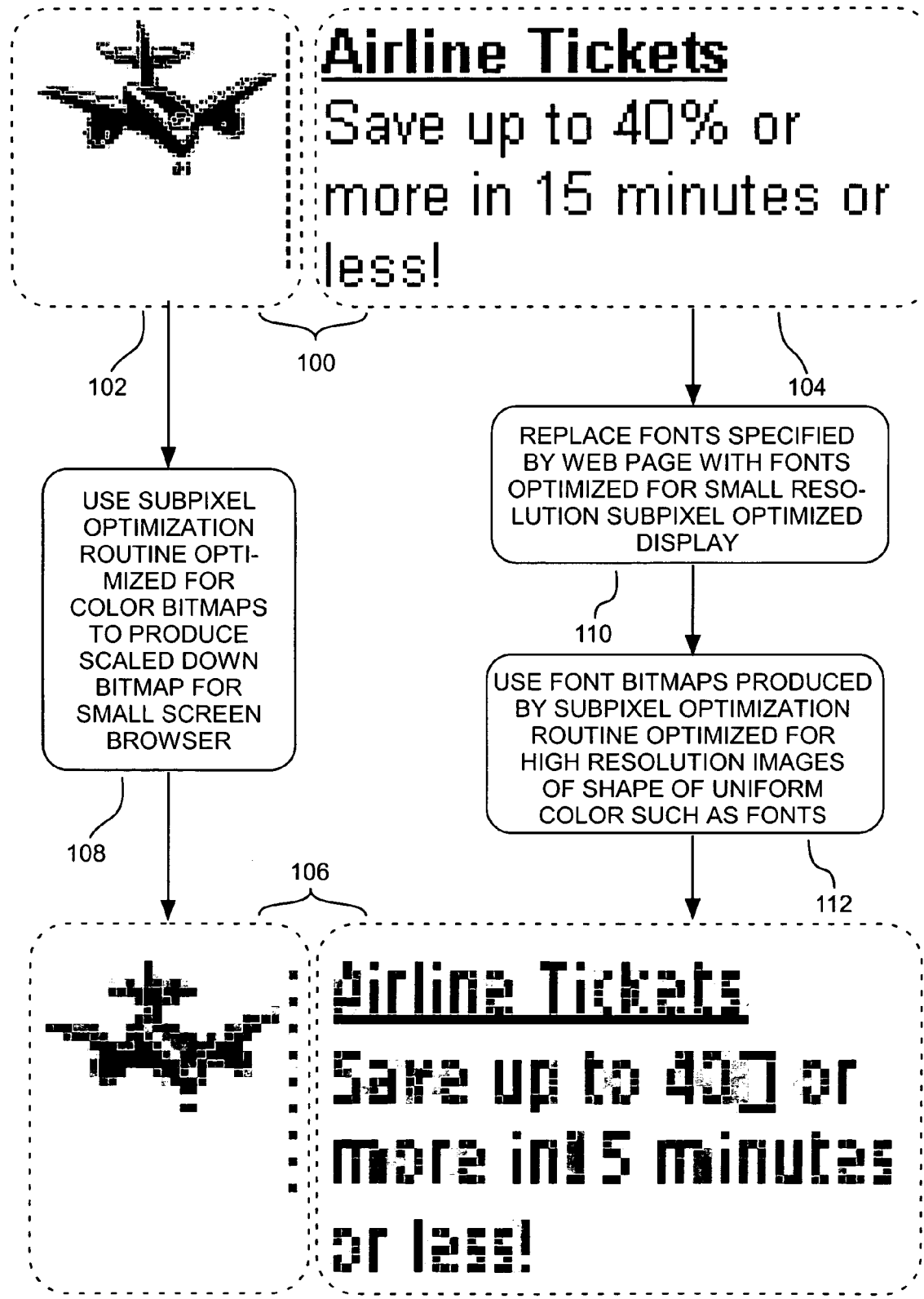
FIG. 1 illustrates a process used according to some aspects of the present invention to improve Web browsing and/or display of other types of computer generated content, particularly on systems with relatively low-resolution screens.

FIG. 1 is a high level diagram that represents basic processes and data representations that may be used according to some aspects of the present invention to improve Web browsing and/or display of other types of computer generated content, particularly on systems with low resolution displays.

Digital content 100, including one or more bitmap images 102 and text 104 shown at the top of FIG. 1 is displayed in a subpixel-optimized downscaled format 106 shown at the bottom of that figure. In one embodiment of the invention a difference process, comprised of step 108 is used to subpixel-optimize the display of the bitmap images 102, than is used to subpixel optimize the display of the text content. Step 108 uses a subpixel optimization routine that is particularly suited for producing subpixel-optimized images from color bitmaps. The process 108 also scales down the bitmaps for display on screens having a lower resolution than that at which most Web content is currently displayed.

The text 104 contained in the digital content 100 is processed for display on a small-resolution subpixel-addressable screen by using steps 110 and 112. Step 110 replaces the fonts normally used to display text with fonts that are optimized for display at small resolutions on subpixel-optimized screens. Then step 112 uses font bitmaps from the substituted fonts that have been produced by a subpixel optimization routine particularly suited for the representation of high resolution images of shapes of a uniform color, such as the mathematically defined outlines commonly used to define font shapes.

One use of the present invention is in the context of a portable, low resolution Web browser that displays images and/or text, represented by a markup language, that have been downloaded from the Internet.

To date there have been multiple so-called mark-up languages. One of the earliest and most successful was SGML (Standard General Markup Language). SGML is a text-based language that can be used to 'markup' data with descriptive 'metadata' that provides information about the data. As an example, markup metadata can be used to indicate the purpose for which the data is intended or the location within a document's visual presentation at which the data should be positioned. It can also be used to indicate links to data of other types, such as images, which are to be inserted at a given location in a text, or in a document described by the mark-up language. Several markup languages that are commonly used today, such as HTML and XML, are derived from SGML.

In a preferred embodiment of the present invention, the digital content 100 referred to in FIG. 1 above may be standard Web content that includes text and/or images represented by a markup language such as HTML. This standard Web content 100, representing perhaps a Web site home page, can be downloaded through various apparatus and methods described below for display on a portable low resolution browser device 200, shown in FIGS. 2 through 4. Before display on the browser device 200, the digital content 100 may be scaled and/or subpixel-optimized for enhanced readability through various methods and processes, such as those described below.

Figure 2:
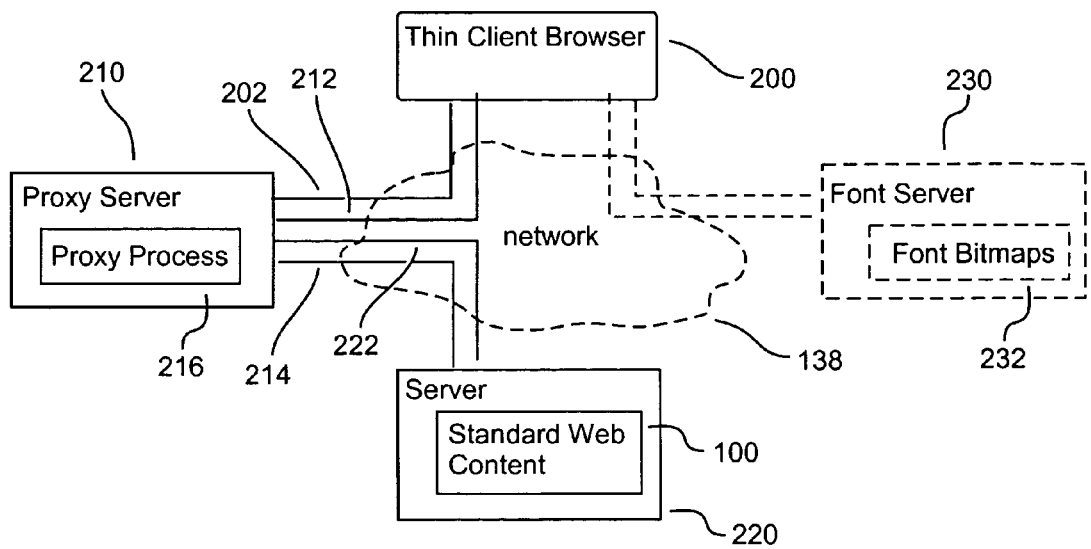
FIG. 2 illustrates a networked computing environment in which aspects of the invention can operate that includes a portable browser, a proxy server, a Web server, and a font server.

FIG. 2 illustrates a networked computer environment implemented in accordance with one embodiment of the present invention. The thin client browser 200 program runs in a handheld or other small computing device capable of retrieving and displaying text and/or graphics on a small display screen, such as, for example, a liquid crystal display (LCD) screen. The browser allows a user to request digital information from a remote source, e.g., from the Internet, and to display it on a screen.

In the embodiment of the present invention illustrated in FIG. 2, a user would request the retrieval and display of digital content, containing images and/or text, by way of manipulation of the controls of the thin client browser 200. The requested digital content may be a specific Web page accessible over the Internet. The thin client browser 200 then makes its request 202 for content through a physically remote proxy server 210 over a network 138, which can be, for example, a LAN, a WAN, or the Internet.

The proxy server 210 runs a proxy process 216 that responds to the request for digital content by generating a corresponding request 214 to a physically remote Web server 220 that contains the digital content 100 requested by the user.

Server 220 responds to the proxy server request 214 by a download 222 of the digital content 100 over the network 138 to the proxy server 210.

The proxy process 216 within the proxy server 210 then uses its computational resources to scale and subpixel optimize the digital content 100, including performing the functions 108 and 110 illustrated in FIG. 1. Scaling and subpixel optimizing are aspects of the present invention that result in the enhanced readability of images, such as text and/or graphics, on small display devices. They will be discussed in greater detail in a subsequent section.

The proxy server 210 completes a download 212 of the now scaled and subpixel-optimized content to the browser 200. At this point, the user is able to view the content on the screen of the browser 200.

In the embodiment of the invention shown in FIG. 2, the text portion of the digital content is downloaded to the browser in the form of one or more strings of characters and associated designations of the font family, font size, and other font attribute. The thin client browser performs the function 112 shown in FIG. 1 by displaying the strings with images composed from individual subpixel-optimized font bitmaps. If the thin client does not have bitmaps for any character in such a string in the font size and family specified for it, it requests one or more such bitmaps from a font server 230. In various embodiments of the inventions shown in FIGS. 2 through 8, the proxy server could provide such font bitmaps or the thin client could have them as a standard part of its software (although that would increase the size of the browser software). In still other embodiments, the fonts could be outline fonts. One advantage of font bitmaps is that some font vendors are more willing to allow bitmaps of their fonts to be distributed more freely than outlines of such fonts.

Figures 3, 4, 5:
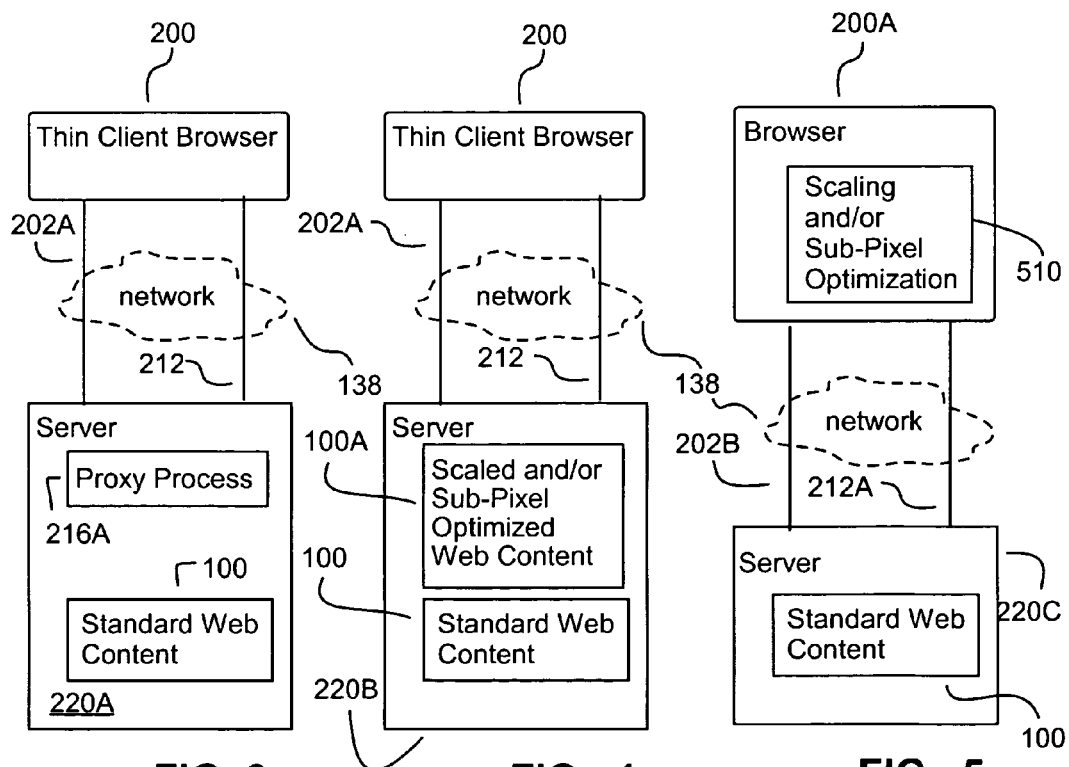
FIG. 3 illustrates an alternative networked computing environment in which aspect of the invention can operate that includes a browser and a Web server.
FIG. 4 illustrates a second alternative networked computing environment in which aspects of the invention can operate that also includes a browser and a Web server.
FIG. 5 illustrates a third alternative networked computing environment in which aspects of the invention can operate that includes a browser and a Web server as well.

An alternate embodiment of the present invention is illustrated in FIG. 3. In this embodiment the proxy server 210 and the Web server 220 of FIG. 2 are replaced with a single remote server 220A. The thin client browser 200 makes its request 202A for digital content 100 to the remote server 220A over a network 138. For example, network 138 may be the Internet or a LAN and the digital content 100 may be a specific Web page. The remote server 220A contains the requested digital content 100 and runs a proxy process 216A that responds to the request 202A. This proxy process 216A can be any process running on the server that dynamically scales and/or subpixel optimizes web content for display on the thin client browsers. The proxy process 216A operates upon the stored digital content 100 and dynamically converts it to the form 106 shown in FIG. 1 by performing the steps 108 and 110 of FIG. 1. The remote server 220A completes a download 212 of the scaled and/or subpixel-optimized content to the thin client browser 200.

Another alternate embodiment of the invention is illustrated in FIG. 4. As in FIG. 3 the thin client's request is made directly to a remote server, in this case server 220B, over a network 138. In this implementation the remote server 220B contains the requested digital content in both a standard form 100, that is for use by standard browsers computers, and the scaled and/or subpixel-optimized content 100A. The conversion from standard digital content 100 to the scaled and/or subpixel-optimized form has occurred in advance, thereby eliminating the need for a proxy process to dynamically convert it. The thin client provides information to the server indicating that it should receive the scaled and/or subpixel-optimized version of the requested content. The remote server 220B completes a download 212 of the scaled and/or subpixel-optimized content 100 to the thin client browser 200.

A further alternate embodiment is illustrated in FIG. 5. Browser 200A is a full scale browser that also contains a scaling and/or subpixel optimization process 510. The browser 200A makes a request 202B to a remote server 220C over the network 138 for the digital content 100. Server 220C completes a download 212A of the requested digital content 100 to the browser 200A. The conversion of the digital content 100 to a scaled and/or subpixel-optimized form is handled by the process 510 running in the browser 200A.

Figure 6:
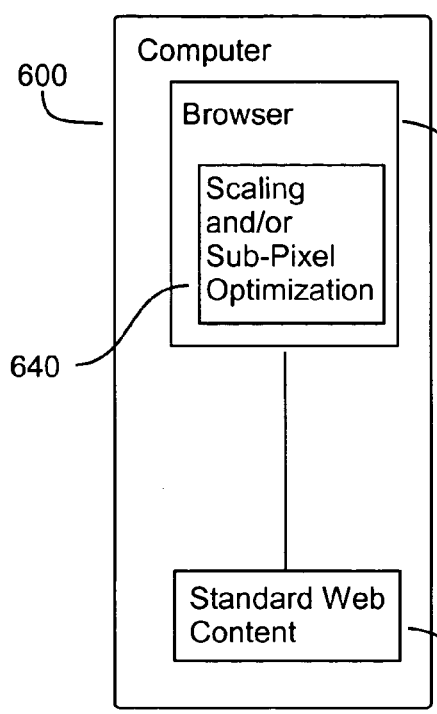
FIG. 6 illustrates a computer system in which aspects of the invention can operate that contains standard Web content to be displayed and browser functionality containing a process for scaling and/or subpixel optimizing that content.

FIG. 6 illustrates a single computer system 600 capable of scaling and/or subpixel optimizing digital content 100. In this preferred embodiment the digital content has been created on or loaded into computer system 600 in advance. Computer system 600 contains a browser process 620 that includes a scaling and/or subpixel optimizing sub-process 640. Here the user makes a request to the computer system 600 by way of an attached input device, e.g., a keyboard or mouse, for the display of the digital content 100. The browser process 620 retrieves the requested digital content 100 from one of the computer system's storage elements, e.g., such as electronic memory or disk storage. Once retrieved, the browser process 620 then passes the digital content to the scaling and/or subpixel optimizing sub-process 640. Once the conversion is complete, the converted content is displayed on the display screen of the computer system 600. This embodiment of the present invention operates without the need for a network or remote servers.

Figure 7:
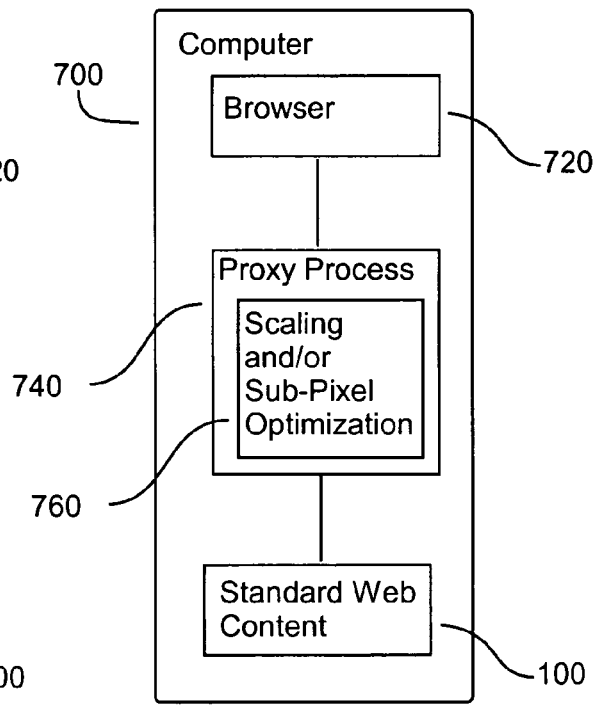
FIG. 7 illustrates an alternative computer system in which aspects of the invention can operate that contains the content to be displayed, a proxy process for scaling and/or subpixel optimizing the content, and browser functionality.

FIG. 7 illustrates an alternate single computer system implementation. In this embodiment, computer system 700 contains the digital content 100 (e.g., the contents of a specific Web page) that has been created or loaded in advance, a proxy process 740, and a browser process 720. The proxy process 740 executes scaling and/or subpixel optimization programming 760. The browser process passes a user request for display of the digital content 100 to the proxy process 740. Proxy process 740 then retrieves the digital content 100 from the storage element of computer system 700. Once retrieved, the programming 760 converts the digital content 100 to a scaled and/or subpixel-optimized form that is then passed to the browser process 740 for display by the display device of computer system 700.

Figure 8:
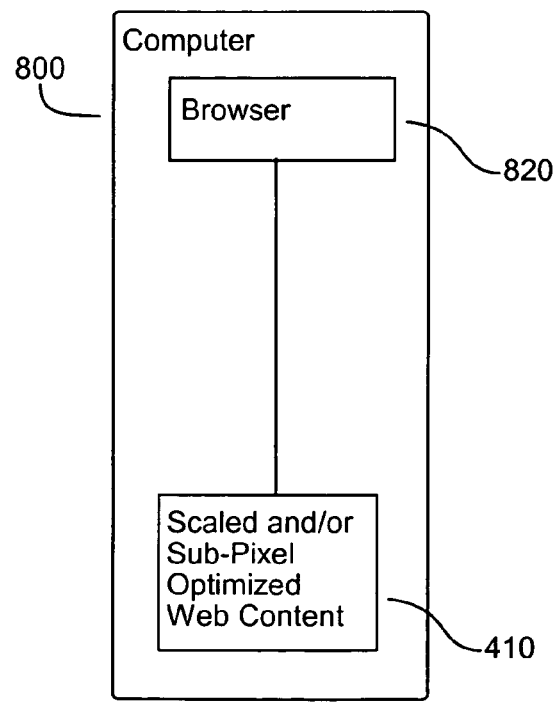
FIG. 8 illustrates a second alternative computer system in which aspects of the invention can operate that contains previously scaled and/or subpixel-optimized content.

FIG. 8 illustrates a second alternate single computer system implementation. Here computer system 800 contains scaled and/or subpixel-optimized Web content 810. A browser process 820 handles user requests for display of the content 100A, retrieves it from a storage element of computer system 800, and displays it on the screen of computer system 800.

In some embodiments of the present invention presented above, the scaling of the image from the resolution of the source image to the resolution of the subpixel addressed screen is performed at a fixed resolution. In other embodiments, the determination of the scaling factor between the source image resolution and the resolution to be displayed on the subpixel addressable display screen can be specified by the user of the browser device. In these embodiments the user of the browser selects from a plurality of scale factors by communicating the scale factor to the process that scales down an image read from storage. The process that scales down the image read from storage then scales down and subpixel optimizes the image by a horizontal and vertical scale factor that varies as a function of the selected scale factor.

As with most other user inputs to the browser device, such scale selections can be made by use of physical or GUI buttons, menu items, dialog boxes, or any other known user interface device on the browser device.

In some such embodiments, the user of the browser device may choose a second scaling factor from a plurality of scaling factors, according to which the digital content will be re-scaled and re-subpixel optimized and redisplayed, after the image has been previously retrieved from storage and displayed in subpixel-optimized form at a first scaling factor.

In such embodiments, the scaling factor used in the first scaled and subpixel-optimized display may have been as a result of a default or preferred scaling factor or it may have been as a result of a scaling factor previously chosen by the user of the browser device. The user of the browser device may choose from a plurality of scaling factors for the redisplay of the digital content by the method of manipulating an input apparatus of the browser device. Such manipulation of the input apparatus of the browser device will cause the image to be scaled according to the second chosen scaling factor.

Such a second scaling may occur as a result of a process running either within the browser device or within a physically remote server, as indicated above by FIGS. 2 through 8. The user of the browser device may continue to select from a plurality of scaling factors for subsequent redisplays.

It is easiest to downscale digital images by integer multiples, which cause an integer number of pixels in a source image to fit into a given pixel in the resulting downscaled image. For example, the scaling from a 640 by 480 resolution to a 320 by 240 resolution is a downscaling by a factor of two. Some embodiments of the present invention allow the user to select from a plurality of downscale factors, including non-integer downscaling factors. An example of a non-integer downscaling factor is that of a ½ downscaling factor that would cause a 480 by 360 pixel portion of a 640 by 480 resolution source image to be scaled and/or subpixel optimized for display on a 320 by 240 resolution display screen.

In this specification when we refer to the resolution of a web page, we normally mean the resolution at which a browser program doing the layout has been requested to lay out the web page's content. As is described below, some web page's have elements that require a certain minimum layout width, and if a request is made to display the web page at less than such a width, those elements will be layed out at their minimum width even if that width is larger than the requested layout width.

Computer graphic displays such as cathode ray tubes (CRT) or liquid crystal display (LCD) screens almost exclusively use the RGB model of color space, although the invention can be used with other color models, such as the CMYK color model. In the RGB model, the three primary additive colors, red, green, and blue, are blended to form a desired color as perceived by the human eye.

Most portable computing or imaging devices have LCD screens that use the RGB model. Such LCD screens are comprised of a rectangular array of thousands of grid elements, referred to as pixels, each capable of displaying any one from a large number of color values from an RGB color space, that when perceived as a whole, form an image. LCD screens are characterized by the number of horizontal and vertical pixels they contain.

Each pixel in turn is composed of three individually addressable sub-components, referred to here as subpixels. Most commonly, the three subpixels are rectangular red, green, and blue elements. In the most common implementation, the three red, green, and blue subpixels are each assigned a luminous intensity value such that they blend together to give the entire pixel the appearance of the desired color. All of the pixels on an LCD screen blend together, in turn, to give the appearance of the desired image.

The subpixels are considered individually addressable because the color value assigned to an individual pixel has a separate red, green, and blue color component, or luminosity value, which will be displayed, respectively, by the red, green, and blue subpixels of that pixel. Thus, the luminosity of each subpixel can be separately controlled by controlling the value of its associated color component's luminosity value in the color value assigned to the pixel.

In an LCD device and other "subpixel addressed" displays, such as color LED (including screens using organic light-emitting diodes (OLEDs)) or gas plasma displays, each individual subpixel has a fixed, known position on the display. Many display devices, such as almost all cathode ray tube (CRT) displays are not subpixel addressable. For example, although each pixel of a CRT has an individual luminosity value for each of its red, green, and blue component colors, the exact physical location within each such pixel of the elements that generate the light associated with those different color values is normally not known because it varies as a function of the individual phosphor pattern of the screen, the resolution of the horizontal and vertical scan, and the current exact state of the voltages that control the exact locations at which individual pixels are drawn on the screen.

Figure 9:
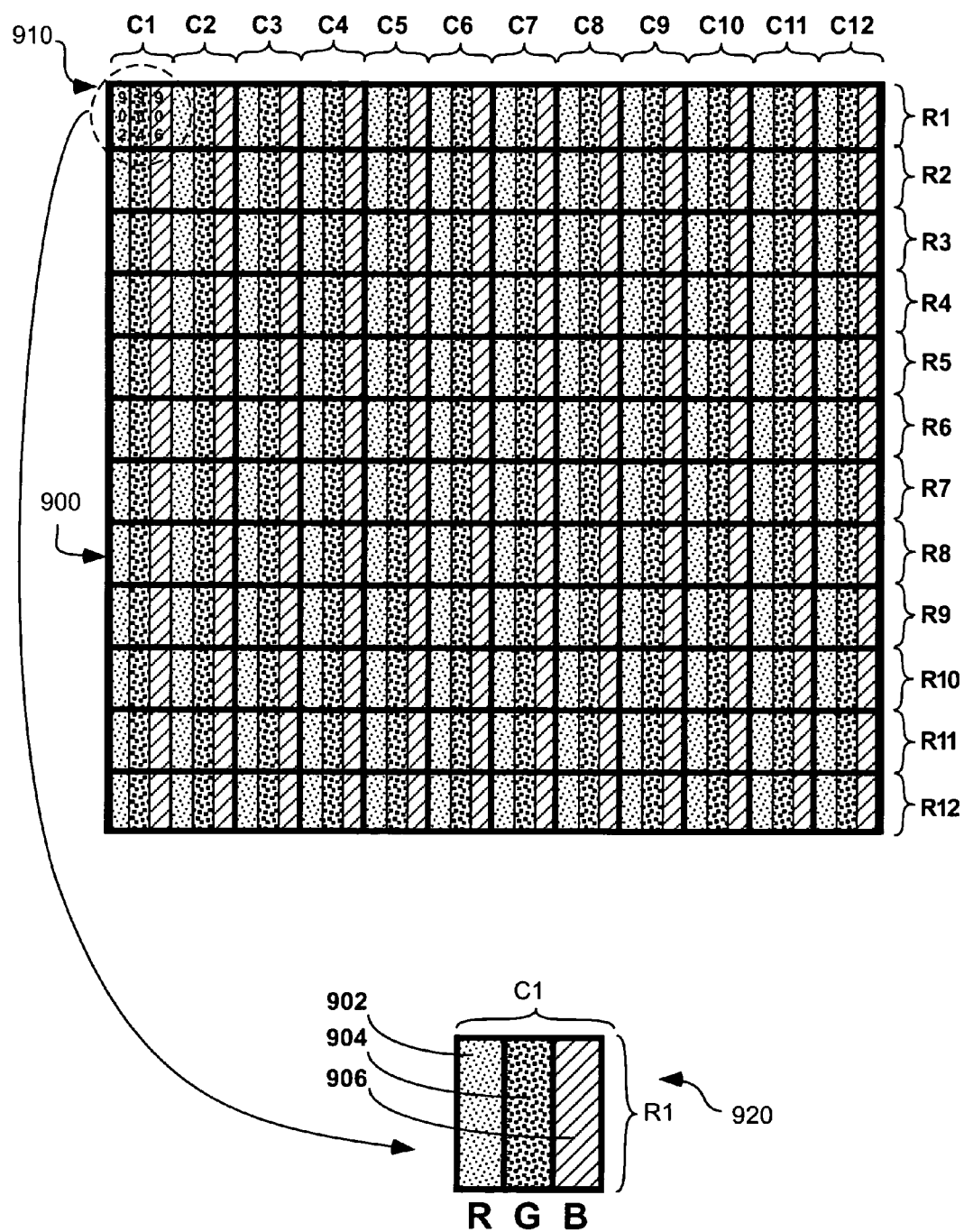
FIG. 9 illustrates a known vertically striped RGB LCD display device.

FIG. 9 illustrates a 12×12 portion of an LCD screen 900 that is comprised of a plurality of pixel rows (R1-R12) and pixel columns (C1-C12). Each intersection of a row and a column constitutes a pixel element. Actual implementations of LCD screens can have an arbitrary number of rows and columns, though grids of 320 by 240, 640 by 480, 800 by 600, 1024 by 768, and 1280 by 1024 are frequently seen.

Pixel R1-C1 is contained within circle 910. Pixel R1-C1 is itself made up of three pixel sub-components herein referred to as subpixel elements. An expanded view of pixel C1-R1 is shown as expanded pixel 920 at the bottom of FIG. 9. Subpixel element 902 displays as red, subpixel element 904 displays as green, and subpixel element 906 displays as blue. The individual subpixel elements 902, 904, and 906 are approximately ⅓ of the width of a full pixel and are equal in height to a full pixel.

As illustrated in LCD screen 900, when a plurality of such pixels are arrayed in a grid this causes the appearance of vertical color stripes down the LCD screen 900. This known arrangement of pixels is sometimes referred to as vertical RGB striping. Other known arrangements lay the pixel elements out in the orthogonal direction such that horizontal striping results (in which case rotating the screen by 90 degrees will convert is into a vertically striped screen).

In common usage, the luminous intensity of the three subpixel elements of a pixel are set such that the pixel is perceived by the human eye as being of the desired hue, saturation, and intensity. The RGB subpixel elements are used together to form a single colored pixel to represent a single sample of an image to be displayed.

One aspect of the present invention relates to the improvement of the readability of downloaded Web content, and other digital content including text and images, on low-resolution screens, such as, for example, displays having column by row pixel ratios of 320 by 240 or 240 by 320 (in which case they can be rotated 90 degrees to have a resolution of 320 by 240). Many of the embodiments of the present invention discussed and shown in some detail map image and text from a virtual layout resolution of 640 by 480 pixels onto a screen with a 320 by 240 pixel resolution. But the present invention can be used with other resolution screens. To give just a few examples, it could be used to display content laid out roughly as it would look at a 1024×768 resolution on a 512×384 resolution screen, or display content laid out roughly as it would look at a 800×600 pixels on a 400×300 screen. In other embodiments, the invention can be used with relatively low-resolution displays that have pixel dimensions that are other than even fractions of the horizontal and/or vertical pixel dimensions common on personal computer screens.

In general when we refer to a small resolution screen we mean a screen having a smaller resolution that given digital content or a given layout of digital content would normally be intended to be displayed upon. By such smaller screens we also mean to include portions of larger screens, such as windows on larger screens, that have such lower resolution.

Figure 10:
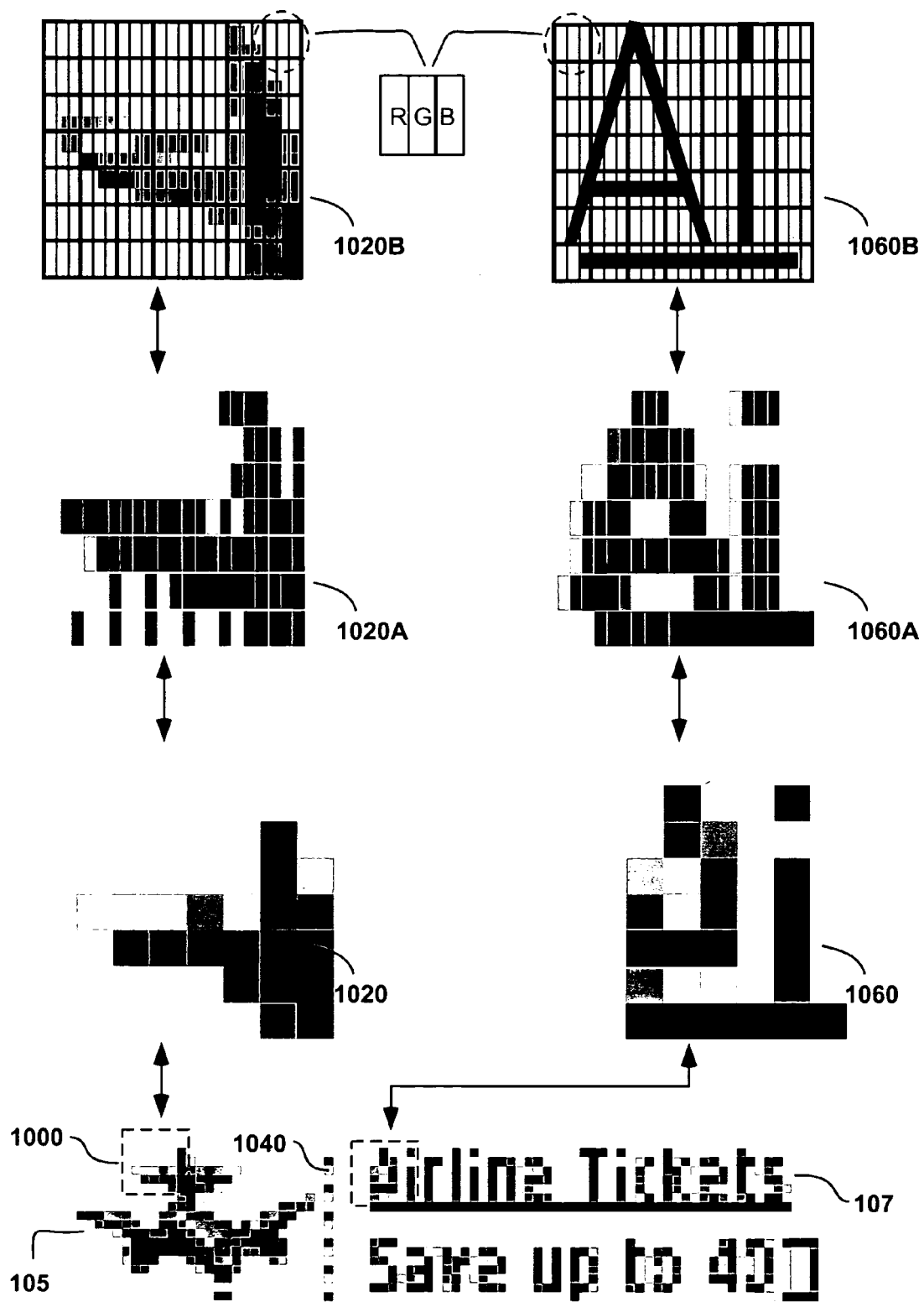
FIG. 10 illustrates some of the aspects of the invention involved in performing the subpixel optimization of both images and text referred to with regards to steps 108 and 112 of FIG. 1, respectively.

In FIG. 10, image content 105 and text content 107 represent a portion of the subpixel-optimized display 106 of FIG. 1. The image shown in FIG. 1 is a grayscale blowup of the actual color values associated with the subpixel-optimized display of both text and images. The portion of the image content 105 contained within the rectangle 1000 is shown expanded at 1020 to make its individual pixels easier to see. Correspondingly, a portion of the text content 107 contained within rectangle 1040 is shown expanded at 1060.

It is important to note that the pixels shown at 1020 and 1060 represent whole pixels because the software used to generate the images 1020 and 1060 merely represents the grayscale corresponding to the RGB color values associated with individual whole pixels. The subpixel blowups 1020A and 1060A are attempts to represent the intensity of each of the three subpixels associated with each pixel in the blowups 1020 and 1040, respectively, 1020B is a blowup corresponding in scale and location to blowups 1020A and 1020. In it the pixel grid of the image is displayed in relatively bold lines, and the three subpixel divisions within each such pixel are shown in somewhat finer lines. This composite grid is superimposed on top of the original higher-resolution color bitmap image 102 of FIG. 1 from which the pixelation patterns shown in the blowups 1020 and 1020A have been derived. In the particular images shown, the resolution of the color bitmap 102 is twice as high in both the vertical and horizontal direction as the whole pixel resolution in the image 105 shown at the bottom of FIG. 10.

The blowup 1060B illustrates the spatial relationship between the subpixel pattern used in the subpixel-optimized font image shown at 1060A and the high-resolution font outline of the characters represented by that font image.

As can be seen by comparing the subpixel resolution blowups 1020A and 1060A to the corresponding whole pixel blowups 1020 and 1060, respectively, the display of subpixel-optimized representations of images and text at subpixel resolution provides better resolution.

FIG. 11 provides a representation of readability provided by an embodiment of the invention when displaying standard Web content on a 320 by 240 color display. Bitmap 1100 at the top of the figure is a grayscale, whole-pixel blowup of an actual bitmap produced from a standard 640 by 480 layout of a portion of a priceline.com web page. This high resolution image corresponds to the portion of the web page contained within the rectangle 1130 shown in the whole-screen lower-resolution 320 by 240 image of the web page shown at the bottom of FIG. 11. Bitmap 1120 in the middle of the figure is a grayscale, whole-pixel blowup of the color bitmap of the same portion of the whole-screen 320 by 240 image. 200B at the bottom of FIG. 11 represents a hand-held computing device that is functioning as a thin client browser of the type described with regard to FIG. 2. On the screen of this browser is shown the above mentioned whole-screen image. This 320 by 240 subpixel-optimized bitmap represents a 640 by 480 layout of the web page it shows. Like the blowup 1020 of FIG. 10, the bitmap 1130 shown at the bottom of FIG. 11 illustrates individual pixels with grayscale levels corresponding to the average luminosity of whole pixels. When this image is seen on a 320×240 screen having vertical subpixel striping, as shown in FIG. 9, the actual image appears to have an even higher resolution, as indicated by the blowup 1020A in FIG. 10.

Any known algorithm for deriving subpixel-optimized images of color bitmaps can be used for the purposes of many aspects of the present invention. In one embodiment of the present invention, the luminosity assigned to each given subpixel of a given color is determined by the average intensity of that given color's value in each total or partial pixel of the source image inside a rectangular window in the source image. This source image window has a size and location relative to the source image corresponding to the area of a whole pixel in the scaled-down image centered around the given subpixel. The average intensity assigned to the subpixel is calculated by multiplying the intensity of each source image pixel that totally or partially covers the source image window by the percent of that window's area covered by each such source image pixel.

Figure 12:
FIG. 12 illustrates the mapping of a pixel and subpixel grid, used in a lower-resolution display device, over a portion of a higher-resolution source bitmap image 102.

FIG. 12 illustrates the mapping of a reduced resolution display's subpixel grid onto a portion of a higher-resolution source image 102. This figure illustrates the subpixel grid 1210 being superimposed on a portion of the original higher-resolution color bitmap 102 shown in FIG. 1. Circle 1220 encloses an area of that grid that corresponds to one pixel in the intended lower-resolution display device. The position and scale of the grid patterns is determined by the relationship between the higher-resolution source bitmap image and the pixel grid of the resulting subpixel-optimized images. The particular grid pattern 1210 shown in FIG. 12 represents a scaling from the pixel resolution of the color bitmap image 102 to a display screen resolution that has one-half as many pixels in both the horizontal and vertical direction as the source image. An example of this scaling is that of an image having pixelation appropriate for display on a 640 by 480 display being scaled down for proportional display on a 320 by 240 display screen. Thus, each bold line division of grid pattern 1210 covers four pixels of color bitmap image 102. The dashed circle 1220 encloses one such bold line division that contains four higher-resolution source pixels.

Figure 13:
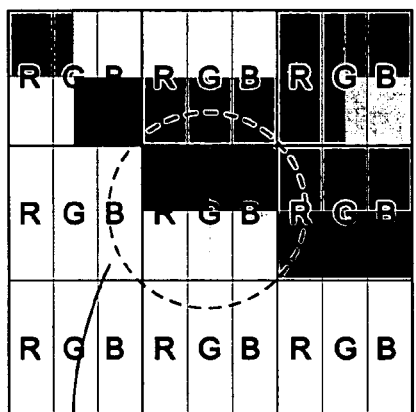
FIG. 13 is an expansion of a section of the mapping grid of FIG. 12.

FIG. 13 is an expansion of the nine bold line divisions (i.e., nine whole pixels) centered on circle 1220 of FIG. 12. The pixel inside circle 1300 represents a single pixel of the intended display device. As FIG. 13 makes clear, each bold line division of grid pattern 1210 encloses four pixels of the higher-resolution source image. The detail of FIG. 13 also illustrates that each pixel of the intended display device is made up of three color subpixels, including a red, a green, and a blue subpixel, labeled "R", "G", and "B", respectively.

Figure 14:
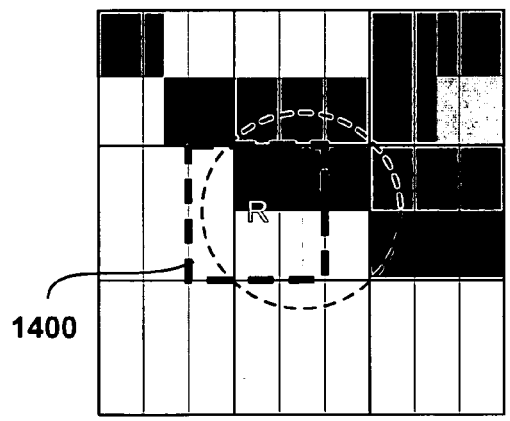
FIG. 14 illustrates the positioning of a window over the source image used to calculate the luminosity of a red (R) subpixel of the lower-resolution display device.
Figure 15:
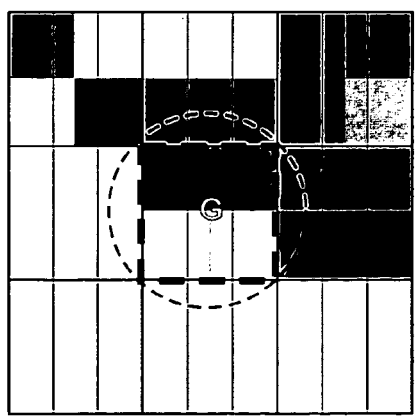
FIG. 15 illustrates the positioning of such a window used to calculate the luminosity of a green (G) subpixel of the lower-resolution display device.
Figure 16:
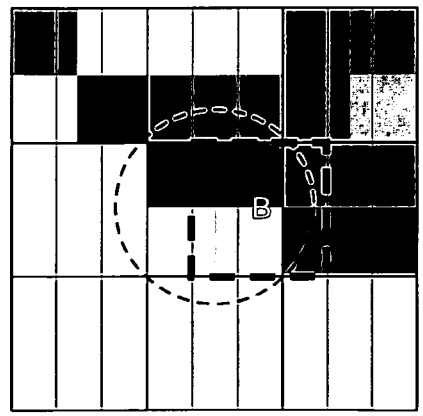
FIG. 16 illustrates the positioning of such a window used to calculate the luminosity of a blue (B) subpixel of the lower-resolution display device.

FIGS. 14, 15, and 16, respectively, illustrate the positioning of the rectangular window area in the source image from which the luminosity of red, green, and blue colored subpixels in the intended display device is determined. The area of each such source image window equals the area of a whole pixel in the scaled down image centered around the portion of the source image corresponding to the subpixel whose luminosity it is being used to calculate.

Rectangle 1400 of FIG. 14 encloses the area of the source image window used to calculate the luminosity of the red subpixel of the lower-resolution display device. Similarly, FIGS. 15 and 16 enclose the source image windows that correspond to the green and blue subpixels of the intended display device, respectively.

As stated above, the luminosity assigned to a subpixel of a given color is determined by the following function, or an approximation thereof. The luminoisity is set equal to the intensity of the supixel's color in each pixel of the source image totally or partially within the subpixel's corresponding source image window, times the percent of that window's area covered by each such source image pixel.

Figure 17:
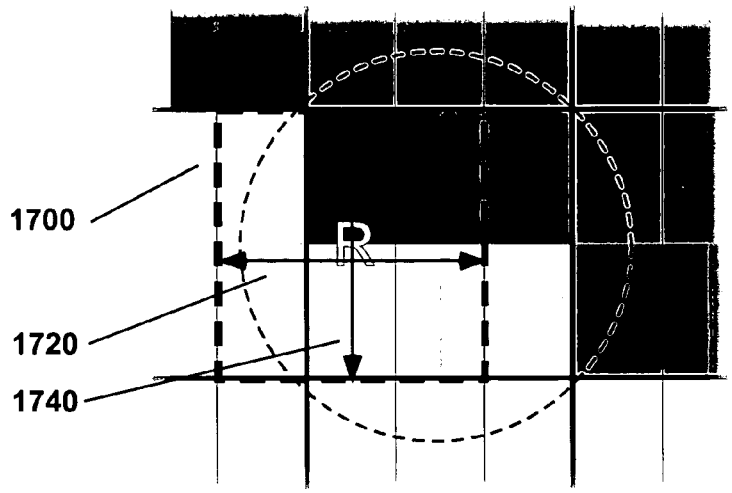
FIG. 17 illustrates scan lines used in a scan line coverage method to calculate the subpixel luminosity of a red subpixel on a lower-resolution display device by estimating the portion of the red subpixel's associated window in a higher-resolution source image that is covered by one or more pixel of different colors.
Figure 18:
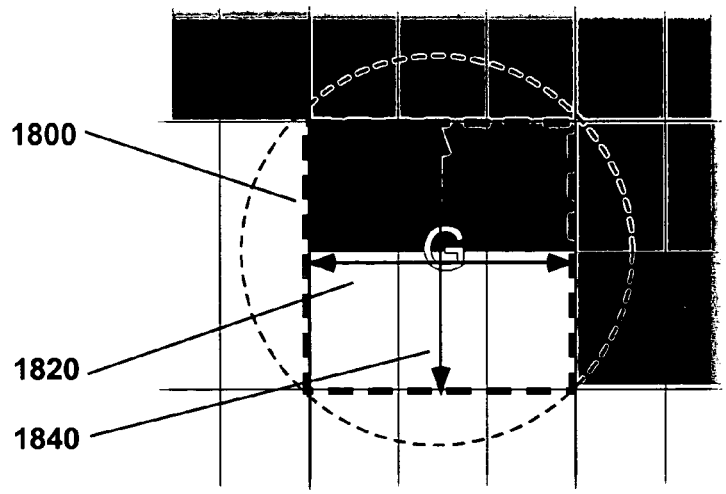
FIG. 18 illustrates similar used to calculate the luminosity of a green (G) subpixel of the lower-resolution display device.
Figure 19:
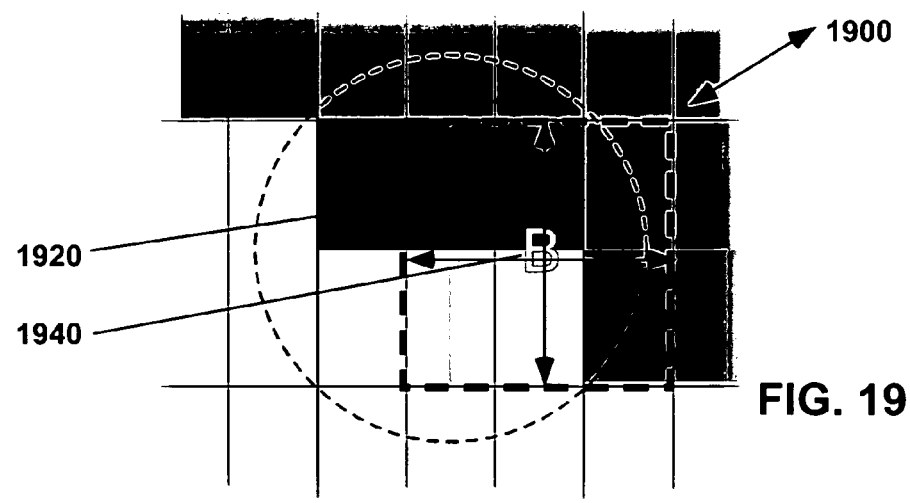
FIG. 19 illustrates scan lines similar to those shown in FIGS. 17 and 18 except that they are used to calculate the luminosity of a blue (B) subpixel of the lower-resolution display device.

FIGS. 17, 18, and 19 are blow-ups of the central portion of FIGS. 14, 15, and 16, respectively, illustrating in greater detail how the luminosity of the red, green, and blue, subpixels is a function of the respective color luminosities of whole or partial source image pixels contained within a source image window centered around the portion of the source image corresponding to a subpixel of a given color. This is shown in FIG. 17 for the red (R) subpixel, in which window area 1700 is centered on the portion of the source image corresponding to that subpixel. Window area 1800 of FIG. 18 illustrates the same for the green (G) subpixel, and window area 1900 of FIG. 19 illustrates the same for the blue (B) subpixel.

As a result of the shift between the source image windows for each subpixel, the color value derived for each subpixel represents the subpixel's corresponding color in a portion of the source image corresponding to the location of each subpixel, itself, rather corresponding to the location of its pixel as a whole. As a result, this use of different source image windows for different subpixels of a given pixel increases the spatial resolution of the resulting image.

In the embodiment of the invention shown in FIGS. 17, 18, and 19, the determination of which pixels fall within a subpixel's source image window and the percent of that window each such pixel covers is made by an approximation based on the percentages of horizontal and vertical scan lines that are covered by such source image pixels. In FIG. 17, the color value of the red subpixel is determined as a result of the percentage of a horizontal coverage line 1720 and a vertical coverage line 1740 this is covered by individual source image pixels, times the red color value of each such pixel. The same is true, for respective color values, for the scaled image's green (G) subpixel of FIG. 18 and its horizontal and vertical coverage lines 1820 and 1840 respectively, and the scaled image's blue (B) subpixel of FIG. 19 and its horizontal and vertical coverage lines 1920 and 1940, respectively.

It should be noted that horizontal coverage lines 1720, 1820, and 1920 are intended to represent vertical positions just above or below the vertical midpoint of their corresponding rectangular area. This is so the coverage line will not exactly equal that location in the source image that represents the border between vertical pixels. In the same manner, the vertical coverage line 1740 is intended to represent its horizontal position just to the left or the right of the horizontal midpoint of the rectangular area 1700.

The above defined coverage lines represent an embodiment of an aspect of the invention that relates to the use of a continuous function, which is intended to include a reasonably high resolution (such as 5 or more bit resolution) equivalent thereof, to determine the extent to which the area of an original image associated with a given color subpixel is covered by a given color or shape. In continuous coverage functions, this coverage is determined, not by sampling, but rather by a mathematical function that determines boundary locations at which the given coverage starts and stops in one or more dimensions, and calculates coverage as a function of lengths or areas between one or more such boundaries or between such boundaries and the boundary of the source image window associated with a given subpixel.

Figure 30:
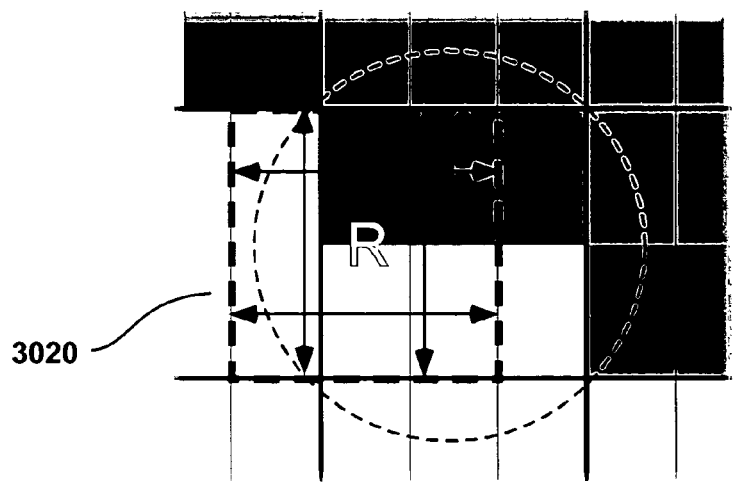
FIG. 30 illustrates how two horizontal and two vertical scan lines can be used on alternate embodiments of "line coverage" methods for calculating the colors of pixels in subpixel-optimized scaled images.
Figure 31:
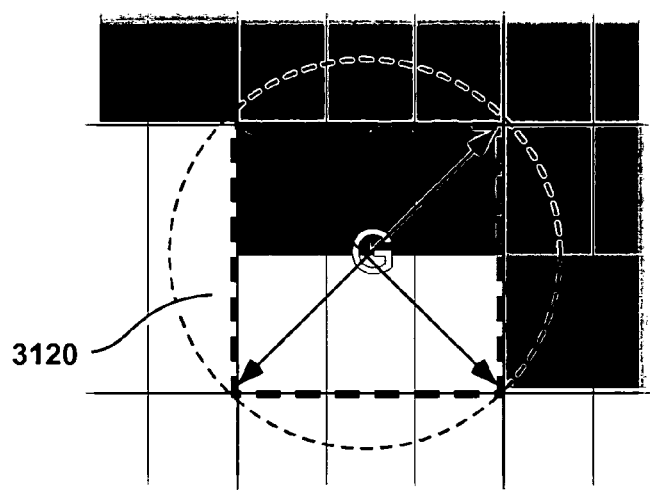
FIG. 31 illustrates how two diagonal scan lines can be used on alternate embodiments of "line coverage" methods for calculating the colors of pixels in subpixel-optimized scaled images.
Figure 32:
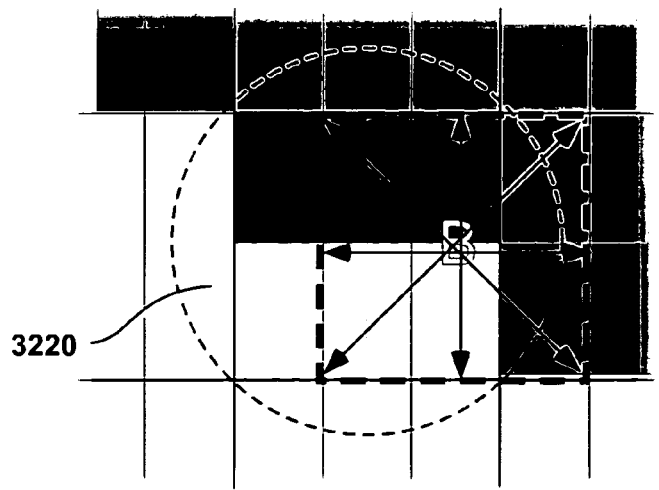
FIG. 32 illustrates how a combination of two diagonal, one horizontal, and one vertical scan lines can be used on alternate embodiments of "line coverage" methods for calculating the colors of pixels in subpixel-optimized scaled images.

In the embodiment of the invention shown in FIGS. 17, 18, and 19 and in FIGS. 30, 31, and 32 the calculation of this continuous coverage function is sped up by estimating the area of each source image pixel that is in a given subpixel's corresponding source image window area by determining the portion of one or more scan lines within the rectangular area that is covered by each of one or more of the source image's pixels within the window. The percent of the total length of the window's scanning lines that is covered by a given pixel is multiplied by the value of the subpixel's color in that pixel. Such products are summed over all pixels that cover any of the window's scan lines to produce the subpixel's color value. This is how a "line coverage" type of continuous coverage function can be used to determine the luminosity of a subpixel when creating scaled images of color bitmaps.

Figure 20:
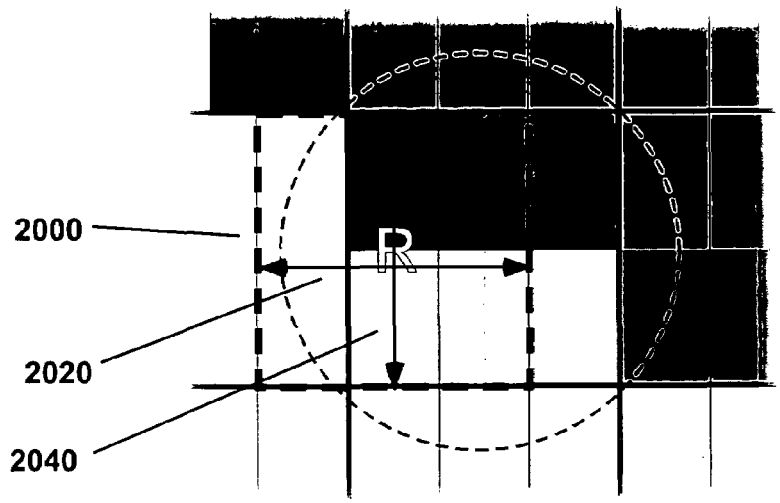
FIG. 20 is a repeat of FIG. 17 provided on the same sheet as FIGS. 21 and 22 for ease of comparison.
Figure 21:
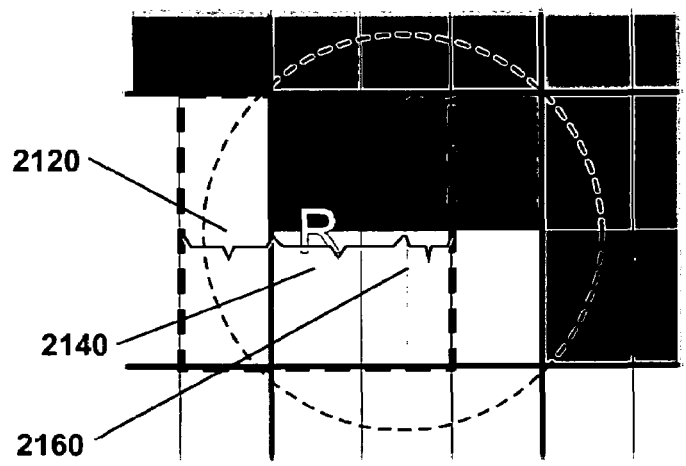
FIG. 21 illustrates the portions of the horizontal scan line shown in FIG. 20 that are covered by different source image pixels within the red pixel's source image window.
Figure 22:
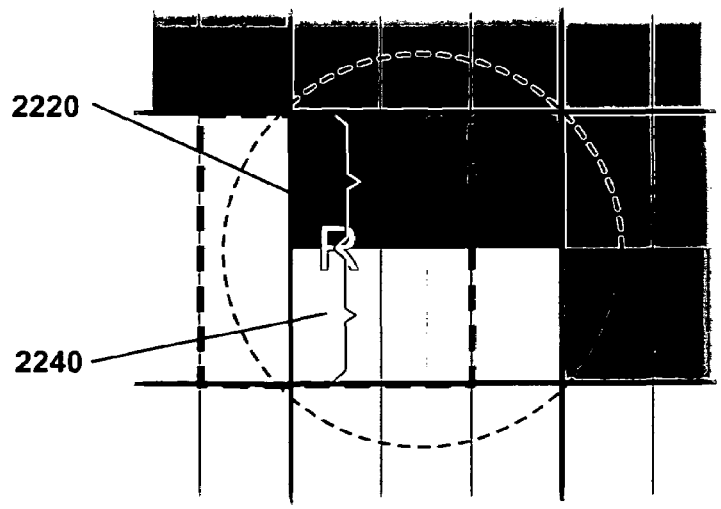
FIG. 22 illustrates the portions of the vertical scan line shown in FIG. 20 that are covered by different source image pixels within the red pixel's source image window.

FIGS. 20, 21, and 22 illustrate the use of a single horizontal and a single vertical coverage line within the source image window 2000 associated with the red (R) subpixel in the lower-resolution display screen. In FIG. 21, the coverage value associated with horizontal scan line 2020 is the summation of:

the red value of the pixel covered by bracket 2120, times the portion (⅓) of horizontal scan line 2020 covered by bracket 2120, plus the red value of the pixel covered by bracket 2140, times the portion (½) of horizontal scan line 2020 covered by bracket 2140, plus the red value of the pixel covered by bracket 2160, times the portion (⅙) of horizontal scan line 2020 covered by bracket 2160.

In similar fashion the coverage value associated with vertical scan line 2040 shown in FIG. 22 is the summation of:

the red value of the pixel covered by bracket 2220, times the portion (½) of vertical scan line 2040 covered by bracket 2220, plus the red value of the pixel covered by bracket 2240, times the portion (½) of vertical scan line 2040 covered by bracket 2240.

The total coverage value for the red subpixel is one half of the coverage value calculated for the horizontal scan line plus one half of the coverage value calculated for the vertical scan line.

Figure 23:
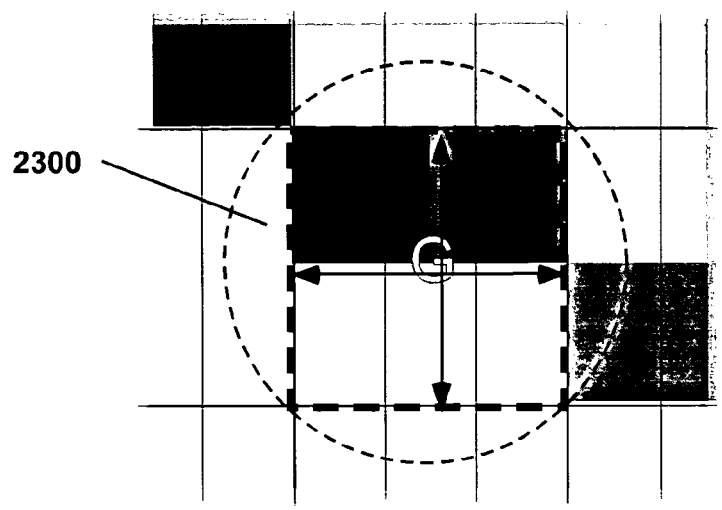
FIG. 23 is identical to FIG. 18 and is provided on the same sheet as FIGS. 24 and 25 for ease of comparison.
Figure 24:
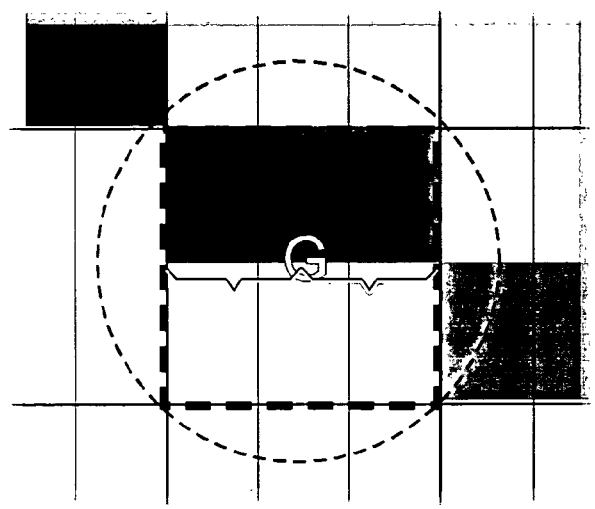
FIG. 24 illustrates the portions of the horizontal scan line shown in FIG. 23 that are covered by different source image pixels within the green pixel's source image window.
Figure 25:
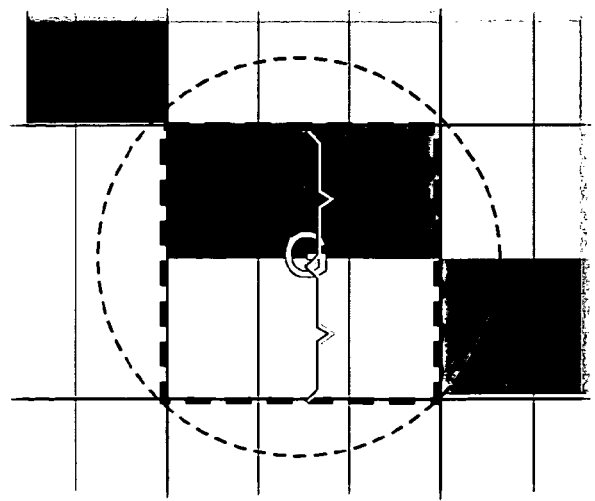
FIG. 25 illustrates the portions of the vertical scan line shown in FIG. 23 that are covered by different source image pixels within the green pixel's source image window.
Figure 26:
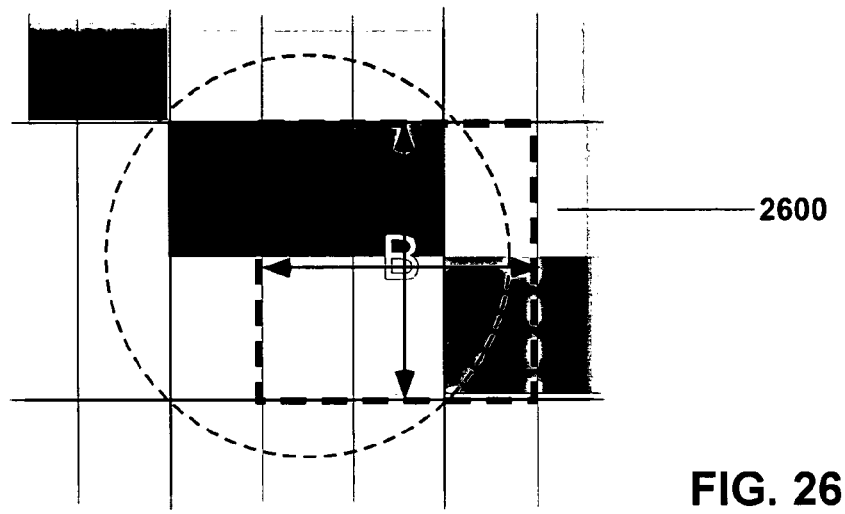
FIG. 26 is identical to FIG. 19 and is provided on the same sheet as FIGS. 27 and 28 for ease of comparison.
Figure 27:
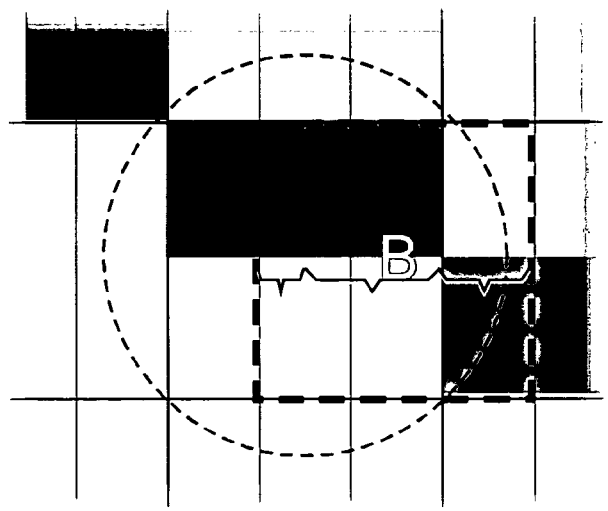
FIG. 27 illustrates the portions of the horizontal scan line shown in FIG. 26 that are covered by different source image pixels within the blue pixel's source image window.
Figure 28:
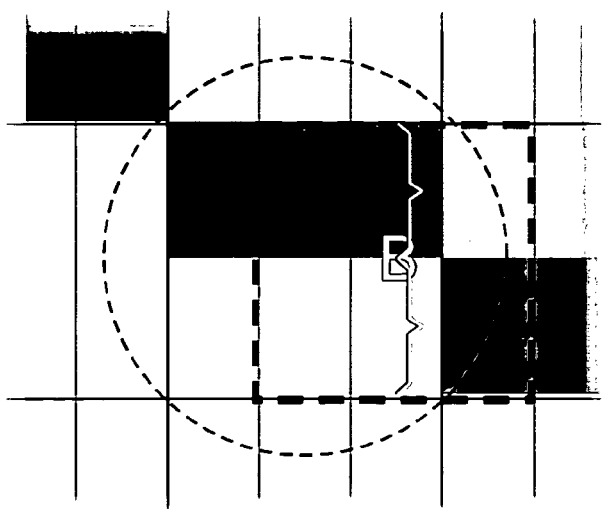
FIG. 28 illustrates the portions of the vertical scan line shown in FIG. 26 that are covered by different source image pixels within the blue pixel's source image window.

Similarly, FIGS. 23, 24, and 25 illustrate the use of single horizontal and single vertical coverage lines within the source image window 2300 associated with the green (G) subpixel in the lower-resolution display screen, and FIGS. 26, 27, and 28 illustrate the use of single horizontal and single vertical coverage lines within the source image window 2600 associated with the blue (B) subpixel in the lower-resolution display screen.

FIG. 29 is highly simplified pseudocode representation of an algorithm 2900 for deriving scaled subpixel-optimized images from a source bitmap image using line coverage of the type described above with regard to FIGS. 17 through 28.

This algorithm performs a loop 2901 for each pixel row of the output image (i.e, the scaled, subpixel-optimized image).

This loop performs an inner loop 2902 for each pixel in its current row. For each such pixel the loop 2902 performs a loop 2904 and a function 2914.

The loop 2904 is comprised of an interior loop 2906 that is performed for each of the subpixel's scan lines, such as the scan lines shown in FIGS. 17 through 28.

The loop 2906 includes a function 2908 and a loop 2910. The function 2908 calculate each intersection between that scan line and a pixel boundary. Normally, such intersection calculations and the other calculations in this algorithm are performed with limited accuracy, such as for example 6 to 8 bits of accuracy, to reduce the storage and computational requirements of such computation.

Then a loop 2910 performs a function 2912 for each portion of a scan line that occurs between two scan line ends, a scan line end and a pixel boundary, or two pixel boundaries. Function 2912 adds to a coverage value associated with the current subpixel of the loop 2904 a multiple of the percent of that scan line covered by current portion of loop 2910 times the component color value of the pixel covering that portion corresponding to the color of the current subpixel, all divided by the number of the subpixel's scan lines.

Once the loop 2904 has calculated the subpixel luminosity value for each subpixel of the current pixel, function 2914 sets the current pixel's color value equal to a color having a compound RGB value with red, green, and blue values equal to the subpixel luminosity values calculated, respectively, for the red, green, and blue subpixels of the current pixel.

In different embodiments of the invention different length color values can be used, such as 24 bit, 16 bit, or 12 bit color values. Although the system can be used with a limited color palette, it works best with true-color colors, which have at least 4 bits of variability for each of the red, green, and blue subpixels. 16 bit color, which commonly allocates 5 bits for red and blue and 6 bits for green (because of the eyes' greater sensitivity to green), provides even better visual results.

Although the embodiment of the invention described above with regard to FIGS. 17 through 28 makes use of a single horizontal and a single vertical coverage scan line, other embodiments of this aspect of the invention may have more scan lines and/or have scan lines in orientations other than horizontal and vertical.

FIG. 30 illustrates the use of two horizontal coverage lines and two vertical coverage lines within a source image window 3020 that can be used to estimate the color coverage associated with a red (R) subpixel of a subpixel-optimized image.

FIG. 31 illustrates the use of two diagonal coverage lines within a source image window 3120 associated with a green (G) subpixel of a subpixel-optimized image.

FIG. 32 illustrates the use of two diagonal coverage lines, a horizontal coverage line, and a vertical coverage line within a source image window 3220 associated with a blue (B) subpixel of a subpixel-optimized image.

Of course each of the arrangements of coverage lines shown in each of FIGS. 30 through 31 can be used on either red, green, or blue pixels.

FIGS. 33 through 38 illustrate that the line coverage method of calculating subpixel luminosity values can be applied to a broad range of different scalings between the size of a source image and the resulting subpixel-optimized image. This is true because the line coverage method measures line coverage at a fairly high resolution, compared, for example, to many sampling techniques. This means that it does a relatively good job of measuring the coverage of pixels that are only partially in a subpixel's source image window, as will often result when using scaling factors that are non-integer ratios.

In one embodiment of this aspect of the invention a seven bit resolution is used in calculating line coverage, which produces satisfactory results. Higher or lower resolutions can be used, but it is preferred that the line coverage resolutions be higher than the two to four bit per dimension resolution commonly used in techniques that measure coverage by sampling coverage within a subpixel's source image window at an array of sixteen (4×4) to two-fifty-six (16×16) points.

Figure 33:
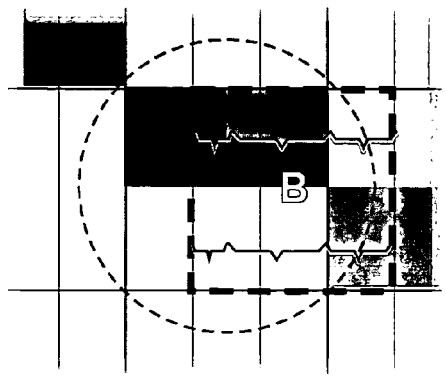
FIG. 33 illustrates line coverage for two horizontal coverage lines at a ½ horizontal and vertical scaling.
Figure 34:
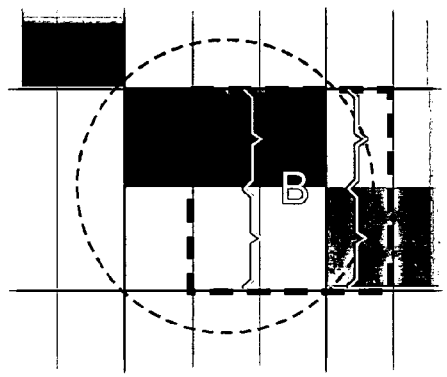
FIG. 34 illustrates line coverage for two vertical coverage lines at the ½ horizontal and vertical scaling shown in FIG. 33.

FIG. 33 illustrates the coverage of two horizontal coverage lines by various source image pixels within a source image window associated with the blue (B) subpixel for a mapping from a source image resolution to a destination pixel-optimized image having half as many horizontal pixels and vertical pixels. FIG. 34 does the same for the two vertical coverage lines used with such subpixel luminosity calculation scheme. Thus, FIGS. 33 and 34 illustrate an integral ratio between the number of pixels in the source and the reduced images.

Figure 35:
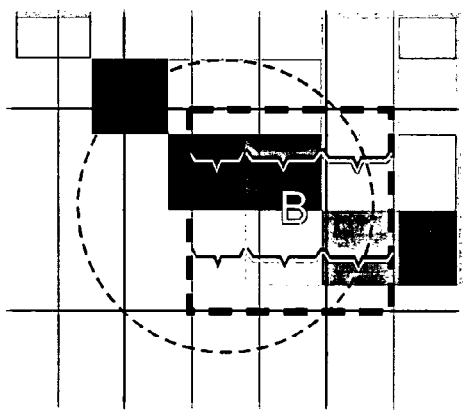
FIG. 35 illustrates line coverage for two horizontal coverage lines at approximately a ⅖ horizontal and vertical scaling.
Figure 36:
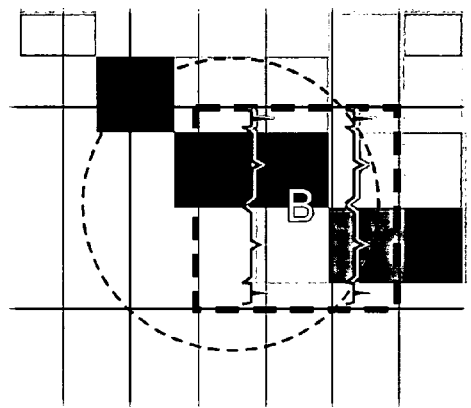
FIG. 36 illustrates line coverage for two vertical coverage lines at the approximately ⅖ horizontal and vertical scaling shown in FIG. 35.

FIGS. 35 and 36 illustrate the coverage of horizontal and vertical scan line, respectively, by pixels of the same source image for a scaling factor in which the reduced subpixel-optimized image has only about 40% as many horizontal and vertical pixels as the source image.

Figure 37:
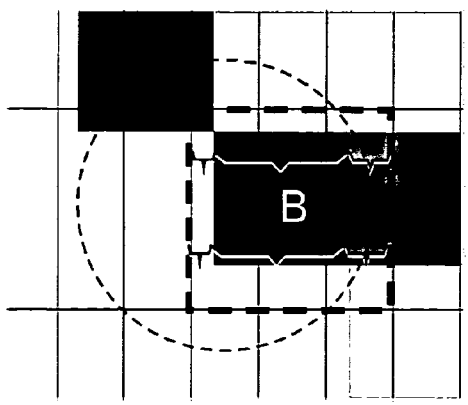
FIG. 37 illustrates line coverage for two horizontal coverage lines at approximately a ⅔ horizontal and vertical scaling.
Figure 38:
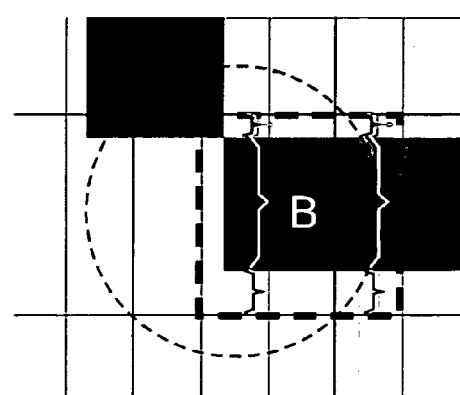
FIG. 38 illustrates line coverage for two vertical coverage lines at the approximately ⅔ horizontal and vertical scaling shown in FIG. 37.

FIGS. 37 and 38 illustrate the same for a scaling factor in which the subpixel-optimized image has about 66.66% as many horizontal and vertical pixels as the source image.

It can be seen that the scan line coverage technique shown in FIGS. 33 through 38 provide an accurate estimate of the percent of each source image window covered by each source image at each of different scaling, with relatively little computation.

Figure 39:
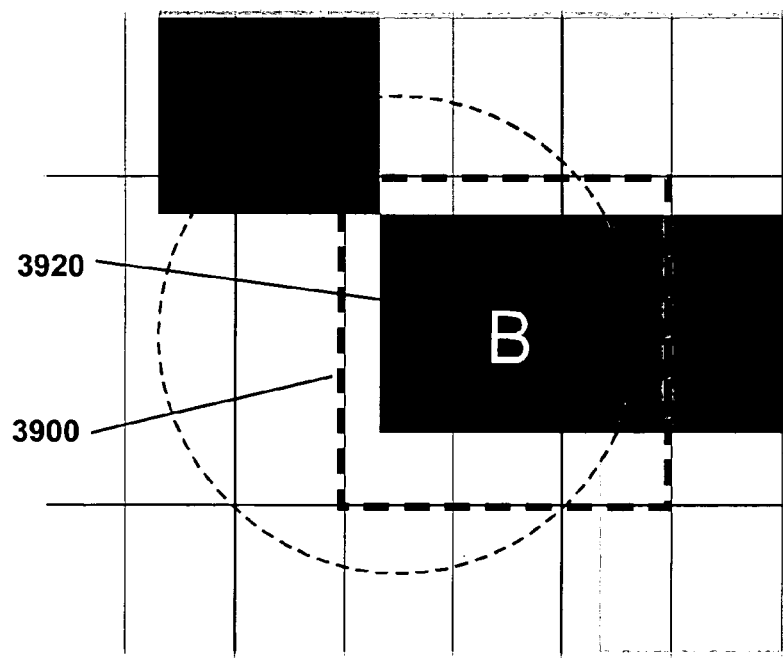
FIG. 39 illustrates the source image pixel window used in an "area coverage" method of calculating the color values of a subpixel-optimized scaled image.
Figure 40:
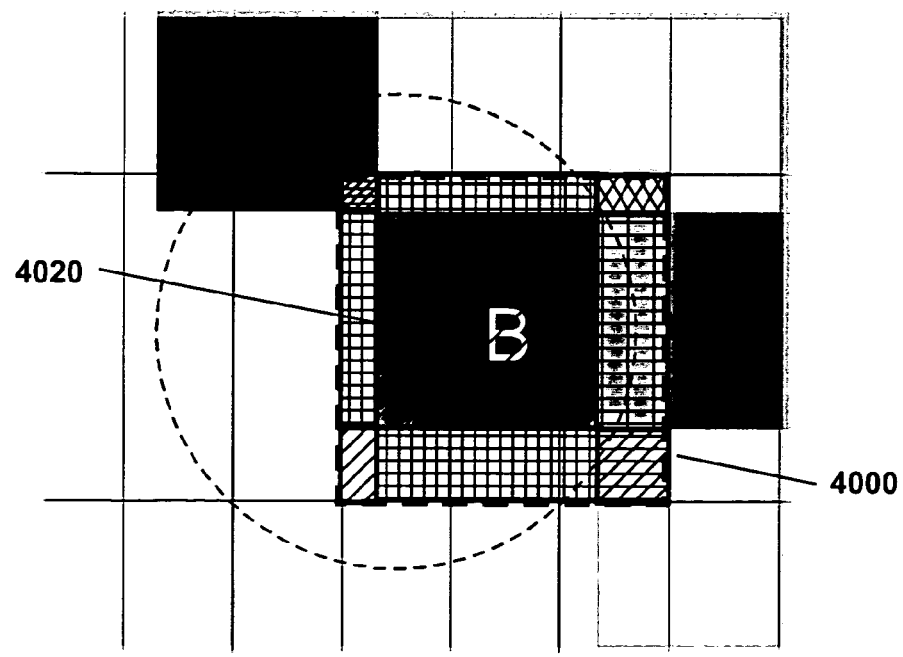
FIG. 40 is similar to FIG. 39 except that it uses different hatching to illustrate the areas of different source image pixels within a source image window that are used to calculate a subpixel's luminosity value according to one such "area coverage" method.

FIGS. 39 and 40 illustrate the geometries associated with an "area" type of continuous coverage function. In some embodiments of the invention, the percent of a given subpixel's source image window covered by each of its associated source image pixels is calculated, not by the line coverage approximation described above, but rather by an actual calculation of the area of that part of each such source image pixel that lies within the subpixel's source image window. For each such source pixel, the component color value of the pixel corresponding to the color of the current subpixel is determined. The luminosity value for each subpixel is then calculated by summing the multiples of the percentage of the source image window covered by a given source image window times the value of the subpixel's color for each source image pixel that appears in its source image window.

FIG. 39 illustrates the source image window area 3900 associated with a blue (B) subpixel. Source pixel 3920 is contained within source image window 3900, as are portions of eight other source pixels. The percent of the source image window 3900 covered by a source pixel 3920 is calculated by taking the ratio of the area of the hatched portion 4020 of FIG. 40 over the area of the whole source image window 4000. Similarly, the percent of the source image window 4000 covered by the other source pixels contained within it are calculated by taking the ratios of their area within the source image window, as indicated by differently hatched areas of the window 4000, over the total area of that source image window.

FIG. 41 provides a highly simplified pseudocode representation of an algorithm 4100 that can be used to implement an area coverage function of the type discussed above with regard to FIGS. 39 and 40.

The algorithm comprises a loop 4102 that is performed for each pixel row in the sub pixel-optimized image to be produced. For each such row the loop 4102 performs an inner loop 4104 for each pixel in that row.

This inner loop 4104 is comprised of a loop 4106 and a function 4116. The loop 4106 is performed for each subpixel in the current pixel of the loop 4104. This inner loop 4106 is comprised of a function 4108 and a loop 4110. The function 4108 determines which pixels of the source image are in the source image window associated with the subpixel, as described above. Once this is done the loop 4110 is performed for each such source image pixel.

The loop 4110 is comprised of a function 4112 and a function 4114. The function 4112 calculates the percentage of the subpixel's source image window area covered by the current source image pixel of the loop 4110. Then step 4114 adds to the luminosity value being calculated for the current subpixel of the loop 4106, the multiple of the percentage of the subpixel's source image window area covered by the current source image pixel, times the source image pixel's color component value corresponding to the color of the current subpixel.

Once the loop 4106 has been performed for each subpixel in the current pixel, function 4116 sets the current pixel's color value equal to a color having RGB color component values corresponding to the red, green, and blue subpixel luminosity values calculated by the loop 4106.

FIGS. 42 through 53 relate to aspects of the invention concerning bicolor subpixel-optimized images.

A "bicolor" image is one in which individual pixel colors range between two different color values. Commonly these two different color values will be black and white, and the pixels of the source and subpixel image will have values limited to black, white, or a grayscale value in between. In some embodiments, however, the two different color values can represent any uniform foreground and background colors, and colors intermediary between them. Bicolor images are often used to represent text, because the display of text is often bicolored, involving a foreground color and a background color. But bicolored images can also be used to represent other bicolored shapes, bicolored bitmaps, portions of multicolored bitmaps that are bicolored, or multicolored bitmaps that are to be represented with bicolored output, such as a grayscale representation of a colored image. For example, a multicolor source image can be treated as a corresponding grayscale image, merely by treating each of its pixels as having a grayscale value corresponding to the average luminosity of each of its three color components.

The advantage of using such bicolored subpixel-optimized output images is that they often can provide a higher spatial resolution than multicolor subpixel-optimized output images. Such higher resolution is allowed where the bicolors are black and white, greyscale values, or opacity and transparency, because each subpixel can represent both the foreground and background of such bicolor pairs equally as well as any other, since each color of each such bicolor pair has equal components of red, green, and blue. Except for the need to perform color balancing, as is described below, each subpixel's luminosity can be determined as a function of the extent to which the portion of the source image corresponding to its own area in the output image is covered by a foreground or a background color. This use of a smaller source window, i.e, one corresponding to a subpixel's size rather than to a pixel's size, allows a more accurate spatial representation of the source image.

Where the foreground and background colors are not black and white, the resolution produced by bicolor subpixel-optimized images will be best if the foreground and background color each have red, green, and blue values that are relatively equal in luminosity, but with the average luminosity of the foreground and background color as different as possible. In fact, in some embodiments of aspects of the invention relating to bicolored subpixel optimized images one or both of the output bicolors are changed from the corresponding input bicolors by being shifted toward a corresponding grayscale color to improve the spatial resolution of the output image.

The extent to which a subpixel of a bicolor subpixel-optimized output image is to display the foreground color is sometimes represented by an alpha, or opacity, value. Such an alpha values indicates the extent to which the subpixel's luminosity should correspond to the its color component in the foreground color or in the background color. An alpha value of one means the subpixel's color component value should equal the corresponding color component in the foreground color. An alpha value of zero means it should equal the corresponding color component in the background color. An intermediary alpha values means the subpixel's color component value should be a weighted blend of the corresponding color components in both the foreground and background colors. Once a subpixel-optimized bitmap is represented in terms of alpha values it can be used to represent bicolor images of a given pattern using different foreground and background colors. This is commonly used to represent font shapes, since in the presentation of fonts the bitmap pattern of a given character-font shape at a given size is often displayed with different foreground and background colors.

In some embodiments of aspects of the invention relating to bicolor subpixel optimizations of bitmap images a scaled subpixel-optimized image of a bitmap image is produced by associating a foreground or background bicolor coverage value with each subpixel of the scaled image as a function of: (a) the ratio of the foreground or background color for each source image pixel in a source image window corresponding to the area of the subpixel; (b) the percent of that window covered by each such source image pixels; and (c) a color balancing function that distributes subpixel coverage values to reduce color imbalance. In cases in which a bicolor output image is being produced for either a grayscale or a multicolor input image, the coverage values calculated for individual subpixel's can be derived as a function of the whole pixel luminosity of source image pixels that cover its source image window. In some embodiments, the extent to which a given luminosity value associated with a given subpixel's source image window is distributed to other subpixels is a function of extent to which the luminosity value causes a color imbalance.

Figure 42:
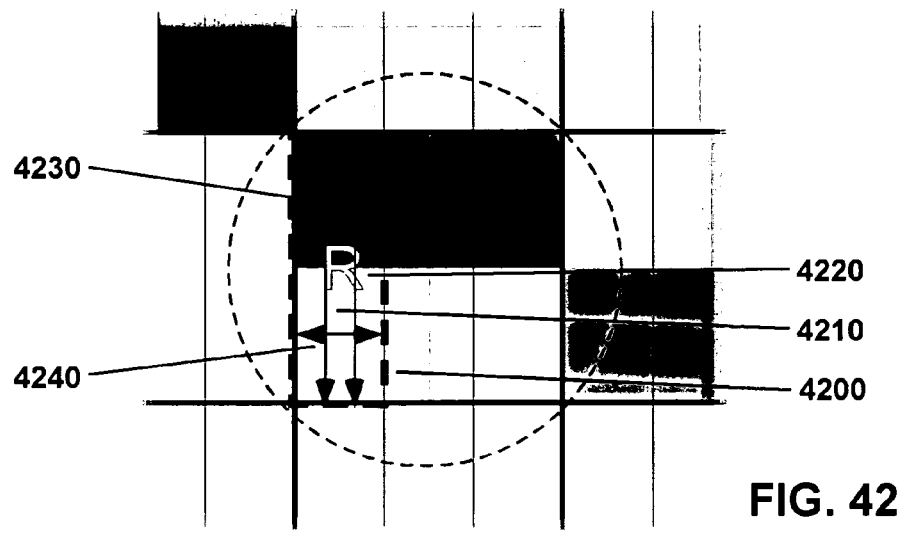
FIG. 42 illustrates a source image window and associated scan lines that can be used in the production of a scaled bicolor subpixel-optimized image of a bitmap image to associated a luminosity value with a red subpixel.
Figure 43:
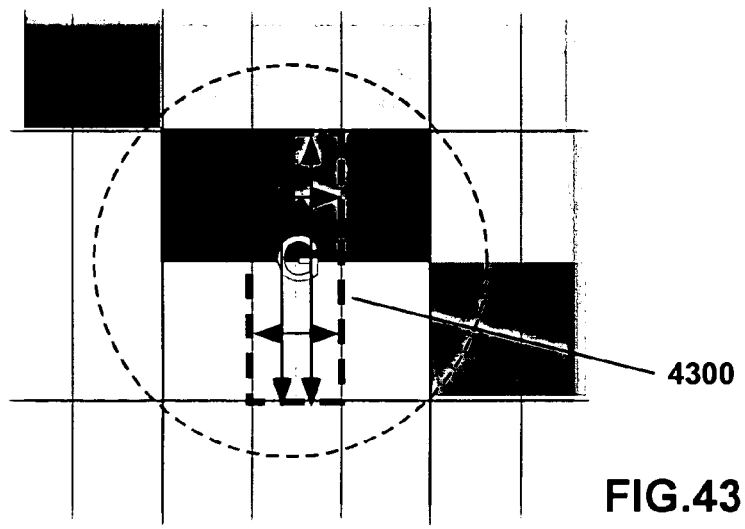
FIG. 43 illustrates a source image window and associated scan lines that can be used in the production of a scaled bicolor subpixel-optimized image of a bitmap image to associate a luminosity value with a green subpixel.
Figure 44:
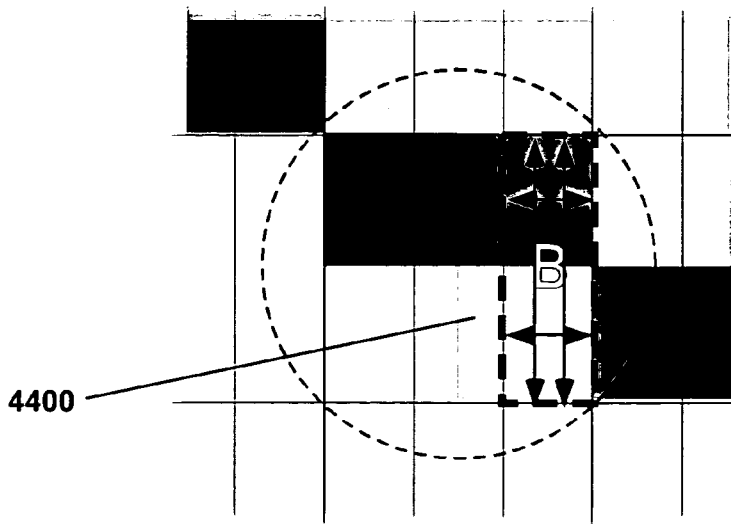
FIG. 44 illustrates a source image window and associated scan lines that can be used in the production of a scaled bicolor subpixel-optimized image of a bitmap image to associate a luminosity value with a blue subpixel.

FIGS. 42 through 44 illustrate a method of determining the luminosity of each subpixel of a grayscale bicolored image. In FIG. 42, rectangle 4200 encloses a window of the source image that is associated with the red (R) subpixel of the scaled image. The luminosity to be associated with such red (R) subpixel is a function of the whole pixel luminosity of the one or more source image pixels that cover the source image window 4200, multiplied, respectively, by the percent of the source image window covered by each such source image pixel. Any known method for calculating or estimating such coverage percentages can be used.

In the embodiment illustrated in FIG. 42 source image window 4200 has associated with it two horizontal scan lines 4210 and 4220 and two vertical scan lines. FIGS. 43 and 44 illustrate the coverage lines for the source image windows 4300 and 4400 for green and blue subpixels, respectively. As before, to estimate the extent to which the source image window areas are covered by a source pixel, a mathematical function that determines boundary locations at which the given coverage starts and stops along each scan line is run. Coverage is calculated as a function of the lengths between one or more such boundaries or between such boundaries and the boundary of the source image window associated with the given subpixel. This can be done in a manner similar to that described above in FIG. 29.

When calculating bicolor subpixel-optimized images, color imbalances may occur. This is because the bicolor methods is attempting to produce an output image in which each whole pixel has a color value in the spectrum between the two bicolors (usually black or white), but the coverage values of a pixel's individual red, green, and blue subpixels is determined by the percent of foreground color in each such subpixel, meaning that the color of individual output pixels would often have no relation to the desired bicolor spectrum (usually grayscale), in the absence of such color balancing.

For example, in a grayscale image, if the source image makes a transition from totally white to totally black at a location corresponding to the boundary between a red and green subpixel in a subpixel optimized output image, the corresponding pixel in the output image will have a red subpixel coverage value that would tend to cause that subpixel to be turned totally on, and green and blue subpixels coverage values that would tend to cause those subpixels to be turned totally off. This would result in a visible red color for the pixel, even though, in this example, the output image is supposed to be a grayscale image.

Figure 45:
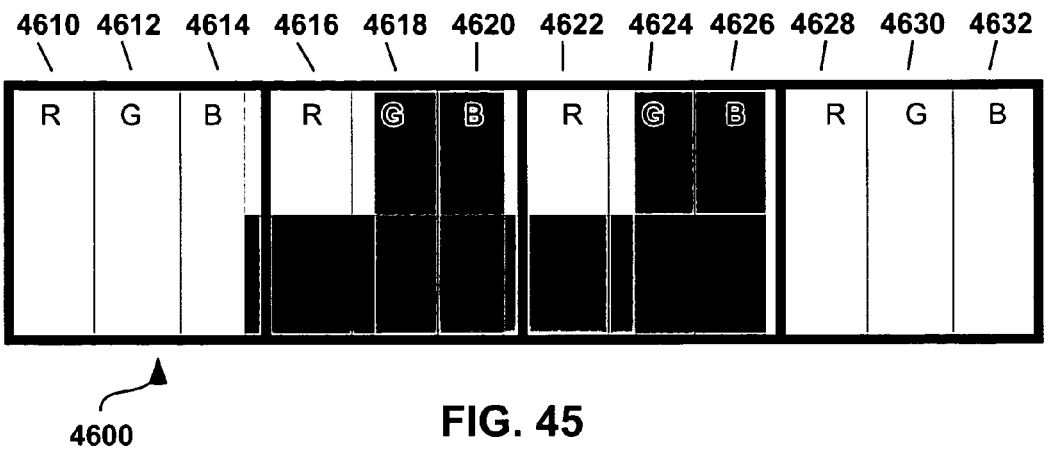
FIG. 45 illustrates the luminosity of a set of source image grayscale pixels associated with a portion of an RGB subpixel display grid.
Figure 46:
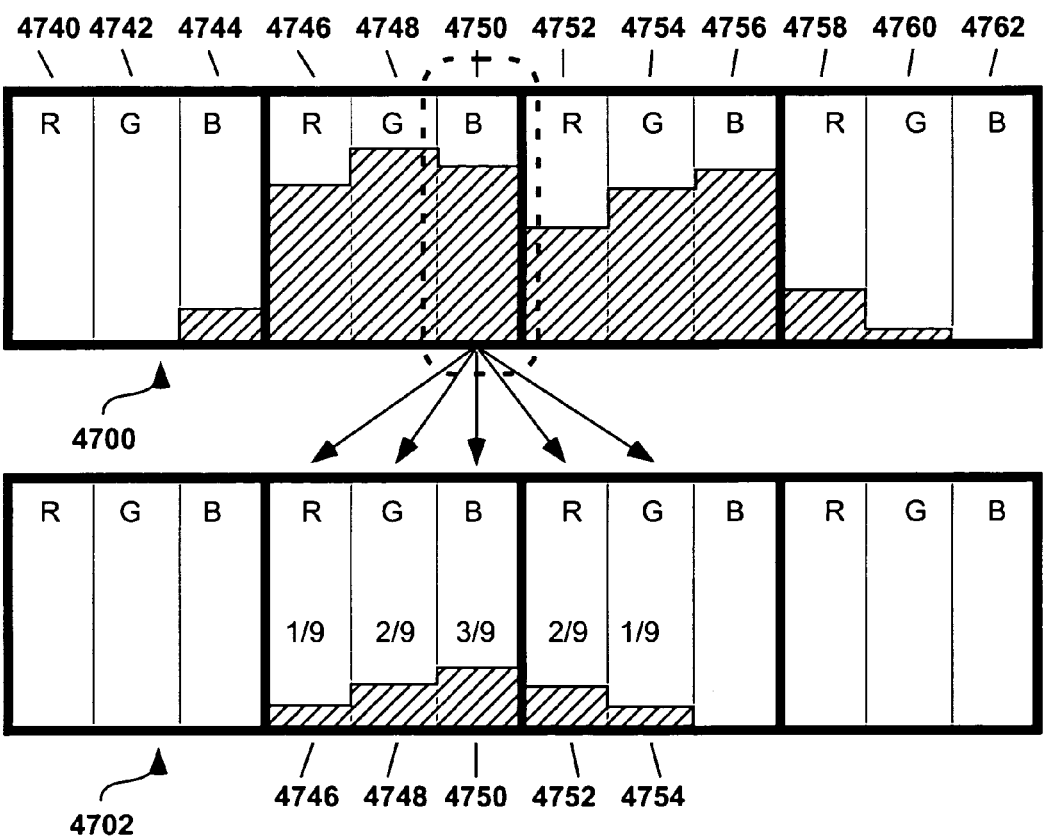
FIG. 46 illustrates how the luminosity associated with an individual subpixel shown in FIG. 45 is distribution under a traditional linear filtering method.
Figure 47:
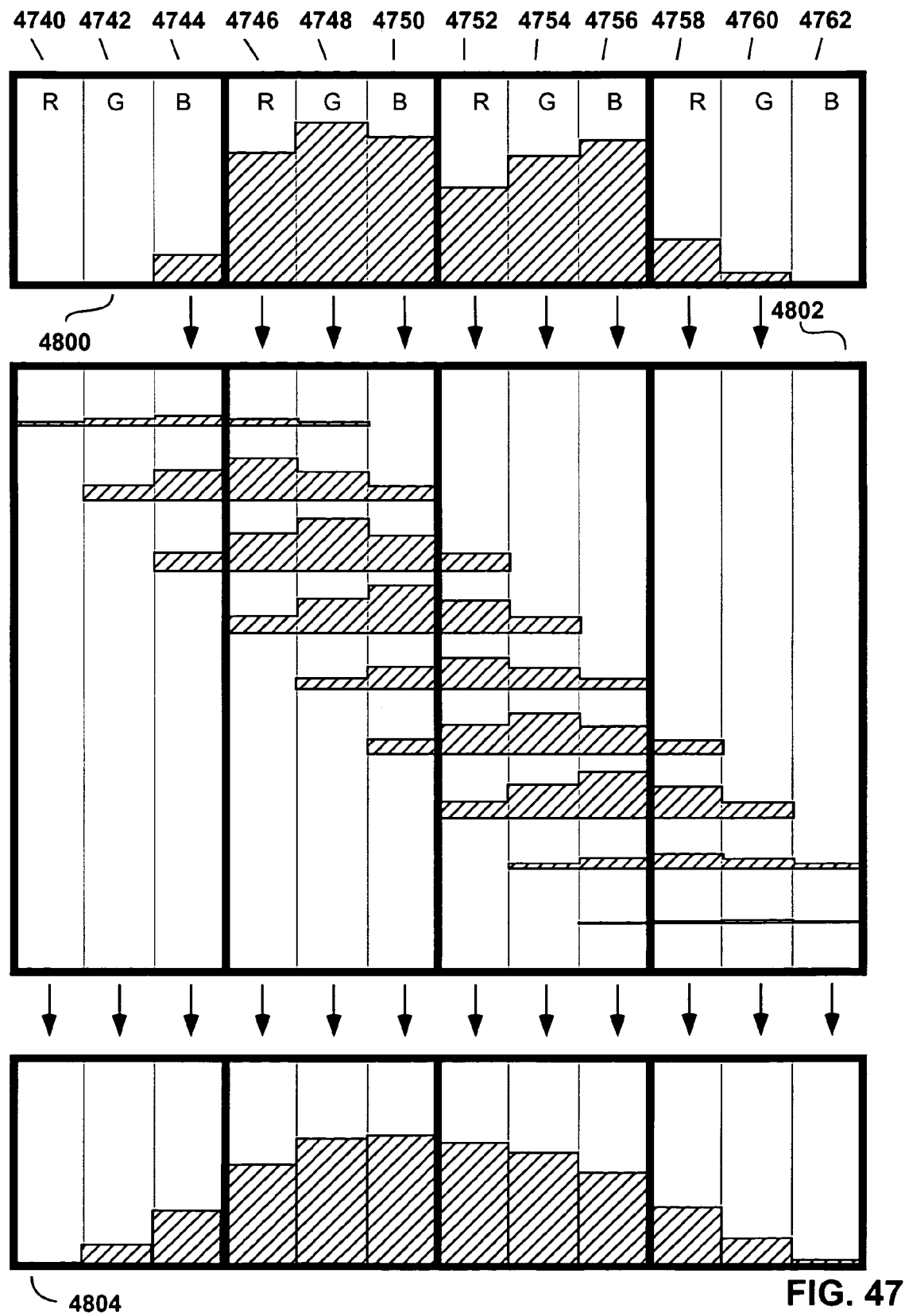
FIG. 47 illustrates subpixel luminosity values that result from the traditional linear filtering method shown in FIG. 46 being applied to multiple subpixels in an pixel row.

FIGS. 45 through 47 illustrate how a traditional linear color balancing method of a type used in the prior art to color balance subpixel coverage values calculated from the rasterization of font outlines can be used to color balance coverage values produced from bicolored bitmaps.

FIG. 45 illustrates a set of grayscale source image pixels under an RGB grid 4600. Grid 4600 has four pixel areas enclosed in bold line divisions. Each such pixel area is associated with a whole pixel in a subpixel addressable screen on which the output image is to be displayed. Each pixel area is further divided into three areas associated with the subpixels of the associated pixel on the subpixel addressable screen. Subpixel-associated area 4610 is associated with the red (R) subpixel, subpixel-associated area 4612 is associated with the green (G) subpixel, and subpixel-associated area 4614 is associated with the blue (B) subpixel. Subpixel-associated areas 4616 through 4632 are associated with respective subpixels.

Subpixel-associated areas 4614 through 4630 are covered in whole or in part by source image pixels having nonwhite coverage values corresponding to various degrees of the foreground color, which in this case is black. The total nonwhite coverage value of the source image pixels in each of the subpixel-associated areas 4614 through 4630 is mapped into corresponding sub-pixel areas in the RGB grid 4700 of FIG. 46. The height of the hatched area within each of the subpixel areas 4744 through 4760 is determined by the total nonwhite coverage values of the corresponding sub-pixel areas 4614 through 4630.

The bottom half of FIG. 46 illustrates the use of a center-weighted, symmetrical color filter, which can be used to distribute the coverage value associated with the subpixel 4750 over five subpixels centered around the subpixel 4750. Three ninths ($\frac{3}{9}^{ths}$) of the coverage value of subpixel 4750 is distributed into sub-pixel 4750, itself. Two ninths ($\frac{2}{9}^{ths}$) of the coverage value of the subpixel 4750 is distributed into the subpixels 4748 and 4752 that are immediately to its left and to its right, respectively. To complete the color distribution of subpixel 4750, one ninth ($\frac{1}{9}^{th}$) of its coverage value is distributed into subpixels 4746 and 4754, which are two subpixels to the left and two subpixels to the right, respectively of the subpixel 4750.

In general, color balancing distributes color values within a neighborhood of nearby pixels in which the nearby pixels are normally within a distance of no more than one full pixel from the subpixel whose color is being distributed, although in some embodiments that distance might be as large as two pixels.

FIG. 47 illustrates the result of the symmetrical center-weighted color balancing filter of FIG. 46 when it is applied linearly to the coverage value calculated for each of the subpixels 4740 through 4762 shown in the top half of FIG. 46.

In FIG. 47 the coverage value associated with each subpixel 4744 through 4760, shown at the top of FIG. 47, is distributed using a color balance filter that distributes its coverage value in the same proportion to its own subpixel and to the two subpixels to the left and right as is shown in FIG. 46. The central grid 4802 of FIG. 47 graphically illustrates the size of the contribution that such a distribution makes to each of the subpixels 4740 through 4762. The distribution associated with each of the given subpixels 4744 through 4760 is centered in a vertical column located directly below its respective subpixel.

RGB subpixel grid pattern 4804 shown at the bottom of FIG. 47 illustrates the luminosity value that is calculated for each subpixel 4740 through 4762 by summing all the contributions that have been made to it by all of the coverage value distributions illustrated in the center panel 4802. To complete the method, the luminosity values of the red, green, and blue subpixels of each pixel in grid 4804 are used as the three component color values that specified the color of each such pixel.

While this linear method does reduce the color imbalance of the scaled image, it does so at the expense a substantial reduction in spatial resolution. This can be understood by comparing the values in RGB grid pattern 4804 at the bottom of FIG. 47, which represents the subpixel luminosity values in the subpixel-optimized output image, to the values in RGB grid pattern 4800 at the top of FIG. 47, which represents the foreground color luminosity, or foreground color coverage value, of the source image pixels corresponding to the subpixels of that output image. As can be seen by FIG. 47, the spatial resolution of the output image is smeared relative to the spatial resolution of the source image.

The present invention includes an innovation that provides similar color balancing of subpixel optimized output images, but often with much less smearing of the output image. It does so by using a non-linear color balancing filtering method. A method of applying this non-linear filtering is illustrated in FIGS. 48 and 49.

Figure 48:
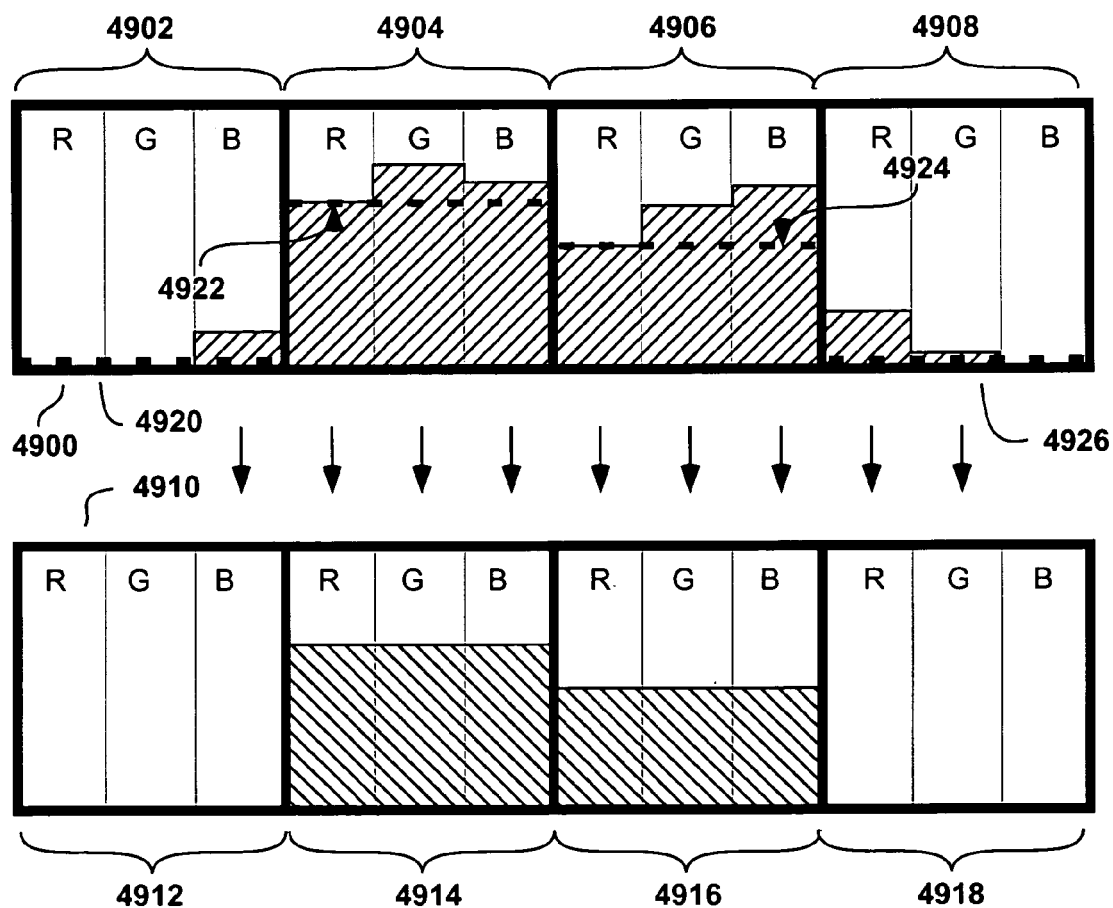
FIG. 48 illustrates the distribution of the minimum subpixel luminosity values under a non-linear filtering.
Figure 49:
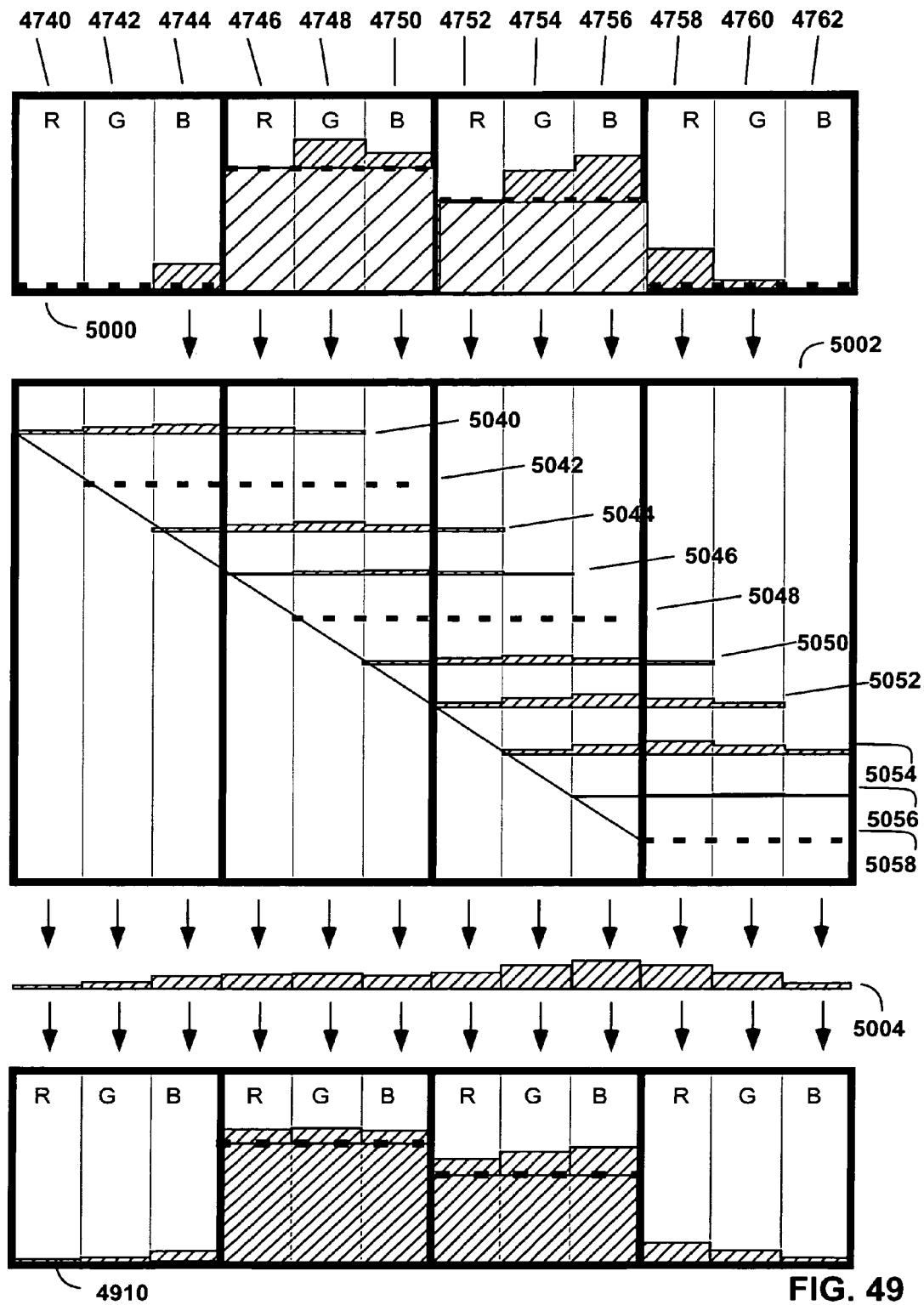
FIG. 49 illustrates the distribution of the excess luminosity values under a continuation of the non-linear filtering method shown in FIG. 48.

FIG. 48's RGB grid pattern 4900 is a duplication of the RGB grid pattern 4700 of FIG. 46. Once again, the total foreground color luminosity, or coverage values of the source image pixels that correspond to an associated subpixel are represented by hatched areas.

The first phase in this non-linear color balancing method is illustrated in FIG. 48. As before, RGB grid pattern 4900 is divided into fourths by the bold line divisions and each fourth, bracketed portion 4902, 4904, 4906, or 4908, is associated with a whole pixel of the scaled, or output, image. Each of the pixel areas 4902, 4904, 4906, and 4908 is further divided into subpixel areas corresponding to subpixels in the output image to be produced. For each pixel area, a determination is made of which of its sub pixels has the lowest foreground luminosity, coverage value, and a respective luminosity (or alpha) value equal to this minimum coverage value is added to a luminosity/alpha value that is being calculated for each subpixel of the pixel areas 4912, 4914, 4916, and 4918 of the RGB grid pattern 4910, shown in the bottom half of FIG. 48.

In the top half of FIG. 48 the hatched line 4920 indicates the minimum coverage value of the pixel area 4902 is zero, since the first two subpixel-associated areas have coverage values of zero. Thus, the step shown in FIG. 48 sets the luminosity/alpha value for the red, green, and blue subpixel areas of pixel 4912 to zero. In like fashion, the minimum coverage value of pixel area 4904 is determined by the value of the red subpixel area 4922 of the pixel 4904. This minimum coverage value is mapped into the corresponding pixel area 4914 in the bottom half of the figure. Similarly, the minimum coverage values of pixel areas 4906 and 4908 are mapped into pixel areas 4916 and 4918 in the bottom half of FIG. 48. The resulting partially calculated luminosity/alpha values after the completion of this step are represented by the RGB grid pattern 4910 at the bottom of FIG. 48.

The second phase of the non-linear color balancing method is illustrated in FIG. 49. In this example of the second phase, the portion of the foreground luminosity/coverage value of each subpixel that is in excess of the pixel's minimum luminosity/coverage value is mapped into the RGB grid pattern 4910 by utilizing a color balance distribution filter of the type shown above with regard FIGS. 46 and 47.

The pixel grid 5000 at the top of FIG. 49 corresponds to the pixel grid 4900 at the top of FIG. 48 (and has the same sub pixels 4740 through 4762) except that it represents the portion of each subpixel's foreground color luminosity/coverage value (shown in high frequency hatching) that remains after the value of the minimum subpixel luminosity/coverage value for the corresponding pixel (shown in low-frequency hatching) has been subtracted from it.

The subpixel grid 5002 in the middle of FIG. 49 corresponds to the similarly shaped pixel grid 4802 in the middle of FIG. 47, except that in it only the excess portion of subpixel foreground color luminosity/coverage values shown in the top of FIG. 49 with the high frequency hatching are distributed using color balance filters of the type shown in FIG. 46. As can be seen in this portion of the figure, a portion of the excess luminosity/coverage value for each subpixel is distributed to its own subpixel, to two pixels to the left, and to two pixels to the right using the same proportional filter shown in FIG. 46.

The portion of FIG. 49 near its bottom labeled by the numeral 5004 shows the total of such excess luminosity/coverage value that is distributed to each subpixel 4740 through 4762 in this example of the non-linear method. The total excess luminosity/coverage value calculated for each subpixel is added to the minimum luminosity/coverage value that been previously added to that subpixel by the step illustrated in FIG. 48, as is illustrated at the bottom of FIG. 49, to produce the total luminosity/alpha value to be used for each subpixel in the output image.

To complete the non-linear color balancing process, the luminosity/alpha values summed for each subpixel of RGB grid pattern 4910 are used to determine the corresponding red, green, and blue, color component values of its associated pixel. The red, green, and blue color values of each individual pixel in such a display may not be equal, but the total of the red, green, and blue color values in any neighborhood of five or so adjacent subpixels of a pixel row should be substantially equal, or balanced.

Figure 50:
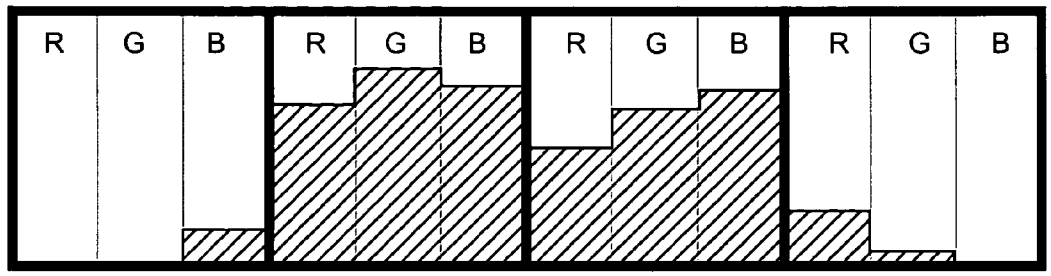
FIGS. 50 through 52 compare, respectively, the original source pixel luminosities with the results of the linear and non-linear filtering methods.
Figure 51:
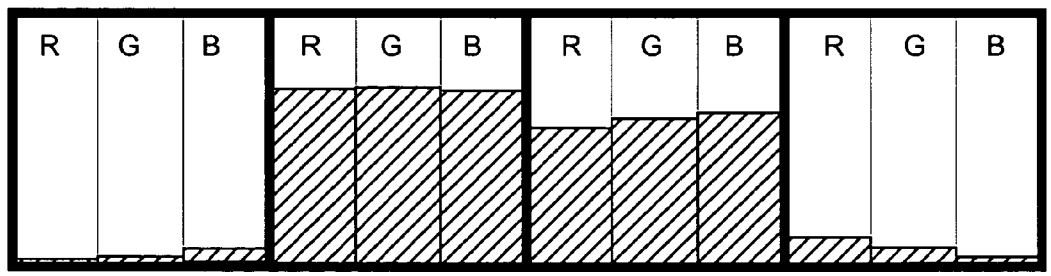
Figure 52:
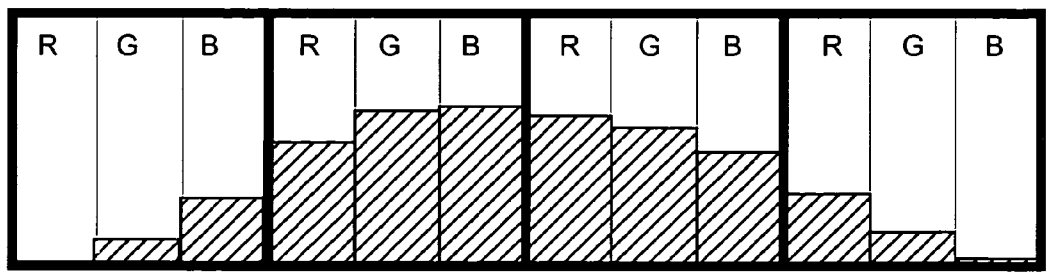

A comparison of the results achieved by use of the linear method and the non-linear color balance filtering method is illustrated by FIGS. 50, 51, and 52.

FIG. 50 illustrates the original unfiltered source subpixel foreground color luminosity/coverage values as first mapped into RGB grid pattern 4700 of FIG. 46 and 4900 or FIG. 48.

FIG. 51 illustrates the result of the non-linear filtering method, as shown at the bottom of FIG. 49.

FIG. 52 illustrates the result of the linear filtering method, as shown in RGB grid pattern 4804 of FIG. 47.

As FIG. 51 shows, the output of the non-linear color balancing method more closely resembles the original spatial distribution of foreground color luminosity/coverage values of FIG. 50 than does the result of the linear method, as shown in FIG. 52. The pattern of luminosity values produced by the non-linear method of FIG. 51 is significantly less spatially blurred, and, thus, provide a higher visible spatial resolution than the output produced by the linear method. This is because the non-linear method seeks to perform color balance distribution, which has the detrimental effect of blurring spatial resolution, only on those portions of subpixel luminosity/coverage values that need such distribution in order to prevent color imbalance. This can be seen by comparing the total of subpixel luminosity/coverage values distributed to each subpixel using the non-linear method FIG., as indicated by the numeral 5004 of FIG. 49, with the corresponding total that is distributed to each subpixel using the linear method, as indicated by the entire crosshatched area shown for each subpixel at the bottom of FIG. 47.

FIG. 53 provides a highly simplified pseudocode description of one implementation of the method described with regard to FIGS. 48 and 49 of producing a subpixel-optimized bicolor output bitmap using the non-linear color balancing method.

The algorithm 5300 in this figure is comprised of a loop 5301 that is performed for each pixel row in the image. This loop performs two subloops 5302 and 5322 for each pixel row.

The loop 5302 performs a loop 5304, a function 5314 and a loop 5316.

The loop 5304 is performed for each subpixel in the current pixel of loop 5302. For each such subpixel it performs a function 5306 and a loop 5308.

The function 5306 determines which pixels of the source image are in a window portion of the source image corresponding to the subpixel's area in the scaled image. This can be performed by any known coverage calculation or estimation function, including the ones described above with regard to FIG. 17 through 44.

The loop 5308, comprised of functions 5310 and 5312, is performed for each source image pixel that is totally or partially contained within the current subpixel's source image window. Function 5310 calculates the percent of the source image window's area covered by the source image pixel's area. Function 5312 adds to a foreground color luminosity/coverage value calculated for the current subpixel, the multiple of the percentage of the window area covered by the source image pixel time the source image pixel's average foreground color intensity.

In cases in which the bicolor image is a grayscale image, the foreground color intensity can correspond to either the luminosity, or the inverse of the luminosity, of each whole source image pixel. If the source image is a multi-color image, the average luminosity value of each source image pixel's color components (i.e., its grayscale luminosity) can be used to determine a luminosity value that can be used for the source image pixel in calculating its foreground color intensity for the purposes of function 5312.

Loop of 5304 can be used to determine the subpixel foreground color luminosity/coverage values of the type shown at the top of FIG. 46.

Once the loop 5304 is been performed for each subpixel in the current pixel, function 5314 finds the minimum subpixel luminosity/coverage value that has been so calculated for the current pixel, as is illustrated in the top half of FIG. 48.

Once this has been done the loop 5316, comprised of functions 5318 and 5320, is performed for each subpixel in the current pixel.

Function 5318 sets a luminosity/alpha value being calculated for the subpixel to the minimum subpixel luminosity/coverage value determined for its pixel by the function 5314, somewhat as is indicated in the bottom half of FIG. 48.

Function 5320 distributes the portion of the subpixel luminosity coverage value that exceeds the pixel's minimum subpixel luminosity/coverage value to the luminosity/alpha values being calculated for the subpixel and adjacent subpixel's in the current pixel row using a color balance distribution filter, as is indicated in FIG. 49.

In one embodiment of the invention, if the total of such distributions made to a given subpixel exceeds the maximum allowed luminosity/output value, the subpixel's luminosity/alpha value is limited to that maximum value. Although this clipping causes some color imbalance, the inventors have found the resulting imbalances to be hardly noticeable.

Once luminosity/alpha values have been calculated for each subpixel in the row and the loop 5302 has been completed, the loop 5322 causes a function 5324 to be performed for each pixel in the row. This function sets the pixel color value equal to a color having a compound RGB value with red, green, and blue component values corresponding to the luminosity/alpha values calculated for the pixel's red, green, and blue sub pixels, respectively.

Figure 54:
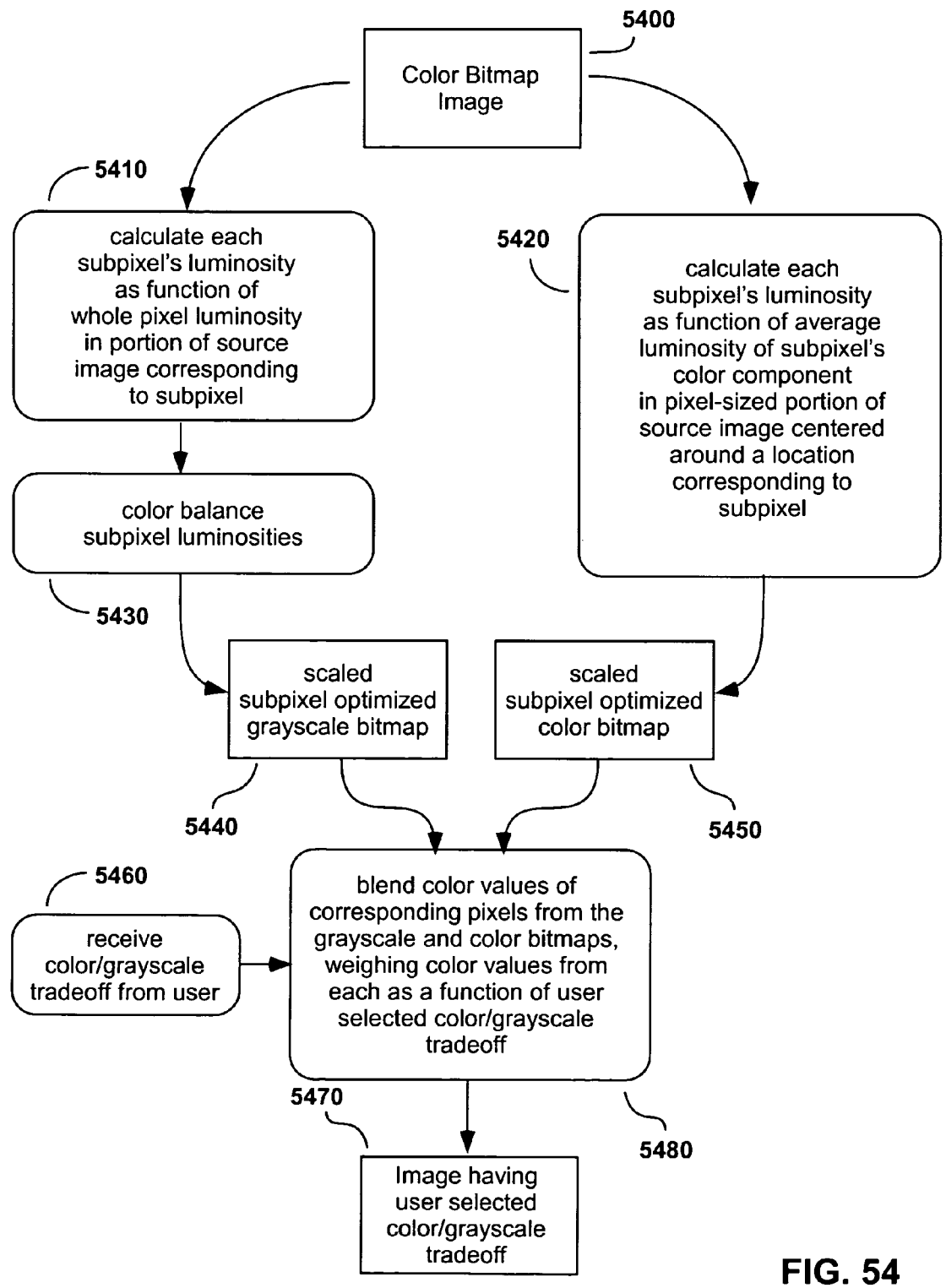
FIG. 54 is a flow diagram of a process to allow a user to dynamically tradeoff color and positional resolution.

FIG. 54 illustrates an aspect of the present invention in which the user of a display device can dynamically make tradeoffs between the extent to which a subpixel-optimized image produced from a source images is produced by a multicolor subpixel optimization process or a bicolor subpixel optimization process. An output image produced by the multi-color subpixel optimization can represent scaled down color images with reasonable color accuracy, whereas the bicolor subpixel optimization in this example can produce only grayscale output images. But in some cases, such grayscale output images will have a more accurate spatial resolution and, particularly where the source image has black and white portions with sharp edges, less perceptible color imbalance than an output image produced by the multi-color subpixel optimization.

A Color bitmap image 5400 may be scaled and subpixel optimized by utilization of functions 5410 and 5430, which use a bicolor subpixel-optimization method, such as one of those described above with regard to FIGS. 42 through 53, to produce a scaled and subpixel-optimized grayscale bitmap 5440. Color bitmap image 5400 may also be scaled and subpixel optimized by a process 5420 that uses a multicolor subpixel-optimization method, such as one of those described above with regard to FIGS. 17 through 40, to produce a scaled and subpixel-optimized color bitmap 5450.

According to an embodiment of the present invention shown in FIG. 54, the user of the display device can manipulate a control apparatus of the display device, such as a pointing device, keyboard, or other input device, according to process step 5460 in order to achieve a blend of the color bitmap 5450 and the grayscale bitmap 5440. The can be done, for example, by manipulation of a slide bar. Process step 5480 receives the grayscale bitmap 5440 and the color bitmap 5450 and the user selected color/grayscale tradeoff information and blends the color values of the corresponding pixels from the grayscale and color bitmaps 5440 and 5450, weighing color values from each as a function of the user selected color/grayscale tradeoff 5460.

In some embodiments of the type shown in FIG. 54, if the user selects a tradeoff value at either extreme of the color/grayscale spectrum, the process can reduce computation by only calculating the bitmap 5440 or 5450 that corresponds to that selected extreme.

A benefit of this aspect of the present invention is that the user of a display device can favor color balance and/or positional accuracy when that is most important or color accuracy when that is most important or simply vary the tradeoff selection to find a more easily readable display.

Not all aspects of the present invention require subpixel-optimized text, and many of those that do can use prior art methods of creating subpixel-optimized bitmap's of font shapes. However, some aspects of the invention relate to innovations in methods of making font bitmaps.

Figure 55:
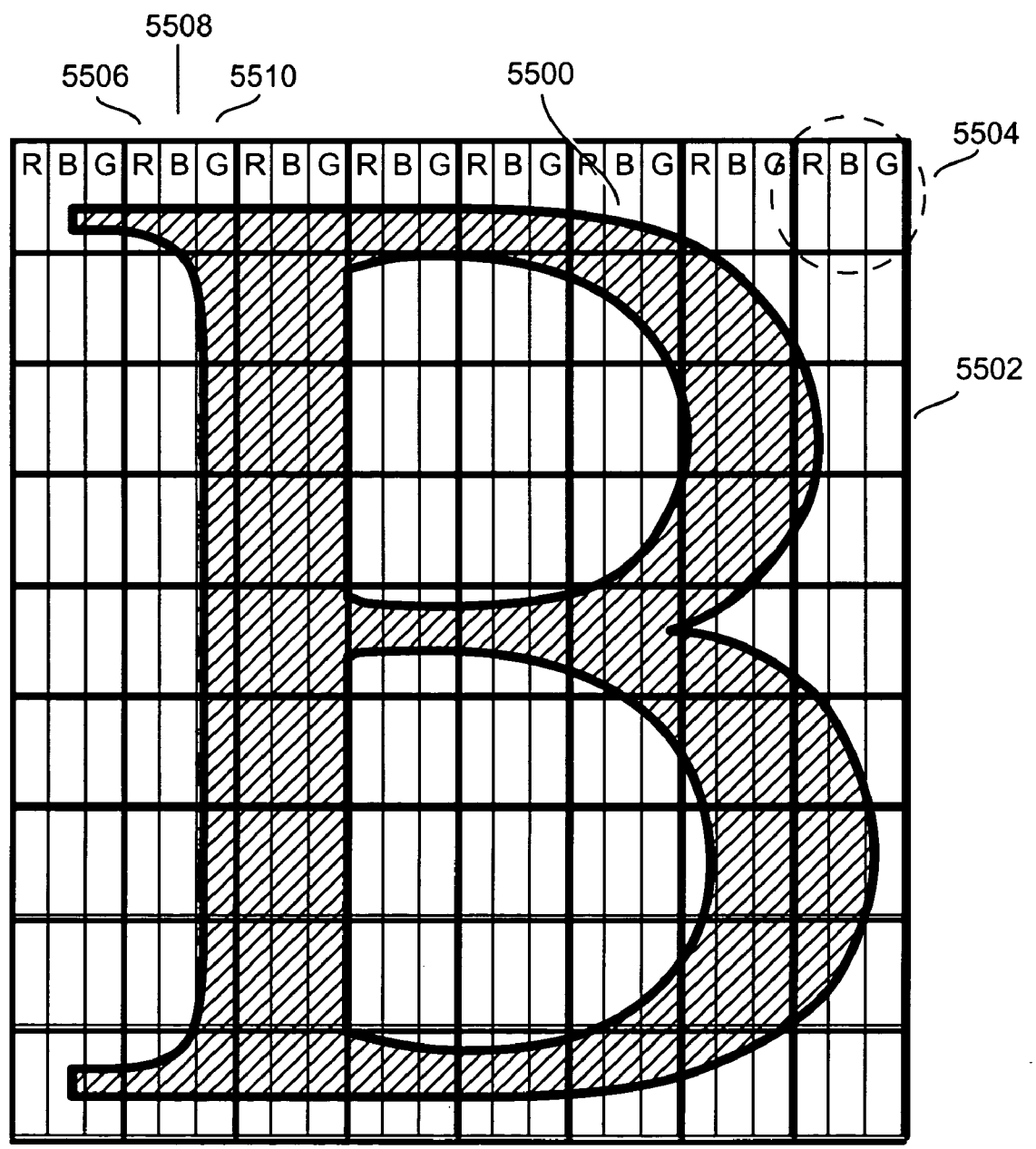
FIG. 55 illustrates the mapping between a character-font shape defined by an outline font description and an array of pixels, having subpixels, used to represent that shape on a subpixel addressable display.

FIGS. 55 through 97 relate to aspects of the invention relating to the forming and using subpixel-optimized font bitmaps FIG. 55 illustrates a font outline 5500, in this case an outline of a capital letter "B" in a Times Roman font. The outline is shown superimposed over a subpixel grid 5502, which is composed of a plurality of individual whole pixels 5504, each of which includes a red, blue, and green subpixel, 5506, 5508, and 5510, respectively.

The font outline shown in FIG. 55 is one that could be used for display at relatively normal text sizes, indicating that the invention's method of subpixel optimizing character-font shapes is applicable across a broad range of applications and is not limited to small screen displays of the type shown at the bottom of FIG. 11. However, when this aspect of the invention is applied to small screen displays and/or the display of font at very small pixel sizes, it is preferred that the fonts used be optimized for display at small sizes such as, in some embodiments, ten pixels per em or less, or eight pixels per em or less.

Figures 56, 57:
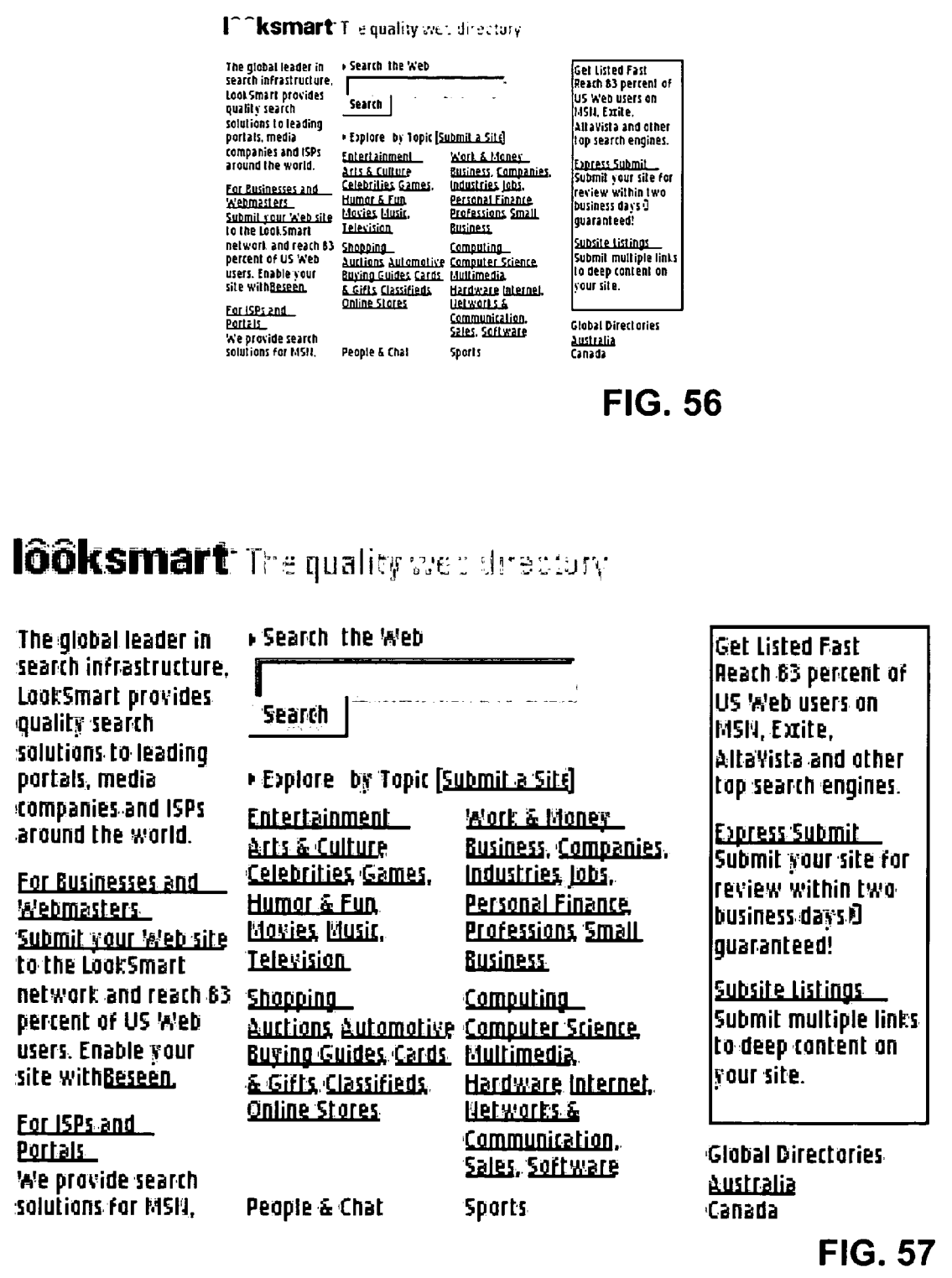

FIG. 56 illustrates a font that has been optimized for such small display on subpixel addressable screens. FIG. 57 shows the same bitmap at twice the size. Unfortunately the printouts of the bitmap shown in FIGS. 56 and 57 display the average luminosities of whole pixels and fail to capture the higher resolution made possible when such a bitmap is shown on a subpixel addressable display.

The font shown in FIGS. 56 and 57 have been produced by a hinting process that shifts selected boundaries of individual font outlines to pixel boundaries, subpixel boundaries, and horizontal and vertical dimension's intermediary between subpixel boundaries. Such high resolution hinting is used in order to achieve optimum readability on subpixel displays. It is done by having a font designer view subpixel-optimized bitmaps of individual characters with various hinting values until he or she feels relatively satisfied that the character is as clear as possible when display at such a small font size. As those knowledgeable of font hinting will understand, a font can have hints that dictate the alignment of individual portions of a font outline across all size renderings of that font, and special hints that are applied for the character-font shape at certain pixel sizes. The font shown in FIGS. 56 and 57 have been hinted to optimize their display at eight pixels per em, and some of them have specific hints that are to be applied only at such small sizes.

In fact, most of the fonts in the 320 by 240 pixel resolution screen shots shown in the figures of this application are of 8 pixel per em fonts that have been specifically hinted for display at that size. These fonts allow a relatively large amount of web text to fit on a small screen, while allowing a relatively high level of readability. These fonts allow the large majority of lower case characters of the latin alphabet to be represented in four pixel columns or less, including space that separates adjacent characters, if any. These fonts allow a majority of capital characters to be represented in 5 pixel columns or less.

The readability of such small fonts is greatly increased by the use of either subpixel optimization or anti-aliasing, because they allows information about the extent to which a character shape covers a given pixel to be represented at more than just a binary representation at the whole pixel level. In fact, subpixel optimization can be considered a type of anti-aliasing because it, like traditional anti-aliasing causes pixels that are partially covered by a font shape to have color values that vary as a function of the extent of such coverage.

FIGS. 58 and 59 illustrate that subpixel-optimized bitmaps produced by the present invention can be represented as font outlines and/or font bitmaps. The font outline descriptions 5802 contain a mathematical geometric description of the shapes of one or more characters in a given font, preferably with hinting information designed to optimally place the boundaries of character outlines at one or more different font sizes. These font outlines can be ones, such as those just discussed, that have been designed to be rendered optimally on a subpixel addressable display and/or have hinting that has been optimized for display on a subpixel addressable display.

A font renderer 5806 can be used to create a subpixel-optimized bitmap 5804 from such outlines, as is described below.

In some embodiments of the invention, illustrated in FIG. 58, a computer 5808 and/or an application running on that computer displays text using font bitmaps or font outlines accessed over a computer network 5814 from a font server 5812. In other embodiments, illustrated in FIG. 59, a computer 5900 and/or an application 5902 running on it have font bitmaps 5804 necessary to render text stored within them. Such computers and/or applications can store only font bitmaps, or they can store scalable font outlines 5802 and render font bitmaps 5804 as needed at different sizes.

The advantage of storing only font bitmaps is that it prevents the need to store font outlines and a font renderer on the computer 5900. It also prevents the need for the computation involved in font rendering. Furthermore, many font vendors are much more willing to allow font bitmaps to be relatively freely available over the Internet then they are font outlines.

The advantage of storing font outlines is that if one is interested in rendering fonts at a large variety of sizes, it is actually more efficient to store the code necessary for the font renderer and to store scalable font outline descriptions than it is to store font bitmaps for all the different size characters.

The advantage of receiving fonts from a font server as shown in FIG. 58 is that it allows a client computer 5808, such as that represented in FIG. 58, to represent text in any one of a large number of different font, size, and character combinations by downloading such fonts as needed, without the need to store a large library of fonts. Preferably the client computer 5808 will cache a reasonable number of character-font bitmaps so that there is no need to communicate over the network 5814 every time it seeks to display a string.

FIG. 60 is a highly simplified pseudocode description of an algorithm 6000 used by some embodiments of the aspect of the invention relating to producing a subpixel-optimized font bitmaps. This algorithm uses nonlinear color balancing of the type described above with regard to FIGS. 48 and 49. Such a subpixel optimization algorithm is particularly optimal for use in the display of text characters, because the alignment of text outline boundaries with whole pixel boundaries is quite common in rasterized font shapes because of the use of hinting.

The algorithm 6000 of FIG. 60 includes a loop 6002 that is performed for each pixel row in the rasterization of an individual character-font shape at a given pixel resolution. This loop 6002 is comprised of three subloop's 6004, 6008, and 6020, which are sequentially performed for each pixel row.

The loop 6004 is performed for each subpixel in the pixel row for which the current iteration of the loop 6002 is being performed. For each such subpixel, the loop 6004 performs a function 6006, which determines the foreground color coverage value for each such subpixel as a function of the percent of the subpixel's area covered by the character-font shape of which an image is being made.

FIGS. 61 through 90 are used to discuss methods that can be used to determine the coverage value of each subpixel in step 6006 of FIG. 60.

Figure 61:
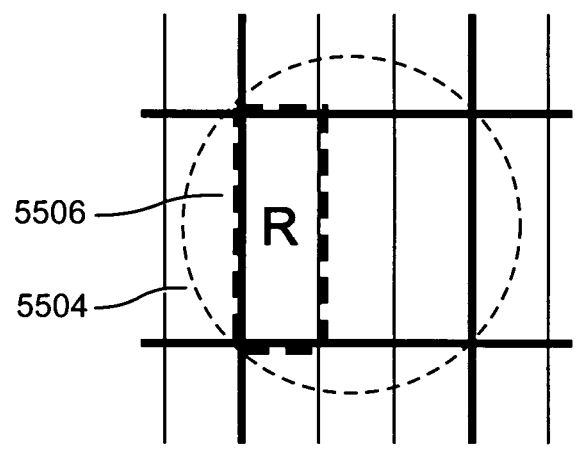
FIGS. 61 through 63 illustrate the size of the source image window in a character-font shape image, such as that shown in FIG. 55, used, respectively, to determine a coverage value for each of the three subpixel's of an individual pixel of a pixel array such as that shown in FIG. 55.
Figure 62:
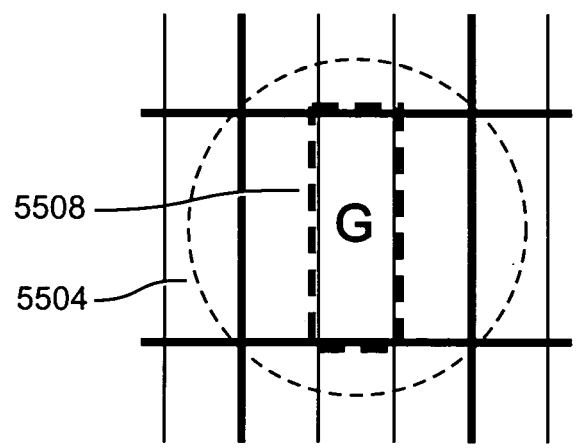
Figure 63:
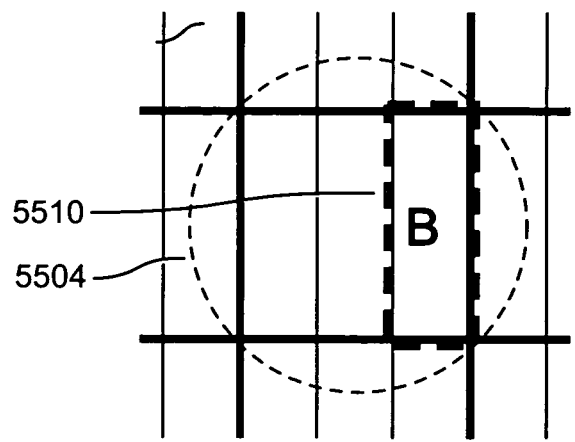

As is indicated in FIG. 61, 62, and 63 the area in the image of the character-font shape for which such a coverage value is calculated for a given pixel 5504 corresponds to the area of the image that will be displayed by each red, green, and blue subpixel 5506, 5508, and 5510, respectively. This is different than in the case of subpixel-optimized multicolor images, in which the source image window corresponding to each subpixel is larger, as is indicated in FIGS. 14 through 16 above. The source image window used by the method of FIG. 60 has the same sizes as the area of the source image window used for bicolor bitmaps described above regard to FIGS. 42 through 44.

Such a higher-resolution source image window can be used because the character-font shapes described by most font outline descriptions are bicolor images, with the area covered by the font outline considered as being associated with a foreground color (in most cases, represented by an alpha value of one) and all other portions of the image being associated with a background color (in most cases, represented by an alpha value of zero).

The calculation of the coverage values in function 6006 of FIG. 60 can be performed using any prior art technique capable of rasterizing a character font outline relative to an array of pixels having the same spatial resolution as the subpixel's of the grid 5502 shown in FIG. 55.

FIG. 64 through 67 illustrate some of the traditional methods that have been used to calculate the percentage of a unit in a rasterization grid that is covered by a font outline 6402. In the prior art, the unit of rasterization 6400 has typically been an area corresponding to a whole pixel in the output image. In the method of FIG. 60 it is an area corresponding to a subpixel in the output image.

Figure 64:
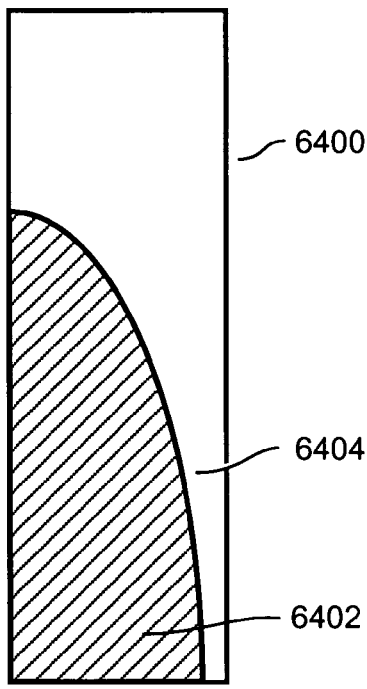
FIGS. 64 through 67 illustrates some prior art techniques that have been used to calculate coverage values for non-square rasterization units (usually whole pixels in the prior art)

FIG. 64 illustrates one method of determining the coverage of a rasterization unit 6400 that uses mathematical techniques to exactly calculate the area of the unit that is covered by the outline 6402. This is relatively computationally expensive, and thus is hardly ever used.

Figure 65:
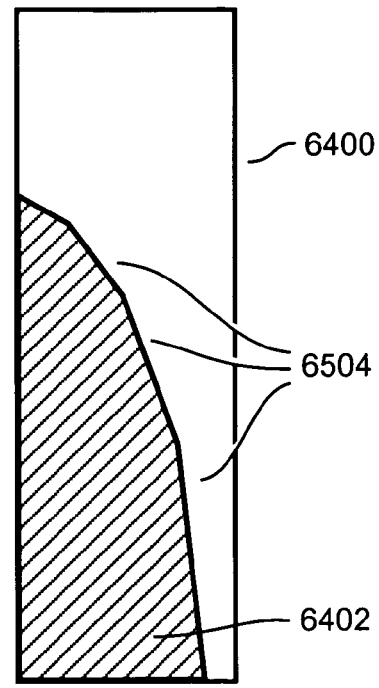

A substantially more computationally efficient method is shown in FIG. 65, which calculates the percentage of the rasterization unit 6400 that is covered by the outline 6402 by using piecewise linear approximations 6504 of the boundary of the character-font shape.

Figure 66:
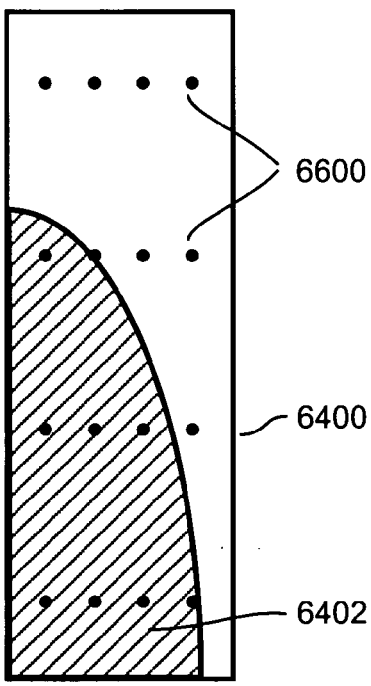

FIG. 66 illustrates an even more computationally efficient manner, although it produces a substantially less accurate results. This method determines the percent of coverage of the rasterization unit 6400 by determining what percent of a set of sample points 6600 fall inside the shape of the outline 6402.

Figure 67:
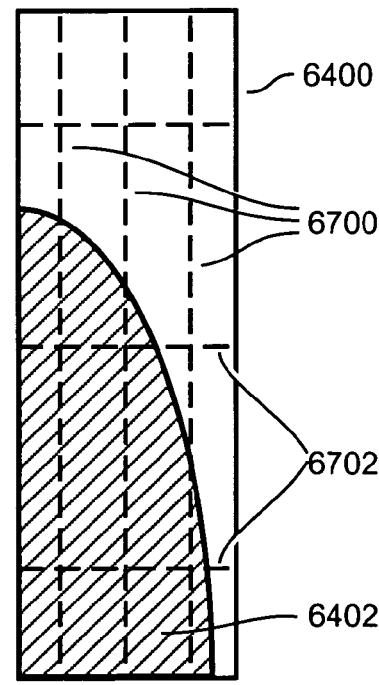
Figure 68:
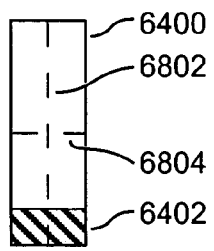
FIGS. 68 through 87 illustrate a computationally efficient method of calculating the coverage value of rasterization units, using weighted line coverage values, which method is used in some embodiments of the present invention to calculate a coverage value for subpixels.
Figure 69:
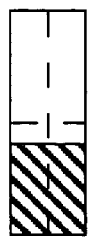
Figure 70:
Figure 71:
Figure 72:
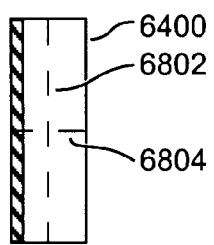
Figure 73:
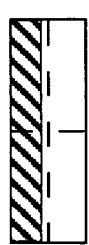
Figure 74:
Figure 75:
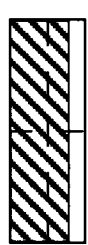
Figure 76:
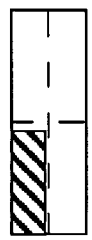
Figure 77:
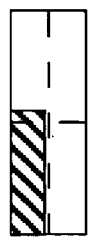
Figure 78:
Figure 79:
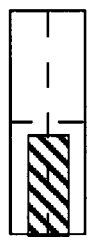
Figure 80:
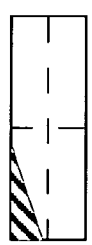
Figure 81:
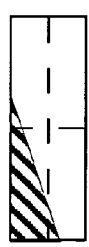
Figure 82:
Figure 83:
Figure 84:
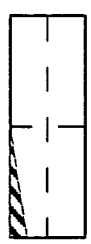
Figure 85:
Figure 86:
Figure 87:

FIG. 67 illustrates a method of determining coverage values that provides more accurate results for the same, relatively low degree of computation as the method of FIG. 66. It determines the coverage of the rasterization unit as a function of the average percentage of each of a number of scan lines 6700 and 6702 that are covered by the outline 6402.

FIG. 68 through 87 illustrate an extremely computationally efficient method of calculating the coverage of a rasterization unit, which yields results that are typically better than a sampling method such as that shown in FIG. 66 for the same amount of computation.

An embodiment of this method is described in much more detail in a U.S. patent application filed in the name of one of the inventors of the present application, Sampo J. Kaasila. This U.S. patent application has the Ser. No. 09/363,513. It was filed on Jul. 29, 1999, and is entitled "Systems For Rapidly Performing Scan Conversion With Anti-Aliasing Upon Outline Fonts And Other Graphic Elements". This application issued as U.S. Pat. No. 6,437,793 on Aug. 20, 2002. This application also has had its disclosure published in PCT application PCT/US00/21559. This application and the patent that has issued from it art incorporated herein by reference in their entirety.

In the method of FIG. 68 through 87, the coverage value for a rasterization unit is determined by that percentage of one of its two scan lines, a horizontal scan line 6804 or a vertical scan line 6802, that is covered by a font outline's shape 6402. The scan line whose coverage value is used as the coverage value for the rasterization unit is that which has the more intermediate coverage value. For example, in an embodiment where the coverage for the horizontal and vertical scan lines is calculated in a range of values from 0 to 126, the scan line chosen is that whose value is closest to 63, which represents a 50 percent coverage.

In FIGS. 68 through 71 it is the percentage of coverage of the vertical scan line 6802 that is used to represent the percentage of coverage of the rasterization unit 6400. In FIGS. 72 through 75 it is the horizontal scan line 6804 that has the most intermediate values, and, thus, which has its percentage of coverage used to represent the percentage of actual coverage of the entire rasterization unit.

In all the rest of the FIGS. 76 through 87 it can be seen that the coverage value of the scan line with the more intermediaries coverage value normally is very close to the actual coverage value for the entire rasterization unit, and that it normally never varies from the actual coverage value of the entire rasterization unit by more than 25 percent.

Figure 88:
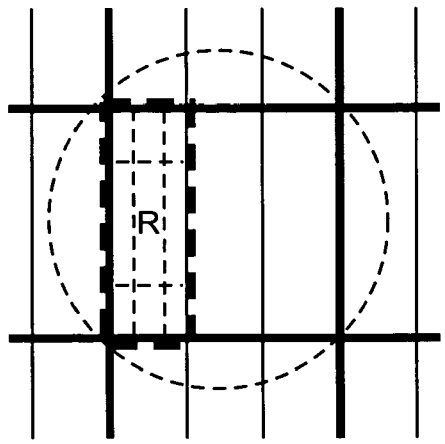
FIGS. 88 through 90 illustrate some of the other arrangements of coverage lines that can be used with a weighted line coverage algorithm of the general type described with regard FIG. 68 through 87.
Figure 89:
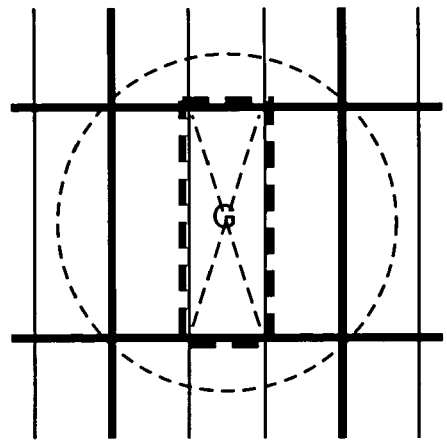
Figure 90:
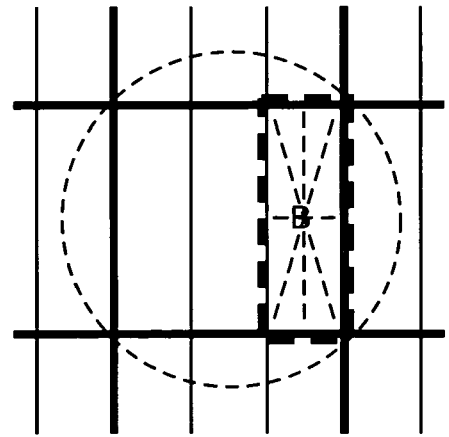

FIGS. 88 through 90 represents other combinations of scan lines that can be used according to a method that weighs the contribution of the coverage values of individual scan lines to the estimated coverage value of their associated rasterization unit as a function of which of those line coverage values have more intermediate coverage values. In such methods the coverage value calculated for entire rasterization unit can be set equal to the sum of the coverage value of each scan line times its mediality, all divided by the sum of each scans line's mediality. In this calculation, a scan line's mediality equals the scan line's middlemost percentage coverage value minus the absolute value of the difference between that middlemost percentage coverage value and the scan line's actual percentage coverage value.

Figure 91:
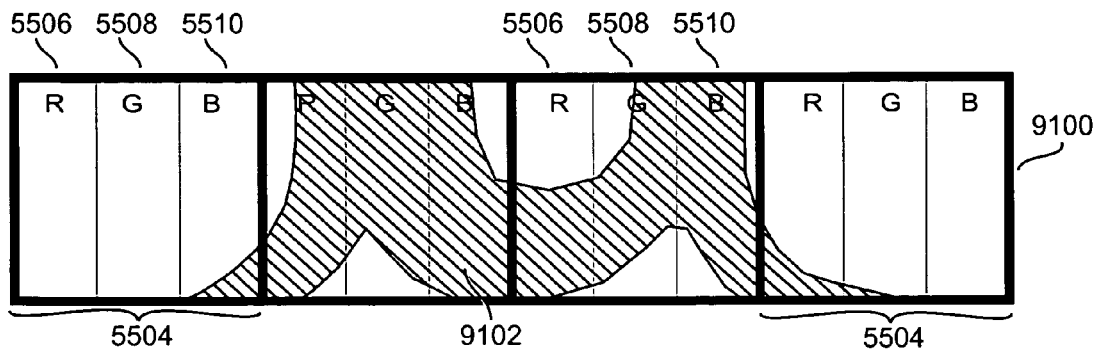
FIG. 91 illustrates a mapping of an array of pixels, and their respective subpixels, into an image of a portion of a hypothetical font outline.

FIG. 91 illustrates a hypothetical font outline 9102 mapped over the red, green, and blue subpixels 5506, 5508, and 5510, respectively, of a row 9100 of pixels 5504.

Figure 92:
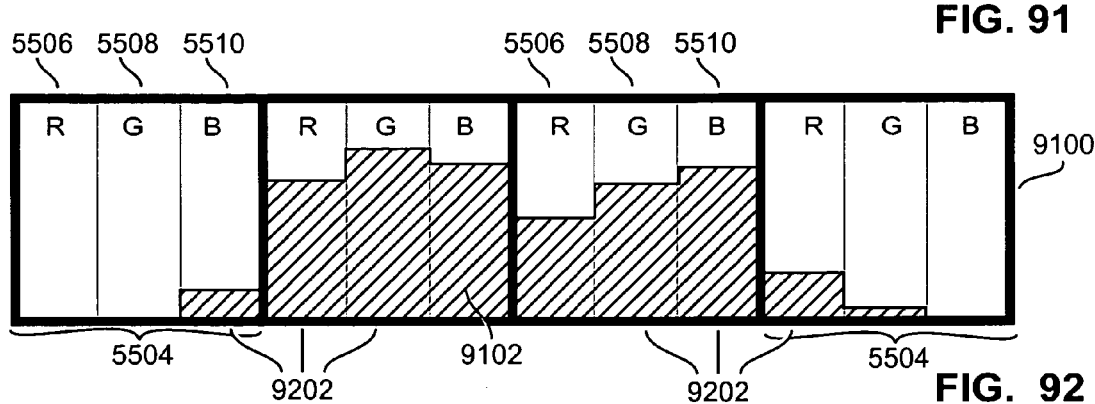
FIG. 92 illustrates corresponding coverage values that have been calculated for the subpixel's shown in FIG. 91.

FIG. 92 illustrates the corresponding coverage values 9202 that have been calculated for each of the subpixels in the row 9100.

Figure 93:
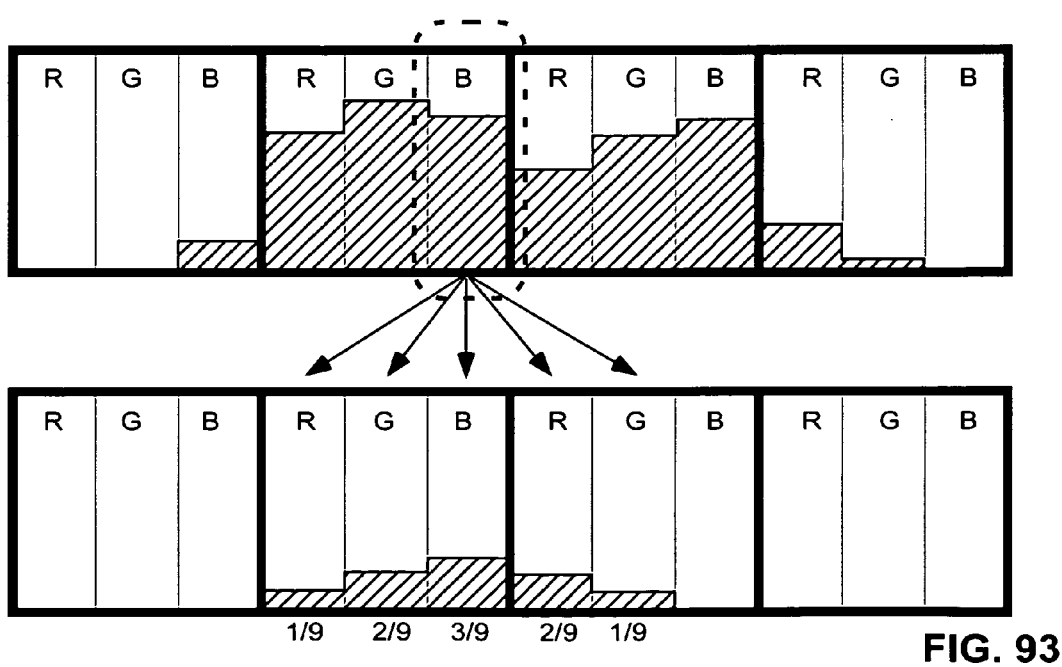
FIG. 93 corresponds to FIG. 46, and like FIG. 46 illustrates how a prior art linear color balancing method distributes all of an individual subpixel's coverage value over a series of adjacent subpixel's within a given pixel row.

FIG. 93 illustrates how the coverage values determined for an individual subpixel can be distributed using a linear color balance method. This linear color balancing is identical to that described above with regard FIG. 46.

Returning briefly now to FIG. 60, once step 6006 of that figure has calculated or estimated the coverage value for each subpixel of a row, as indicated in FIG. 92, a loop 6008 is performed for each pixel in the row. This loop color balances the coverage values calculated for the subpixels of a row. It does not use a linear color balancing routine of the type illustrated in FIG. 93 and described above with regard to FIGS. 46 and 47. Instead it achieves higher perceivable spatial resolution by using a non-linear color balancing technique similar to that described above with regard to FIGS. 48 through 53.

The loop 6008 performs two functions, 6010 and 6012, and a loop 6014 for each such pixel.

The function 6010 finds that subpixel of the current pixel that has the minimum coverage value calculated for its subpixel. Then step 6012 adds this minimum coverage value to the temporary alpha, or opacity, value being calculated for each subpixel of the current pixel. This corresponds to the function described above with regard to FIG. 48.

Then a loop 6014 performs function 6016 and 6018 for each subpixel of the current pixel. The function 6016 determines, for the current subpixel of the loop 6014, the excess of the coverage value that has been calculated for it over the minimum coverage value that has been found for the pixel of which the current subpixel is part. Then function 6018 distributes this excess value across the subpixel alpha values being calculated for the current subpixel and the two subpixels to its left, and the two subpixels to its right in the current pixel row. This function corresponds to that described above with regard to FIG. 49.

FIGS. 94 and 95 illustrate two different color balance distribution filters that are used in one embodiment of the present invention. In this embodiment a symmetrical center-weighted color-balance filter shown in FIG. 94 is used to distribute the coverage values associated with the red and green subpixels. The asymmetrical color-balance filter shown in FIG. 95 is used to distribute coverage values associated with blue subpixels. Thus, this embodiment of the invention differs from the process described above with regard to FIG. 49 in that it used differently shaped distribution filters for some colors than for others.

One of the inventors of the present application has found that because the eye perceives green much more strongly that it does blue, that color balancing coverage values associated with differently colored subpixels should use such different distribution filters. In other embodiments of the invention relating to non-linear color balancing (including the non-linear color balancing of bicolor images) a different color balancing filter could be used for each different color, the same color balance filter could be used for all colors, and either symmetrical or asymmetrical color balancing filters can be used.

The particular color-balancing filters shown in FIGS. 94 and 95 are designed for use with coverage values that are calculated on a scale from 0 to 126. A given coverage value having a value from 0 to 126 is associated with one of the set of five distribution values on the right hand side of the tables of FIGS. 94 and 95 whose associated color value on the left side of that table is closest to its own color value. For example, if the coverage value of the current subpixel was 126 for the colors red or green, an addition of 1 would be made to the alpha value being calculated for subpixels two to the left and two to the right of the current subpixel, an addition of 3 would be made to the alpha values being calculated for the subpixels one to the left and one to the right of the current subpixel, and a value of 4 would be added to the alpha value being calculated for the current subpixel. In this particular embodiment the alpha values are calculated on a scale from 0 to 12.

The relative size of the color balance distribution shown in the last row of FIGS. 94 and 95 reflect more accurately the desired distribution ratios. This is because the larger value distributed in each of these last rows allows greater numerical resolution than is found in the rows above each of them.

It should be appreciated that in other embodiments that use higher numerical accuracy to describe the coverage or luminance values being balanced, the balancing distributions would have ratios between the contributions to different subpixels more like those reflected in these last rows of FIG. 94 and/or FIG. 95. This is particularly true when filters of the general type shown in FIG. 94 and/or FIG. 95 are used in the color balancing of bicolor subpixel optimizations of images, such as is described above with regard to FIGS. 48 through 52. This is because, in such bicolor subpixel optimizations of bitmap images, there is more reason to compute the luminance to be color balanced at a resolution corresponding to that used in the bitmap being subpixel optimized.

Once loop 6008 of FIG. 60 has caused step 6018 to be performed for each subpixel of each pixel in a row, each pixel will have a separate alpha value calculated for each of its three subpixels, with each such alpha value having one of thirteen opacity levels. This means it is possible for each pixel to have 1 of 2,197 (i.e., $13^3$) different possible combined alpha values. In other embodiments of the invention alpha values with higher or lower resolution can be used.

In many embodiments of the invention, particularly those designed to run on computers with limited computational capacity or in systems in which it is desirable to reduce the bandwidth or storage capacity required to store or download font bitmaps, it is desirable to map from the relatively large color space of the 2,197 combination of different subpixel alpha values possible after such color balancing into a smaller color space.

The embodiment of the invention in FIG. 60 performs such a mapping. Once the loop 6008 has been performed for each pixel in the current row, a loop 6020 performs an additional function 6022 for each such pixel. The function 6022 takes the three alpha values that have been calculated for each of a pixel's subpixels and uses them as an input value of a lookup table that maps from each of the 2,197 possible color value defined by the possible combination of a pixel's three alpha values into 1 of 122 values. In this embodiment the color space has been reduced down to such a small number of colors so that a machine that has a 256 value color space will be able to display each of the 122 values selected for use in the display of subpixel optimize fonts while still having over half of such a limited color space for other uses. The uses of such a small color palette to represent font bitmaps reduces the number of bits required to store such font bitmaps and makes them more efficient to download. In other embodiments of this aspect of the invention the source and the destination color spaces used in such a mapping could have different sizes.

FIG. 96 illustrates the method 9600 that has been used to create such a color mapping in one embodiment of the preferred invention. It is to be understood that in other embodiments, other types of mapping could be used. In some embodiments no such mapping into a smaller color space need be used at all.

The method of FIG. 96 starts with a step 9602 that runs multiple characters from multiple fonts through the non-linear color-balanced subpixel optimization algorithm described above with regard to FIGS. 60 through 95. When this is done, a histogram is kept of the number of times each of the possible 2,196 different composite pixel alpha values is calculated for any of the pixels. This histogram is useful because most of the three-colored alpha values calculated for pixels in subpixel-optimized font bitmaps tend to be concentrated into various small regions of the total possible color space of 2,196 such three-color alpha values. This concentration is probably even more pronounced with non-linear color balancing, because it substantially reduces the amount luminosity distributions due to color balancing.

Next a function 9604 creates a limited color palette, in this case having 122 colors, by performing the functions 9606 and 9608. The function 9606 selects, as part of the palette, the thirteen grayscale values that are possible for whole pixel alpha values, given that each subpixel can have one of thirteen alpha levels. Then the function 9608 selects the 109 other most frequently occurring colors in the histogram previously calculated by step 9602.

Once the limited color palette has been selected, a loop 9610 is performed for each of the 2,196 possible whole pixel alpha values. For each such possible alpha value a conditional 9612 tests to see if that input color exactly matches one of the 122 colors. If so, the function 9614 associates the input color with its identical output color in the lookup table being constructed. If the condition 9612 is not met, a loop 9618 and a function 9628 will be performed for the current input color of loop 9610.

The loop 9618 is performed for each of the 122 output colors in the palette. It has a conditional 9620, which tests to see if the difference between the red alpha value of the input color to be mapped and the current output color of the loop 9618 is of the same sign as the difference between the green alpha value of the current input color and the green output alpha value for the current output color. The conditional 9620 also tests to see if the difference between the red alpha value and the green alpha value of the current output color is less than the difference between the red alpha value and the green alpha value of the input color (plus a possible value X to allow some leeway). If these two conditions, which are designed to prevent relatively noticeable differences between an input color and the output color to which it is to be mapped, are met, functions 9622 through 9626 will be performed.

Function 9622 calculates the distance from the input color to the output color. Function 9624 tests to see if that distance is the closest distance so far to the input color in the current loop 9618. If the test of function 9624 is met, step 9626 saves the current output color of the loop 9618 as the closest allowed palette color. After the loop 9618 has been performed for each of the 122 output colors of the limited palette, step 9628 associates the current input color of the loop 9610 with the closest allowed palette color calculated in the loop 9618.

Once the loop 9610 has been performed for each of the possible input colors, each of those input colors will have been mapped to one of the 122 output colors.

In the particular color mapping scheme shown in FIG. 96 non-grey scale pixel color values produced by color balancing get mapped in to greyscale color values if they do not get mapped into one of the one hundred and nine most frequently occurring non-greyscale color values selected by step 9608. This generally yields results at least as good as traditional anti-aliasing, which represents all bitmaps with a greyscale alpha value.

FIG. 97 illustrates an algorithm 9700 used to display font bitmaps of a type generated by the methods of FIGS. 60 and 96 on a subpixel addressable screen.

The loop 9702, comprised of the function 9704 and loops 9706 and 9714, is performed for each string to be displayed.

Function 9704 samples a set of points in the rectangle of the bitmap at which the string is to be drawn, to determine the average background color value for the string. In other embodiments the background color is separately determined for each character or for each pixel of each character, but in the embodiment shown, the background color is determined only once for each string to save computation.

Once the background color for the string has been determined, loop 9706 performs a subloop 9708 and a function 9712 for each of the 122 whole pixel alpha values, described above with regard to FIG. 96.

The loop 9708 performs a function 9710 for each of the three subpixel colors. The function 9710 calculates the luminosity value for the current subpixel color as a function of the components of the current whole pixel alpha value corresponding to the current subpixel color. It sets the luminosity value it is calculating equal to this subpixel alpha value multiplied by the luminosity of the current subpixel's corresponding color in the foreground color of the string to be drawn, plus a quantity of one minus the current subpixel's alpha value multiplied by the luminosity of the current subpixel's corresponding color in the background color determined by function 9704.

Once this loop has been performed for each of the three subpixel colors, function 9712 maps the current whole pixel alpha value of the loop 9706 into the whole pixel color value comprised of the three subpixel luminosities that have just been calculated in the loop 9708.

Then the loop 9714 performs the function 9716 and the loop 9718 for each of the characters of the current string to be displayed on a subpixel addressable display.

Function 9716 accesses the font bitmaps for the current character. Then the loop 9718 performs functions 9720 and 9722 for each pixel of that bitmap. Function 9720 finds the color value that has been mapped by the loop 9706 into the current whole pixel alpha value indicated for the current pixel in the character's font bitmap. Once this color value has been found, function 9722 sets the corresponding pixel in the subpixel addressable display to the that whole pixel color value.

Once the loop 9718 has been performed for each pixel of each character of the string, the string will have been completely displayed in a subpixel optimize manner.

Figure 98:
FIGS. 98 through 101 illustrate how well the present invention can display web pages on a 320×240 screen, with FIGS. 98 and 100 each being a screen shot of a 640×480 layout of a different web page, and FIGS. 99 and 101 showing how the present invention is capable of displaying each of these two web pages, respectively, on a 320×240 screen.
Figure 99:
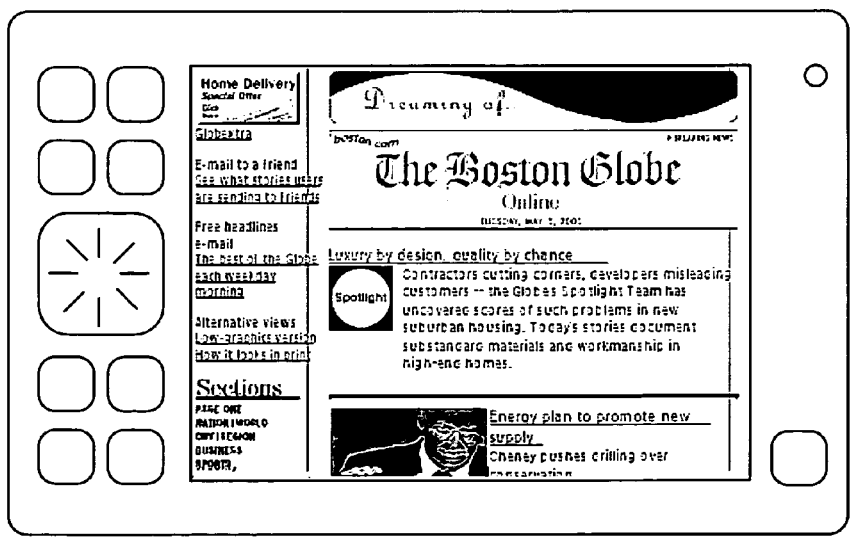
Figure 100:
Figure 101:
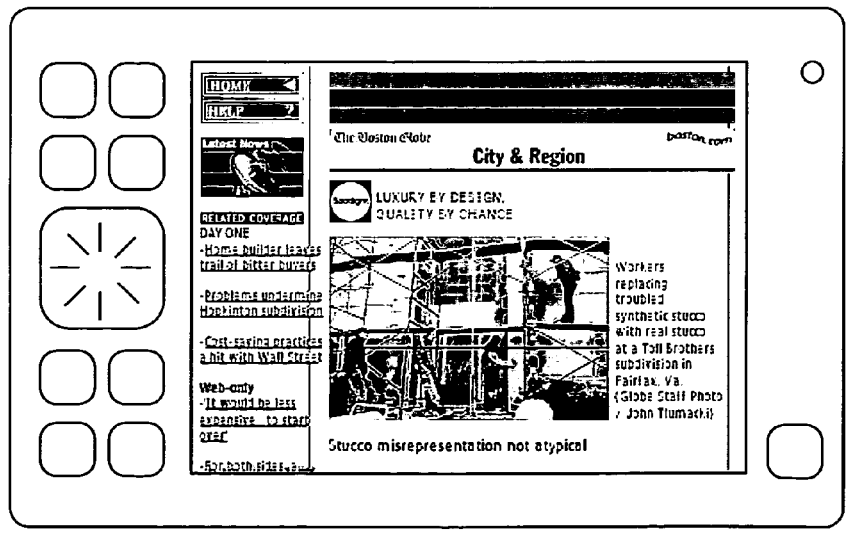

FIGS. 98 through 101 are used to illustrate how well the techniques for image and font scaling and subpixel optimization work. FIGS. 98 and 100 illustrate views of two different web pages laid out and displayed at 640 by 480 pixels using a common browser program. FIGS. 99 and 101 illustrate the same web pages after their images and text have been scaled by the method described above so as to fit on a 320 by 240 display. Unfortunately, the 320 by 240 pixel images are printed with grayscale values determined by the average luminosity of its whole pixels, and thus the actual clarity added by subpixel resolution is not shown in these images.

FIGS. 102 through 113 illustrate in more detail the interaction between a proxy server and a thin client computer in one embodiment of the present invention.

Figure 102:
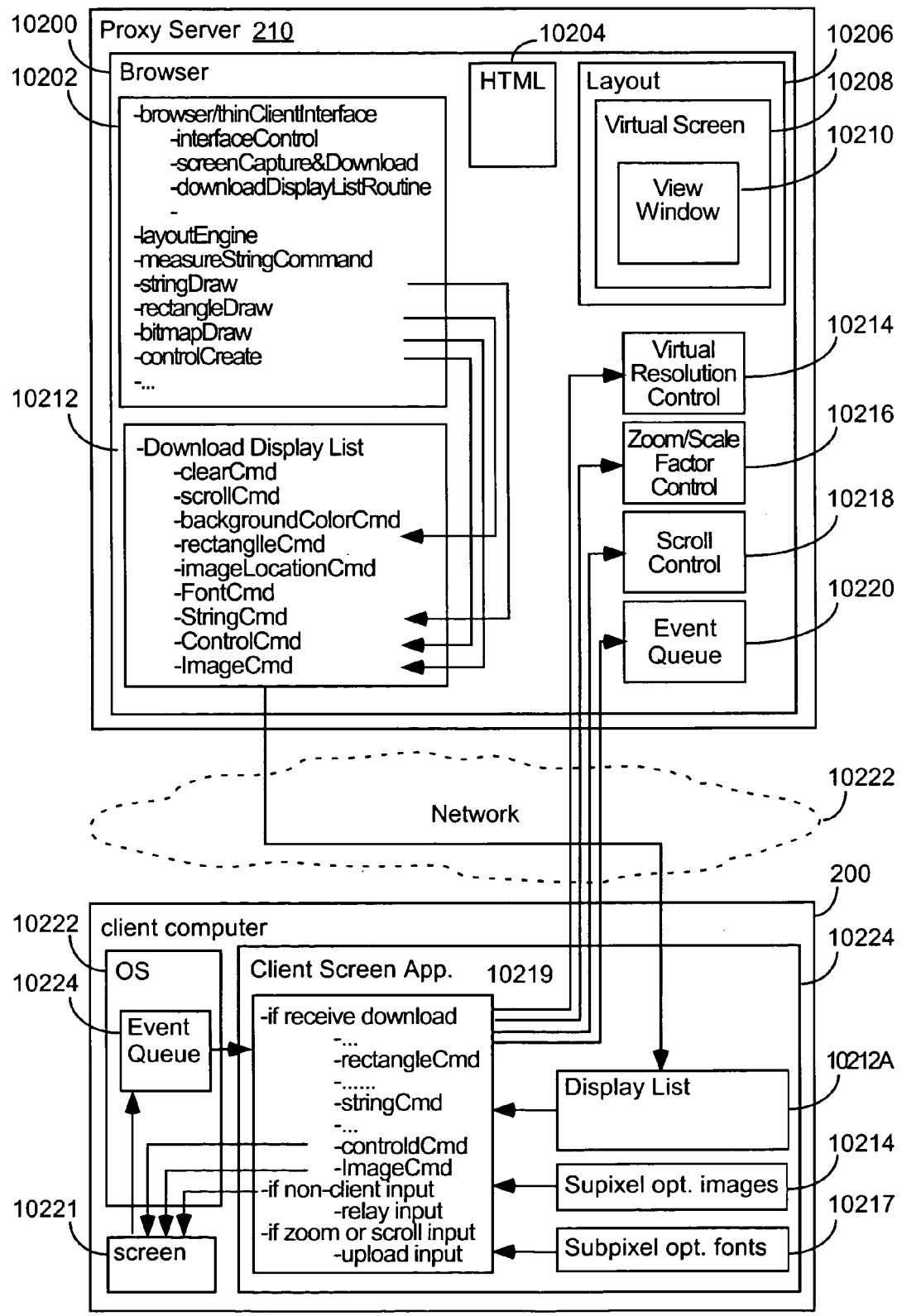
FIG. 102 is a schematic block diagram of some of the data structures and programming used by a proxy server and thin client computer to enable a user of the thin client computer to access web content on a scaled-down, subpixel-optimized screen.

FIG. 102 is a highly schematic box diagram of a system including a proxy server 210 and a thin client 200 of the type described above in regard to FIG. 2.

The proxy server 210 includes a browser 10200 that includes programming 10202 to perform the standard functions of a full Web browser. This programming has been modified because the browser operates as a proxy for the thin client. When the browser receives over the network an HTML description 10204 of a requested web page, it creates a two dimensional layout 10206 of that web page.

FIG. 103 illustrates a portion of HTML description of the web page whose display is shown in FIGS. 98 and 99. The numerals 10300 shown in FIG. 103 illustrates portions of text in the HTML that are shown in the left-hand column of the web page shown in FIGS. 98 and 99. The numeral 10302 points to an image tag that identifies the bitmap used to represent the word "Sections" shown in the same column.

When the proxy browser code receives the download of the web page, it attempts to create a layout 10206 of that web page at a virtual screen resolution, which corresponds to the size of the window into which it thinks it is displaying all or a portion of the web page. We call this window into which the browser thinks it is displaying the web page the virtual screen 10208.

Figure 104:
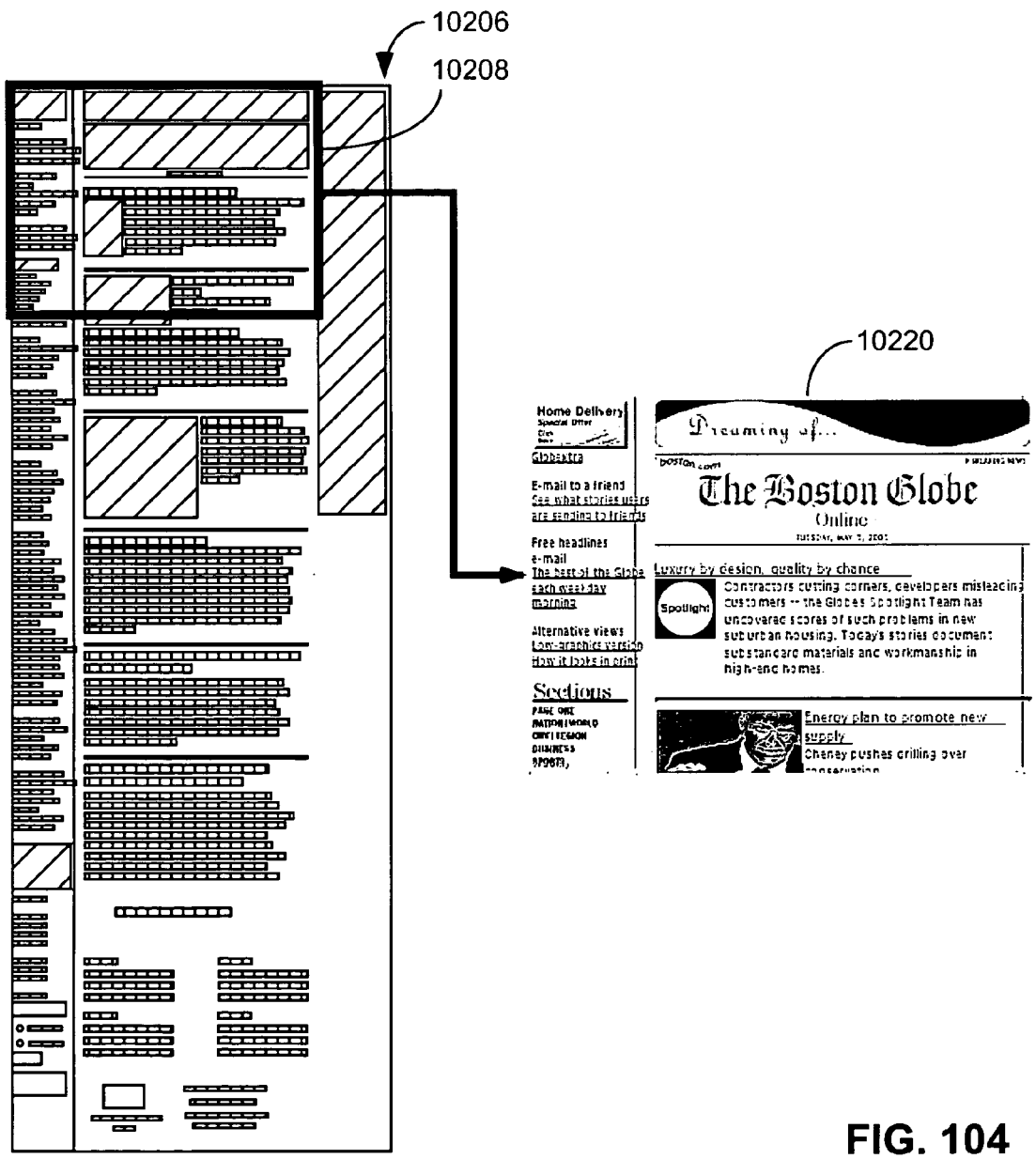
FIG. 104 illustrates the layout of a web page produced by the proxy server and the portion of that layout that falls within the proxy server's virtual screen, which in this example corresponds to the portion of the web page shown in FIG. 99.

FIG. 104 illustrates the layout 10206 of the web page shown in FIGS. 98 and 99, and it shows in heavy black rectangle 10208 the mapping of the virtual screen into that layout. 10220 shows the actual screen image that is displayed on the thin client given the location of the virtual screen shown in FIG. 104.

Many web pages today include elements larger than the 640 by 480 virtual screen resolution used in the example system being described. The layout will have the minimum width required to layout the objects of the web page, or the width of the virtual screen, which ever is larger. For example, it is common today for many web pages to be laid out with a minimum possible resolution of 800 pixels. In this case the virtual screen will have a smaller width than the layout. This is the case in the example shown in FIG. 104.

The view window 10210 shown in FIG. 102 represents that portion of the virtual screen that is to be actually displayed upon the screen of the thin client. In views shown in FIGS. 99 and 101 the view window equals the virtual screen. But as the user zooms in on a portion of the virtual screen, the zoom's scale factor control 10216 will change and the view window will be mapped into a subset of the virtual screen.

Scroll control 10218, shown in FIG. 102, causes the view window to move relative to the layout. If the view window is moved so that it includes a portion of the layout that is not on the virtual screen, a command will be sent to the browser software to scroll the virtual screen.

The event queue 10220 stores events, that is, user input, which have been received on the thin client and which have been uploaded to the proxy server for corresponding action by the browser. Events that occur on the screen of the thin client are mapped through the view window to the corresponding locations on the virtual screen and then placed in the event queue of the proxy browser, so that the proxy browser will respond to such input as if it had been received at the appropriate location on the screen (i.e., the virtual screen) that it thinks it is drawing directly onto a video output device.

The browser programming 10202 of FIG. 102 has been modified so that each time it thinks it is drawing an object on the virtual screen it creates a corresponding scaled-down object at a correspondingly scaled location in a download display list 10212.

This display list is downloaded over the network 10222 to the client computer, which stores it as is indicated by the numeral 10212A. The scaled down images referred to by this display list 10214 are also downloaded. Programming 10218 located on the thin client displays the strings, images, and other elements contained in the display list on the thin client screen 10221. If the user clicks on the thin client screen, the operating system 10222 of the thin client places such a click and its location on the thin client's screen in an event queue 10224. Each such event that does not relate to programming handled locally on the thin client is uploaded to the event queue 10220 of the proxy server, as described above.

FIGS. 105A through 110 are highly simplified pseudocode descriptions of programming and data structures on the browser and thin client computers designed to control their interaction for the purpose of allowing the thin client to browse web pages through the proxy.

FIGS. 105A and 105B are highly simplified pseudocode representations of portions the browser's code 10202 shown in FIG. 102 used to help it function as a proxy browser for the thin client.

In the particular embodiment illustrated in these figures, a large Web browser designed for normal use has been patched so as to make it perform as a proxy. It is to be understood that in other embodiments of this aspect of the invention the functionality necessary to make the browser operate as a proxy could be more intimately and elegantly integrated into the browser's code. In yet other embodiments, code in the operating system, or in functions that intercept operating system calls can be used to make a standard Web browsing program operate as a proxy for a thin client.

In the embodiment shown in FIG. 105A, if the proxy's browser receives a request from the thin client for a web page, steps 10502 and 10504 relay that request to the server computer indicated in the URL of the request.

If the browser receives an indication from its own code that the browser has completed a draw or redraw of the virtual screen 10208 described above with regard FIG. 102, functions 10506 and 10510 will call the screen capture and download routine shown in FIGS. 106A and 106C.

FIGS. 106A through 106C are highly simplified pseudocode descriptions of the screen capture and download routine 10600.

When this routine is called by function 10510, just described, its step 10602 asks the browser for a screen redraw, which causes the browser to call routines to draw each of the elements in the web pages layout that all or partially fit within the virtual screen. The routine of FIGS. 106A through 106B records information contained in each of these draw calls and uses it to create the download display list 10212 shown in FIG. 102.

If the browser calls a measure string routine 10606 of FIG. 106A, this routine causes functions 10608 through 10618 to be performed. Such calls are made by the browser to determine the size of text it is seeking to layout into the virtual screen. Although not shown in the figures, these same functions 10608 and 10610 are performed anytime the browser makes a call to measure string size, even if it is not during the operation of the screen capture and download routine shown in FIGS. 106A through 106B.

Function 10608 maps the font specified in the measure string call into a font having a different font family and a different font size. This font substitution is controlled by three considerations indicated by numerals 10608 through 10616.

Consideration 10608 seeks to select a size for the substitute font as a function of the requested font size in the call to the measure string routine and as a function of the display scale factor.

The display scale factor is a ratio of the resolution along a given dimension of the portion of the virtual screen 1028 corresponding to the view window and the resolution, along the same dimension, at which the view window will be displayed on the thin client. In some cases the display scale factor will have different components to represent different scaling ratios to be used along the horizontal and vertical directions, but in many cases the display scale factor will be comprised of a single scaling ratio to be used for both horizontal and vertical resolution.

In the embodiment shown in FIG. 102, this scale factor is stored in the Zoom/Scale Factor Control 10216. In cases where the virtual screen has a resolution of 640 by 480, the view window equals the size of the virtual screen, and the view window is displayed on all of a 320 by 240 display, the display scale factor will be two, meaning that elements are to be drawn on the screen of the thin client at ½ the pixel resolution at which the browser thinks it is drawing them upon its virtual screen.

Consideration 10612 replaces all font sizes that will be small when displayed on the thin client screen with font families that are narrower and taller than the average pixel size of the font that would be selected by the consideration 10610 alone. When reducing from a 640×480 virtual screen to a 320×240 display screen this can include most or all web page text represented in characters, as opposed to bitmap, form. This substitution is done because the subpixel addressable displays used with this embodiment of the invention have three times the subpixel resolution in the horizontal direction as they do in the vertical direction. Because of this, decreasing the width of characters has a less negative impact on readability than decreasing the their height. Thus, to display the maximum amount of relatively easily readable text on such a subpixel addressable display screen, this substitution caused the width of characters to effectively be scaled down by more than the display scale factor and the height of such characters to effectively be scaled down by less than the display scale factor. For example, the fonts of the small screen displays shown in FIGS. 56, 57, and 99, 101, 168, 169, 172, 173, and 174 have all been substituted by fonts that have been scaled in such a manner.

The fonts in these figures have a pixel size of eight pixel per em. A majority of the lower case letters in this font fit within an advance width of four pixel columns of less. This width of four pixel columns or less includes the spacing, if any, that occurs between the shapes of characters having such widths. In these particular fonts, over eighty-percent the lower case characters of the roman alphabet fit within such an advance width These characters have an x-height of more than four pixel rows, which makes them generally considerably taller than they are wide. As a general rule, such a relatively narrow font can represent a larger amount of text within a given area at a given level of readability than a wider font.

The consideration represented by the numerals 10614 and 10616 tests to see if a flag has been set to limit minimum font size, indicating that no fonts should be shown on the thin client's display below a certain pixel size. Commonly this flag will be set to prevent the display of text that is too small to read. It can be unset when the user desires to see a more accurate scaled-down representation of how the web page text would normally be laid out if actually shown on a display having the virtual screen size. Such a desire is particularly likely when the display scale factor is large, meaning that placing such a minimum limit on text size would drastically alter the appearance of the web page's layout.

If, as is often the case, the system is limiting minimum font size, then steps 10614 and 10616 prevent the substitute font size from being below a minimum pixel size. In a current embodiment of the invention, this minimum pixel size is eight pixels per em. The developers of this embodiment developed hinted fonts for subpixel display at seven pixel per em, and although they found such fonts relatively easy to read, they received feedback from other users that such small fonts were too difficult to read.

The limitation on minimum font size often substantially changes the relative size at which a web page's variously sized fonts are actually displayed.

In some embodiments of the invention, all Web text is displayed at one font size. This actually works quite well for most web pages, because in most web pages the truly large fonts are represented by bitmaps.

Once the function 10608 has determined which font family and font size should be substituted for the font with which the measure string routine has been called, function 10618 returns the string measurement of the string with which the routine was called, given the size of the string's characters in the substituted font and font size, after that measurement has been scaled up by the display scale factor.

The return of this value causes the browser's layout engine to lay out the web page using font metrics for characters that are scaled up, relative to the pixel size at which those characters will actually be displays by the display scale factor, which is the ratio of the resolution of the portion of the virtual screen corresponding to the view window and the actual resolution at which the view window will be displayed on the thin client screen. This means that the virtual screen is being laid out using virtual font metrics that are different than the actual font metrics that will be displayed as a result of that layout.

If the screen capture and download routine receives a call to a string draw routine 10620, this routine causes functions 10621 and 10624 to be performed.

Function 10621 transforms the screen position at which the string is to start being drawn into the corresponding position on the thin client screen at which the string will ultimately be displayed. This transformation takes into account the mapping between the view window 10210 and the virtual screen 10208 illustrated in FIG. 102. This mapping reflects both the current zoom setting stored by the control 10216 and a current scroll setting stored by the scroll control 10218 also shown in FIG. 102.

Function 10622 tests to see if the substituted font family and size associated with the string by the prior call to the measure string routine, described above with regard to numerals 10606 through 10618, and any other font attributes requested for the display of the current string, are different than the current values for such font attributes. The current value for each such font attribute is defined by the last value for each such attribute defined by a font commands already recorded in the download display list. If such differences are found, function 10623 stores a font command at the current end of the display list changing any such font attributes to those appropriate for the display of the current string.

Function 10624 stores the string with which the string draw routine has been called and the transformed screen position just calculated by step 10622 at the end of the download display list 10212, illustrated in FIG. 102. As described below with regard FIG. 108, this is done by placing a string command in the display list containing the string's transformed start position and its characters If the screen capture and download routine receives a call to a rectangle draw routine 10626, this routine causes functions 10628 through 10634 to be performed. Rectangle draw commands are commonly called by browsers to create areas of a web page with different background color, as well as to draw horizontal and vertical lines that can be used as underlining for text or demarcations between different portions of the web page's layout.

Function 10628 transforms the geometric values contained in the call to the corresponding geometric values with which a corresponding rectangle will be drawn on the thin client's display. This includes transforming the rectangle's start screen position, and its width and its height.

Function 10630 tests to see if the rectangle's color is different than the current (i.e., last) rectangle color in the display list. If so, function 10632 adds a background color command to the end of the display list changing the current background color to the color specified in the current call to the rectangle draw routine.

Next function 10634 stores the rectangle and its transformed screen position, width, and height at the end of the download display list with a rectangle command.

If the screen capture and download routine receives a call to a bitmap draw routine 10636 shown in FIG. 106B, this routine causes functions 10638 through 10670 to be performed. Bitmap draw routines are called by browsers to display pictures, pictures of fonts, banner ads, and images associated with hot zones and other graphical user interface bitmaps of a page.

In some embodiments, only the first screen of given animations are captured and recorded to the download display list to reduce the amount of bandwidth required to display web pages. In other embodiments, particularly those with higher bandwidth links such a restriction need not apply In the embodiment of the invention that is described with regard to FIGS. 106A through 160C, bitmap draws associated with certain graphical user interface's are ignored because the thin client's programming stores subpixel-optimized, scaled-down bitmaps for such controls.

Step 10638 tests to see if the URL of the image for which the bitmap draw routine has been called is already in a download image list, not shown in the figures, which contains each of the images referred to in the download display list. If not, the requested bitmap has not yet been processed for the current download and functions 10642 through 10662 need to be performed for it.

Function 10642 tests to see if the bitmap is a color bitmap. If so it causes functions 10644 through 10654 to be performed. Function 10644 scans the color images for one or more individual areas of sufficient size to justify separate treatment, which each contain only colors from a single bicolor spectrum. A bicolor spectrum corresponds to a set of colors that lie in a line in an RGB color cube (i.e. a color cube defined by red, green, and blue value ranges in each of its three major dimensions).

For each bicolor portion of the image found that is large enough to justify individual processing, function 10646 causes functions 10648 and 10650 to be performed. Function 10648 performs a bicolor subpixel optimization, of the type described above with regard to FIGS. 42 through 53, on the current portion of the image using the most extreme ends of its bicolor spectrum as its foreground and background colors, and using the current display scale factor to determine the extent to which it scales down that portion of the image. This subpixel optimization, like that performed in steps 10654 and 10658 described in the next few paragraphs, scales down the image by the display scale factor, which is the ratio between the resolution of the image in the virtual layout of the proxy browser and the resolution at which it will be displayed on the thin client's screen.

After this subpixel optimization has been performed, function 10650 determines if the foreground color is too chromatically unbalanced. That is, it is to close to a pure red, green, or blue color. If this is the case, such color purity would decrease the accuracy with which it can display the spatial resolution of the color image. If this is the case, the foreground color can be replaced by a corresponding color that is closer to a grayscale value, and thus that will allow more accurate spatial representation.

In some embodiments of the invention such foreground color substitution will not be used because it might upset the color balance of the color image. In general it is best not to use such foreground color substitution unless the foreground color appears throughout a substantial portion of the entire color image. In other embodiments of the invention the background color associated with a bicolor image could be changed. But the Changing of the background colors of images on web pages is often unadvisable.

For each non-bicolored portion of the current image, function 10652 causes step 10654 to perform a multicolored subpixel optimization, of the type described above with regard to FIGS. 14 through 41, on that portion of the bitmap at the current display factor.

If the bitmap for which the bitmap draw routine has been called is a grayscale bitmap, function 10656 causes step 10658 to perform a bicolor subpixel optimization, of the type described above with regard to FIGS. 42 through 53, on the bitmap using black and white as the foreground and background colors at the current display scale factor.

Then function 10662 stores the scaled-down, subpixel-optimized bitmap at the end of the image list with a unique image ID, its URL, and its scaled width and height.

Whether or not the image with which the bitmap draw routine has been called was previously in the image list, by the time the program advances to function 10664 it will be in that list, and will have been assigned an ID number and a transformed width and height. At this time function 10664 transforms the screen position with which the bitmap draw routine has been called for the image to one applicable to the thin client's screen, and then stores an image location command of the type shown in FIG. 108 having the image's image ID, its transformed screen position, and its transformed width and height at the end of the download display list.

In some embodiments of the invention all bitmap images are subpixel-optimized using the multicolor subpixel optimization routine. In other embodiments only grayscale bitmaps undergo any bicolor subpixel optimization.

In some embodiments of the invention vector images can be handled by performing subpixel optimization upon the shapes defined by such vector descriptions. In some such embodiments such subpixel optimization is performed on the proxy, but in others it is performed on the thin client. One of the advantages of vector, or geometrically defined, drawings is the compactness with which their descriptions can represent an image. Thus when bandwidth to the thin client is a primary restriction, it might well make sense to download vector descriptions of images and have the thin client then render them using subpixel optimization.

It is possible in some embodiments, to have image recognition performed upon images, and then have the recognized images downloaded to the thin client in a symbolic representation. For example, it is common in many web pages to represent large text with bitmaps. Optical character recognition could be performed on such bitmaps, and corresponding characters and their font, or an approximation of their font could be downloaded symbolically, so as to reduce the bandwidth required in order to describe the page to the thin client.

If the screen capture and download routine receives a call to the routine to create a control object, such as a radio button, check box, text field, or button from the browser, the control-Create routine 10666 shown in FIG. 106C causes functions 10667 through 10670 to be performed. Function 10667 transforms the screen position at which the browser has requested a control to be drawn to the location at which it is to be drawn in the thin client's screen. A function 6668 places a corresponding control create command as indicated in FIG. 108 in the download display list, including its corresponding text label, and function 10670 creates a corresponding browser-side portion of the control object.

In this embodiment of the invention the functionality of a control object shown in the thin client's screen is shared between the proxy and the thin client. State information, such as whether not a check box is checked, or which of a set of radio buttons has been pushed, is stored on the thin client. This prevents the need for communication from the thin client to the proxy every time the user enters information into such a control object. Usually it is only when the user clicks a button indicating that the information stored for such controls is to be transmitted to the remote server computer that originally generated the web page that the client needs to send such information to the proxy, for relay to such a server.

In other embodiments of the invention having a higher bandwidth link to the thin client, it might be desirable to simplify the code of the thin client, by having more or substantially all of the functionality associated with individual control objects run on the proxy.

When the screen capture and download routine determines that the screen redraw requested by function 10602 of FIG. 106A is complete, function 10672 of FIG. 106C causes function 10764 to call the download display list routine 10700 shown in FIG. 107.

As shown in FIG. 107, the download display list routine has a function 10702 that places all elements in the download display list that are to be totally or partially newly displayed on the new thin client's screen in a download stream. Normally this includes any elements in the browser's virtual screen that occur within the current view window. As is explained below, however, in the case of a scroll in which a significant portion of the prior bitmap on the thin client's screen can be reused, only elements that occur at least partially in the portion of the view window that does not correspond to the reusable portion of the thin client screen's current bitmap are placed in the download stream.

In many embodiments of the invention the functions of FIGS. 106A through 106C that creates the download display list do not enter an element on the download display list if it does not fit within the view window. In other embodiments this filtering takes place in function 10702.

In some embodiments of the invention elements that are downloaded are clipped, so that only those portions of such elements that are to actually fit within the thin client screen are downloaded. This would have the benefit of decreasing the number of bits required for download, but it would add computational complexity.

Once all the elements on the download display list to be shown on the thin client screen have been placed in the download stream, function 10704 places the bitmaps of all images with a corresponding image location command in the download stream at the end of the download stream, as indicated by the numeral entries 10818 in FIG. 108. Some embodiments of the invention, before they places such bitmaps at the end of the download stream perform a lossy compression on them. In some embodiments, the algorithm used is one that clusters the color values in the image into clusters of colors having visually imperceptible differences in RGB color values, using a metric that takes into account the fact that green color values differences are more perceptible than red color value differences, and that red color value differences are more perceptible than blue color value differences.

Then function 10705 compresses the download stream, including the images previously compressed by the lossy algorithm, using a lossless compression algorithm. Standard prior art lossless compression algorithms can be used for this purpose.

FIG. 108 is a schematic illustration of such a download display stream. In some embodiments such a stream is actually represented using a markup language.

The font commands 10812 shown in FIG. 108 represent font commands recorded in the display list by function 10623 of FIG. 106A.

The string commands 10814 of FIG. 108 represent commands recorded in the download display list by the step 10624 of FIG. 106A.

The background color commands 10806 of FIG. 108 represent the background color commands entered by the function 10632 shown in FIG. 106A.

The rectangle commands 10808 of FIG. 108 represent rectangle information stored by function 10634 of FIG. 106A.

The image location commands 10810 shown in FIG. 108 represent image location commands recorded by the function 10664 of FIG. 106B.

The control commands 10816 of FIG. 108 represent control commands placed in the download display list by the function 10668 of FIG. 106C.

Returning now to FIG. 107, once all the elements for the download stream have been selected and the stream is ready to be sent, function 10706 opens a socket connection between the browser computer and the thin client, and then function 10708 sends the download stream's display list information down to the thin client. The thin client then displays information, as is described below in greater detail with regard to FIGS. 109A through 109C.

Returning now to FIG. 106C, once the call in the function 10674 to the download display list routine is complete the function 10676 clears the display list, so the new display list can be created for the next screen that is to be downloaded to the thin client.

Returning now to FIG. 105A, we have just described the completion of the screen capture and download routine called by function 10510 shown in that figure.

As shown in FIG. 105A, if the browser's proxy code receives a query from another portion of the browser code for the state of one or more control objects displayed on the thin clients screen, function 10516 sends a query to thin client for the state of that one or more control objects. When such state information is received from the thin client, it is returned to the programming that made the request for such state information.

As was described above with regard to functions 10666 through 10670 of FIG. 106C, this embodiment of the invention actually has the thin client draw and store state information about individual control objects, such as radio buttons, check boxes, and text entry fields, to reduce communication bandwidth as the user changes information prior to selecting to have it submitted to the web site on whose web page such controls are shown. Commonly when the user clicks a submit button the associated click event is transmitted up to the proxy computer, it has its screen coordinates transformed the corresponding coordinates on the virtual layout screen, and then it is placed in the browser's event queue for the browser code to respond to that click event as if it had been generated on the screen, having the virtual screens resolution, that the browser thinks it is displaying. Once this is done, the browser's standard code asks for the state of all of the current web page's control objects, so it can post that information back to the web server from which the current web page came. It is such requests that cause the operation of functions 10514 through 10518.

If the browser's proxy code receives a scroll or move command from the thin client, functions 10522 through 10534 of FIG. 105A are performed.

Function 10522 moves the view window 10210 shown in FIG. 102 relative to the browser's layout 10206 in response to the scroll or move. Then function 10526 tests to see if any significant portion of the view window that was in the view window before the move is still in the view window after the move. If this is the case, it means a substantial portion of the bitmap currently being displayed on the thin browser screen can be reused in the display after the requested scroll or move is accomplished. In this case function 10528 places a scroll command 10804, illustrated near the top of the download stream in FIG. 108, at the start of the new display list that is to be created for the scrolled screen. Such a scroll commands includes an XY shift value that indicates which portion of the thin client's prior screen bitmap is to be reused.

In FIG. 108 both a clear command 10802 and a scroll command 10804 are shown at the start of the download stream, so that both can be illustrated. In the current embodiment only one of these two commands, the clear command or the scroll command will start a download stream, with the first being used if the screen of the thin client is to be totally redrawn, and the second being used if a portion of the thin client screen's prior bitmap is to be shifted for reuse in the new screen.

The reuse of a substantial portion of a screen display that has been previously downloaded and drawn, made possible by the use of the scroll command, can substantially reduce the amount of data that has to be downloaded to the thin client in scrolls that involved relatively small changes in position. This can substantially speedup the rate at which scrolled screens can be displayed on the thin client, particular in situations in which there is a limited bandwidth between the browser and the thin client, such as if they're communicating over the relatively slow digital cellular link common at the time this application is being filed.

If the moved view window that results from a scroll or move command includes a portion of the web page's layout not currently in the virtual screen 10206, shown schematically in FIG. 102, function 10530 of FIG. 105A causes functions 10532 and 10534 to be performed. Function 10532 scrolls the browser's virtual screen so that all of the view window will be contained within it, and then function 10534 requests a redraw from the browser for the newly moved virtual screen. Once this redraw is complete functions 10506 and 10510 will capture the newly drawn elements and will draw them, as has been described above with regard to FIGS. 106A through 106B.

If the browser's proxy receives a zoom command from the thin client, function 10536 of FIG. 105A causes functions 10538 through 10552 to be performed.

Function 10538 changes the display scale factor according to the zoom change.

Function 10540 scales the view window relative to the browser's virtual window according to the selected zoom.

Function 10542 checks to see if the scaled view window includes portions of the web page's layout not currently contained within the virtual screen. If so, it causes function 10544 to scroll the virtual screen or change its resolution to make the scale view window fit within the virtual screen.

If scrolling the virtual screen will enable the new view window to fit within the virtual screen, there is no need to re-layout the web page, and the zoom can be used to display the same layout as existed before the zoom, by showing a different location within it and/or by displaying it at a different scale factor. If, however, the zoom is a zoom out that causes the view window to be larger than the virtual screen size, in the embodiment shown in FIG. 105A, this will require that the web page be laid out at a new virtual screen size that allows the view window to fit entirely within it the virtual screen, so that the proxy browser can handle any input supplied to any portion of the view window displayed on the client as if it had occurred at a corresponding location on the proxy browser's virtual screen. In the embodiment being described, this may cause the web page to be displayed at a new layout if the new virtual screen resolution is larger than the layout resolution used in the previous layout, and this can cause line breaks to occur in different locations.

In other embodiments of the invention, such as ones in which proxy browser was designed, rather than patched, to support zoomed views, and such as the ones described with regard to FIG. 115 in which the client zooms directly relative to a download of an entire layout, extreme zoom outs need not require a re-layout of the web page.

Finally function 10552 calls for a screen redraw. This causes the screen capture and download routine to capture the redraw of the current view window with the new zoom scale factor, and download corresponding display information to the thin client so they can display the web page at the new zoom setting.

As indicated in FIG. 105B, if the browser's proxy receives a virtual resolution change command from the thin client, function 10554 causes functions 10556 through 10560 to be performed. Function 10556 changes the browser's virtual screen resolution to the requested resolution. Then step 10560 calls for a screen redraw. This is because the browser re-lays out the current web page at the new virtual screen resolution, and redraws all of the current view window to be captured at the display's scale factor corresponding to the ratio between the number of pixels the view window has in the virtual screen relative to the number of pixels it has on the thin client screen.

Such a change in virtual resolution changes the size at which a layout is performed relative to the size of images and text within such a layout. Such a change in relative layout size changes the size at which images and text will be displayed on the screen, unless the user makes a change in the relative size of the view window relative to the virtual screen that cancels such a change in size. In the absence of such a compensating change in relative view window size, decreasing the virtual resolution increases the size at which images and text will be shown on the screen, and tends to make the text lines shorter relative to the size of the fonts shown on them, so as to allow more of text lines to fit on the screen at one time at a larger text size. Thus, changes in virtual layout size can be used to provide a certain type of zoom capability to the display of web pages.

The inventors have found that quite good readability can be supplied using virtual screen of 640 by 480 when displaying web pages on a typical PDA-sized 320 by 240 screen, which involves scaling down the layout by a factor of 2. However, the invention can be used to display web pages at even more reduced scales, such as displaying an 800 by 600 virtual screen resolution on a PDA-sized 320 by 240 display, even though readability will suffer, so as to enable a user to see how the web page might look when laid out for larger resolution displays. Of course, if the reader chooses to have the minimum font size limited, as was described above with regard to function 10614 of FIG. 106A, the text, even with such a large virtual resolution would still be shown with readable fonts, although the layout of the page would be quite different than that originally intended for display at such a resolution, because of the relative increase in font size that would result.

As indicated by function 10562 of FIG. 105B, if the browser's proxy code receives other user input from the thin client associated with a click on the thin client's screen, function 10564 transforms the thin client screen position associated with the click to the corresponding position on the virtual screen, and function 10566 relays the event to the browser's event queue so that it can respond to it as if the user had actually clicked on the virtual screen that most of the browser's code thinks it is laying out.

This is the method by which the browser on the proxy responds to input the user of the thin client makes to select most links, whether they be text links or image links, on the web page displayed on the thin client. For example, if the user clicks on a link displayed on the thin clients screen, the corresponding click will be relayed to the browser on the proxy, which will act as if the user had clicked on the same link in the virtual screen that it thinks it is displaying. The proxy's browser then responds by issuing an HTTP request over the Internet corresponding to the link. When the web page corresponding to that link is received, the browser will lay out and seek to display it on the virtual screen, causing functions 10506 and 10510 of FIG. 105A to capture the information contained in that portion of the layout corresponding to the view window and to download it to the thin client for display on it's screen. As a result, the user of the thin client is able to surf the Web, in much the same manner as a user of a normal browsing computer.

FIGS. 109A through 109C are highly simplified pseudocode representations of code 10900 on the thin client computer designed to help it operate in conjunction with the proxy browser to enable its users to browse the World Wide Web using its screen.

Function 10902 of FIG. 109A responds to the receipt of all or an initial portion of the download stream sent to the thin client by function 10708 of FIG. 107. It does so by starting to respond to the individual commands, of the type illustrated in FIG. 108, contained in that stream in the order in which they are received. It starts doing this as soon as one or more such commands are received so that the work of drawing the new screen need not be delayed until the download stream has been fully received. The response to each different type of command contained in the download stream is indicated by the functions numbered 10904 through 10956 in FIGS. 109A through 109B.

As indicated by functions 10904 and 10906, when the thin client reads a clear command in the download stream it causes the bitmap displayed on its screen to be cleared, or set to a totally white value.

When the thin client reads a scroll command in the download stream, function 10908 causes functions 10910 and 10912 to be performed Function 10910 copies the portion of the thin client's screen's bitmap that is to be reused after the scroll specified in the scroll command to a new position on that screen indicated by the XY shift value included in the command. Then function 10912 clears the remaining portion of the screen.

When the thin client reads a background color command in the download stream, functions 10914 and 10916 set the current rectangle background color variable to the color specified in the command. This causes all rectangles drawn by the thin client in response to rectangle commands until the background color value is changed again to have that specified color value.

When the thin client reads a rectangle command in the download stream, functions 10918 and 10920 draw a rectangle, using the current background color, having a screen position, width, and height specified in the command.

When the thin client reads an image locations command, functions 10922 and 10923 do nothing at that time. This is because the bitmap's necessary to draw the image referenced in such an image locations command usually will not have been received at such time. In other embodiments, the browser associates rectangle draw commands with images, which will cause the portion of the thin browser screen associated with images to have a rectangle drawn on them indicating where a bitmap image is to be displayed.

When the thin client reads a font command, functions 10924 and 10926 set the value of all font attributes listed in the font command to the values listed for those attributes in that command. In different embodiments of the invention different font attributes can be used. It is preferred that at least font family, font size, and font foreground color be supported font attributes.

When the thin client reads a string command in the download stream, function 10928 causes functions 10930 through 10940 to be performed.

Functions 10930 tests to see if the thin client has in its font bitmap cache a bitmap for each character of the current string in the current size and font family specified by the current font attribute values. If not, functions 10932 through 10936 are performed.

Function 10932 sends an HTTP request over the thin client's Internet connection to the font server 134 described above with regard to FIG. 2. When the requested font is received from the font server, functions 10934 and 10936 place it in the thin client's font bitmap cash.

It should be noted that some embodiments of the invention permanently store, as part of the thin client browser software, a sufficient set of font bitmaps so that the use of the functions 10930 through 10936 are not necessary. In other embodiments, subpixel-optimized font outlines are either stored permanently by the thin client or are requested as needed, as are the font bitmaps in the example described in FIG. 109A.

When the thin client has all of the font bitmaps necessary to render the current string, functions 10938 and 10940 draw the string using the current font attribute values including foreground color, upon the screen at the specified screen position. In the current embodiment font bitmaps are represented as alpha value bitmaps of the type described above with regard to FIGS. 60, 96, and 97. When doing so, the background color is derived from the portion of the bitmap over which the string is to be drawn.

In some embodiments, in order to reduce computation, the color value of the portion of the screen over which the string is to be drawn is sampled at a relatively few number of points, and the average of those sampled color values is used as the background color for the entire string display, as is described above with regard to FIG. 97.

In the embodiment being described, all of the strings contained in the download stream are single line text strings, many of which may have resulted from the wrapping of continuous text across line boundaries by the proxy browser's layout engine. As a result, in this embodiment, the thin client does not have to perform any such wrapping of text.

Function 10940 draws a bitmap image of a strings by composing it from a plurality of separate font bitmaps corresponding to the letters of the string. Normally in such composition each different separate character will be represented by a different separate font bitmap.

It is preferred that the fonts used in such composition at different font sizes (such as different font sizes caused by changes in scale factor) have the shape and pixel alignment of each character selected to improve readability at each such font size. In most embodiments this improved readability is produced by selecting the character shape and position relative to a font bitmap so as to increase the alignment of the character shape with the pixelation of the bitmap. Such shape and pixel alignment is particularly critical when dealing with font bitmaps of ten pixels per em or less, and is even more critical at eight pixels per em or less. This is because as font bitmaps became smaller they become more difficult to read because of their more course pixelation, and thus it becomes even more critical that they have character shapes and alignments selected to fit such pixelation.

FIGS. 56, 57, and 99, 101, 168, 169, 172, 173, and 174 illustrate pixel optimized font bitmaps that have drawn by a thin client. In many embodiments of the invention the font bitmaps used by step 10940 at smaller scales are subpixel optimized bitmaps created by non-linear color balancing of the type described above, in which only color imbalances that occur within a pixel are distributed. When such subpixel-optimization is combined with character shapes that have been properly shaped and aligned to better match their bitmap pixelation, the resulting bitmaps drawn are amazing easy to read considering their small pixel size.

Returning now to FIG. 109B, when the thin client reads a control command from the download stream, function 10942 causes functions 10944 through 10948 to be performed.

Function 10944 tests to see if the thin client has already created a data or program object corresponding to the control ID specified in the current control command. If not function 10946 creates such a data or program object of the type specified in the control command and associates it with the control ID specified in that command.

Then step 10948 draws a subpixel-optimized bitmap of the specified type of control object on the thin client's screen at the location specified in the control command. It then draws the text associated with the control on the control object's bitmap using subpixel-optimized fonts. Then it associates a hot zone, having a display screen position corresponding to the control's bitmap, with the data object or program object representing the control on the thin client.

When the thin client reads an image command from the download stream, function 10950 causes functions 10952 through 10956 to be performed.

Function 10952 scans the current display stream for all occurrences of an image location command that has the same image ID as the current image command. For each such image location command, it causes function 10954 to draw the bitmap at the location specified by that image location command upon the thin client's screen. As with all the thin client's draw functions, any portion of the image that does not fit on the thin client screen is clipped in such draw operations.

Next function 10956 redraws all other items in the display list that occur at the same location as any of these drawn bitmaps. This is necessary because it is common for web pages to place text on top of images, and, thus, it is desirable that any strings that are intended to be displayed at the same location as a bitmap image be redrawn after those images are drawn. In one embodiment of the invention, the thin client merely redraws all non-image elements of the download stream's display list that occurs after the first image location command in that list.

Figure 110:
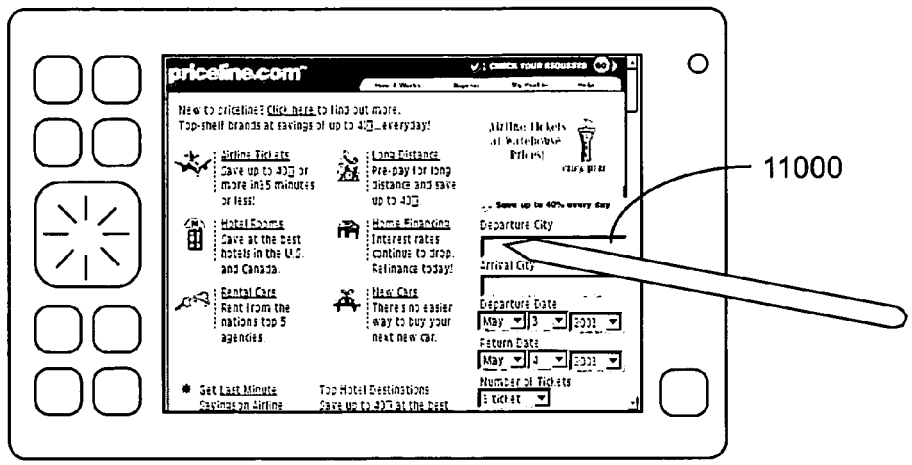
FIGS. 110 through 112 illustrate how, if a user clicks on a text entry field on a web page's display on the thin client shown in FIG. 102, a pop-up keyboard is shown that allows the user to enter text into that field.

If the user clicks on a hot zone 11000 associated with a text entry field, as indicated in FIG. 110, functions 10958 and 10960 of FIG. 109B cause a keyboard routine comprised of functions 10962 through 10978 to be executed.

Figure 111:
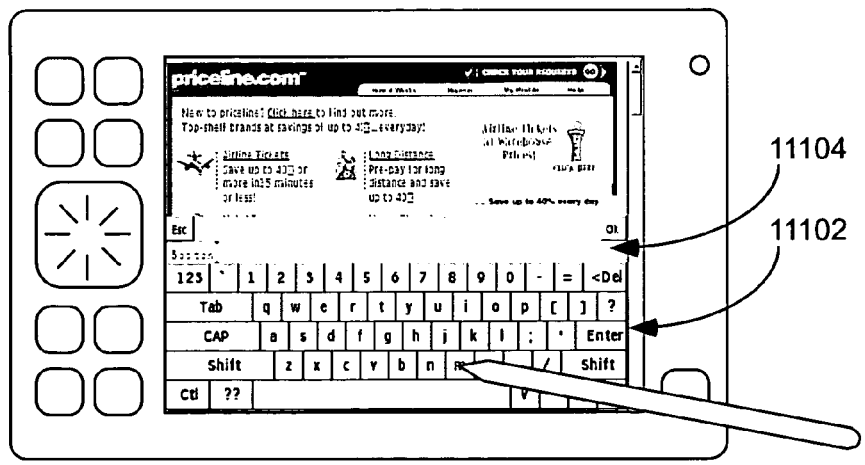

Function 10962 displays a pop-up user keyboard 11102 and text edit field 11104, illustrated in FIG. 111, on the thin client's screen. Then a loop 10964 is performed until the user presses the enter key on the pop-up keyboard. During this loop each time a user types a text character, function 10966 causes function 10968 to place a subpixel-optimized text bitmap of the character on the pop-up keyboard's text edit line at the current cursor position and moves the bitmap of the cursor to a position after the newly drawn character, and then function 10970 adds the typed character to a temporary text edit string associated with the pop-up keyboard's programming.

Figure 112:
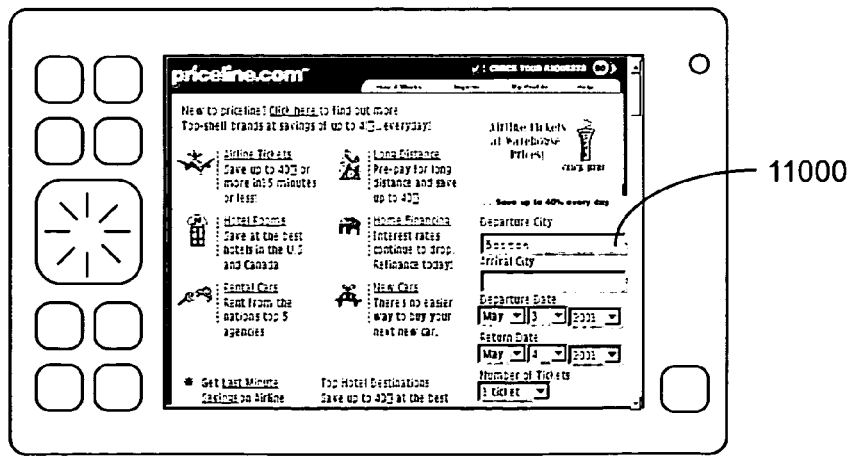

When the user presses the enter key of the pop-up keyboard, function 10972 causes functions 10974 through 10978 to be performed. Function 10974 stores the value of the temporary text edit string associated with the pop-up keyboard in the text edit control for which the pop-up keyboard has been evoked. Then function 10976 draws the characters of that text edit string, using subpixel optimized bitmaps, in the bitmap of the text entry field 11000 of the control object on the thin client's screen, as shown in FIG. 112.

Then function 10978 removes the pop-up keyboard from the thin client's screen by drawing over it the bitmap that was displayed on-screen before the pop-up keyboard was drawn.

Figure 113:
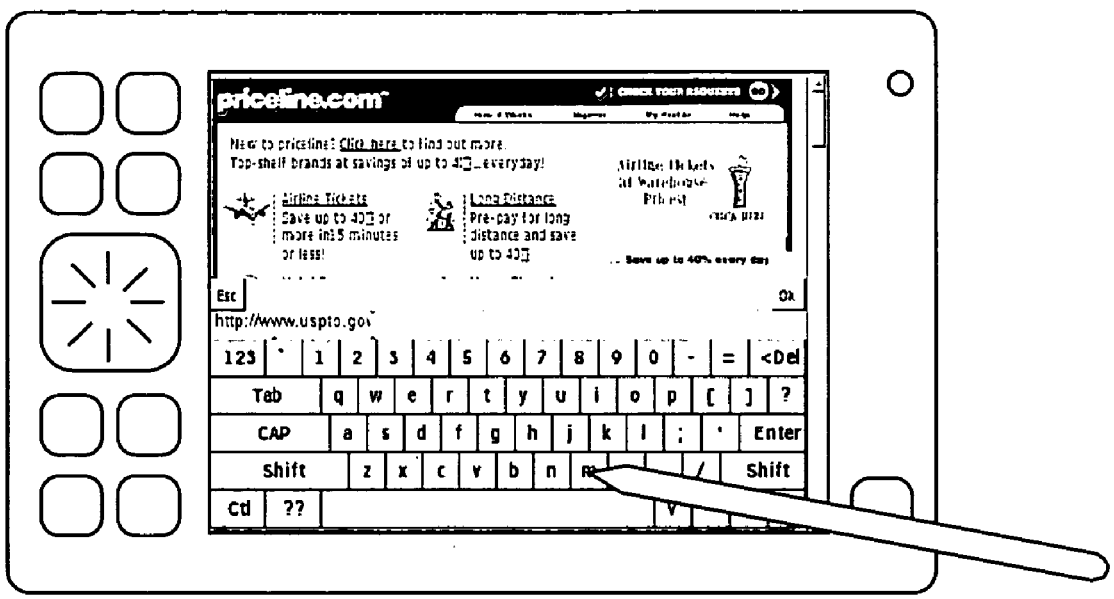
FIG. 113 illustrates how the user can use the same pop-up keyboard to enter URLs that allow him or her to access desired websites.

FIG. 113 illustrates that the pop-up keyboard routine can be used for other purposes besides entering text in text entry field. Although it is not represented in the pseudocode of FIGS. 109A through 109C, the pop-up keyboard can also be used to enter the URLs of web pages a user would like to see displayed on the thin client.

Figure 114:
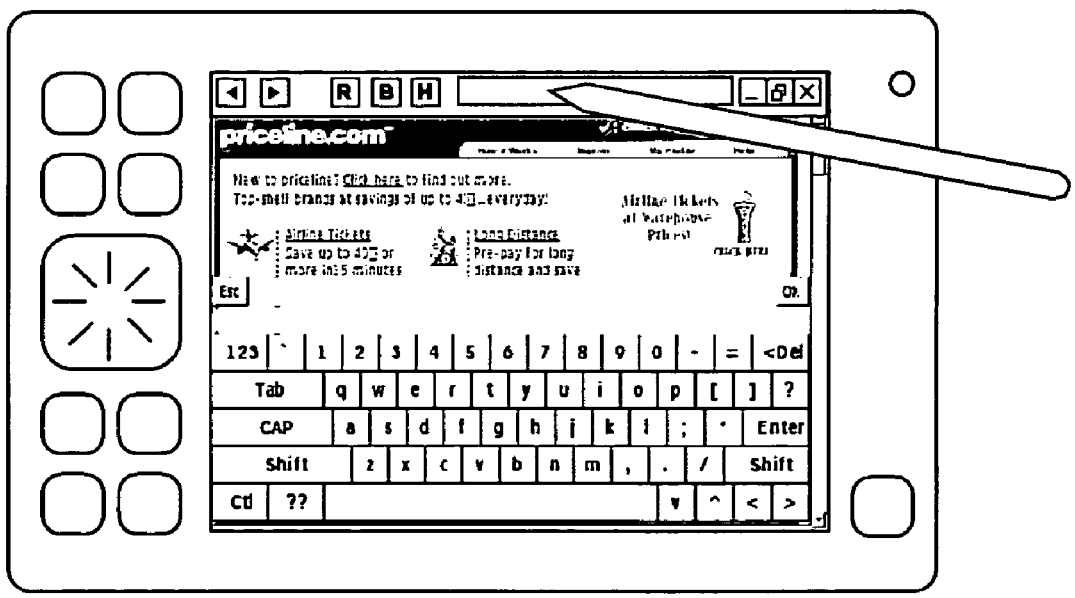
FIG. 114 is virtually identical to FIG. 13 except that it illustrates an embodiment of the invention having a toolbar at the top of the thin client computer screen that includes graphical user interface buttons and a URL text entry field.

FIG. 114 is virtually identical to FIG. 113, except it illustrates an embodiment of the invention that has a button bar, or Toolbar, at the top of its graphical user interface. This button bar includes at its leftmost end back and forward buttons of the type commonly found in Web browsers. It also includes buttons labeled R, B, and H that correspond to a refresh button, a bookmark button, and a history button, which are also functions commonly found on Web browsers. The button bar also includes an URL text entry field, which if clicked will cause the pop-up keyboard shown in FIG. 114 to appear. When the pop-up keyboard is not being displayed, this text entry field displays the URL of the current web page displayed on the thin client's screen. In one embodiment of the invention a user can select whether or not to display such a toolbar by pressing a hardware button. In this embodiment, even when such a tool bar is not shown the user can use hardware buttons to invoke some of the more common web browsing functions, such as the back command and forward commands.

In other embodiments of the invention, such a graphical user interface Toolbar would preferably also include buttons or menus allowing the user to access other functionality of the browser, including changing the zoom and/or relative layout size of a web page's display.

Returning now to FIG. 109B, if the user clicks on a hot zone of a button or menu item control, function 10980 causes functions 10981 and 10982 to be performed.

Function 10981 changes the appearance of the button or menu item appropriately. In the case of a button, the bitmap associated with the button is redrawn to indicate the button is being pressed. In the case of a menu item, either a submenu will be display, or the display of the menu item will be removed, depending upon whether or not a final selection has been made.

If a final selection has been made in the case of a menu item, or the button has been pressed and released, function 10982 sends the button's or menu item's control ID and an indication that it has been selected up to the browser, which responds by causing the corresponding button or menu item control object on the browser to act as if it had been clicked.

If the user clicks on the hot zone associated with another type of thin client control, function 10983 changes the appearance of the control's bitmap on the thin client's display accordingly. For example, in the case of a check box, a check would either be displayed or removed from the display of the control on screen. Then step 10985 stores the corresponding state change in association with the control object. As stated above, in the embodiment being described, the state of such control objects are not communicated to the browser until the browser requests such information, in order to reduce communication demands.

If the user clicks on any other portion of the thin client's screen not associated with the control interface of the thin client program or its computer, functions 10986 and 10987 send an event corresponding to that click up to the proxy browser along with the screen location at which it occurred. As was described above with regard functions 10562 through 10556 of FIG. 105B, the browser will transform the location of such a click to the corresponding location on its virtual screen, and will respond to such a click as if it occurred upon the screen the browser thinks it is drawing at the resolution of the virtual screen. In some embodiments, to further reduced communication demands, the thin client will only report such other clicks to the browser if it has reason to believe they corresponds to a user input the proxy's browser is supposed to respond to.

Referring now to FIG. 109C, if the thin client receives a query from the proxy browser asking the state of one or more control objects, function 10988 causes function 10989 to query the state of the corresponding controls on the thin client, and function 10909 to transmit that state information to the proxy browser. As was described above with regard to function 10518 of FIG. 105A, the proxy browser will then return such requested information to the part of the browser which requested it, as if that information were part of the current state of the corresponding control objects associated with the virtual screen.

If the user of the thin client enters the command to scroll its screen, functions 10991 and 10992 upload that scroll command to the proxy. This causes the functions 10520 through 10534 described above with regard to FIG. 105A to generate and download a new download stream for the display of the current web page at the newly scrolled position.

If the user enters the command to change the zoom, i.e., scale, of the image displayed on the thin client, functions 10993 and 10994 upload a corresponding zoom command to the proxy. This causes the functions 10536 and 10552 described above with regard FIG. 105A to cause a new download stream to be downloaded to the thin client for display of the current web page at the new zoom setting.

If the user enters the command to change the virtual resolution of the thin client's display, that is to change the resolution at which the virtual screen on the proxy browser is laid out, functions 10995 and 10996 upload the selected virtual resolution to the proxy. This causes functions 10554 through 10560, described above with regard FIG. 105B, to have the virtual screen re-laid out at the new resolution and a corresponding downloads stream to be sent to the thin client, so it can display the portion of the virtual screen corresponding to the window at the current zoom setting upon the thin clients screen.

As indicated at the bottom of FIG. 109C, if the user enters another command associated with the thin client's control graphical user interface, function 10997 will cause a correspondingly appropriate response, indicated by the ellipses 10999 to be performed. Such other functions can include the selection of bookmarks, the accessing of bookmarked web pages, back and forward functions, or any other function that can be part of a browser's user interface. Such demands can be selected by use of physical buttons or other physical inputs on the thin client computer, by the selection of graphical objects, such as buttons, menu item, or dialog box controls, or virtually any other known graphical user interface technique.

Figure 117:
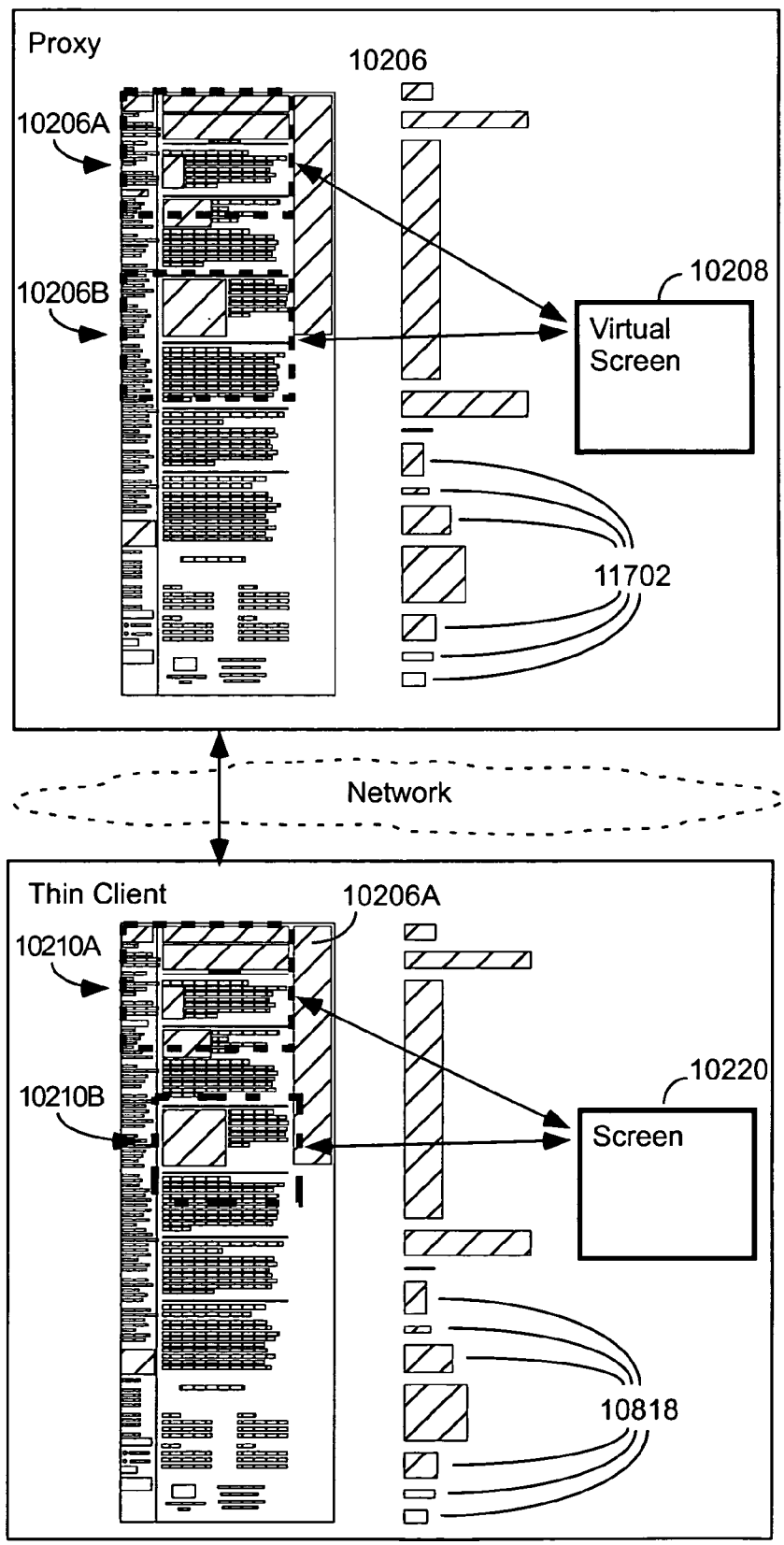
FIG. 117 is a schematic illustration used to help explain the operation of the pseudocode illustrated in FIGS. 115 and 116.

FIGS. 115 through 118 relate to an alternate method for enabling a thin client computer to browse the web through a proxy server. In this embodiment the entire layout 10206 of a web page created by the proxy computer is downloaded to, and cached by, the thin client, as indicated in FIG. 117. As will be described, this allows the thin client to scroll within the layout at substantially higher speeds, although it can increase the total number of bits downloaded, since it attempts to download the entire layout of, and all images for, each web page viewed.

FIG. 115 illustrates portions of the proxy browser's code 11500 that can be used with such a page layout caching scheme.

In this embodiment of the invention if the proxy browser receives a request for a web page from the thin client, functions 11502 causes functions 11504 through 11524 to be performed.

As indicated by the pseudocode associated with function 11502 in FIG. 115, in this particular web caching embodiment the thin client can request a web page with a desired view setting for that page, including a desired virtual resolution, zoom setting, and view window position. This is done to allow a user to associate such view settings with a bookmark, including a particular URLs or a portions of a URL path name, so as to allow the user to automatically see such web pages at a desired virtual resolution, zoom setting, and view window position, without having to separately enter such setting values each time the page is requested. This, for example, would allow a user view commonly accessed web pages with the display automatically zoomed in on a desired portion of that page using text of a desired size.

Once a request for a web page has been received from the thin client, function 11504 on the proxy browser requests that web page from the server identified in the URL of the request from the thin client. When the web page is received from the server function 11506 causes functions 11507 through 11516 to be performed.

Function 11507 causes the layout engine of the browser on the proxy to lay out the received web page at the virtual screen resolution associated with the view setting specified in the web pages request. This layout is made using scaled string measurements for substituted fonts, in a manner similar to that described above with regard to functions 10606 through 10618 of FIG. 106A. The scale factor used is determined by the view setting specified in request for the current page.

Function 11508 specifies a virtual screen position relative to the resulting layout that will include the view window implicit in the view setting of the current request. Thus for example, if the view setting requests to see the rightmost portion of a 640 by 480 virtual screen resolution output, and the layout is forced to have a width of 800 pixels, the virtual screen position would extend from approximately pixel column 160 over to pixel column 800 in the layout.

Function 11518 causes functions 11520 to scale and subpixel-optimize each image 11702, illustrated schematically in FIG. 117, received in association with the web page being laid out.

Once all the images referenced in the web page have been received, scaled, and subpixel optimized, function 11522 causes function 11523 to create a display list for that layout, and to compress that display list and all its associated subpixel-optimized, scaled-down images. Then function 11524 transmits that compressed data to the thin client in a download stream that includes the web page's layout, followed by its scaled-down, subpixel-optimized images.

If the user receives a request from a thin client to rescale and subpixel-optimized one or more images previously downloaded at a different scale, function 11526 through 11532, rescale and subpixel-optimize, compress, and download such images to the thin client. This allows the user to view the web page at a different subpixel optimized size if he or she seeks to view the downloaded web page layout at a different zoom setting.

If a screen input's event is received from the thin client function 11534 causes functions 11536 through 11542 to be performed.

Function 11536 tests to see if the page layout coordinates associated with the command corresponds to a portion 10206A of the web page layout 10206 currently mapped to the proxy browser's virtual screen 10208, shown in FIG. 117.

If not, function 11538 scrolls the virtual screen to a new portion 10206B of the layout that includes the layout coordinates associated with the command.

Function 11540 calculates the virtual screen coordinate corresponding to the page layout coordinate of the received screen event. Then function 11542 places the input screen event with its virtual screen coordinates in the browser's event queue, so that it can respond to that event, such as the clicking of a link, as if the user had clicked at its corresponding virtual screen coordinate on the virtual screen itself.

FIG. 116 is a highly simplified pseudocode description of portions of the thin client code that can be used to support the page layout caching scheme illustrated in FIGS. 115 and 117.

If the thin client starts to receive a download stream containing a page layout's display list, function 11602 causes function 11604 and 11606 to be performed.

Function 11604 sets the mapping of the view window (such as the view window 10210A shown in FIG. 117) relative to the page layout, and then calculates the current display scale factor based on that mapping.

Function 11620 displays any portion of the downloaded page layout that falls within the current view window, using the current scale factor. This process includes the functions 11622 through 11630.

Function 11622 displays each string element that occurs within the current view window with font sizes that are a function of the current scale factor. When it does so it adjusts, if necessary, for any disproportionate changes in the relative size of characters that might result from the uneven effects of font hinting as the pixel size at which such characters are displayed changes. It does this by using techniques for compensating for the discontinuities and disproportionalities, such as changing spacing between characters, similar to those that have traditionally used to provide a WYSIWYG correspondence between the display of text on a computer screen and its appearance when printed at a much higher resolution. If font bitmaps having a different size that than previously displayed are required, font bitmaps for such differently sized characters can be either accessed from storage on the thin client, accessed from a network font server, or rasterized at the needed size from a font outline.

If the display created by function 11620 is at a different scale factor than that for which the bitmap images 10818 have been scaled-down, function 11624 causes functions 11626 through 11630 to be performed. These request the proxy server to rescale at the new scale factor and subpixel-optimize all images that are totally or partially within the view window. Then the bitmaps of the same images are locally rescaled from the formerly downscaled and subpixel-optimized images 10818 stored on the thin client and displayed on the thin client screen to provide a temporary representation for such images. Then, when the requested images that have been rescaled from the original, higher-resolution bitmaps associated with the web page have been received by the thin client from the proxy server, they are drawn at the appropriate location on the display screen.

In some embodiments, when a user changes the zoom of the display, the bitmaps of any images corresponding to a portion of the page on the screen at the new scale factor are displayed with a quick, but crude representation of the image generated on the thin client to provide the user a temporary representation of such images to be used until the properly subpixel-optimized versions of the images have been downloaded. Such quick representations are relatively simple to generate when the new scale factor is an integral ratio of the scale factor of the previously downloaded bitmaps. When this is not the case, the temporary representation could be produced in any of a number of ways. These include displaying them as images having integral scaling ratio that have been either cropped or scaled to an integral ratio smaller than the proper scale so to not take up more space than the properly scaled images that are intended to over draw them.

If the user generates a screen input to be sent to the proxy browser, function 11632 through 11636 transform the thin client screen coordinates of the input to a corresponding page layout coordinate. Then the screen input and corresponding page layout coordinate are uploaded to the proxy browser. The proxy browser then responds to such an input using the functions 11534 through 11542 described above with regard FIG. 115. This causes the proxy browser to respond to such screen input as if the user had clicked on a corresponding portion of the web page on the proxy browser's virtual screen.

Caching schemes, such as that just described with regard FIGS. 115 through 117, that allow the thin client to store more than the portion of a web page currently displayed on a screen, can be used to allow a user to scroll and/or zoom more rapidly relative to web page's content. This is particularly true if the thin client has a relatively low bandwidth to its proxy server.

The embodiment of such a caching scheme that has just been described operates relatively well even with bandwidths as low as those associated with current digital cellular communication rates commonly available at the time of this application. This is because all the content, except images, included in most web pages can normally be compressed to fit into 3,000 bytes or less. Thus, at commonly available current digital cellular communication rates, the entire text portion of most web pages could be downloaded in several seconds, and the initial portions of it could be drawn in even less time. Of course the downloading of the images might take more time, but all but large images at the start of the web page would commonly be displayed within a few seconds. And with faster communication links this delay can be reduced tremendously.

Figure 118:
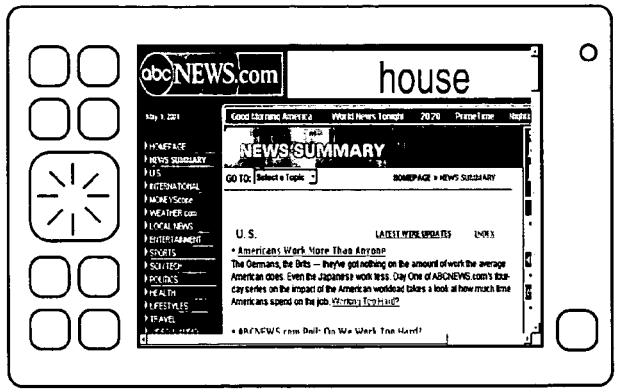
FIGS. 118 through 120 illustrate how the present invention can allow a user to rapidly select a portion of a web page or a screen and then zoom to that selected portion.
Figure 119:
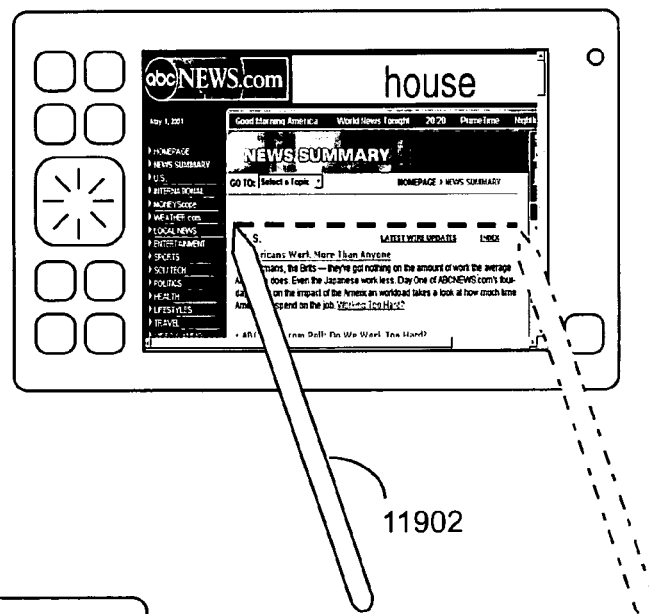
Figure 120:
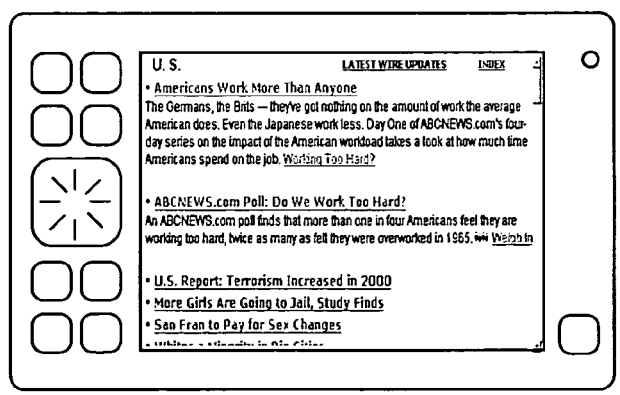

FIGS. 118 through 120 illustrate aspects of the invention that can be used in virtually any Web browsing environment, but which are particularly useful when browsing the Web on small screens. This includes use on small screen devices such as the thin client computers discussed above. Because these aspects of the invention involve a zoom into or out of a selected portion of a web page, they can be made to work quickly on such thin client computers by use of a layout caching scheme of the type just described.

FIG. 118 shows the view of a standard web page that has been laid out at a virtual resolution of 640 by 480 and then downscaled and subpixel-optimized for display on a 320 by 240 screen. Such content is readable by those with good eyes at the distance at which most people commonly use handheld computers. However the content of most Web pages can be made even easier to read if it is displayed at a larger size. Since most Web content is laid out in a plurality of columns, it would often be desirable to be able to quickly zoom a display to the top of a column at which a user would like to start reading. In the interface shown in FIGS. 119 and 120 a user can do this by dragging the pointing device 11902 across the desired text column at a vertical position that the user would like displayed near the top of the display screen in the zoomed view. When the display is in the mode to perform this type of zoom, a horizontal linear drag of the type shown in FIG. 119 will cause the display to scale the width of the web page layout indicated by the drag to fit the width of the screen. In the example shown in FIG. 119 this user input would cause the display to be zoomed as shown in FIG. 120.

Preferably the user interface also allows a user to drag a selection box around an area in the web page layout shown on the screen, and the system will zoom the display of the web page so that the selected area in the web page fits the screen.

It is also preferred that in such drags the user be allowed to drag the pointing device across a boundary associated with an edge of the screen, and if this is done the portion of the web page shown on the screen will scroll in response, to allow the user to select to perform a zoom to fit to a width, height, or area within the web page layout that is too large or improperly positioned to fit totally within the screen as the start of such a drag. If such a drag selects a portion of the layout too large to fit on the screen at the scale factor displayed during the drag, it would change the scale factor so as to decrease the size at which text and images were displayed.

When we say that a selected width, height, or area in the layout is scaled to fit the screen, we mean that it is scaled to have its largest dimension ranges between two thirds and the full corresponding dimensions of the screen. Normally it would be preferred that such scaling make the selected length or area have a largest dimension that ranges from eighty or ninety percent to the full corresponding dimension of the screen.

FIGS. 121 to 128 illustrate a feature of the invention called zoom-click. This feature allows a user to more easily and accurately select items within a screen that is seen with a low resolution, which is very small, or which is being used with a pointing device that can not be easily positioned with accuracy relative to desired locations on a screen. This is particularly useful with dealing with cell-phone sized screens, with touch screen devices using fingers as a pointing device, and/or for touch screen devices used in an environment such as a moving car in which it is difficult to accurately place the pointing device.

In zoom click when the user clicks down at a given location in a screen, the portion of the screen upon which he or she has clicked is shown at an expanded scale. The user is then free to navigate in this expanded representation with the pointing device held down until the pointing device is in the desired location. At this point the user can stop pressing down, and release the pointing device, causing the current location at the time of the release to be treated as the selected location for purposes corresponding to a traditional graphical user interface click.

With zoom click double clicks can be represented in different ways. One of the easiest is merely to record a quick secondary click and release shortly following a zoom click and near the same location as the zoom click as converting the zoom click into a double-click.

In preferred embodiments of the invention where a user can move the cursor without a down click, such as with most non-touch screen pointing device, the pointer movement in the enlarged view during the down click in a zoom click to occur at the same rate as normal pointer navigation. This means that a user will have approximately twice the pointing resolution as he otherwise would.

It is also preferred that when a user gets to the edge of the screen while moving the pointer during a sustained down click in zoom click mode the image will scroll to enable the user to navigate the entire page in this mode.

In the example of FIGS. 121 through 128, a clamshell cellphones/computer 120C is shown. In this example, it is assumed that the cellphones has a 320 by 240 whole pixel resolution and color subpixel addressability. Of course in other embodiments of the invention other resolutions could be used. For ease of use, the cellphone is assumed to have a touch sensitive screen that can be operated by a user's finger.

Figure 121:
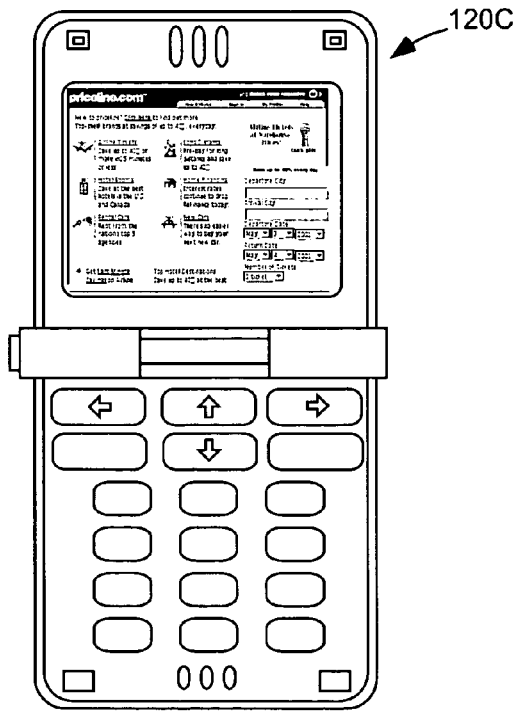
FIGS. 121 through 128 illustrate a zoom-click aspect of the invention that allows a user to view and select portions of a web page or a screen with greater accuracy.

FIG. 121 shows the cellphones with the same image of the priceline.com Web page shown in FIGS. 11 and 110.

Figure 122:
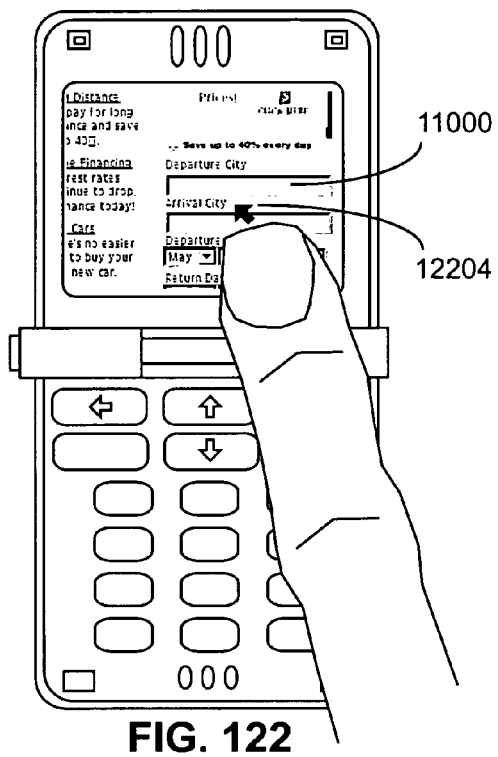
Figure 123:
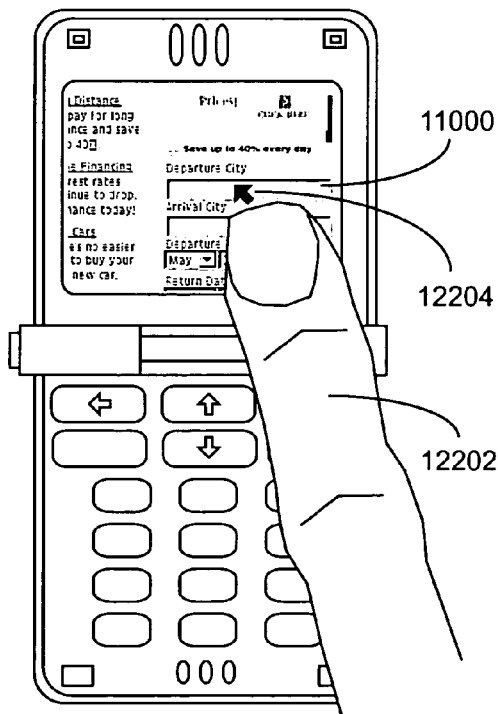
Figure 124:
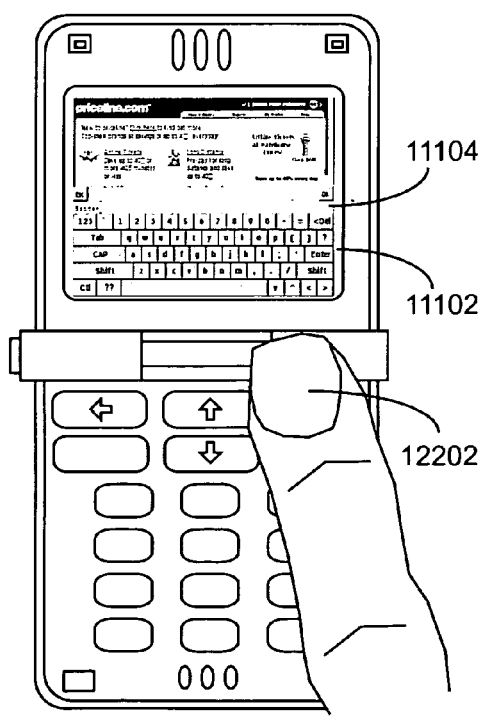

FIG. 122 shows what happens when, while in zoom-click mode, the user tries to press his or her finger 12102 down upon the screen to select the same text entry field 11000 discussed above with regard FIG. 110. It is often difficult to estimate in advance the exact location at which a cursor will be placed when one touches one's finger to a touchscreen. Zoom click helps with this, since it allows the user to see the position of the cursor 170 that results from a finger touching the touch screen before any selection is made. It also shows the screen at a larger view scale to make it easier for the user to position the cursor 12204 on the desired link or control, such the desired text entry field 11000 shown in FIG. 123. Once the user removes his finger from the touchscreen, as shown in FIG. 124, the pop-up keyboard 11102 appears, just as it did in FIG. 111, described above.

Figure 125:
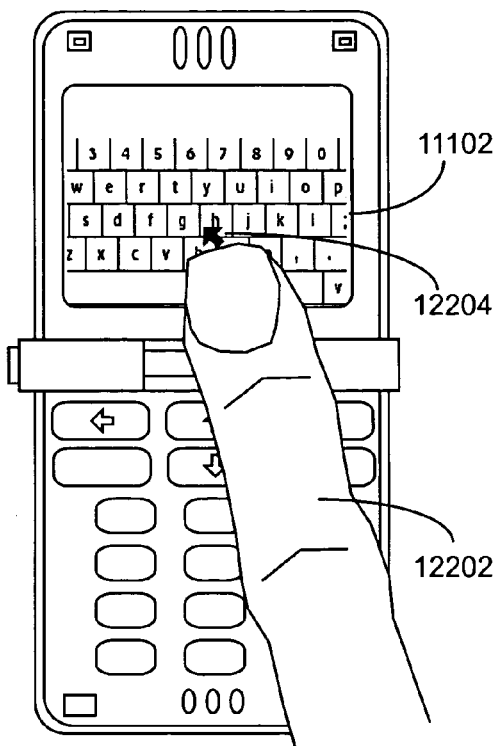

As shown in FIG. 125, when the user, while in zoom click mode, tries to touch a desired letter in the pop-up keyboard 11102, in this case the letter "b," the image of the portion of the keyboard touched increases its scale. In the example shown in FIG. 125 the user has not exactly position the cursor 12204 at the desired location at the time of his initial pressing of the touchscreen. The user can easily correct this problem in zoom-click mode by dragging his finger 12202 to position the cursor 11102 at the location shown in FIG. 126. If the user then removes his finger from the screen, the screens image will revert to its normal scale, which enables the entire pop-up keyboard 11102 to be shown to allow rapid selection of the next character, no matter where it might lie within the keyboard.

Figure 126:
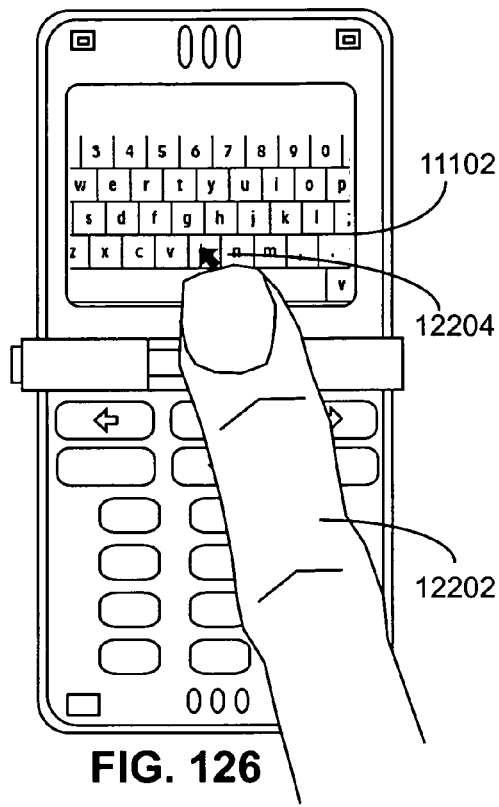
Figure 127:
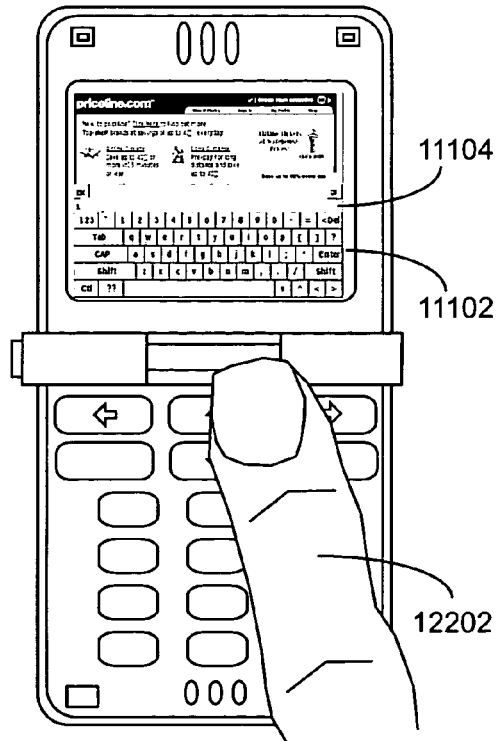

As shown in FIG. 127, the letter "b" selected in FIG. 126 is shown as having been entered in the pop-up keyboard's text entry field 11104.

Figure 128:
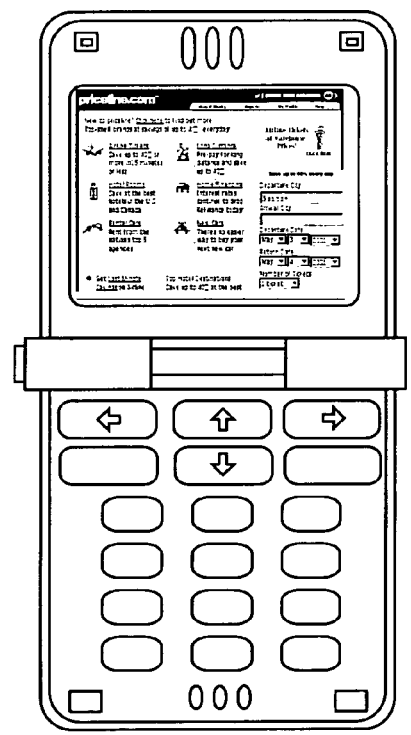

If the user continues selecting characters by the process shown in FIGS. 125 through 127 he or she will be able to enter an entire string of text followed by the selection of the enter key that will cause the desired text to be entered at the desired location in the web page, as indicated by FIG. 128.

In many embodiments of this aspect of the invention, the zooms used in zoom click involve expanding the bitmap previously shown on all or part of the screen by an integral ratio, such as 2× or 3×. This allows such zooming to be performed virtually instantaneously, even by relatively low powered processors, making zoom click a very rapid user interface.

FIGS. 129 through 137 illustrate an aspect of the invention that enables a user of a Web browser to select a portion of text from a web page to be the re-flowed, or re-laid out, across line boundaries at a substantially larger scale factor. Such re-flowing of text is particularly useful on displays having small screens, since it allows selected Web text to be displayed with much larger fonts, while at the same time allowing entire lines of such text to fit within such screens. This enables such lines to be read quickly, without the need to repeatedly horizontally scroll back and forth to read successive lines of such text.

Regardless of how high the resolution of a small screen display is, the human eye can only see what it displays at a relatively large resolution if the display is held relatively close. This aspect of the invention enables Web text to be display wrapped across lines that fit within the width of a display at a relatively large scale factor. For example, it allows the user of a handheld computer with a four inch diagonal screen to display text at a sufficiently large scale to be seen by a group of people who are standing five or six feet away. Similarly it would allow a user to view text on cellphone or wristwatch sized display without having to hold them close to his or her face. It can also be used with normal sized computer display screens to display Web text to people who are at a relatively large distance from the screen, or who are visually impaired.

FIG. 129 provides a highly simplified pseudocode description of programming 12900 that could be used by a client computer to redisplay Web text according to this aspect of the invention.

It should be understood that this aspect of the invention is not limited to use on client computers. In fact, with modification this aspect of the invention can be used in viewing visual output generated by applications other than Web browsers, such as in systems of the type described below with regard FIGS. 140 and 141.

Many web pages are designed to have their text laid out in different columns, that is, in different horizontal positions relative to such a layout. A web page can indicate such different desired horizontal displacements in multiple different ways, including the use of tables and frames. It is preferred that system used with the method is capable of displaying a web pages text in such a multi-column layout that reflects such indications of different desired horizontal displacements.

If the user selects an area of a web page layout for text re-flow in a single column at a new scale factor, function 12902 causes function 12904 through 12908 to be performed.

In some embodiments of the invention such a selection is made by dragging a pointing device, such as the stylus 11902 shown in FIG. 130 across the portion of the width of a web page that the user desires to have re-flowed at a larger scale across the width of a display screen or window. This is similar to what was discussed above with regard to FIG. 119, except that the method currently being discussed allows text to be re-flowed across line boundaries, letting a selected column of text be displayed with much larger fonts while at the same time allowing whole lines of such text fit within the screen.

Function 12904 of FIG. 129 selects all strings and corresponding underlining (i.e., labeling of text as being a link) in the layout of the current web page that are substantially within the selected layout area.

FIG. 131 illustrates the top portion of the layout 10206A, similar to that shown in the bottom half of FIG. 117, of the web page shown in FIG. 130. In FIG. 131 the dashed rectangle 13102 represent the portion of the web page's layout corresponding to the column selected by the user in FIG. 130.

In some embodiments of the invention, a string will be considered to be within the selected area only if a substantial portion, such as two-thirds or three-quarters of its length fits within the area selected by the user. For example, in FIG. 130, the user intended to select the text at the right hand portion of the screen displayed in that figure. However, in the example of FIG. 130 the user failed to exactly select the width of that intended column with the drag of the stylus. Nevertheless, because function 12904 selects all strings that are substantially within the selected area, the text re-flow will operate as if the user had selected exactly the intended column.

FIG. 132 illustrates an initial portion of the strings in the layout of the web page shown in FIG. 131 that falls within the user selected area. In this figure, underlining indicates portions of text that correspond to links.

Once all of the strings in the selected area have been selected, function 12906 labels any groups of one or more successive strings whose closeness in the layout or other characteristics indicate they are part of the same paragraph. This is indicated in FIG. 132 by the paragraph brackets 13202.

As indicated in FIG. 132, this method might not detect all groupings of characters that are paragraphs, but it does detect many of them without the need to reference the HTML corresponding to the text. In the embodiment of the invention being described, such HTML is stored on the proxy server, meaning that such an access would require the delay associated with communication between the client computer and a proxy server. In other embodiments, particularly those in which the client computer has a full browser resident upon it, or those having a high access bandwidth link to a proxy server, access to the HTML code could be used to more accurately determine how the selected strings should be grouped in paragraphs. In other embodiments, the layout information downloaded to a proxy server could contain any information about paragraph boundaries contained within a web pages HTML.

Once the selected strings have been grouped into paragraphs, function 12908 re-flows the text of each paragraph using the selected expanded scale factor across the width of the display screen (or display window if the image is being shown on less than an entire display screen).

This text re-flow process is illustrated in FIG. 133, in which the strings in the top portion of FIG. 132 are laid out at a new scale factor. In the example being shown, the text of FIG. 130 has been selected to be re-flowed at twice its original size within the same screen. Preferably the user interface of the thin client allows the user to select a plurality of different scale factors for use with the selected-text-reflow function, ranging from rather modest to rather extreme increases in font size.

In FIG. 133 underlining is used to represent something different than it does in FIG. 132. In FIG. 133 the text on each line that came from a common layout string in FIG. 132 is shown with continuous underlining. Underlining gaps between portions of text on the same line in FIG. 133 that come from different strings in FIG. 132 are exaggerated to make their difference more readily visible. In FIG. 133 all of the individual strings from the original layout shown in FIG. 132 that have been wrapped across a line boundary are indicated by a arrow from their portion on one line to their following portion on the next line.

FIG. 134 provides a schematic illustration of how the selected strings of the original layout shown in FIGS. 130 and 131 look once they have been re-flowed at approximate twice the size on the thin client's screen. As can be seen by looking at FIG. 134, such a text re-flow makes Web text much easier to view from a distance. Re-flowing the same text at 4× or 6× instead of 2× would make it possible to show the same web content to people at quite a distance from the display screen.

Figure 135:
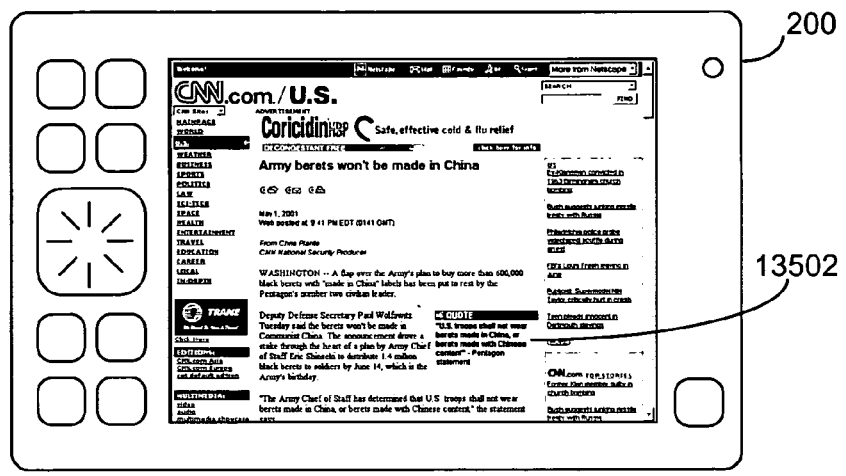
Figure 136:
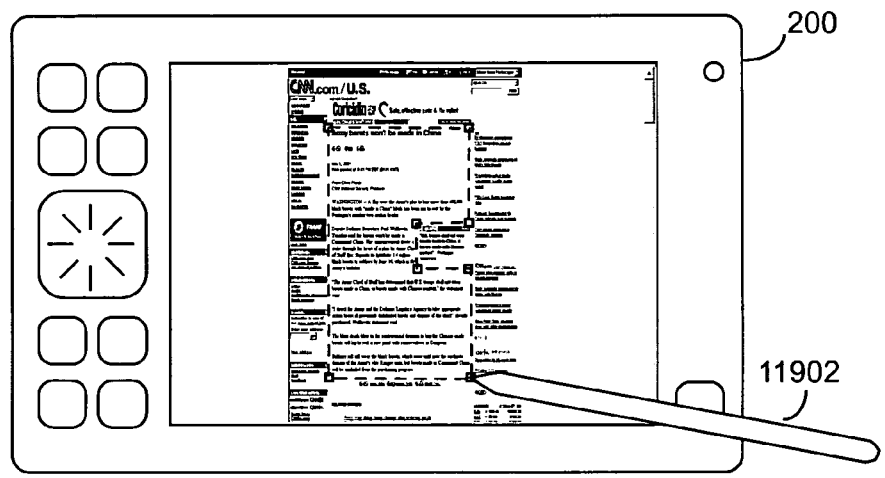
Figure 137:
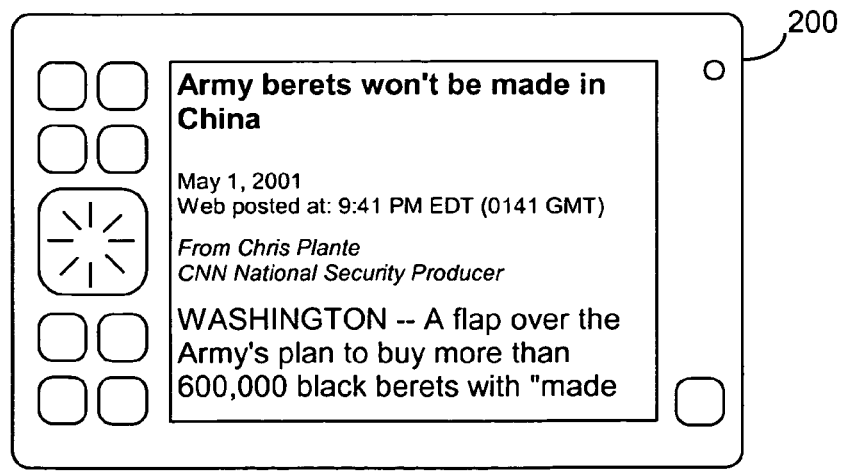

FIGS. 135 through 137 illustrate another method that can allow a user to select a portion of text to be re-flowed.

FIG. 135 illustrates a portion of a web page having a central column of text that has intruded into it one or more portions of other text.

FIG. 136 illustrates how the user obtained a zoomed out view of the entire web page's layout. In many actual embodiments, text greeking would be used to indicate portions of text too small to be represented in such zoom-out views as individual characters. Such a zoomed-out view could be generated quickly on thin client computers such as those described above with regard FIGS. 115 through 117 in which a web page's entire layout was stored on the thin client, itself.

In FIG. 136 the user has selected a mode that allows her or him to define a polygon shaped area upon the zoomed-out web page view by clicking the display of the web page at corners in such an area. Once this is been done, the selected area will be used by the function 12904 shown in FIG. 129 to select which text is to be re-flowed.

FIG. 137 illustrates how the selected text will appear once it has been re-flowed and displayed.

Figure 138:
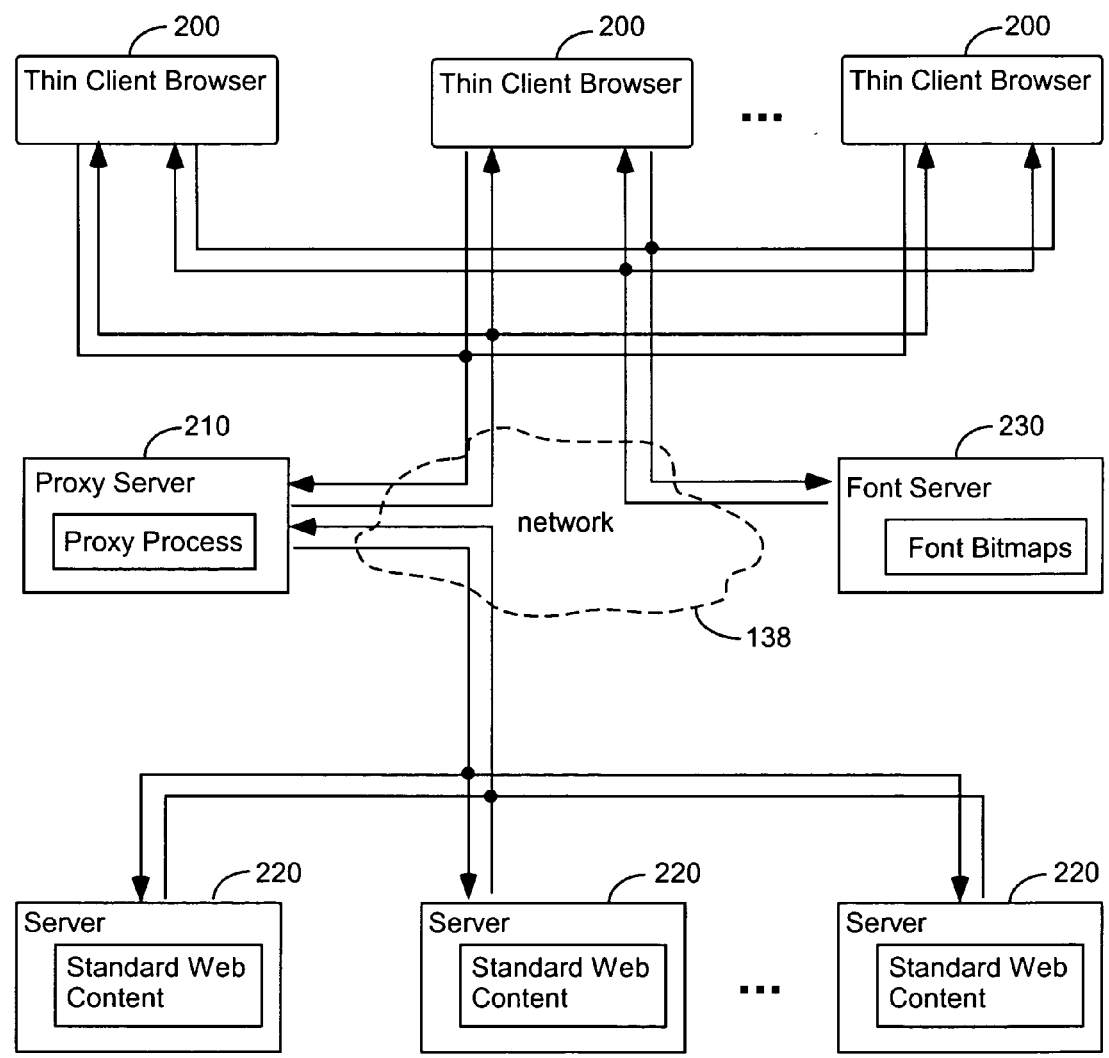
FIG. 138 is used to illustrates how multiple client computers can be programmed to access a common font server and/or a common proxy server.

FIGS. 138 and 139 provides more description of the font server 230 described above with regard FIG. 2.

FIG. 138 corresponds to FIG. 2, except that in it there are a plurality of the client browsers 200, each of which accesses content from one or more servers 220 through the same proxy server 210 and each of which accesses fonts from the same font server 230.

This is because the software sold, licensed, or distributed for use in each of the thin client browsers has been programmed to seek fonts such clients do not have from the same font server 230 and to make Web requests through the same proxy server 210. Of course, in other embodiments of this aspect of the invention the thin clients could be programmed to select which of a common plurality of proxy servers to use based on such factors as their geographic location, or their Internet service provider. Similar considerations could be used by the thin clients to select from which of a common plurality of font servers they are to request and receive fonts.

FIG. 139 provides a highly simplified pseudocode description of programming 13900 that can be used on a font server of the type illustrated in FIG. 138. This font server could also be used by normal browser computers, as well as by computers running applications other than Web browsers.

If the font server receives an HTTP request from a computer for a character of a particular font, function 13902 causes steps 13904 through 13922 to be performed.

The particular embodiment of font server code shown in FIG. 139 is designed for use with a protocol that specify each character desired for particular font at a particular size with a separate HTTP request. It specifies the desired font, font size, and character as part of a URL pathname. Of course, in other embodiments font servers could allow HTTP requests to specify more than one font, and could specify fonts other than with URL pathnames.

In systems that request each character-font shapes separately, it is preferable that the HTTP protocol 1.1 or later be used, since it allows multiple HTTP request to be handled by a server from a given client computer without having to open and close a separate connection for the handling of each such request.

In the embodiment of the invention shown in FIG. 139, if the font server determines that it currently has stored a font bitmap corresponding to the URL pathname specified in the request, function 13904 causes function 13906 to send that font in an HTTP response to the network address from which the URL request came, and then function 13908 charges an account associated with the transaction. Such a downloaded font could be either a font bitmap or a font outline description.

Such a charging of an account is not used in all embodiments of the invention. In some of those in which it is used, the account charged is one associated with the computer to which the font is sent. In other embodiments, the charge is to an account of a party associated with the web page that included a specification for such fonts. In yet other embodiments, the charge is to an account associated with a proxy server of the type described above, or to a user of the services of such a proxy server.

If the requested font is not in the font server's storage and it is a bitmap for which the font server has a corresponding outline font, function 13910 causes function 13,912 through 13,922 to be performed.

Function 13912 generates a font bitmap having the attributes, such as size and possible transformation, indicated by the font pathname of the HTTP request. This function includes determining if the requested font's pathname indicated that a subpixel-optimized version of the font is desired. If so, function 13914 and 13916 generate a subpixel-optimized version of the font, preferably using the non-linear color balancing method described above with regard FIGS. 55 through 96.

Once the font bitmap has been created, function 13918 sends the bitmap over the network in an HTTP response to the requesting address. Function 13920 caches the font bitmap at an address corresponding to the pathname specified in the request. Function 13922 charges an account associated with the transaction, as discussed above with regard to function 13910, in embodiments where such charging is performed.

Figure 140:
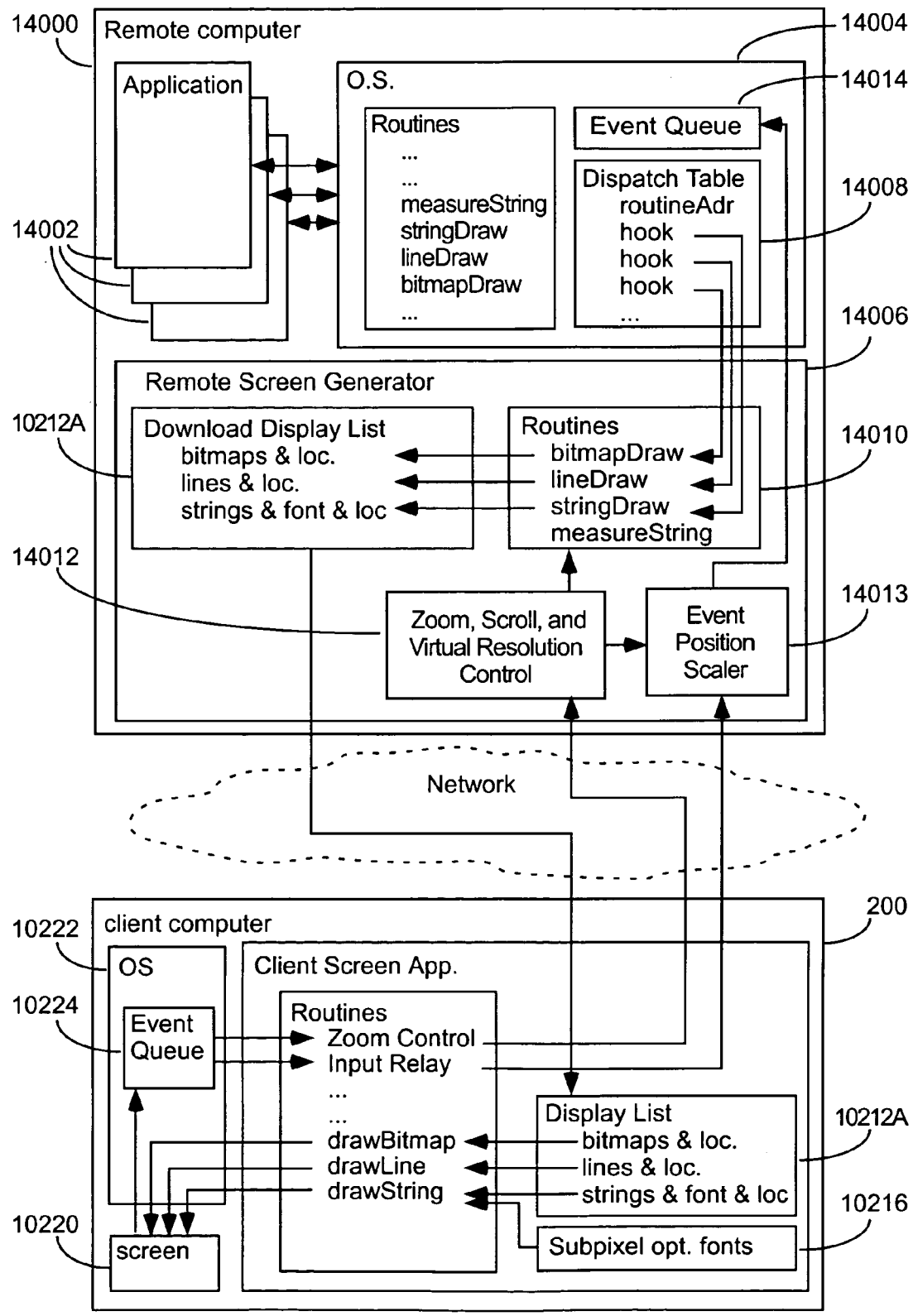
FIG. 140 illustrates how certain aspects of the present invention can be used to allow a client computer to view screens that are drawn by applications (which can include, but are not limited to, one or more web browsers) running on a remote computer in a scaled-down, subpixel-optimized manner by intercepting calls made by such applications to the remote computer's operating system.

FIG. 140 illustrate that certain aspects of present invention can be used to enable a thin client computer 200 to display digital content corresponding to the text and the images generated as screen output by one or more applications running on upon a remote computer 14000. Such applications can include Web browsers, spreadsheets, word processors, database programs, or virtually any other type of software capable of generating screen displays.

The remote computer includes remote screen generator programming 14006, which includes hooks in the dispatch table 14008 of the remote computer's operating system 14004. These hooks intercept calls made by one or more of the applications 14002 to the operating system to draw text, shapes, lines, control objects, and bitmap's to a screen at a given display resolution. In some embodiments, such draw commands will actually cause content to be displayed on a screen associated with a remote computer, in others there will be no screen at the remote computer, and thus such draw commands will be made to a virtual screen. In the text that follows, for purposes of simplicity, I will refer to the video space to which these application thinks they are displaying graphic output and receiving user input on a given client computer as a virtual screen.

When one of the applications 14002 request the operating system to draw a display element, that call is intercepted by one of the hooks in the operating system's dispatch table, so as to make a corresponding call to a corresponding routine 14010 of the remote screen generator. In a manner similar to that described above with regard to FIGS. 102 and 106A through 106C, this causes a download display list 10212A to be created that is substantially similar to the display list 10212 described above with regard to FIG. 102 and the figures that follow it. A zoom, scroll, and virtual layout control 1412, corresponding to the controls 10214 through 10218 shown in FIG. 102, controls the mapping of the thin client's view window into the virtual screen and, thus, the display scale factor at which the elements drawn by an application into the virtual screen are drawn and positioned in the download display last 10212A. Preferably this includes subpixel optimization of image bitmaps, and font substitutions of the type described above with regard to FIGS. 106A through 106C.

Once the download display list has been created for a given virtual screen, it is compressed and downloaded to the corresponding client computer, which then draws it upon its screen in much the manner described above with regard to FIGS. 109A through 109C.

In some embodiments of the invention, individual draws to the virtual screen will have corresponding draw commands downloaded to the thin client. This, can be used to speed the rate at which minor changes to the thin clients screen can be made in response to corresponding changes to the virtual screen.

In the embodiment shown in FIG. 140, user input associated with screen locations are uploaded to the remote computer from the thin client, and they have their screen coordinates transformed to reflect the mapping between the thin clients view window and virtual screen. Once this is done such events are placed in the event queue 14014 of the remote computers operating system with their transformed screen coordinates so the associated application 14002 will respond to that event as if it had been entered upon the remote computer's corresponding virtual screen.

Many of the techniques used by screen sharing applications, such as LapLink, sold by LapLink, Inc., 18912 North Creek Parkway, Suite 100, Bothell, Wash., USA 98011, or pcAnywhere, Symantec Corporation, 20330 Stevens Creek Blvd., Cupertino, Calif. 95014, can be used in conjunction with an embodiment of the invention of the type shown in FIG. 140. In fact, when the remote computer in that figure has its own screen, the embodiment shown in FIG. 140 can be used to perform screen sharing between the client computer and the remote computer.

It should be appreciated that in embodiments in which the client computer has a reasonable amount of a computational power, the client and the remote computers can operate in a peer-to-peer manner. The remote computer can be a dedicated application server computer or it can be any other type of computer, such as a personal computer, including a desktop computers, laptop computers, or tablet computers.

Figure 141:
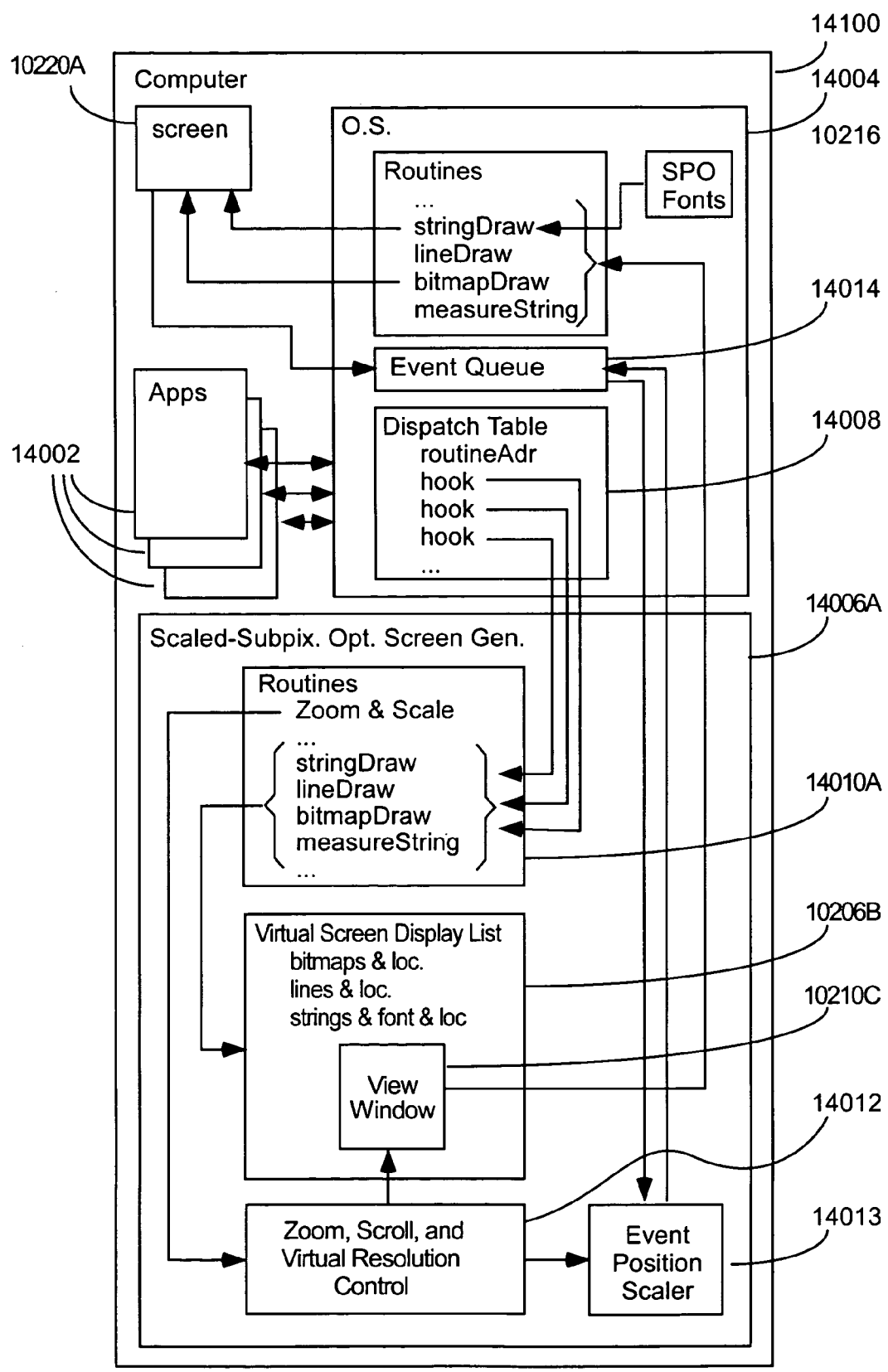
FIG. 141 illustrates how subpixel-optimized, scaled-down views can be had of screen output generated by application programs (which can include but are not limited to one or more web browsers) running on a given computer, even if those applications have not been programmed to generate such views, on the screen of that given computer, by intercepting calls to the computer's operating system made by such applications.

FIG. 141 illustrate an embodiment of the invention that is somewhat similar to that shown in FIG. 140, in that it uses hooks into the dispatch table 14008 of a computer's operating system 14004 to intercept operating system calls made by one or more applications 14002 in order to cause the screen displays generated by such applications to be scaled-down and/or subpixel-optimized according to aspects of the invention described above. It is different from the client-server embodiment shown in FIG. 140, in that it is designed to run on one computer system 14100, shown in FIG. 141.

In the embodiment shown in FIG. 141, when an application makes a call to the operating system to draw an element to a screen, the hooks placed in the OS dispatch table 14008 cause a corresponding draw routine within the programming 14010 of a scaled subpixel-optimized screen generator program 14006A to be evoked. This substitute draw routine draws a corresponding element to a virtual screen display list 10206B. It also causes any portions of such screen elements drawn into the part of the virtual screen that fits within a view window 10210C to be immediately displayed on the display screen 10220A of the computer 14100 by means of calling draw commands in the operating system, or by directly drawing to that screen themselves.

When an application program calls the operating system for a measure string commands, that commands is likewise intercepted so the call returns font metrics for a substituted font size in the manner described above with regard to functions 10608 through 10618 of FIG. 106A.

A screen event input into the computer's screen is taken from the operating system's event queue and passed to an event position scaler, which transforms the screen coordinates at which such an event was generated on the screen into a corresponding position in the virtual screen's layout represented by the display list, using the mapping of the view window into that virtual screen to control such a transformation. Once the coordinates of the event have been appropriately transformed, the event is returned to the operating system event queue so the operating system will respond to the event as if it have been entered onto the virtual screen.

An embodiment of the invention of the type shown in FIG. 141 would allow a user of a computer to subpixel-optimizize, scaled-down, zoom, and perform selected text re-flow upon screens generated by standard computer applications 14002, even if they have not been designed to support such functions.

In other embodiments of the invention not shown, the operating system of a computer can be modified to include functionality of the type shown in the scaled, subpixel-optimized screen generator 14006A shown in FIG. 141. In yet other embodiments of the invention, application programs 14002, including browser programs, can be modified to support all or much of such functionality directly.

Figure 142:
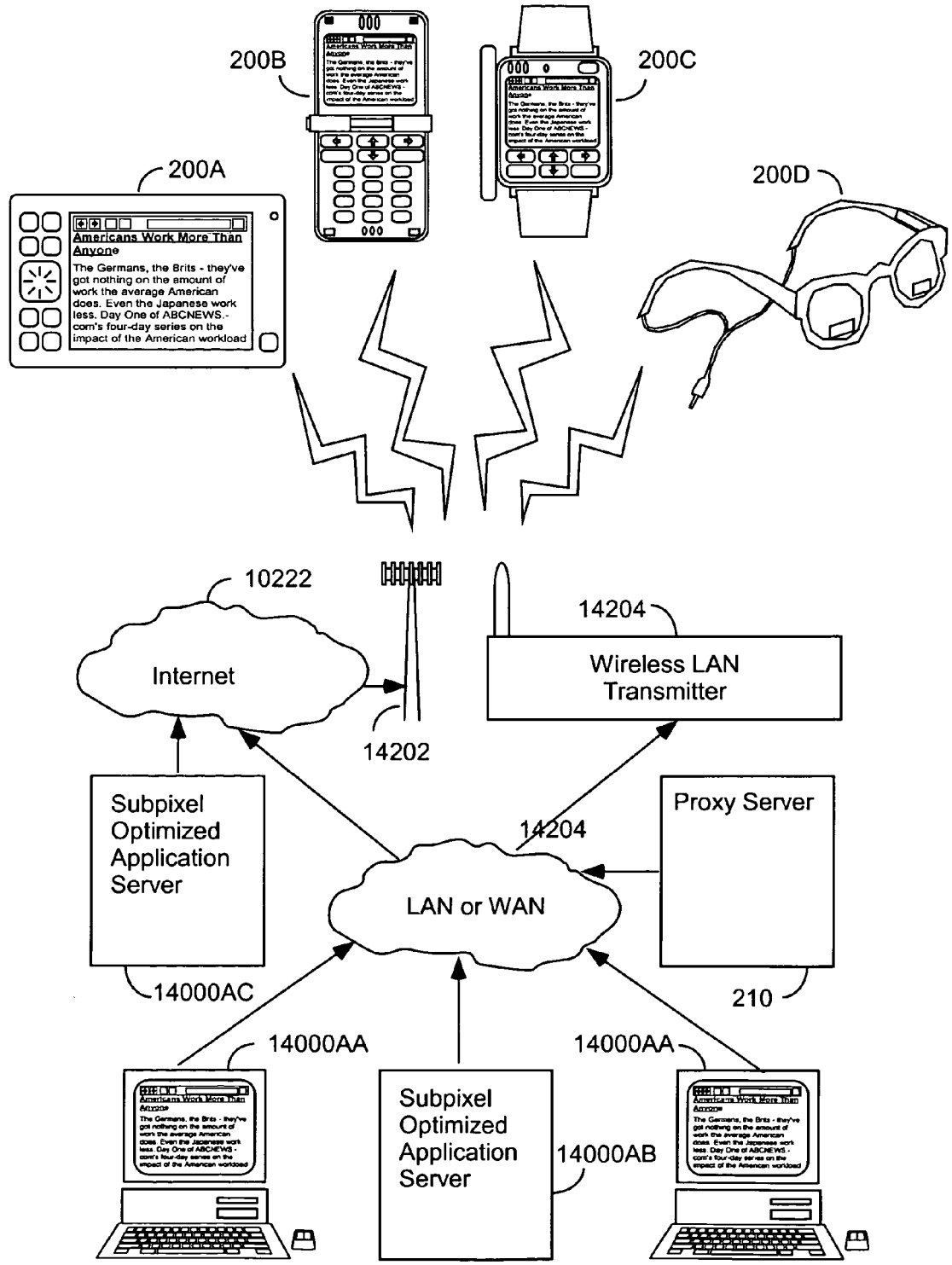
FIG. 142 illustrates how certain aspects of the present invention can be used allow portable small-screen, thin-client computers to access web content and the screen output of various application programs through both local and/or Internet wireless communication.

FIG. 142 illustrates how the embodiment of the invention shown in FIGS. 102 and 140 can be used to allow thin client computers, such as the thin client computers 200A through 200D shown in that figure, to be used to access Internet content or application programs over wireless network.

In this figure the computers 200A through 200D correspond to the thin client computer 200 shown in FIGS. 102 and 140. The computer 200A is a handheld computer. The thin client computer 200B is a cellphone. The thin client computer 200C is a wristwatch computer. The thin client computer 200D is a headmounted computer, or headmounted display for a portable computer. Each of these client computers can have a subpixel addressable display.

At the time of the filing of this application it is currently possible to manufacture screens for each of these types of devices having resolutions high enough for use by most aspects of the present inventions. For example, at the current time it is possible to manufacture a 320×240 color LCD display with a diagonal measurement of 2 inches or less. Organic LED devices can currently be manufactured with even higher resolutions. In the near future, the cost of such small screens should come down, and their availability and resolution should go up.

All of the thin client computers shown in FIG. 142 have wireless transceivers that enable them to transmit and received information of the type described above with a remote proxy server computer 210 of the type shown in FIG. 102 or a remote application server 14000 of the type shown above with regard FIG. 140. Such transceivers can be wireless LAN transceivers for communicating with a wireless LAN transceiver 14204 or digital cellular wireless transceivers for communicating with a wireless Internet transceiver 14202, or preferably a transceiver that has been designed to communicate with both types of wireless transceivers. In other embodiments, other types of wireless communication, such as Bluetooth or infrared communication, can be used.

The remote computers 14000AA through 14000AC shown in FIG. 142 correspond to the remote server computer 14000 shown in FIG. 140.

The remote application server computers 14000AA shown in FIG. 142 represent laptop, desktop, server or other types of computers that can be programmed to operate as a remote application server computer 14000. The subpixel-optimized application server 14000AB is a remote computer of the general type illustrated in FIG. 140 that is designed to run applications for a plurality of thin client computers connected to a LAN or WAN associated with such clients. The remote computers 14000AA and 14000AB can communicate with thin clients over a private local area wireless transmitter 14204, or can communicate with them over the wireless Internet as indicated by the numerals 10222 and 14202.

The subpixel-optimized application server 14000AC is an application server similar to server 14000AB, except that it is connected directly to the internet to allow multiple thin client computers 200 to use applications over the Internet by means of the wireless transmission network indicated by the numeral 14202.

In FIG. 142 a proxy server 210, of the type described above with regard to FIG. 102, is shown connected to the LAN or WAN 14204. This, for example might be a proxy server intended to handle Web browsing that the Corporation wishes to keep off the Internet. It should be understood that other such proxy servers, such as those operated by companies providing commercial proxy serving services, would normally be connected directly to the Internet 10222 shown in FIG. 142 as well.

The system illustrated in regard FIG. 142 allows small computers that can be conveniently carried at virtually all times to access and display web pages and the output of most application programs. At the time of filing this application, the bandwidth of relatively inexpensive wireless LAN transceivers, such as the LAN transceiver 14204 shown in FIG. 142, is fast enough to allow thin clients of the type shown in FIG. 142 to view web content or the output of application programs almost is rapidly as one could view such digital content on a desktop computer connected to a cable modem. And this is on a machine that can be carried one's pocket, or on one's wrist, or as part of one's glasses, and that can be capable of accessing such media within several seconds after being turned on.

At the digital cellular bandwidth commonly available in America at the time of filing this application, it will normally take several seconds to download the entire text of the most web pages, and longer to download the web page's images. Of course many embodiments of the present invention start to display text as soon as part of it is received, allowing the user starts to start seeing part of a downloaded page very quickly.

As of this filing new, higher speed, digital cellular systems have been developed that are capable of providing bandwidths in the range of hundreds of thousands or millions of bits per second. Once such higher speed systems become commonly deployed, users of the invention will be able to read and interact with web pages and application screen on small, portable devices, that can be used within seconds of being turned on most places they travel, with almost as much speed and convenience as if accessing them on a desktop or laptop through a DSL or cable modem connection.

Figure 143:
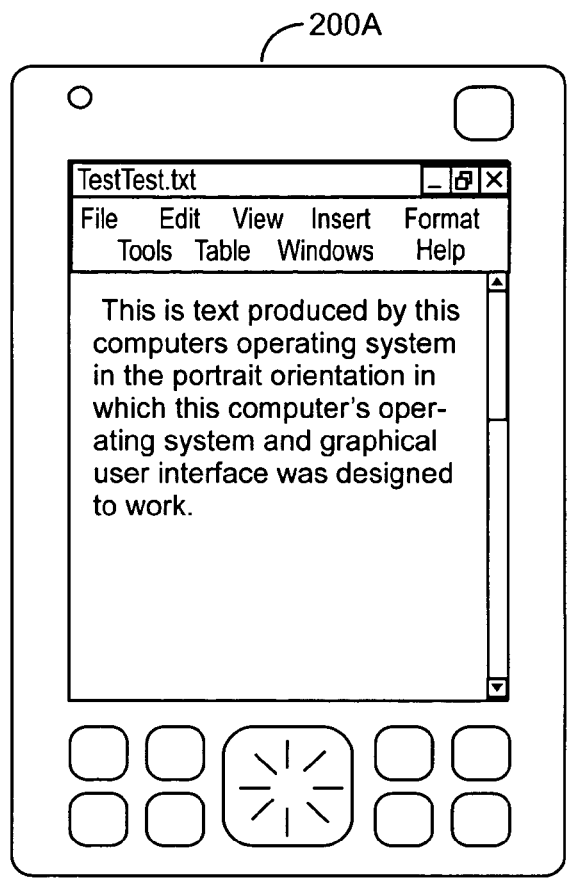
FIGS. 143 and 144 are used to illustrate how in some embodiments of the present invention subpixel-optimized output is displayed with a landscape orientation by rotating a computing device that has an operating system programmed to work in a portrait orientation.
Figure 144:
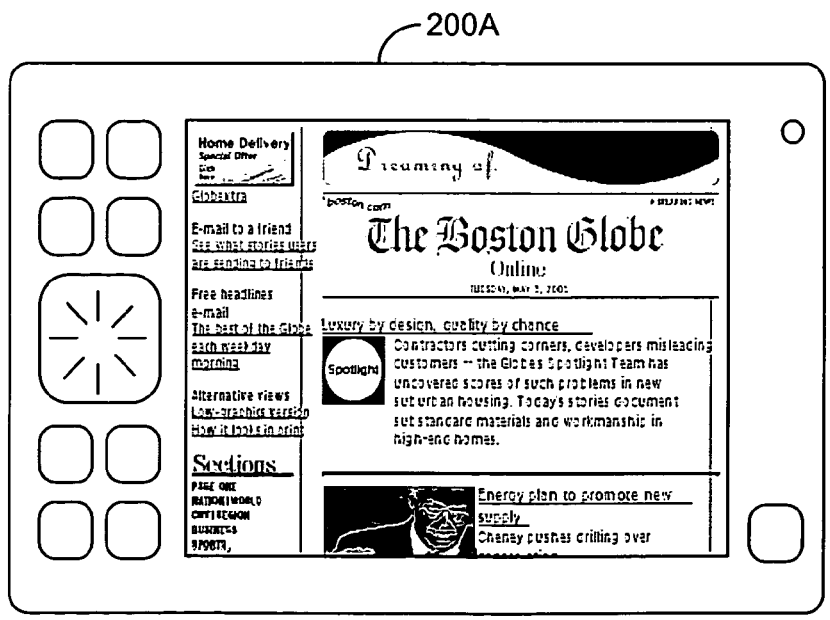

FIGS. 143 and 144 provide two views of a handheld computer 200A capable of functioning as a thin client for either proxy servers of the type described above with regard to FIG. 102 or a remote application server computer of the type described with regard to FIG. 140.

In FIG. 143, the computer is shown in the portrait orientation in which it has been designed for use. The native operating system on the computer is designed to draw fonts and graphical user interface elements in this portrait orientation. This is the manner in which many of the handheld computers sold at the time of the filing of this application have been designed and built. For example, there are multiple such handheld computers on the market today that have subpixel addressable screens with a 240×320 whole pixel resolution. Many of these computers also have subpixel striping that runs in a horizontal direction when the displays are in their intended portrait orientation.

Unfortunately, such a portrait orientation does not provide the type of landscape aspect ratio with which most people are used to using computers, and for which most web pages have been designed. Furthermore, in the case where such computers have horizontal subpixel striping, such striping provide all of its potential increase in subpixel resolution in the vertical direction. Unfortunately, the display of text tends to benefit substantially more from an increase in horizontal resolution than it does from such an increase in vertical resolution.

For all these reasons, many embodiments of the invention that use such portrait-orientation machines are designed to use them when they have been rotated by 90 degrees, as shown in FIG. 144, so they will have a landscape aspect ratio more like that of the layout of most computer screens, and so that their subpixels will provide an increase in horizontal resolution that is most useful for displaying text.

FIG. 145 is a highly simplified pseudocode representation of how some aspects of the present embodiments can be used to respond to requests to draw basic shapes—such as rectangles, ovals, lines, and curves—using subpixel optimization. Such functionality can be used in applications of many different types, in operating systems, and in thin client software.

In the example of FIG. 145, the pseudocode shown relates to a rectangle draw function 14500, that could, among other uses, be used in place of the rectangle command 10918 described above with regard FIG. 109A. Such a routine is evoked by a call to draw a rectangle that has its position, width, and/or height defined at higher resolution than the whole pixel resolution of a subpixel addressable screen on which is to be shown. In response, the function 14502 uses a subpixel-optimization routine to render the image of the rectangle defined at such a higher resolution, at subpixel resolution. This can be done using virtually any subpixel optimization scheme, but for monochrome rectangles a bicolor optimization scheme, such as that described above will tend to provide the highest perceived spatial resolution.

FIG. 146 is a highly simplified pseudocode representation 14600 of code 14602 that operates on a server and/or proxy computer and code 14604 that can be run on a client computer, including a thin client computer, to allow applets downloaded from the server to draw subpixel-optimized screen elements on the screen of the client.

In such an embodiment, a function 14606 of the client requests media from the server. The server responds in function 14608 by downloading media, or data, including one or more applet programs that can run on the client computer. In function 14610 the client computer receives the media including the applets, and function 14612 loads and runs the applets. In function 14614 the applets draw subpixel-optimized elements to the subpixel addressable screen on the client computer.

The applets can draw subpixel-optimized elements either by copying or generating subpixel-optimized bitmaps, by rendering text with subpixel-optimized fonts, or by drawing subpixel optimize shapes, such as the shapes of vector defined graphics or relatively simple geometric shapes, such as lines, rectangles, and ovals.

Figure 147:
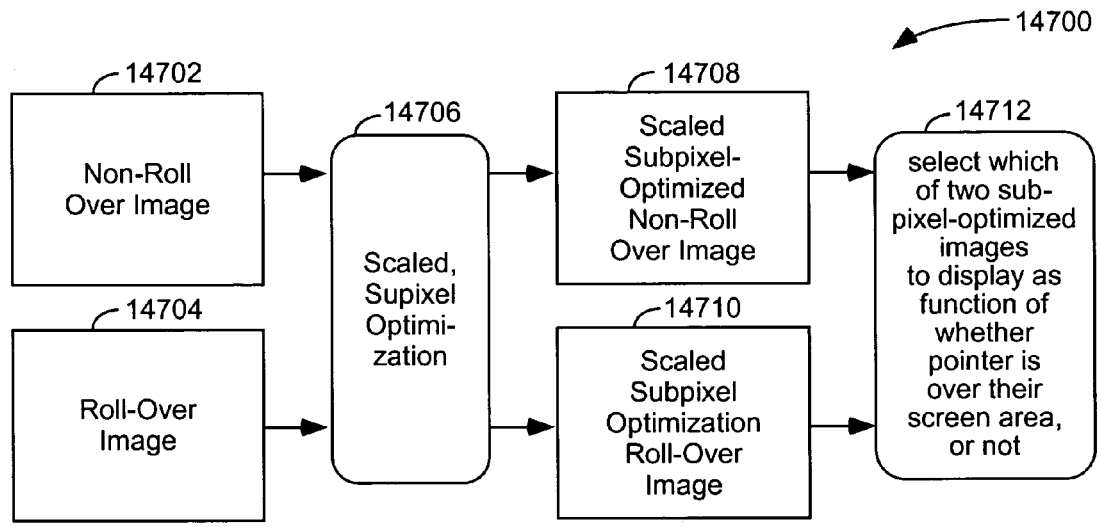
FIG. 147 is a highly simplified block diagram illustrating how rollover images can be subpixel-optimized.
Figure 148:
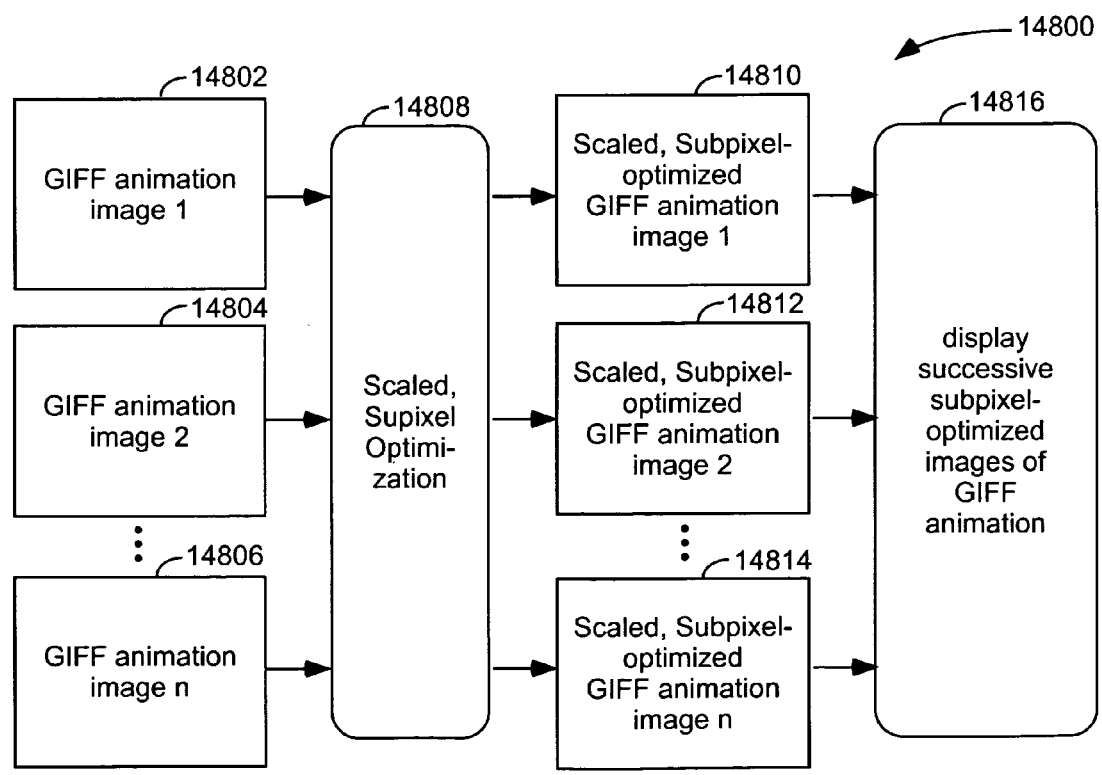
FIG. 148 is a highly simplified block diagram illustrating how GIFF animations can be subpixel-optimized.

FIGS. 147 and 148 illustrate how subpixel optimization can be applied to rollover images and GIFF animations, respectively.

In the subpixel optimization routine 14700 shown in FIG. 147, both a non-rollover image 14702, which is to be displayed when a pointing device is not detectably over the portion of the screen associated with the images, and a rollover image 14704, which is displayed when the pointing device is detectably over that screen portion, are both downscaled and subpixel-optimized by a function 14706. This produces a scaled subpixel-optimized non-rollover image 14708 and a scaled subpixel-optimized rollover image 14710. Then a function 14712 is used to select which of these two subpixel-optimized images is displayed based on whether the pointer is detectably over their associated screen area or not. This makes the two subpixel-optimized images act as a combined "rollover" graphic.

In other embodiments of this aspect of the invention, a similar technique could be applied to two images that are associated with a button, one displayed when the button is not being pressed, and another displayed when the button is pressed.

The method 14800 shown in FIG. 148 is similar to that described above with regard FIG. 147. It takes each separate image 14802 through 148906 of a GIFF animations and subpixel-optimizes it in a function 14808 to produce a corresponding set of scaled-down, subpixel-optimized GIFF animations images. Then function 14816 displays the subpixel-optimized images in substantially the same manner that non-subpixel-optimized GIFF animations are displayed.

The subpixel optimizations described with regard to FIGS. 147 and 148 can be used with other aspects of the invention described above, including in the accessing of web pages on a subpixel addressable screen, including those on thin client computers.

FIG. 149 illustrates a method 14900 for subpixel optimizing 3-D animation. This method includes performing a set of functions 14904 through 14908 for each successive frame of the animation.

Function 14904 runs a 3-D animation engine to create a bitmap of the current frame, or at least of those portions of the image that have changed since the last frame. This function generates such bitmaps at a resolution higher than the whole-pixel resolution at which the subpixel-optimized version of such bitmaps are to be displayed.

Function 14906 then uses techniques, such as those described above, for scaling down and subpixel optimizing the frame bitmap, or at least changes made in the frame bitmap since the last frame.

Next, function 14908 displays the scaled-down, subpixel-optimized image of the frame bitmap, or at least of the changed portion of the frame, on a subpixel addressable screen.

The method shown in FIG. 149 can be particular useful to allow people to play games, and see the images produced by such games at the higher resolution made possible by subpixel optimization. It can be used for such purpose on small screen, handheld devices. It can be used both with client computers displaying animated images generated on a remote computer, as well as with computers that are generating such animated images locally.

FIGS. 150 and 151 illustrates one way in which the method of FIG. 149 can be used in a client server gaming application.

FIG. 150 illustrates programming 15000 on a game server computer used in such an embodiment. As indicated by the numeral 15002 and 15004, if the game server receives user input from one or more game client computers it sends input to the game engine. If such input is screen input, it is scaled appropriately to compensate for the difference between the user's screen resolution and the space that the game engine associates with screen inputs.

In function 15006 the game engine computer computes a display list for the current frame, or for any changes associated with the current frame to a prior display list. Then function 15008 has a 3-D rendering program render a frame bitmap corresponding to the display list generated for the current frame, or render the changes required to the bitmap of the current frame. Such bitmaps are generated at a higher resolution than that of the subpixel-optimized images that are to be created by the function 15010.

If the client is generating different screen images for different clients, the function 15008 would be performed separately for each of those separate views.

Next function 15010 scales down and subpixel optimizes the current frame bitmap or the bitmaps of current changes to the frame. When the function is scaling down only bitmaps of such changes it also correspondingly scales down the screen positions associated with those changes.

Next function 15012 compresses the subpixel-optimized bitmaps, and if appropriate, their locations, and function 15014 downloads the compressed, scaled, subpixel-optimized images and any such locations to the client for display.

FIG. 151 illustrates programming 15100 on a game client designed for use with a programming of FIG. 150.

Function 15101 receives downloaded images, then function 15102 decompresses them. Next function 15104 displays the scaled, subpixel-optimized animation frame bitmaps, or it displays bitmap of changes over the image of the prior animation screen at the locations indicated for those changes. This is done on a subpixel addressable display.

As indicated by numeral 15106 and 15108, when the client receives user input, it uploads that input to the game server with any screen coordinates associated with those inputs being appropriately translated.

In other embodiments of this aspect of the invention the distribution of functionality between the game server and the game client could be different. In some embodiments, a proxy server generally similar to that described above could be used to perform the subpixel optimization for display on a thin client of game content originally generated on a game server that is different than the proxy server. In yet other embodiments the game client could itself perform the subpixel optimization.

FIG. 152 is a highly simplified pseudocode description of an aspect of the invention that allows images having associated transparency maps to be displayed with the subpixel optimization of both their foreground image and transparency map.

The programming 15200 shown in FIG. 152 includes a function 15202 that produces a scaled subpixel-optimized bitmap of a foreground image, that is an image, the display of which on top of a background or other prior bitmap is to be controlled by an associated transparency bitmap. The subpixel optimization used can be either a bicolor or a multicolor subpixel optimization, or a combination of the two. Any method known for producing subpixel-optimized representations of images could be used, including those that have been described above.

Function 15204 produces a subpixel optimization of the image's associated transparency map. Preferably a bicolor subpixel optimization is used, since a high resolution source image of a transparency map has transparency values that vary along a straight line in 3-component color space, that of an alpha value ranging from 0 to 1. Such source image alpha values correspond to grayscale colors because, if the area of the transparency map source image corresponding to a given pixel in the subpixel-optimized output image of that map is covered by a uniform transparency value, all of that output pixel's subpixels will tend to have equal alpha values. Preferably the bicolor subpixel optimization of the transparency map is created using the non-linear color balancing described above.

Once such a subpixel optimization of a foreground image and its associated transparency map has been created, function 15206 displays this combination on a subpixel-optimized display. This process includes performing a loop 15208 for each pixel row of the displayed image, which includes a loop 15210 for each subpixel of each such row. The function 15210 causes function 15212 and 15214 to be performed for each subpixel. The function 15212 sets the current alpha value to the alpha value of the corresponding subpixel of the subpixel-optimized transparency map. Then function 15214 sets the luminosity of the current subpixel to the current alpha value multiplied by the luminosity of the corresponding subpixel of the subpixel-optimized foreground image plus the prior luminosity value of the current subpixel in the background bitmap over which the transparency image is being drawn multiplied by one minus the current alpha value.

This means that if the foreground image is drawn over a prior bitmap, the extent to which luminosity of each of its separate subpixel's is derived from the corresponding subpixel value of the foreground image, or of the prior bitmap is determined as a function of the corresponding subpixel alpha value of the subpixel-optimized transparency map.

In some embodiments of the invention, images with associated transparency maps will be scaled and subpixel-optimized on a server or browser computer, downloaded, and then displayed by function 15206 on a client computer. In other embodiments of the invention, such subpixel-optimized transparency images will be made available on recorded digital media. In yet other embodiments of the invention they will be generated by the same computer that displays them.

In other embodiments of the invention subpixel-optimized foreground images could be displayed using alpha values contained in a non-subpixel-optimized transparency map.

In some embodiments of the invention lossy color compression will be used to represent groups of colors that are perceptually close with one color. Such compression can be performed upon one dimensional transparency values, upon three dimensional transparency (i.e., opacity or alpha) values of the type described above with regard to FIGS. 60, 96, and 97, or upon color values having a transparency component value as an extra color dimension, as well as upon RGB component values. In such compressions, it is generally advisable to prevent transparency values or component color values representing an alpha one or zero, or values very close to one or zero, from being represented by transparency values further from one or zero, respectively. This is because the eye is more sensitive to slight changes in opacity at the extremes of the transparency range than it is to such changes elsewhere in that range.

Subpixel-optimized images with transparency maps can be used on subpixel optimize displays for all the purposes for which non-subpixel-optimized images are used with transparency maps. This includes use in animations and in web page layouts.

FIGS. 153 through 162 are highly simplified pseudocode descriptions of aspects of the invention relating to subpixel optimization of video and/or animation. Such subpixel optimization can be used in the context of Web browsing as well as in virtually any other context in which video and animations is used.

FIG. 153 represents programming 15300 used to subpixel optimize video represented using interpolation between video key frames. This programming includes a function 15302 that is used in the case where the video to be subpixel-optimized is received in compressed format. It decompresses such video, so it can be subpixel-optimized.

Function 15304 scales down and subpixel optimizes the keyframes of the video. Function 15306 scales down, but does not subpixel optimize interpolated changes between keyframes. In some embodiments of the aspect of invention shown in FIG. 153, such interpolation changes could be subpixel-optimized, but there is little benefit from doing so, since such changes appear so rapidly on a screen that their subpixel optimization would not be noticeable, and avoiding their subpixel optimization reduces computational overhead.

Then function 15308 displays the scaled down video on a subpixel addressable display with the subpixel-optimized keyframes and the non subpixel optimize interframe interpolation.

In other embodiments of the invention, this concept of only subpixel optimizing portions of video that will be on the screen at one location long enough to be clearly perceived could be used in other ways.

FIG. 154 illustrates programming that can be used to subpixel optimize video represented totally or partially by sequences of sub-whole-frame image elements that are to be drawn to a display frame. Commonly such video will also include whole frame images, and will use a sequence of sub-whole-frame draws to incrementally changes screen as needed to represent motion of one or more objects within it. This would include animation of the type described above with regard FIG. 149. It can also include various forms of video compression, including video having keyframes and interframe interpolation of the general type described above with regard FIG. 153.

The programming of FIG. 154 includes a function 15402 used where the video to be subpixel-optimized is received in compressed format, in which case that function decompresses it. Next function 15404 scales and subpixel optimizes any frame images contained in the video, scaling them down by a display scale factor. Then function 15406 scales and subpixel optimizes any change bitmaps, scaling both the size of such images and their location by the scale factor.

Functions 15407 and 15408 repeatedly display on a subpixel addressable screen any scaled subpixel-optimized video frame in the video sequence. After the display of such a video frame it displays any of one or more scaled, subpixel-optimized change bitmaps over the bitmap of that frame at the scaled position associated with that change bitmap by the function 15406.

It can be seen that the method of FIG. 154 enables subpixel-optimized video and animation to be drawn in a manner that reduces the amount computation required for subpixel optimization, since it does not require the subpixel optimization of an entire frame each time a change is made to its video image.

FIGS. 155 and 156 illustrate two different methods in which subpixel-optimized images that move relative to a frame can be displayed.

FIG. 155 includes programming 15500 that displays an image with fixed subpixelation as it moves in whole pixel increments relative to a larger image on a subpixel addressable display. It includes a function 15502 that stores a subpixel-optimized image, which can be produced by any method, including those described above. It includes a loop 15503 performed for each successive frame time. This loop comprises the function 15504 and 15506. The function 15504 calculates a movement for the image relative to the larger image. In this movement calculation the position calculated for the object at each display frame is rounded to the nearest whole horizontal and vertical pixel location and the size and orientation of the image is not altered. The function 15506 displays the image at the whole pixel resolution location calculated for it by the function 15504. Since only one subpixel-optimized bitmap of the image has to be calculated, and that single image is repeatedly used as it moves across the screen, this method is quite computationally efficient.

FIG. 156 describes programming 15600 that displays a moving image with changing subpixelation. It includes a function 15602, which stores a high resolution source image of the image to be moved. It also includes a loop 15603 performed for each successive frame time. This loop includes a function 15604, which calculates the current translation, rotation, and/or transformation of the high resolution source image, if any for the current frame. Then the loop's function 15606 generates a scaled-down, subpixel-optimized bitmap of the translated, rotated, and/or transformed bitmap so produced. This subpixel optimization takes into account the location of this transformed bitmap relative to the subpixel array upon which it will be displayed at a resolution higher than whole pixel resolution. Then function 15608 of the frame loop displays the resulting subpixel-optimized bitmap on a subpixel addressable display.

Either of the methods described above with regard FIG. 155 or 156 can be used to display sprites in game animation, as well as animated text, or any other type of visual representation that is moved relative to a larger frame.

The method of FIG. 155 tends to provide a less accurate representation of the motion of the visual object, but it is more computationally efficient. The method of FIG. 156 provides a more accurate visual representation, but is more computationally expensive.

In some embodiments of the invention a combination of these two methods could be used. For example, a small subset of possible mappings between the object and a subpixel array can be stored, and as the object moves it is displayed with that one of such stored mappings that most closely represents a higher-resolution representation of its current location relative to the subpixel array upon which it is to be displayed.

FIGS. 157 and 158 illustrates aspects of the present invention used to optimize the display of DVD or an HDTV video by downscaling and subpixel optimizing such video for display on a subpixel addressable screen. This is particularly useful when used in conjunction with subpixel addressable screens that have a higher subpixel resolution in the horizontal direction than they do in the vertical direction, because both DVD an HDTV video commonly has an aspect ratio substantially wider than it is high.

FIG. 159 illustrates aspects of the invention that can be applied to video formats that represent subcomponents of video images as separate objects having different attributes. The particular example in FIG. 159 involves programming 15900 that subpixel optimizes the display of MPEG-4 video.

The programming shown in FIG. 159 includes a function 15902 that receives and decompresses an MPEG-4 video. It includes functions 15904 and 15906 that use different subpixel optimization methods when scaling down different types of objects in the MPEG-4 video. This function uses bicolor subpixel optimization, preferably with nonlinear color balancing, on bicolor objects, and it uses multicolor subpixel optimization on multicolor objects. It's function 15908 displays a combination of the bicolor and multicolor objects on a subpixel-optimized screen, moving such subpixel-optimized objects relative to the screen as dictated by the MPEG-4 description, using methods of the type discussed above with regard to FIGS. 155 and/or 156.

Some aspects of the invention are not limited to such use of different subpixel optimizing algorithms for different object types in the MPEG-4 data stream. But the use of such different subpixel optimizing algorithms can provide higher perceived resolution for bicolor objects, such as text, and thus has the advantage of providing a somewhat better image.

FIGS. 160 and 161 relate to systems in which users access subpixel-optimized video over a computer network.

FIG. 160 illustrates programming 16000 used by a server computer that serves subpixel-optimized, scaled down, video. Such a server could be a proxy server that accesses video requested by the client from yet another server computer and then downscales and subpixel optimizes it before downloading to the client. In other embodiments, the serving of such subpixel-optimized video is performed without such an intermediary proxy server.

The programming of FIG. 160 includes a function 16002 that receives a request for certain video from a client computer. In many embodiments, such as the one shown in FIG. 160, the request will also describe the horizontal and vertical subpixel resolution for which the video is to be subpixel-optimized. In embodiments in which the server is only serving a set of clients having one fixed subpixel resolution, such information is not needed as part of the request.

The function 16004 receives the requested video content. This can be done by accessing it from a remote server, as described above; by accessing it from RAM or a mass storage device associated with the serving computer; by having such content dynamically generated; or by selecting a video fed from some source.

Function 16006 scales down and subpixel optimizes the received video to the subpixel resolution associated with the request of function 16002. Then function 16008 compresses the subpixel-optimized video and function 16010 download that compressed video to the requesting device.

The compression algorithm used for such subpixel-optimized images can include one which has a certain amount of loss without substantially decreasing the increased spatial resolution made possible by subpixel optimization, as long as the location of the color values associated with any pixel in such subpixel-optimized images are not moved in RGB color space by more than a relatively limited color distance.

FIG. 161 describes a system 16100 that can be used with the aspect of the invention described in FIG. 160. This system includes proxy computer code 16100 and thin client computer code 16112, both of which are illustrated by highly simplified pseudocode in FIG. 161.

When the thin client receives a user request for certain video, function 16113 responds by sending a request for the video, including the subpixel resolution at which the video is to be displayed to the proxy. When the proxy receives the request for such video its function 16100 causes function 16103 to send a corresponding request for the video to a server from which it can be obtained. In many embodiments this will be a server identified in the URL of such a request.

When requested video is received by the proxy server, function 16104 causes function 16106 through 16110 to be performed. Function 16106 scales down and subpixel optimizes the video to the subpixel resolution associated with its request from the client; function 16108 compresses that subpixel-optimized video; and function 16110 downloads it to the client that has requested it.

When the client receives the requested video from the proxy, function 16114 causes function 16115 to decompress it, and function 16116 to display the downscaled, decompressed video on a subpixel addressable display.

FIGS. 162 through 166 are used to illustrate how aspects of the invention can be used to improve the appearance of digital ink. Digital ink is usually a black and white bitmap drawn on a screen in response to a user attempting to write or draw with his or her pointing device. In the past, digital ink bitmaps have usually been represented at a whole pixel resolution in which each pixel is shown as either black, white, or in some devices a grayscale value.

One aspect of the invention is the use of subpixel optimization to represent digital ink with a higher resolution. When digital ink that is represented within the computer's memory by points and lines or curves between such points, the resulting mathematical description of the lines between such points can have a much higher resolution than the whole pixel resolution of the screen.

FIG. 162 is a highly simplified pseudocode description of programming that can be used to optimize the clarity with which digital ink can be viewed.

The digital ink code 16200 shown in FIG. 162 includes a function 16202 that responds to user input with a pointing device while in digital ink draw mode, by recording the strokes of the pointing device as a series of points and curve or lines between such points. Function 16206 draws ink on the screen using a subpixel optimization of the lines and curves. This can be done with virtually any subpixel optimization scheme, but it is preferrably done with a bicolor subpixel optimization scheme, such, as for example, a bicolor subpixel optimization scheme using non-linear color balancing.

Figure 163:
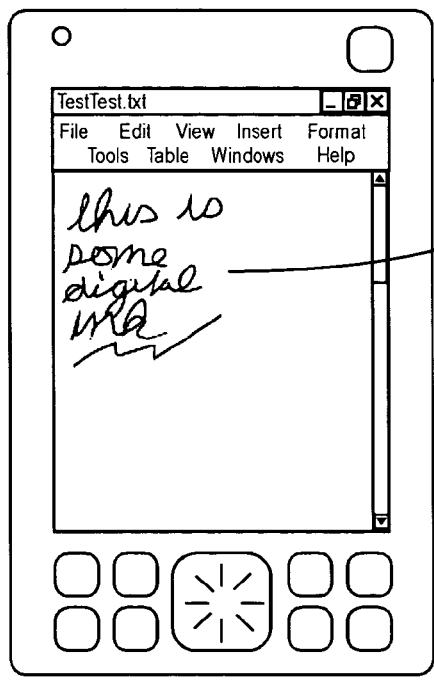
FIGS. 163 through 166 are used to help illustrate the benefits of the programming describe with regard FIG. 162.

FIG. 163 illustrates some digital ink 16302 that has been drawn on the screen of a handheld computer 16300. Because this illustration is printed with a printer that can only represent whole pixel luminosity values, the digital ink illustrated in FIG. 163 displays subpixel optimization as grayscale anti-aliasing. It to be appreciated that when viewed on a subpixel addressable display the image would appear even more clear than shown in FIG. 163.

If the user of the digital ink programming selects to scale up a representation of a portion of digital ink, function 16208 causes function 16212 to produce a subpixel-optimized bitmap of the digital ink lines and curves, using a bicolor subpixel optimization with non-linear color balancing, at the user selected scaled-up size. Then function 16212 displays that scaled-up image on the users screen.

Figure 164:
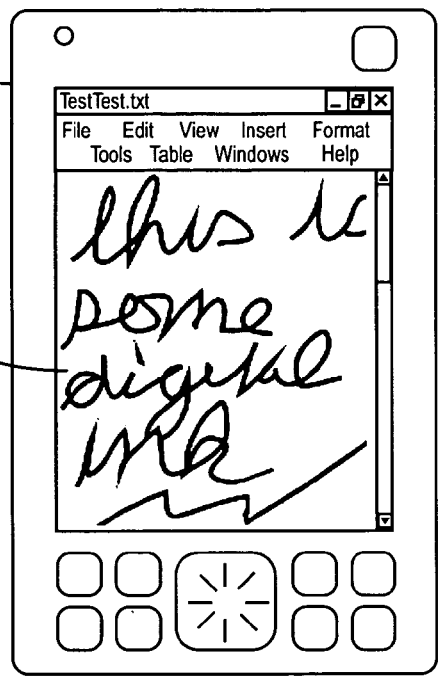

FIG. 164 illustrates a scaled-up representation 16302A of the portion of digital ink 16302 shown in FIG. 163. This provides a substantially more clear representation of the digital ink, than is produced by merely blowing up the pixelation of the digital ink's representation 16302 shown in FIG. 163, as is illustrated by the bitmap 16302B shown in FIG. 165.

Figure 165:
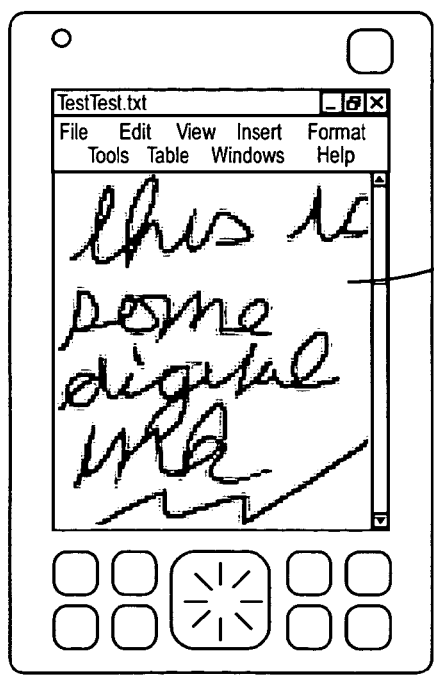
Figure 166:
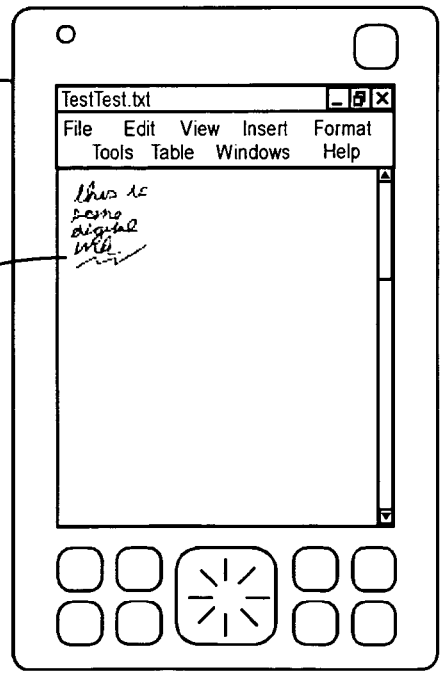

It should be noted that the bitmap shown in FIG. 165 is actually more pleasant to look at than some scaled-up representations of digital ink because the bitmap shown in FIG. 163 has been printed with whole pixel grayscale values with anti-aliasing, which is not used in some digital ink representations.

If the user selects to scale down the representation of digital ink, function 16214 causes function 16216 to produce a subpixel-optimized bitmap of the ink's lines and curves using bicolor subpixel optimization with non-linear color balancing at the selected scaled-down size, and then causes function 16218 to display that scaled-down bitmap on the subpixel addressable display. The results of such a process is illustrated by the bitmap 16302C shown in FIG. 166.

These aspects of the invention can be modified to deal with digital ink that has been recorded as whole pixels that are either on or off. This can be done by having a routine estimate a centerline of each stroke represented by such "on" pixels, and then producing a subpixel optimize image of the digital ink's centerline at various scales as described above. A more accurate but more computationally expensive approach would be to seek an optimal fit between successive portions of such digital ink and a corresponding succession of lines and curves, such as, for example Bezier curves.

In other embodiments, subpixel optimization could be performed on bitmaps that have been produced by digital ink drawing by merely performing subpixel-optimized scale ups or scale downs upon such bitmaps.

Some embodiments of the invention that relate to digital ink could be used with non subpixel-optimized displays, by replacing subpixel optimization with grayscale anti-aliasing.

Figure 167:
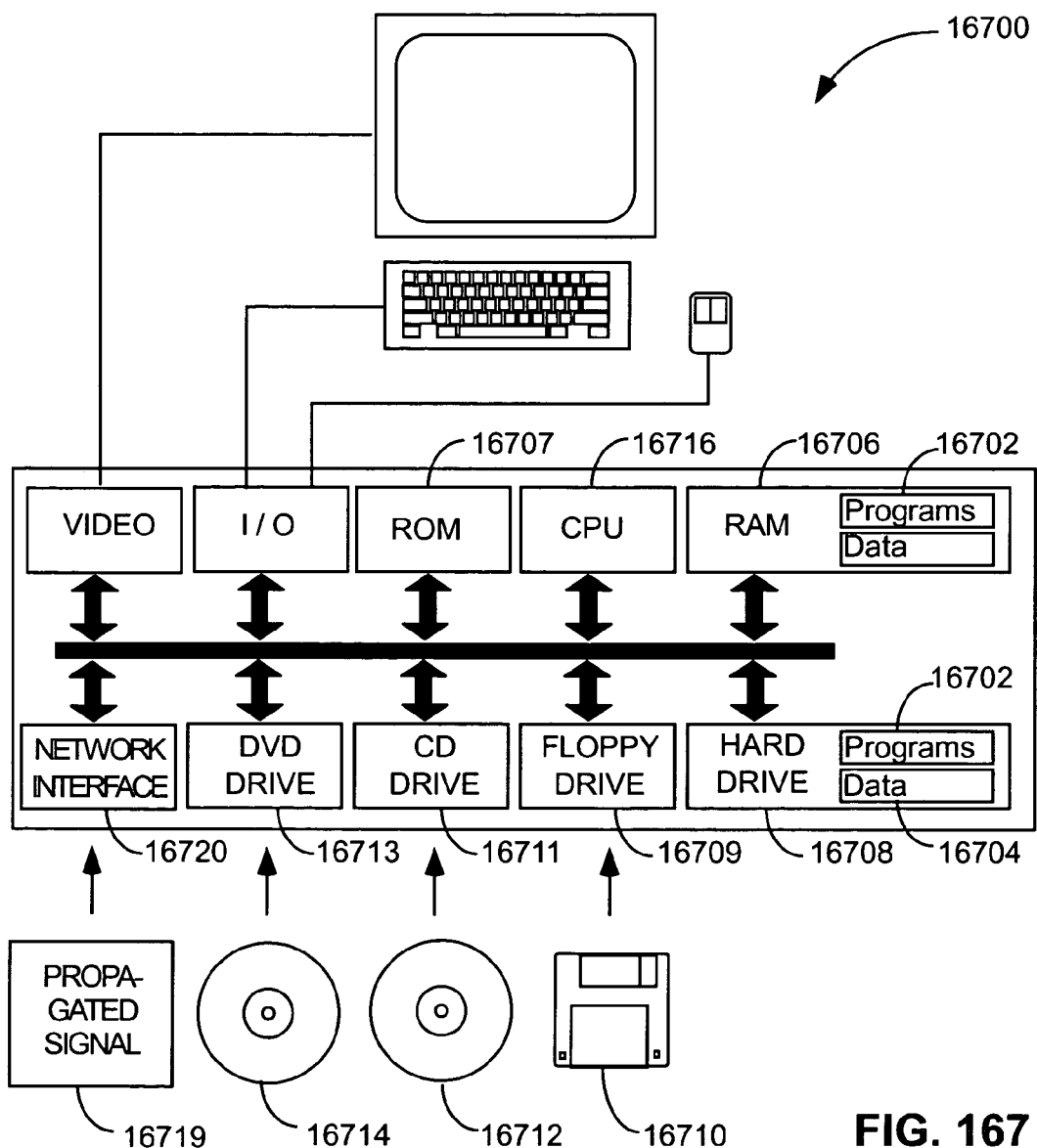
FIG. 167 illustrates that the present invention relates not only to methods, but also to programming and data related to such methods stored in a machine readable form or embodied in a propagated signal, and to programmed and/or hardwired computer systems for performing such methods and/or use such programming and/or data.

FIG. 167 illustrates physical components that can be included in many of the server, client, proxy server, thin client, remote, desktop, or other computers referred to above. It should be understood that not all of the components shown in FIG. 167 will be in all such computers, and most such computers will include other components besides those shown in FIG. 167.

This figure is provided to make clear that most of the computers used with various aspects of the present invention include some type of processor 16716 capable of executing programming 16702 to cause it to perform the functions of such aspects of the invention and to read and write data 16704 according to the methods of such aspects. The present invention relates to not only to methods but also to such computer programming and data, as well as to computer systems that have been programmed and/or hardwired to perform such methods or to use such data.

In most such computers the invention's programming will be stored in RAM 16706; ROM 16707; or a mass storage device such as a hard drive 16708, floppy drive 16709, CD-ROM drive 16711, and/or DVD drive 16713. It can also be stored in machine-readable media, such as on a floppy disks 16710, CD ROMs 16712, DVD ROMs 16714, or virtually any other type of machine readable storage media. The invention's programming and/or data can also be the represented as propagated signals indicated by the numeral 16719 that can be received by the computer through some sort of communication port, such as the network interface 16720.

Figures 168, 169:
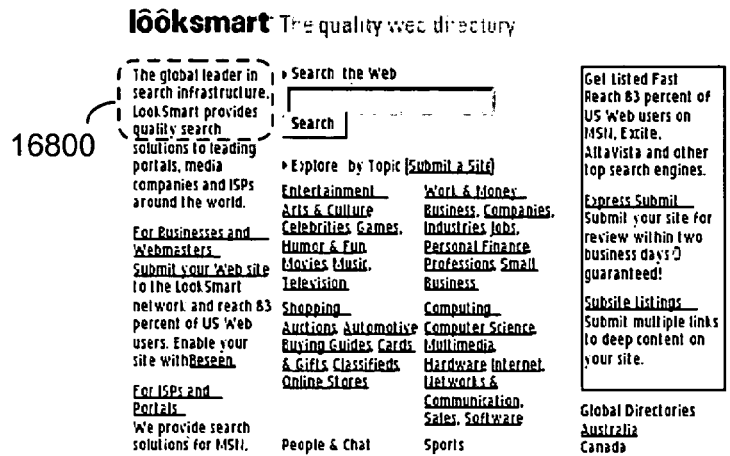

FIG. 168 provides a whole-pixel grayscale representation of a 320 by 240 screen showing a small subpixel-optimized font produced using the non-linear color-balance method described above with regard to FIG. 60 through 97. This figure is identical to FIG. 56 except that a portion of its text is encircled by dotted lines 16800.

FIG. 169 is an eight times blowup of the portion of the bitmap shown in FIG. 168 within the dotted lines 16800. It shows that most of the vertical strokes in the font shown in FIG. 168 contain color-balance distributions one their left hand side that blur the clarity of such fonts.

One of the major benefits of the non-linear color-balancing method of producing subpixel optimized font bitmaps is its ability to decrease the blurring of character-font shapes by the non-linear method with which it seeks to substantially prevent the distribution of color balancing values where it is not needed for color balance.

Upon observing the spreading of color values to the left of the main strokes of fonts of the type shown in FIG. 169, the inventor of this aspect of the invention sought to see if such spreading could be reduced. He tried to determine what the source of such spreading was.

Figure 170:
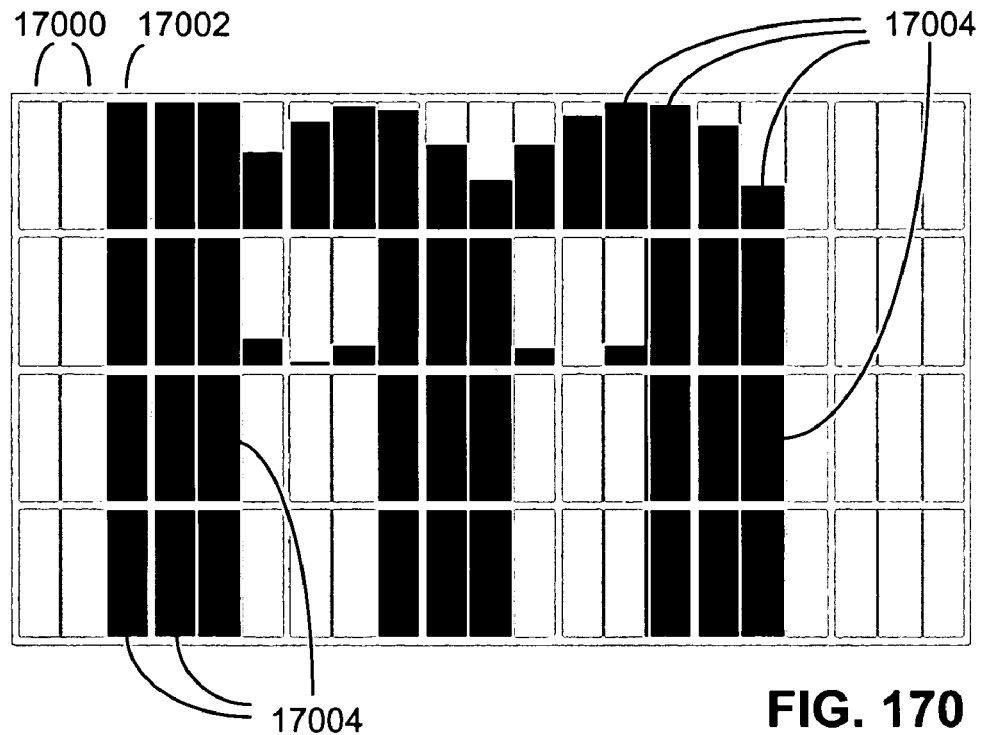

Referring now to FIG. 170, he found that the algorithm used for creating non-linear color-balanced bitmaps was designed to automatically place two padding columns of subpixels 17000 to the left of the leftmost subpixel column 17002 in the rasterization of a character-font shape that included an actual non-zero coverage value 17004 (i.e., was actually covered by a portion of the character-font shape being represented by the rasterization). This was done to provide room for the spreading of color balancing color values into the two subpixel column to the left of the leftmost subpixel column containing such a non-zero coverage value, if such a leftward spreading was required by the non-linear color balancing algorithm, described above, which allows color balancing distribution two pixel to the left of a totally or partially covered subpixel.

Unfortunately padding the rasterization subpixel array with only two such subpixel columns 17000 tends to have the undesirable effect of making the leftmost subpixel column 17002 that contains such a coverage value be the rightmost subpixel column of the pixel column containing the two padding subpixel columns. In an RGB display this would cause the leftmost subpixel column containing an actual coverage value to correspond to a blue subpixel.

This is undesirable because it tends to cause pixels in the leftmost pixel column in a font bitmap to contain two leftmost subpixels that have no actual coverage value and a rightmost subpixel that does include a non-zero coverage value, requiring that non-zero coverage value to be distributed to achieve color balancing. This is a reason for much of the leftward blurring of major vertical strokes shown in FIG. 169.

Figure 171:
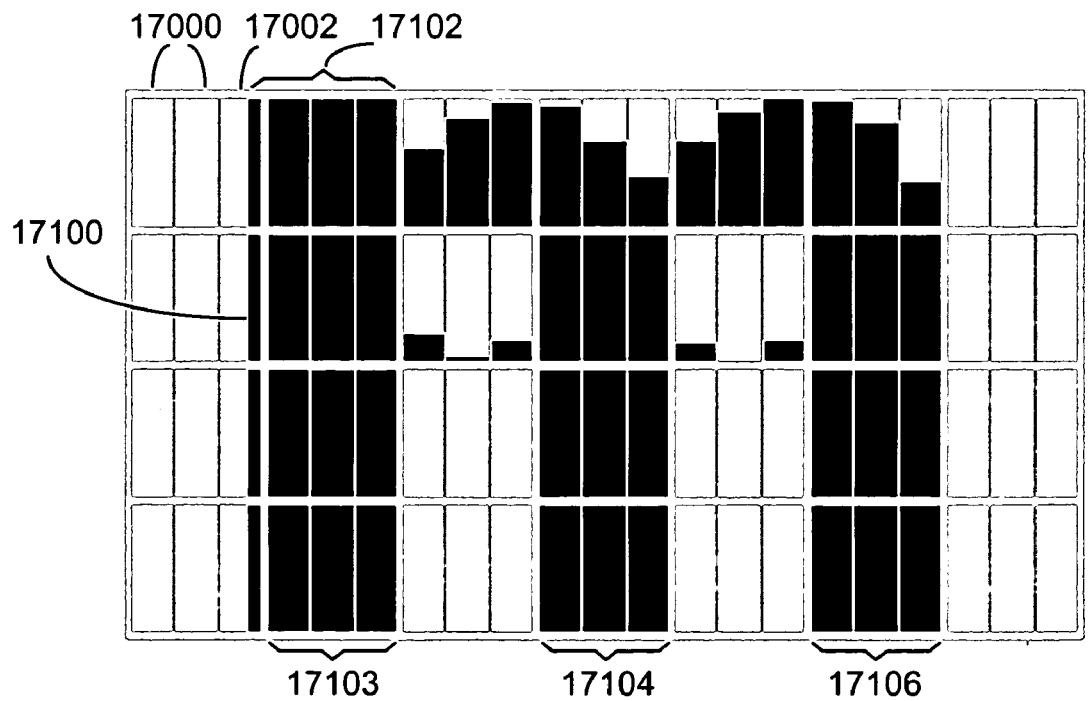

The inventor noted that character-font shapes hinted with systems that allowed boundaries of vertical strokes to be positioned in increments finer than the width of a subpixel column had often been designed by the individuals who hinted them to start the leftmost edge of their leftmost vertical stroke, such as the edge 17100 shown in FIG. 171 only a slight distance into the leftmost subpixel column containing non-zero coverage values 17002. This would substantially reduce the amount of the non-zero coverage value contained within the subpixel column 17002 that had to be distributed by non-linear color balancing, thus greatly reducing undesirable blurring in the subpixel optimized representation of the character.

For example, the inventors found that many of the best hinting combinations, when used with such algorithm, cause the first vertical strokes of a character, such as the vertical strokes 17102 shown in FIG. 171 to have its leftmost edge slightly into one subpixel column, with total coverage in three successive subpixel column to the right, so as to cause the second leftmost pixel column 17103 in the resulting bitmap to have one or more pixels totally covered so as to require no color-balance spreading.

In such an optimized hinting process, subsequent vertical strokes would be aligned to cover three adjacent subpixel column starting at a distance of three, six, or nine subpixel column from the rightmost edge of the first vertical stroke. This would cause the subsequent vertical strokes, such as the vertical strokes 17104 and 17106 shown FIG. 171, to have multiple pixels that are totally covered, so as to require no color balancing.

Figures 172, 173, 174:
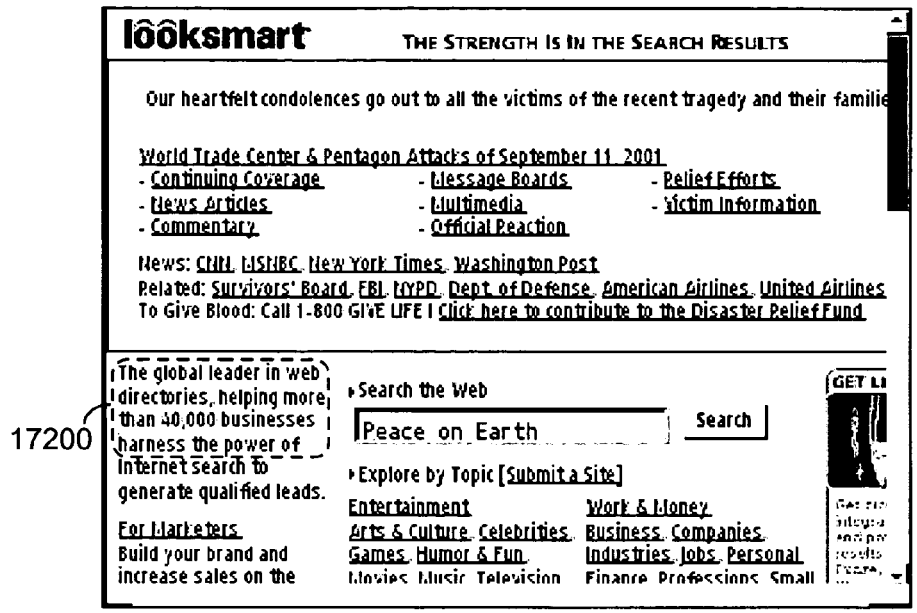

Although fonts of the type shown in FIG. 168 to 171 are more readable than most subpixel-optimized font bitmaps produced by prior art method, as a result of these investigations the inventor has figured how to produce even more clear subpixel optimized font, as shown in FIGS. 172 through 174.

FIG. 172 shows a whole-pixel grayscale bitmap representing a subpixel-optimized 320 by 240 pixel display of a web page of the type shown in FIG. 168, except that it uses a new, more clear method for producing and displaying font bitmaps.

FIG. 173 shows a four times blowup of the portion of FIG. 172 shown in the dotted box numbered 17200.

FIG. 174 shows a further four times blowup of the portion of text shown in the dotted lines 17300 in FIG. 173.

As can be seen from looking at FIGS. 172 through 174, there is relatively little horizontal spreading of color values from many of the vertical strokes contained in the font bitmaps shown in those figures. It should be noted that the uniform light gray background in FIGS. 173 and 174 results because the text in those figures was taken from a portion of the web page of FIG. 172 that had a background color, not because of any spreading due to color balancing. The fonts shown in these figures are substantially more clear than those shown in FIGS. 168 and 169.

Figure 175:
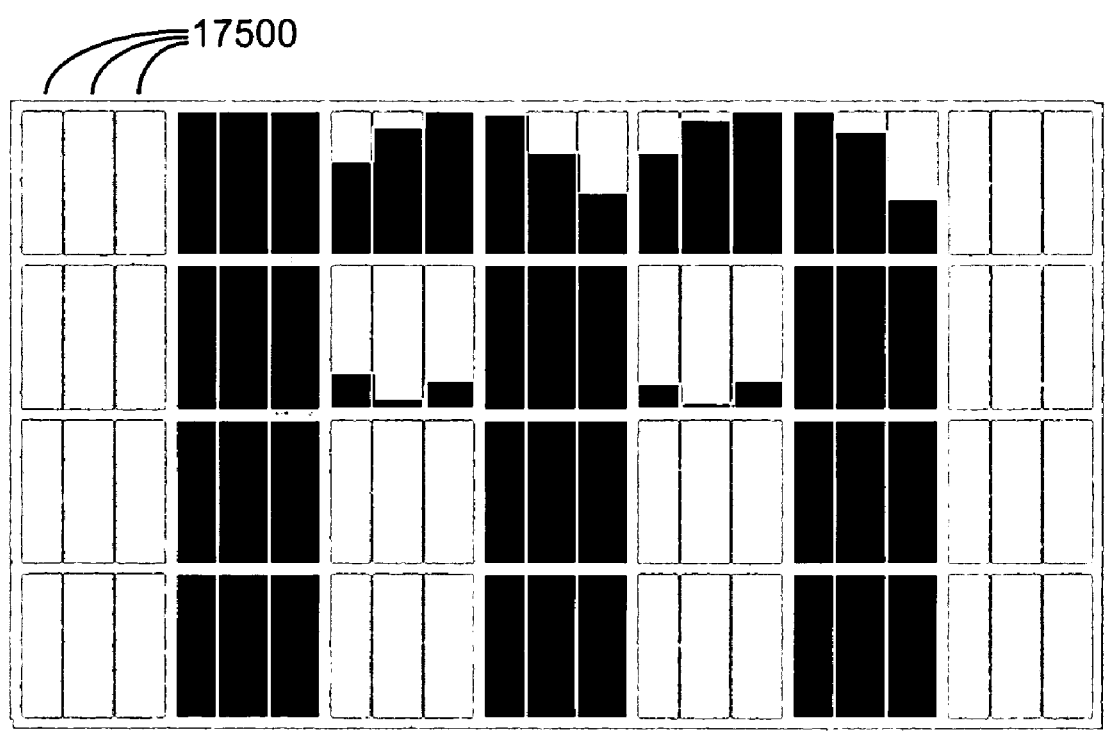

The inventor has made this improvement by aligning the leftmost edge of a character's leftmost vertical stroke with the left edge of a pixel boundary. In many embodiments this is done by inserting three padding subpixel column 17500, shown in FIG. 175 before the leftmost subpixel column that contains a non-zero coverage values. This automatically aligns the leftmost rasterization unit (i.e., subpixel) all or partially covered by a character's outline with the leftmost edge of a pixel column. If a characters is hinted so its leftmost outline edge is aligned with the leftmost edge of a rasterization unit, this will automatically cause that leftmost outline edge to be aligned with the leftmost edge of a pixel in the resulting font bitmap. When the leftmost edge of a font outline is a vertical stroke this makes it very easy to create a font bitmap that has clear leftmost vertical edge, even after non-linear color balancing.

Figure 176:
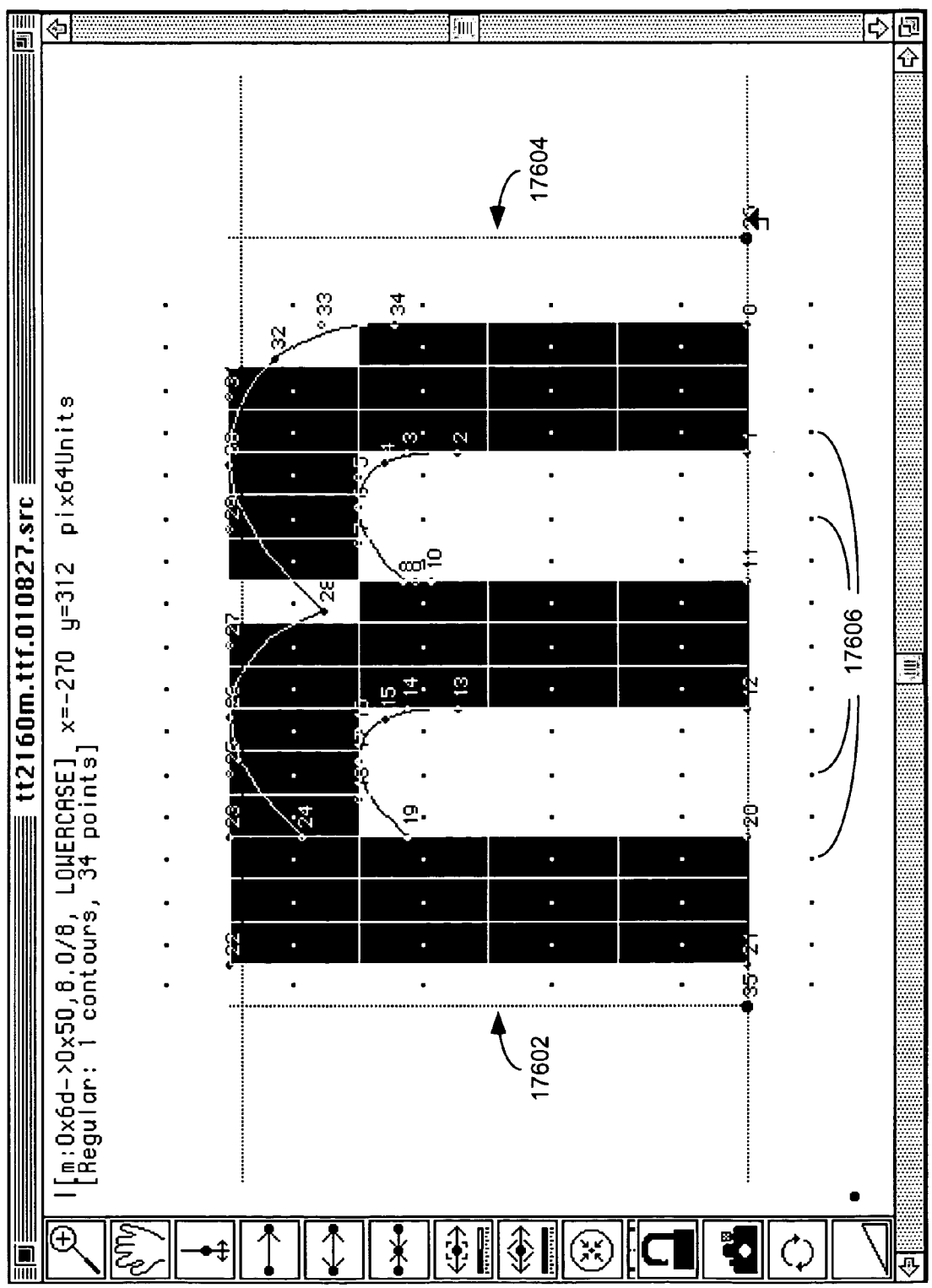

FIG. 176 shows one of many possible hinting interfaces that can be used with the present invention. In this hinting interface the dotted lines 17602 is a line that can be moved by the user to interactively define the left side bearing for a desired character. The dotted line 17604 is a movable line that defines the right side bearing. The left side bearing is the distance between the initial reference point, sometimes called the pen position, relative to which a character is to be drawn and the leftmost edge of the bitmap of the character being drawn. The line 17604 corresponds to the location relative to the bitmap at which the pen position will normally be placed at the start of the drawing of the next successive character along a line of text. The right side bearing is the distance between the line 17604 and the rightmost edge of the bitmap of the character being drawn. The advance width is defined as the distance between the lines 17604 and 17602. This represents the normal total width between pen positions before and after the drawing of a character's bitmap. In some embodiments, the left side bearing value and the advance width are rounded to whole multiples of pixel widths, although in other embodiments this need not be true. In some cases, the left and/or right side bearing values can be negative. For example this often happens with italic fonts in which the bitmaps associated with successive characters often overlaps portions of each other's advance width.

Each of the small rectangular dots 17606 shown in FIG. 176 correspond to the center of a rasterization unit, which, in subpixel-optimized font bitmaps, correspond to an individual subpixel. In this particular hinting interface rasterization units more than half covered by a character-font shape's outline are shown in black, although in more advanced interfaces such rasterization units could be shown with grayscale coverage values. The character-font shape's outlines are shown in the figure and each point that defines a segment in the outline is numbered, whether it be a control point or a segment endpoint.

FIGS. 177 through 181 are used to help explain some of the steps described in the highly simplified pseudocode contained in FIG. 182.

FIG. 182 is a highly simplified pseudocode description of programming 6000A, which corresponds generally to the pseudocode shown in FIG. 60, except that the pseudocode shown in FIG. 182 focuses on computational aspects that relate to the improved method of producing more clear non-linearly color-balanced subpixel-optimized bitmaps described above with regard to FIGS. 172 and 176.

The pseudocode includes a function 18202, which determines the tightest rectangular array of rasterization units into which a character-font shapes can be placed, taking into account the alignment of its shape relative to such rasterization units defined by its hinting.

The position of the font outline relative to the individual rasterization units in which it occurs is not changed by this function. Thus, if such an outline's leftmost point occurs other than at the left edge of the rasterization unit it is in, that rasterization unit will appear at the leftmost edge of the tightest rectangular array produced by function 18202, and the leftmost point of that outline would occur within the leftmost rasterization unit column of that rectangle, but it would not occur at the leftmost edge of that leftmost column.

Figure 177:
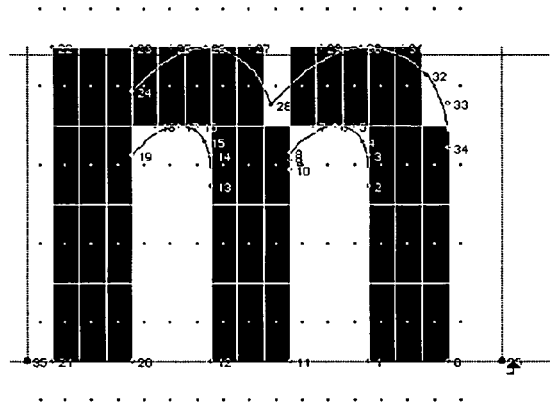
Figure 178:
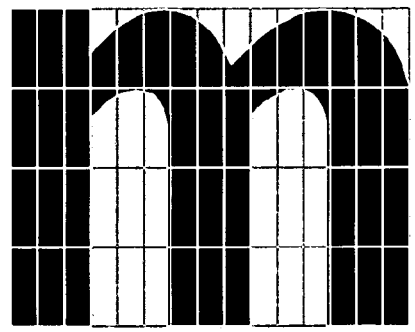

FIGS. 177 and 178 are used to help explain this function. FIG. 177 corresponds to a hinted character-font shape outline. FIG. 178 shows the rectangle of rasterization units (each corresponding in size to a subpixel) returned by function 18202 for the character outline shown in FIG. 177. This grid corresponds to the tightest, or smallest, rectangle into which the rasterization unit containing the character font shape fits.

Once the function 18202 has been completed, functions 6002A through 6006 are performed. These correspond to steps 6002 through 6006 of FIG. 60. They are used to determine a coverage value for each rasterization unit contained in the rectangle returned by function 18202. Each such coverage value represents the percent of the subpixel covered by the higher-resolution character-font shape outline being rasterized.

Figure 179:
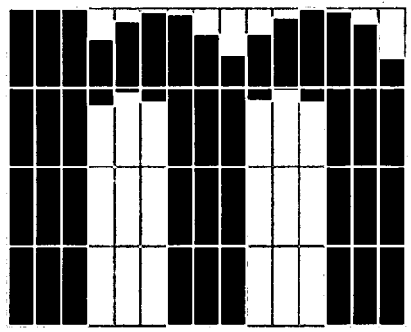

FIG. 179 illustrates the coverage values calculated for each rasterization unit in the array shown in FIG. 178. In it coverage is represented by the percent of the rasterization unit that is colored black. In FIG. 179 the portion of the resulting bargraph in each rasterization unit representing coverage is placed at the top of that unit if the corresponding part of the unit covered by the character-font shape outline occurs at the top of the rasterization unit.

Figure 180:
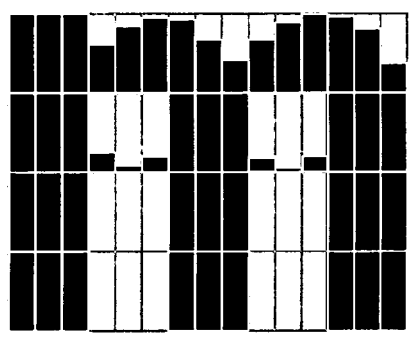
Figure 181:
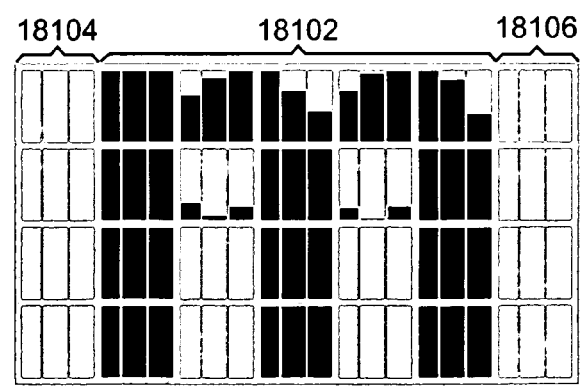

In FIG. 180 the bargraphs for all individual rasterization units are placed starting at the bottom of the corresponding subpixel unit, so as to make them correspond more closely with the representation of coverage values shown in FIGS. 46 through 52 and 92 through 93, described above.

Once the character-font shape has been rasterized, step 18204 maps the resulting array of subpixel coverage values into an array of subpixel-addressable pixels. It does so aligning the first column of rasterization units in the tight rectangle described above with the leftmost subpixel of a pixel row. This causes the leftmost column of rasterization units that have a nonzero coverage value to be placed as a leftmost subpixel column in a whole pixel as described above with regard to FIG. 175. In the example illustrated in FIGS. 177 through 181, this causes the resulting subpixel array to appear as shown in the set of central pixel columns labeled 18102 in FIG. 181.

Next a step 18206 pads the bitmap array being created for the current character with a pixel column comprised of three subpixel's to the left of the pixel containing the leftmost subpixel column containing an actual nonzero coverage value. This causes the subpixel array in the example to appear as shown by the combination of pixel columns 18104 and 18102 in FIG. 181.

Next a step 18208 pads the bitmap array with two or more subpixel columns to its right, so as to cause the total number of subpixel columns of the bitmap to be an even multiple of three, that is to be an even number of whole pixel columns. This causes the example subpixel array to appear as shown by the combination of pixel columns 18104, 18102, and 18106 in FIG. 181.

Step 18210 adjusts the left and right side bearing value to compensate for the addition of the padding pixel columns. Thus, for example, a bitmap that would otherwise have a left side bearing of one pixel width would be changed to have a left side bearing of zero to compensate for the addition of the left side padding column. Similarly a bitmap that had and extra pixel column added to its right side would decrease its right side bearing by one pixel width.

Next function 18212 performs non-linear color balancing, which in many embodiments will correspond to the steps described by the loop 6008 shown in FIG. 60, described above.

Once this has been done, in embodiments using a packed color value representation of the type described in FIG. 96 above, step 18214 converts the pixel color values resulting after the color balancing operation into corresponding values from a more limited color palette.

Note that the method of FIG. 182 allows room for any color balancing that might be necessary, without tending to cause the unnecessary color spreading discussed above with regard to FIGS. 168 and 169. It does this by insuring that there are at least two subpixels to the left and to the right of any subpixels corresponding to area covered by the font shape being rasterized.

In other embodiments of this aspect of the invention other methods will be used to cause leftmost and rightmost edges of font shapes and vertical strokes to be aligned with whole pixel boundaries, so as to take maximum advantage of the capability of non-linear color balancing to reduce smearing. In some such embodiments, whether or not a padding pixel columns was added to the left or right side of a font bitmap could be a function of whether or not color balancing distributions were required in such columns.

FIG. 183 describes functions for drawing a string of characters using the bitmaps produced by the method described in FIG. 182. This pseudocode is similar to that described above with regard FIG. 97, except that it focuses on an aspect of the invention that is quite useful with the method for producing more clear non-linearly color-balanced subpixel-optimized font bitmaps describe with regard to FIG. 182.

When the draw string function 18300 shown in FIG. 183 is called, a step 18302 sets the pen position to a start position specified by the draw string call that indicates where the display of the string is the start.

Then a loop 9714A similar to the loop 9714 described in FIG. 97 is performed for each character the string to the display.

In this loop a step 9716 accesses the current character's font bitmap. Then a step 18304 sets the character start position to the current pen position. Then a step 18306 adjusts the current pen position by the left side bearing. As has been described above, the left side bearing has been changed from what it would normally be to take into account the fact that the character bitmap has been padded with one extra pixel column on its left hand side, and thus will be decreased by the width of one pixel column.

Next a step 9718A is performed for each pixel in the font bitmap. This includes a substep 18308, which tests to see if the current pixel's value is nonzero. If so, it draws the pixel on the screen at a position determined as a function of the current pen position.

If the current pixel's value is zero, it represents a totally transparent pixel, meaning the background color previously at the position of the current pixel should be left unchanged.

In this embodiment of the invention the functions described in FIG. 96 reserve the value 0 to represent such a totally transparent pixel.

This practice of not writing transparent pixel's is applied to all pixels of the bitmap in the embodiment described in FIG. 183. This practice is particular valuable with regard to pixels in the padding column placed at the left most edge of a character-font bitmap by step 18206 described above regard FIG. 182. This is because pixels in such padding columns will commonly have no color values spread into them as a result of non-linear color-balancing when vertical stroke boundaries have been aligned to vertical pixel boundaries. As a result, such pixels will be transparent and color values that may have been placed in their location by the character to its left can remain unchanged, allowing the pixel columns of adjacent characters that contain coverage or color balancing information to be placed adjacent to each other.

This can be seen for example at the location indicated by the numeral 17302 in FIG. 173 where the pixel column between the "w" and "e" of the word "Web" contained color values from the "w" that have been allowed to show through the transparent, and thus non-written, left side padding column associated with the "e". This can also be seen at the location indicated by the numeral 17402 shown in FIG. 174, in which the pixel column between the "r" and the "e" contain color values from the "r" that are not overridden by the transparent padding pixel column of the "e".

As those skilled in the art will recognize, function 9718A will require some sort of iteration controlling the position at which pixels are drawn to be repeated for each row of a font bitmap, so as to have each of its bitmaps drawn in the proper place.

It should be appreciated that in other embodiments of the invention, function could be provided that would allow overlapping non-transparent pixel values from adjacent characters to be combined, rather than merely allowing non-transparent color values from one character to show through when the corresponding pixels of the following character are transparent.

Preferably such a process would allow combination of such transparency values on a subpixel-by-subpixel basis. Such a process could provide an even more accurate representation of closely spaced letters, although it would require more computation.

One way of achieving this result would be as follows: Add each of the three corresponding alpha component values associated with any overlapping pixel between characters, clipping any component values at their maximum possible value. And then drawing each of the resulting pixels, using the combined component alpha values to determine how much foreground color and how much background color should be drawn at its location.

Figure 184:
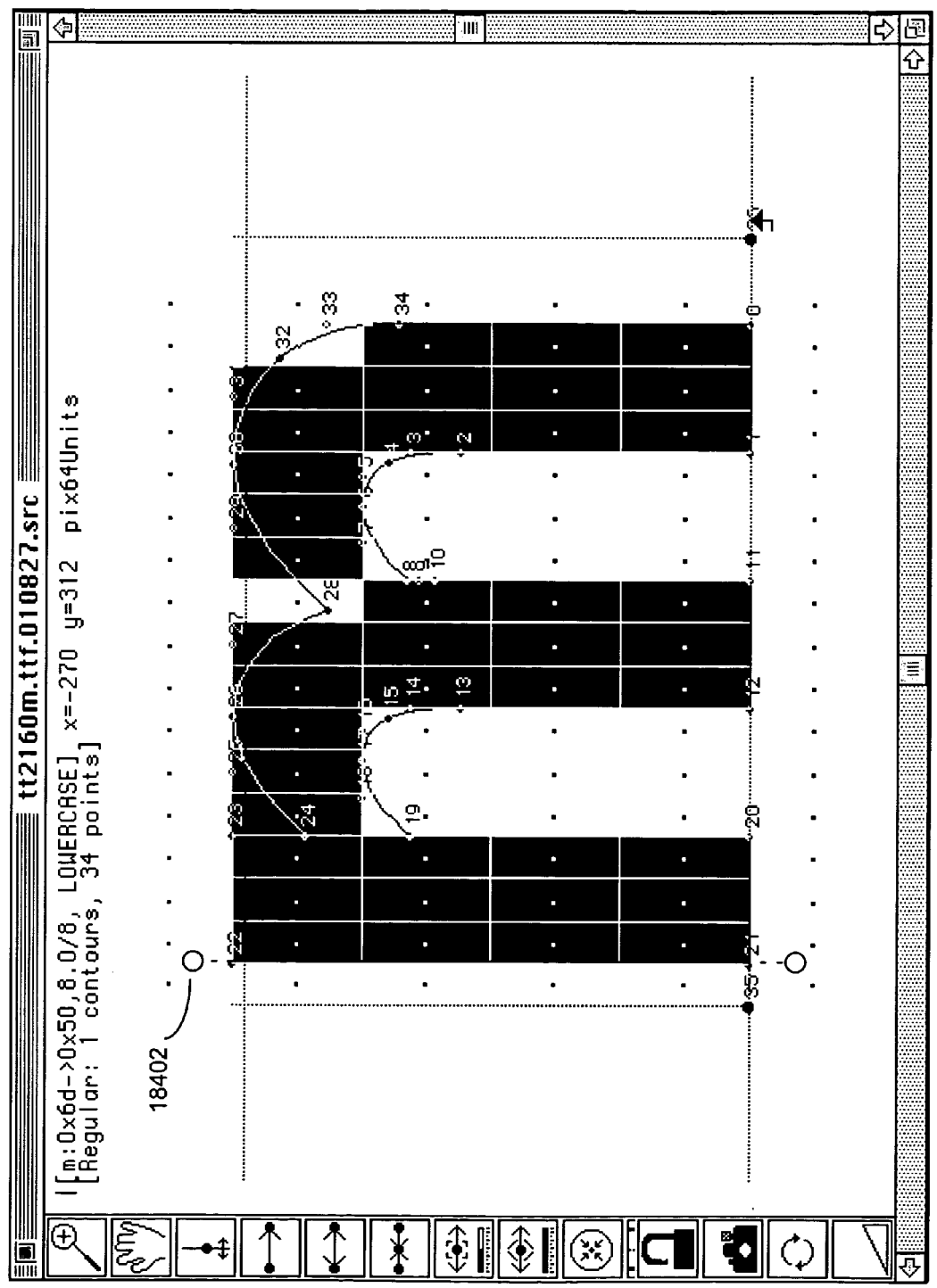

FIG. 184 illustrates an alternate embodiment of this method for providing more clear non-linear color-balanced font bitmaps. It illustrates a hinting interface similar to that described above regard FIG. 176, except that it includes an interface feature 18402 comprised of a user-movable line or control. This control allows the user to selectively position, relative to his or her character-font shape outline, the location to be aligned with the leftmost edge of a pixel column following the leftmost padding pixel column.

Such an interface feature is more desirable when hinting fonts that have a leftmost edge that is other than a vertical stroke. For example, when dealing with a character-font shape having a leftmost main vertical stroke with a small serif sticking out from to its left edge by less than a full pixel width, the hinter may want to have the main leftmost edge of the vertical stroke aligned with a whole pixel boundary, rather than the more leftward serif. The interface feature shown in FIG. 184 would make such an alignment easy for a hinter to select.

Another way of giving a hinter the equivalent capability would be to allow him or her to select whether to add only two subpixel padding columns, as described above with regard FIG. 170 or 171, or to add three or more such subpixel padding columns, as is described above with regard to FIGS. 175, 181 and 182.

The just described method for making non-linear color balanced subpixel optimized bitmaps more clear is not only applicable to small fonts of the types shown in FIGS. 172 through 174 but also to larger fonts, such as the relatively large font shown in FIG. 55.

It should be appreciated that subpixel optimization can usually represent a font bitmap with just three different types of pixels: a foreground pixel, a background pixel, and an intermediary, color balancing, pixel. A foreground pixel represents a portion of the font image totally covered by the font shape being represented, and is drawn with the foreground color with which the character is being represented. A background pixel represents a portion of the font image totally uncovered by the font shape, and is drawn with the color of the background on top of which the font is being shown. An intermediate pixel represents a pixel that is partially covered by the font shape and/or which receives color balancing distributions for a nearby pixel. The color of each of its subpixel's is determined separately by color balancing.

When prior art linear color balancing of the type described above with regard to FIGS. 46, 47, 52, and 93 are applied to fonts, color balancing is performed across every edge of a character shape in the direction of subpixel color variation, even if that edge is perfectly aligned with a pixel boundary. This leads to the spatial smearing of the shape of all letters, no matter how well hinted.

When non-linear color balancing of the type described above with regard to FIGS. 48, 49, 51, and 91 is applied to fonts, hinting can be used to greatly reduce the spatial smearing caused by color balancing. In portions of a character's shape where its edges are aligned with pixel boundaries, often no color balance distribution will be required across pixel boundaries. This is because such non-linear color balancing only distributes color imbalance that occurs within a give pixel. This allows foreground pixels to be next to background pixels along the direction of subpixel color variation in such locations, greatly increasing the perceived clarity of the font shape. This is shown in FIGS. 173 and 174 in which substantial portions of the vertical strokes in the 8 pixel per em font shown those figures have been hinted so that their edges align with pixel boundaries. As a result, foreground pixels are located horizontally next to background pixels along substantial portions of the edges of many such vertical strokes. Even with the less optimal hinting of leftmost vertical stroke edges shown in FIGS. 168 and 169, the amount of color-balance smearing is substantially less than that which would result from prior art linear color balancing.

FIGS. 185 through 190 are highly simplified pseudocode descriptions of user interface innovations that can be used to improve the browsing of Web pages, particularly when such browsing is performed on relatively small or relatively low resolution screens.

FIG. 185 is a higher level description of the selected-text re-flow method described above with regard to FIGS. 129 through 134. This method 18500 includes a function 18502 that accesses a Web page's content and a function 18504 that performs a first layout of the Web page's content, placing text at different horizontal locations indicated for text in the web page. The markup languages used to describe Web pages have multiple methods of indicating that different portions of text are to be drawn at different horizontal locations or in different horizontal ranges in a web page, including, to name just two, the use of tables and frames.

Once such a layout has been performed, function 18506 displays the elements of the layout at a given scale and at relative positions determined by the first layout. After this display has been performed a step 18508 enables the user to select a portion of the text at a given horizontal location in the display of the first layout. On way of enabling this is described above with regard to FIG. 130.

If such a selection is made, function 8510 causes function 18512 and 18514 to be performed. Function 18512 performs a second layout of the text that has been selected by the user. This second layout re-flows the selected text across the lines of the new column in which the text has a different, usually larger, font size relative to the width of the lines in the new column. When this second layout is been performed, function 18514 displays the layout of the new column at a scale that fills at least two thirds of the width of the screen or screen window on which the web page is being displayed.

As indicated above with regard to FIGS. 135 through 137, the second layout in such selected-text re-flow method allows a user to see selected portions of the Web pages layout in large easy-to-read font sizes. This can be a tremendous advantage on both low resolution screens, screens that are small, and/or screens that are relatively far from their viewer. The first layout in such a method allows the user to get a view of how the web page is intended to look in more normal displays, and allows the user to more rapidly select that portions of the text he or she desires to see re-displayed at a larger font size.

FIG. 186 is a high-level pseudocode description of a zoom-to-fit method 18600, of the general type described above with regard to FIGS. 118 through 120.

This method includes a function 18602 that accesses a Web page's content, and a function 18604 that lays the Web page's content out.

Once such a display of the layout is being shown on a screen, function 18608 enables the user to drag a pointing device across this display. During such a drag, if the drag continues across a boundary associated with a screen edge, a function 18610 causes function 18612 to scroll, onto the screen, portions of the layout that were previously off screen on the other side of the screen edge. This is done to allow user to select with a drag a portion of the layout that is either too large to entirely fit on the screen at the current display scale or that was positioned at the start of a drag so that only part of it was on the screen.

If the user releases the drag, function 18614 causes functions 18616 and 18618 to be performed. The first of these causes a part of the layout to be defined as selected based on the positions in the layout that corresponds to the start and end of the drag. Such a selected part can correspond to a portion of the layout having either the horizontal or vertical range of the drag or to an area having diagonal corners corresponding to the start and end of such a drag. Then function 18618 displays the selected part of the layout at a scale that causes it to substantially fit the screen.

FIG. 187 is a high-level pseudocode description of a drag scroll method 18700 that allows a user to easily navigate within the display of a web page's layout.

This method includes a function 18702 that accesses the Web page's content, a function 18704 that performs a layout of the Web page's content, and a function 18706 that displays all or portion of that layout at a given scale factor. Then a function 18708 enables the user to drag a pointing device across the display of the layout. Function 18710 responds to any such drag across a boundary associated with a screen edge by scrolling onto the screen, past the screen edge, portions of the layout previously off screen.

This method can be used as part of, or independently from, zoom selection functions. It has the advantage of enabling a user to scroll around the display of the layout of a web page by merely dragging a pointing device across a boundary at, or near, an edge of the display screen.

FIG. 188 is a high-level pseudocode description of a click-zoom method 18800 that enables a user to rapidly select to zoom in on a desired portion of the display of a layout of a web page. This method includes a function 18802 that accesses the web page's content, a function 18804 that performs a layout of the Web page's content, and a function 18806 that displays all or a portion of the Web page's layout at a first scale. A function 18808 enables the user to click a pointing device at a selected location in the display of the layout at the first scale, and function 18810 responds to such a click by performing a zoomed-in display of the portion of the layout around the location in the layout at which the click was performed. Commonly the zoomed-in display will be centered on the location in the layout at which the click was made.

FIG. 189 is a highly simplified pseudocode description of the zoom-click method 18900 described above in some detail with regard to FIGS. 121 through 128.

This method includes a function 18902 that accesses the Web page's content, a function 18904 that performs a layout of that content, and a function 18906 that displays all or a portion of the web page's layout at a first scale on a display screen having an associated pointing device. In the particular embodiment of this method described in FIG. 189, the screen is a touch screen and it is intended that the pointing device can be a person's finger.

Once the display of the layout at the first scale has been performed, a function 18908 responds when a press has been made to the touch screen display. When such a press occurs, this function causes functions 18910 through 18922 to be performed.

Function 18910 replaces, on the screen, the display of a portion of the web page at the first scale with a zoomed-in display of a portion of the web page at a larger scale. This zoomed portion includes a selected location in the layout associated with touch screen press. Preferably the selected layout position has substantially the same location on the screen in the zoomed-in display as it had in the display at the first scale at the time of selection. By substantially same position, it is meant that the selected positioned should have locations on the screen both immediately before and after the zoom that appears to correspond to the same touch positioned on the screen. Preferably this would mean that the change in the selected position's screen location would not change by more than twenty percent of the width or height of the screen immediately after such a zoom.

Once the zoomed-in display is shown, function 18912 displays a cursor above the location at which the screen is being touched to indicate the selected location in the web page layout associated with the touch. In some touch screen devices, particularly those designed for use with styluses having relatively fine points, there is no need for such a cursor, since the user can see with considerable accuracy the point at which the screen is being touched. But in touch screens designed for use with fingers as pointing devices it is often desirable to place a cursor above the location at which the screen is being touched so the user can accurately see the location in the screen's display that is associated with such a touch. This is particularly desirable when the method is being use with a display, such as that shown in FIGS. 121 through 128, that is relatively small compared to the size of a human finger.

During the continuation of the touch, a function 18914 responds to any movement of the touch by correspondingly moving the cursor in the zoomed display. Also during the continuation of such a touch, a function 18916 response to any movement of the touch across a boundary associated with a screen edge by scrolling onto the screen, past the screen edge, portions of the layout at the zoomed scale that were previously off the screen. This allows the user to rapidly and conveniently scroll within the zoomed display of the web page while in zoom-click mode.

Function 18918 responds if the user releases a touch at a given positioned in the zoomed display of the web page. If so, a function 18920 acts as if a pointing device click had occurred at a positioned in the web page corresponding to that of the release. For example, if the release is at a layout location corresponding to a web link, the system will respond by selecting the link, or if the release is at the location of a radio button, the system will respond by flipping the state of the radio button.

Once this has been done, a function 18922 replaces the display of the zoomed-in layout on the screen with a display of the layout at the same first scale factor at which the web page was displayed before the pointing device press was detected by function 18908.

As described above with regard to FIGS. 121 through 128, zoom-click provides a valuable technique for allowing a user to rapidly see and select desired portions of a web page at a zoomed-in scale that makes the contents of those selected parts easier to read and easier to accurately select with a pointing device.

FIG. 190 is a highly simplified pseudocode description of a method 19000 that allows a user to see a zoom-out view of a web page using greeking to represent text lines. Greeking is the representation of the size at which portions of text are laid out in a document by non-readable graphic representations.

This method includes a function 19002 that accesses a Web page's content, a function 19004 that performs a layout of the web page's content, and functions 19006 and 19014 that detects the scale at which the user has selected to have the layout of the web page's contents display.

If the user has selected to have the web page's layout displayed at a given larger display scale, function 19006 causes function 19008 to display a portion of the web pages layout at the larger scale. This includes performing a function 19010 to represent the layout's images with bitmap images scaled for display at the larger scale and a function 19012 that represents the layout of the web page's strings with bitmaps composed from separate font bitmaps that have sizes appropriate for display at the larger scale.

If, on the other hand, the user has selected a given smaller display scale, one which is so small that at least some of the text of the web page cannot be displayed at that scale in a size that is readable, function 19014 causes a function 19016 to display a portion of the web page's layout at the smaller scale. This includes performing a function 19018 that represents the layout's images with bitmap images that have been scaled down for display at the smaller scale, and a function 19020 that represents at lease some strings with bitmaps composed of greeked text representations that indicate the size and location of individual strings in the display at the smaller scale.

In many cases the bitmaps used to represents strings in such greeking will merely be lines or rectangles having a width and/or height corresponding to the size of their corresponding strings in the web page's layout at the small-scale.

When a layout is displayed at a size in which text is too small to read the use of greeked representations of text can makes such a display easier and more pleasant to see, and such greeking generally takes less computation to generate that would corresponding string images generated from unreadabily small font bitmaps.

One of the major uses of the method shown in FIG. 190 is to enable a user to quickly gain an overview of a web page's layout and to allow him or her to quickly select different portions of such a web page, such as has been described above with regard to FIGS. 136 and 137.

Those skilled in the art of computer user interfaces will appreciate that some of the methods described in FIGS. 185 through 190 can be used in combination with each other and with other aspects of the invention described above as part of a single user interface mode, whereas others are them would normally be used in different user interfaces or different user interface modes.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention.

The invention of the present application, as broadly claimed, is not limited to use with any one type of operating system, computer hardware, or computer network, and, thus, other embodiments of the invention could use differing software and hardware systems.

Furthermore, it should be understood that the program behaviors described in the claims below, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and/or sequence of steps described in the figures. This is particularly true since the pseudocode described in the text above has been highly simplified to let it more efficiently communicate that which one skilled in the art needs to know to implement the invention without burdening him or her with unnecessary details. In the interest of such simplification, the structure of the pseudocode described above often differs significantly from the structure of the actual code that a skilled programmer would use when implementing the invention. Furthermore, many of the programmed behaviors that are shown being performed in software in the specification could be performed in hardware in other embodiments.

In the many embodiment of the invention discussed above, various aspects of the invention are shown occurring together that could occur separately in other embodiments of those aspects of the invention.

Most of the various illustrations of subpixel optimization and non-linear color-balancing described in various parts of this specification relate to RGB subpixel addressable displays having vertical subpixel striping. It should be appreciated that many aspects of the present invention that relate to non-linear color balancing and subpixel optimization can be used with subpixel displays that have BGR or other types of subpixel addressability, as well as subpixel displays having horizontal subpixel striping.

In the non-linear color balancing methods shown above the only portion of a subpixel's luminosity distributed by color balancing is that which is higher than the minimum subpixel luminosity value within a pixel. But in other embodiments other portion of a subpixel's luminosity that cause color imbalance within a pixel could be distributed, such as portions that differ from the mean or maximum subpixel luminosity of pixel. In such embodiments subpixel luminosity values below such a mean or maximum would, in effect, be negative luminosity values, that could be distributed by a weighted decreasing of subpixel luminosities in such a subpixel's neighborhood.

All the non-linear color balancing methods shown above only distribute those portions of a subpixel's luminosity that cause color imbalance within a subpixel's corresponding pixel. This is done because the arrangement of three successive RGB or BGR subpixels commonly found within a whole pixel are perceptually well color balanced. If the subpixels of such a whole pixels are of equal luminosity they tend to appear more color balanced to the eye than an isolated set of the same three colored subpixels shown at the same intensity in an order in which green is not the central color. This is one of the reason why edges of fonts that appear at other than whole pixel boundaries appear color imbalanced.

But other non-linear color balancing embodiments need not be limited to only distributing subpixel luminance that causes imbalance within individual whole pixels. Other non-linear color balancing embodiments could determine the degree of subpixel color imbalance within regions other than whole pixels, and distribute subpixel luminance values based totally or in part on imbalance with such regions. For example, studies could be performed to find which distributions of imbalanced coverage values created a minimal spatial spreading while maintaining the perception of color balance, for each of a plurality of commonly occurring imbalance patterns, and such perceptually selected distributions could be used to distribute color imbalance that occurs in spatial regions other than whole pixel regions.

Certain aspects of the invention relate to the creation and use of subpixel optimized images that calculate luminosity values for individual pixels by line coverage techniques. It should be appreciated that other aspects of the invention claimed below without specific recitation of such line or area coverage functions are not limited to such methods of determining subpixel luminosity and could for example use other known methods for determining coverage values with source images comprised of color bitmaps, greyscale bitmaps, fonts, and other shapes, including, but not limited to, area sampling techniques.

In the discussion above, the source image windows used to assign luminosity or coverage values in subpixel-optimized bitmaps are rectangular, and have sizes corresponding a whole pixel in a multi-color subpixel-optimized image and corresponding to a subpixel in a bicolor subpixel optimized image. In other embodiments windows of different shapes and sizes can be used. For example, in multi-colored sub-pixel-optimized images source image windows might have a size somewhat smaller that that corresponding to a whole output image pixel. In some embodiments, a non-uniform weighting function could be used to translate coverage or luminosity values in a source image window into coverage or luminosity value in the output image. For example, in multicolor subpixel-optimized images it might be preferred to give more weight to the luminosity in portions of a source windows that corresponds in size and location to the subpixel whose luminosity is being determined. In fact, the line coverage arrangement discussed above with regard to FIGS. 17 through 19 provides such central weighting because its vertical line runs only through the portion of the source image window that correspond to the location of the subpixel for which its line coverage values are being determined.

Although many aspects of the invention explicitly relate to the use of subpixel optimization, many other aspects do not depend on subpixel-optimization. In some such aspects of the invention forms of anti-aliasing can be used that do not involve subpixel-optimization. Forms of anti-aliasing that do not involve subpixel optimization can allow images to appear to have a higher resolution than could be provided in the absence of such anti-aliasing. This is particularly true for font images. For example, fonts as small as seven pixel's per em can be read relatively easily provided that they have the right shape, are properly hinted, and use anti-aliasing—either with or without subpixel-optimization, although proper subpixel-optimization makes such small fonts easier to read.

In this specification and the claims that follow, reference to a "screen", particularly a screen on which scaled-down images, text, or web page layouts are displayed, can normally include either whole screens or parts of screens, such as graphic windows on screens. For example, the scaled down screen images referred to might be shown in a window on a considerably larger screen, or may be shown on a portion of a small screen that is left after space is dedicated to certain graphical user interface elements, such as, for example, the tool bar shown in FIG. 114. It should also be appreciated that certain subpixel-optimized aspects of the invention can be used to display images and/or text across all or a substantial portion of a large screen, such as to allow such a large screen to see content at a higher spatial resolution that it could with non-subpixel-optimized techniques.

Some aspects of the invention specifically relate to laying out digital content at a virtual resolution and then displaying it at a scaled-down resolution. It should be appreciated that in other aspects of the invention the images and text of the digital content could be scaled down before layout, and then be laid out at the actual resolution they are to be shown at.

What is claimed is:

1. A method of displaying, on a subpixel addressable screen of an image displaying device having pixels comprised of separately-addressable, differently-colored subpixels, digital content including text and/or images represented by a mark-up language including tags that dictate the format in which such content is to be displayed and tags that identify images to be displayed as part of said content, said method comprising:

accessing said digital content, including accessing one or more images, from one or more devices in which said content is stored or is generated dynamically;

performing a down-scaling and subpixel-optimization process in which:

each of said accessed images is a source image for the process;

said process produces from each such source image a corresponding scaled-down, subpixel optimized image;

each such scaled image represents the source image from which it has been produced at a lower pixel resolution than the pixel resolution of said source image;

each such scaled image also represents the corresponding source image in a subpixel-optimized manner by causing the luminosity associated with each subpixel within a given pixel of the scaled image to represent the luminosity of the subpixel's color in a portion of the corresponding source image that differs for each subpixel as a function of the subpixel's different position in the given pixel; and displaying said accessed digital content on said subpixel-addressable screen in a format determined at least in part by one or more tags in said content, including, as part of said formatted display, displaying said scaled images in a subpixel-optimized manner on said screen;

wherein:

said accessed digital content includes one or more strings of displayable text characters; and said display of said digital content also includes drawing a string bitmap on said screen to represent said string, the string bitmap being composed from a succession of separate font bitmaps each selected to correspond to an individual character in the text of said string;

said font bitmaps are anti-aliased subpixel-optimized images of character-font shapes; and said subpixel-optimized character-font shape images are subpixel-optimized in a different manner than the scaled images in that:

the luminosity assigned to each given subpixel of a pixel in one of said scaled images represents the intensity of the given subpixel's corresponding color in a portion of the source image having a position corresponding to the position of the given subpixel in the scaled image; and the luminosity assigned to each given subpixel in one of said font bitmaps is a function of:

a coverage value representing the percent of the given subpixel's area in the font bitmap that is covered by the character-font shape represented by the bitmap; and for at least some subpixels of said font bitmaps, a color balancing distribution between the given subpixel's coverage value and coverage values of other nearby subpixels that reduces perceptible color imbalances that would result from differences between coverage values of nearby subpixels of different colors in the absence of such color balancing distributions.

2. A method as in claim 1 wherein one or more of said strings are represented by font bitmaps that:

have a font size of 10 pixels per em or less;

are anti-aliased font bitmaps that assign a color value to a given screen pixel as a graded function of a coverage value representing the percent of the given pixel that is covered by a character shape being represented by the font bitmap; and have the shape and pixel alignment of the character represented by such a font bitmap selected to increase the degree of alignment of edges of the character shape with pixel boundaries of said bitmap.

3. A method as in claim 2 wherein:

said anti-aliased font bitmaps include small font bitmaps having a small font size of eight pixels per em or less; and the shape and pixel alignment of the character represented by such a small font bitmap have been selected to increase the degree of alignment of edges of the character shape with pixel boundaries of said small bitmap.

4. A method as in claim 3 wherein the font bitmaps of said small font size represent a majority of characters of the Roman alphabet within an advance width of 4 pixel columns or less.

5. A method as in claim 4 wherein the font bitmaps of said small font size represent a majority of lowercase letters with an x-height greater than 4 pixels.

6. A method as in claim 1 wherein said accessing of said digital content is performed over an computer network.

7. A method as in claim 6 wherein said accessing of said digital content is performed over the Internet.

8. A method as in claim 1 wherein said digital content includes web pages.

9. A method as in claim 1 wherein:

said screen is part of a browser computer capable of browsing digital content;

the browser computer includes browser programming that responds to user input requesting a given portion of digital content by requesting that content from another entity, either a storage device, another computer, or other programming running on the browser computer;

said accessing of said digital content is performed in response to the request from the browser programming; and said display of said accessed digital content, including said scaled images, is performed on the screen of said browser computer.

10. A method as in claim 9 wherein:

said user request is communicated over a computer network from said browser computer to one or more servers;

the digital content is accessed by being read from memory or dynamically generated by one or more of said servers;

said down-scaling and subpixel-optimization of said source images is performed by one or more of said servers; and said digital content, including said scaled images, is downloaded over said computer network to said browser, which then performs said display of the digital content.

11. A method as in claim 9 wherein:

said browser computer communicates said user request over a computer network to a proxy server;

said proxy server communicates said user request over a computer network to one or more servers that store or dynamically generate said digital content, including said source images;

said one or more servers sends said source image to said proxy server;

said scaling down of said source images is performed by said proxy server; and the proxy server downloads the digital content, including said scaled images to said browser, which then performs said display of the digital content.

12. A method as in claim 9 wherein said down-scaling and subpixel-optimization of said source images is performed by said browser computer.

13. A method as in claim 9 further including:

allowing a user of the browser computer to select one of a plurality of scale factors; and said down-scaling and subpixel-optimizing produces one or more scaled, subpixel-optimized images that each have a pixel size relative to the respective source image that is selected as a function of said user selected scale factor.

14. A method as in claim 13 wherein the size of said font bitmaps varies as a function of said user selected scale factor.

15. A method as in claim 13 wherein:

said other entity from which said browser programming requests said digital content is one or more remote computers that said browser programming communicates said request to over a computer network;

said user selected scale factor is also communicated from said browser programming over said computer network to one or more of said remote computers; and said scaling down and subpixel optimizing of said source images is performed on one or more of said remote computers at a scale factor that varies as a function of said user selected scale factor communicated over said network.

16. A method as in claim 1 wherein the percent of a given font bitmap subpixel's coverage value that is distributed to achieve color balance is a function of the percent of the given subpixel's coverage value that causes color imbalance within pixel of which the given subpixel is part.

17. A method of displaying, on a subpixel addressable screen of an image displaying device having pixels comprised of separately-addressable, differently-colored subpixels, digital content including text and/or images represented by a mark-up language including tags that dictate the format in which such content is to be displayed and tags that identify images to be displayed as part of said content, said method comprising:

accessing said digital content, including accessing one or more images, from one or more devices in which said content is stored or is generated dynamically;

performing a down-scaling and subpixel-optimization process in which:

each of said accessed images is a source image for the process;

said process produces from each such source image a corresponding scaled-down, subpixel optimized image;

each such scaled image represents the source image from which it has been produced at a lower pixel resolution than the pixel resolution of said source image;

each such scaled image also represents the corresponding source image in a subpixel-optimized manner by causing the luminosity associated with each subpixel within a given pixel of the scaled image to represent the luminosity of the subpixel's color in a portion of the corresponding source image that differs for each subpixel as a function of the subpixel's different position in the given pixel; and displaying said accessed digital content on said subpixel-addressable screen in a format determined at least in part by one or more tags in said content, including, as part of said formatted display, displaying said scaled images in a subpixel-optimized manner on said screen;

wherein:

said accessed digital content includes one or more strings of displayable text characters; and said display of said digital content also includes drawing a string bitmap on said screen to represent said string, the string bitmap being composed from a succession of separate font bitmaps each selected to correspond to an individual character in the text of said string;

one or more of said strings are represented by font bitmaps that:

have a font size of 10 pixels per em or less;

are anti-aliased font bitmaps that assign a color value to a given screen pixel as a graded function of a coverage value representing the percent of the given pixel that is covered by a character shape being represented by the font bitmap; and have the shape and pixel alignment of the character represented by such a font bitmap selected to increase the degree of alignment of edges of the character shape with pixel boundaries of said bitmap;

said font bitmaps are anti-aliased subpixel-optimized images of character-font shapes; and said subpixel-optimized font character-images shape are subpixel-optimized in a different manner than the scaled images in that:

the luminosity assigned to each given subpixel of a pixel in one of said scaled images represents the intensity of the given subpixel's corresponding color in a portion of the source image having a position corresponding to the position of the given subpixel in the scaled image; and the luminosity assigned to each given subpixel in one of said font bitmaps is a function of:

a coverage value representing the percent of the given subpixel's area in the font bitmap that is covered by the character-font shape represented by the bitmap; and for at least some subpixels of said font bitmaps, a color balancing distribution between the given subpixel's coverage value and coverage values of other nearby subpixels that reduces perceptible color imbalances that would result from differences between coverage values of nearby subpixels of different colors in the absence of such color balancing distributions.

18. A method as in claim 17 wherein the percent of a given font bitmap subpixel's coverage value that is distributed to achieve color balance is a function of the percent of the given subpixel's coverage value that causes color imbalance within pixel of which the given subpixel is part.

19. A computer system for displaying, on a subpixel addressable screen having pixels comprised of separately-addressable, differently-colored subpixels, digital content including text and/or images represented by a mark-up language including tags that dictate the format in which such content is to be displayed and tags that identify images to be displayed as part of said content, said system comprising:

one or more processors for executing program instructions stored in computer readable memory; and one or more computer readable memories storing program instructions for causing said one or more processors to:

access said digital content, including accessing one or more images, from one or more devices in which said content is stored or is generated dynamically;

perform a down-scaling and subpixel-optimization process in which:

each of said accessed images is a source image for the process;

said process produces from each such source image a corresponding scaled-down, subpixel optimized image;

each such scaled image represents the source image from which it has been produced at a lower pixel resolution than the pixel resolution of said source image;

each such scaled image also represents the corresponding source image in a subpixel-optimized manner by causing the luminosity associated with each subpixel within a given pixel of the scaled image to represent the luminosity of the subpixel's color in a portion of the corresponding source image that differs for each subpixel as a function of the subpixel's different position in the given pixel; and display said accessed digital content on said subpixel-addressable screen in a format determined at least in part by one or more tags in said content, including, as part of said formatted display, displaying said scaled images in a subpixel-optimized manner on said screen wherein:
said accessed digital content includes one or more strings of displayable text characters; and
said display of said digital content also includes drawing a string bitmap on said screen to represent said string, the string bitmap being composed from a succession of separate font bitmaps each selected to correspond to an individual character in the text of said string;
said font bitmaps are anti-aliased subpixel-optimized images of character-font shapes; and
said subpixel-optimized character-font shape images are subpixel-optimized in a different manner than the scaled images in that:
the luminosity assigned to each given subpixel of a pixel in one of said scaled images represents the intensity of the given subpixel's corresponding color in a portion of the source image having a position corresponding to the position of the given subpixel in the scaled image; and
the luminosity assigned to each given subpixel in one of said font bitmaps is a function of:
a coverage value representing the percent of the given subpixel's area in the font bitmap that is covered by the character-font shape represented by the bitmap; and
for at least some subpixels of said font bitmaps, a color balancing distribution between the given subpixel's coverage value and coverage values of other nearby subpixels that reduces perceptible color imbalances that would result from differences between coverage values of nearby subpixels of different colors in the absence of such color balancing distributions.

20. A computer system as in claim 19 wherein the percent of a given font bitmap subpixel's coverage value that is distributed to achieve color balance is a function of the percent of the given subpixel's coverage value that causes color imbalance within pixel of which the given subpixel is part.

21. A method of displaying, on a subpixel addressable screen of an image displaying device having pixels comprised of separately-addressable, differently-colored subpixels, digital content including text and/or images represented by a mark-up language including tags that dictate the format in which such content is to be displayed and tags that identify images to be displayed as part of said content, said method comprising:
accessing said digital content, including accessing one or more images, from one or more devices in which said content is stored or is generated dynamically;
performing a down-scaling and subpixel-optimization process in which:
each of said accessed images is a source image for the process;
said process produces from each such source image a corresponding scaled-down, subpixel optimized image;
each such scaled image represents the source image from which it has been produced at a lower pixel resolution than the pixel resolution of said source image;
each such scaled image also represents the corresponding source image in a subpixel-optimized manner by causing the luminosity associated with each subpixel within a given pixel of the scaled image to represent the luminosity of the subpixel's color in a portion of the corresponding source image that differs for each subpixel as a function of the subpixel's different position in the given pixel; and
displaying said accessed digital content on said subpixel-addressable screen in a format determined at least in part by one or more tags in said content, including, as part of said formatted display, displaying said scaled images in a subpixel-optimized manner on said screen;
wherein said down-scaling and subpixel-optimization process causes said luminosity associated with each subpixel of the scaled image to differ as a function of the subpixel's different position by determining the luminosity of each given subpixel in a given pixel of said display image by:
defining a plurality of coverage lines within a window in said source image having a position relative to the source image corresponding to the given subpixel's position relative to the display image, with the position of different source image windows associated with different subpixels of a given display image pixel differing as a function of the different positions of said subpixels within the given display image pixel;
determining which source image pixels overlaps each of said coverage lines within the given supixel's source image window;
determining what length of each of said coverage lines is overlapped by each such overlapping source image pixel; and
determining the luminosity of the given subpixel as a function of the length of each coverage line overlapped by each such overlapping source image pixel and the respective luminosity, in the given subpixel's color, of each such overlapping source image pixel.

22. A method as in claim 21 wherein the coverage lines associated with a given subpixel include at least two coverage lines that run in nonparallel directions on said subpixel's source image window.

23. A method as in claim 21 wherein the source image window associated with each given subpixel has a size relative to the source image corresponding to the size of a whole pixel relative to said display image.

24. A method of displaying, on a subpixel addressable screen of an image displaying device having pixels comprised of separately-addressable, differently-colored subpixels, digital content including text and/or images represented by a mark-up language including tags that dictate the format in which such content is to be displayed and tags that identify images to be displayed as part of said content, said method comprising:
accessing said digital content, including accessing one or more images, from one or more devices in which said content is stored or is generated dynamically;
performing a down-scaling and subpixel-optimization process in which:
each of said accessed images is a source image for the process;
said process produces from each such source image a corresponding scaled-down, subpixel optimized image;
each such scaled image represents the source image from which it has been produced at a lower pixel resolution than the pixel resolution of said source image;

each such scaled image also represents the corresponding source image in a subpixel-optimized manner by causing the luminosity associated with each subpixel within a given pixel of the scaled image to represent the luminosity of the subpixel's color in a portion of the corresponding source image that differs for each subpixel as a function of the subpixel's different position in the given pixel; and displaying said accessed digital content on said subpixel-addressable screen in a format determined at least in part by one or more tags in said content, including, as part of said formatted display, displaying said scaled images in a subpixel-optimized manner on said screen;

wherein said down-scaling and subpixel-optimization process causes said luminosity associated with each subpixel of the scaled image to differ as a function of the subpixel's different position by:

defining a window in the corresponding source image having a position relative to the source image corresponding to the given subpixel's position relative to the display image, with the position of different source image windows associated with different subpixels of a given display image pixel differing as a function of the different positions of said subpixels within the given display image pixel; and determining the luminosity of each given subpixel in a pixel of said display image as a function of:

the whole pixel luminosity of each of one or more source image pixels that overlaps the given subpixel's source image window;

the percent of the given subpixel's source image window overlapped by each such overlapping source image pixel; and a color balancing function that distributes subpixel luminosity values between nearby subpixels in the display image to reduce color imbalance.

25. A method as in claim 24 wherein the percent, if any, of a given subpixel's luminosity value that is distributed by said color balancing varies as a function of the percent of said luminosity value that causes color imbalance within the pixel of which the given subpixel is part.

26. A method as in claim 24 wherein a source image window has a size relative to the source image corresponding to the size of a subpixel relative to the display image.

27. A method as in claim 26 wherein:

a plurality of coverage lines are defined within the given subpixel's source image window;

the luminosity of the given subpixel is determined by:

determining which source image pixels overlaps each of said coverage lines within the given supixel's source image window;

determining what length of each of said coverage lines is overlapped by each such overlapping source image pixel; and determining the luminosity of the given subpixel as a function of the length of each coverage line overlapped by each such overlapping source image pixel and the respective whole pixel luminosity of each such overlapping source image pixel.

28. A method as in claim 26 wherein the luminosity of the given subpixel is determined by:

determining which source image pixels overlaps the given supixel's source image window;

determining what area of the given subpixel's source image window is overlapped by each such overlapping source image pixel; and determining the luminosity of the given subpixel as a function of the area of the source image window overlapped by each such overlapping source image pixel and the respective whole pixel luminosity of each such overlapping source image pixel.

* * * * *